(12) United States Patent
Jones et al.

(10) Patent No.: US 9,359,221 B2
(45) Date of Patent: *Jun. 7, 2016

(54) CARBON DIOXIDE SEQUESTRATION INVOLVING TWO-SALT-BASED THERMOLYTIC PROCESSES

(75) Inventors: Joe David Jones, Austin, TX (US); Al Yablonsky, Austin, TX (US)

(73) Assignee: SKYONIC CORPORATION, Austin, TX (US)

( * ) Notice: Subject to any disclaimer, the term of this patent is extended or adjusted under 35 U.S.C. 154(b) by 903 days.

This patent is subject to a terminal disclaimer.

(21) Appl. No.: 13/179,305

(22) Filed: Jul. 8, 2011

(65) Prior Publication Data

US 2012/0034144 A1    Feb. 9, 2012

Related U.S. Application Data

(60) Provisional application No. 61/362,607, filed on Jul. 8, 2010, provisional application No. 61/370,030, filed on Aug. 2, 2010, provisional application No. 61/406,536, filed on Oct. 25, 2010, provisional application No. 61/451,078, filed on Mar. 9, 2011.

(51) Int. Cl.
| | |
|---|---|
| *C01F 11/18* | (2006.01) |
| *B01D 53/62* | (2006.01) |
| *C01B 31/24* | (2006.01) |
| *C01F 5/24* | (2006.01) |

(52) U.S. Cl.
CPC .............. *C01F 11/18* (2013.01); *B01D 53/62* (2013.01); *C01B 31/24* (2013.01); *C01F 5/24* (2013.01); *B01D 2251/402* (2013.01); *B01D 2251/404* (2013.01); *B01D 2257/504* (2013.01); *B01D 2258/0283* (2013.01); *Y02C 10/04* (2013.01); *Y02P 20/121* (2015.11); *Y02P 20/152* (2015.11)

(58) Field of Classification Search
CPC ................................ C01F 11/18; B01D 53/62
See application file for complete search history.

(56) References Cited

U.S. PATENT DOCUMENTS

| | | | | |
|---|---|---|---|---|
| 2,357,130 A | 8/1944 | Pike | ............... | 423/163 |
| 2,383,674 A | 8/1945 | Osborne | ............... | 422/423 |
| 2,962,350 A | 11/1960 | Trubey | ............... | 23/66 |
| 3,801,698 A | 4/1974 | Lowrance et al. | ............. | 423/234 |
| 3,855,398 A | 12/1974 | Hoffman et al. | ............... | 423/422 |
| 4,032,616 A | 6/1977 | Artur et al. | ............... | 423/190 |
| 4,069,117 A | 1/1978 | Cooper | ............... | 423/220 |
| 4,128,701 A | 12/1978 | Maricle | ............... | 429/21 |
| 4,147,599 A | 4/1979 | O'Leary et al. | ............... | 205/482 |
| 4,620,969 A | 11/1986 | Wilkinson | ............... | 423/421 |
| 4,720,375 A | 1/1988 | Ainscow et al. | ............... | 423/175 |
| 4,749,453 A | 6/1988 | Harris | ............... | 204/98 |
| 4,764,286 A | 8/1988 | Bon et al. | ............... | 210/757 |
| 5,080,799 A | 1/1992 | Yan | ............... | 210/661 |
| 5,888,256 A | 3/1999 | Morrison | ............... | 44/552 |
| 6,340,736 B1 | 1/2002 | Coenen et al. | ............... | 528/196 |
| 6,488,740 B1 | 12/2002 | Patel et al. | ............... | 95/71 |
| 6,592,829 B2 | 7/2003 | Chakravarti et al. | ............ | 422/171 |
| 6,676,824 B2 | 1/2004 | Urquhart et al. | ............... | 205/504 |
| 6,846,584 B2 | 1/2005 | Dutil et al. | ............... | 429/19 |
| 6,890,497 B2 | 5/2005 | Rau et al. | ............... | 423/220 |
| 6,908,570 B2 | 6/2005 | Green | ............... | 252/184 |
| 6,958,136 B2 | 10/2005 | Chandran et al. | ............... | 423/235 |
| 7,361,279 B2 | 4/2008 | Hernandez et al. | ............ | 210/668 |
| 7,427,449 B2 | 9/2008 | Delaney et al. | ............... | 429/19 |
| 7,517,435 B2 | 4/2009 | Guth et al. | ............... | 203/47 |
| 7,527,770 B2 | 5/2009 | Monzyk et al. | ............ | 422/186.3 |
| 7,655,069 B2 | 2/2010 | Wright et al. | ............... | 95/92 |
| 7,655,193 B1 | 2/2010 | Rau et al. | ............... | 422/169 |
| 7,699,909 B2 | 4/2010 | Lackner et al. | ............... | 95/236 |
| 7,708,806 B2 | 5/2010 | Wright et al. | ............... | 95/139 |
| 7,727,374 B2 | 6/2010 | Jones | ............... | 205/508 |
| 7,735,274 B2 | 6/2010 | Constantz et al. | ............ | 106/735 |
| 7,744,761 B2 | 6/2010 | Constantz et al. | ............ | 210/652 |
| 7,749,476 B2 | 7/2010 | Constantz et al. | ............ | 106/668 |
| 7,754,169 B2 | 7/2010 | Constantz et al. | ............ | 106/465 |
| 7,833,328 B2 | 11/2010 | Lackner et al. | ............... | 96/281 |
| 7,875,163 B2 | 1/2011 | Gilliam et al. | ............... | 205/210 |
| 7,887,694 B2 | 2/2011 | Constantz et al. | ............ | 423/230 |
| 7,909,911 B2 | 3/2011 | Lackner et al. | ............... | 95/51 |
| 7,931,809 B2 | 4/2011 | Constantz et al. | ............ | 210/652 |
| 7,993,432 B2 | 8/2011 | Wright et al. | ............... | 95/139 |
| 7,993,500 B2 | 8/2011 | Gilliam et al. | ............... | 204/263 |
| 8,062,418 B2 | 11/2011 | Constantz et al. | ............ | 106/738 |
| 8,105,558 B2 | 1/2012 | Comrie | ............... | 423/210 |
| 8,114,214 B2 | 2/2012 | Constantz et al. | ............ | 106/738 |
| 8,114,374 B2 | 2/2012 | Blencoe et al. | ............... | 423/432 |

(Continued)

FOREIGN PATENT DOCUMENTS

| | | |
|---|---|---|
| DE | 19631794 | 8/1997 |
| EP | 2070578 | 6/2009 |

(Continued)

OTHER PUBLICATIONS

Office Communication issued in Georgian Patent Application AP 2008 011762, dated Sep. 30, 2011 (English translation included).
Office Communication issued in Georgian Patent Application No. AP 2005 009999, dated Sep. 28, 2011. (English translation).
"Skyonic Corporation presents The SkyMine Process—A proprietary technology that removes carbon dioxide ($CO_2$) and other flue gas pollutants—converting same into non-toxic, commercial chemicals," Presentation given to President's Council of Advisors on Science and Technology by Joe Jones and Steve Goldstein, on Sep. 20, 2005.
Air and Gas Duct Structural Design Committe of the Energy Division of the Air and Gas Structural Design Committee. *The Structural Design of Air and Gas Ducts for Power Stations and Industrial Boiler Applications.* Ronald L. Schneider, chmn. New York, NY; ASCE Publications, Aug. 1, 1995. pp. 11-15.
Cadmium Chloride, Material Safety Data Sheet, CAS No. 7790-78-5, ESPI Metals, available on the internet at http://www.espimetals.com/index.php/msds/460-cadmium-chloride. Revised/Verified Sep. 2005. Accessed Dec. 28, 2011.

(Continued)

*Primary Examiner* — Stuart Hendrickson
(74) *Attorney, Agent, or Firm* — Norton Rose Fulbright US LLP

(57) ABSTRACT

The present invention relates to an energy efficient carbon dioxide sequestration processes whereby Group 2 silicate minerals and $CO_2$ are converted into limestone and sand using a two-salt thermolytic process that allows for the cycling of heat and chemicals from one step to another.

52 Claims, 41 Drawing Sheets

(56) References Cited

U.S. PATENT DOCUMENTS

| | | | |
|---|---|---|---|
| 8,137,444 B2 | 3/2012 | Farsad et al. | 96/235 |
| 8,137,455 B1 | 3/2012 | Constantz et al. | 106/738 |
| 8,177,909 B2 | 5/2012 | Constantz et al. | 106/738 |
| 8,202,659 B2 | 6/2012 | Coustry et al. | 423/421 |
| 8,673,256 B2 | 3/2014 | Blencoe et al. | 423/419.1 |
| 2002/0129450 A1 | 9/2002 | Kim | 8/115 |
| 2004/0051080 A1 | 3/2004 | Ernst et al. | 423/438 |
| 2004/0089841 A1 | 5/2004 | Green | 252/182.32 |
| 2004/0096384 A1 | 5/2004 | Echigo et al. | 423/247 |
| 2004/0178149 A1 | 9/2004 | Hernandez et al. | 210/688 |
| 2004/0213705 A1 | 10/2004 | Blencoe et al. | 422/129 |
| 2004/0219090 A1 | 11/2004 | Dziedzic et al. | 423/437.1 |
| 2004/0265202 A1 | 12/2004 | Chandran et al. | 423/239.1 |
| 2005/0002847 A1 | 1/2005 | Maroto-Valer et al. | 423/432 |
| 2005/0011770 A1 | 1/2005 | Katsuyoshi et al. | 205/742 |
| 2005/0013750 A1 | 1/2005 | Monzyk et al. | 422/186.3 |
| 2005/0031522 A1 | 2/2005 | Delaney et al. | 423/419.1 |
| 2005/0180910 A1 | 8/2005 | Park et al. | 423/432 |
| 2006/0051274 A1 | 3/2006 | Wright et al. | 423/220 |
| 2006/0076228 A1 | 4/2006 | Guth et al. | 203/47 |
| 2006/0185985 A1 | 8/2006 | Jones | 205/508 |
| 2006/0186562 A1 | 8/2006 | Wright et al. | 261/94 |
| 2006/0289003 A1 | 12/2006 | Lackner et al. | 128/200.4 |
| 2007/0187247 A1 | 8/2007 | Lackner et al. | 204/518 |
| 2008/0031801 A1 | 2/2008 | Lackner et al. | 423/438 |
| 2008/0087165 A1 | 4/2008 | Wright et al. | 95/51 |
| 2008/0138265 A1 | 6/2008 | Lackner et al. | 423/224 |
| 2008/0245660 A1 | 10/2008 | Little et al. | 204/242 |
| 2008/0245672 A1 | 10/2008 | Little et al. | 205/555 |
| 2008/0248350 A1 | 10/2008 | Little et al. | 429/21 |
| 2009/0001620 A1 | 1/2009 | Constantz et al. | 210/652 |
| 2009/0010827 A1 | 1/2009 | Geerlings et al. | 423/164 |
| 2009/0020044 A1 | 1/2009 | Constantz et al. | 106/738 |
| 2009/0074656 A1 | 3/2009 | Billings | 423/648.1 |
| 2009/0081096 A1 | 3/2009 | Pellegrin | 423/232 |
| 2009/0101008 A1 | 4/2009 | Lackner et al. | 423/224 |
| 2009/0101050 A1 | 4/2009 | Lackner et al. | 110/216 |
| 2009/0120288 A1 | 5/2009 | Lackner et al. | 95/68 |
| 2009/0127127 A1 | 5/2009 | Jones | 205/464 |
| 2009/0169452 A1 | 7/2009 | Constantz et al. | 423/230 |
| 2009/0202413 A1 | 8/2009 | Saxena | 423/277 |
| 2009/0232861 A1 | 9/2009 | Wright et al. | 424/405 |
| 2009/0294366 A1 | 12/2009 | Wright et al. | 210/683 |
| 2009/0320688 A1 | 12/2009 | Lackner et al. | 96/257 |
| 2010/0051859 A1 | 3/2010 | House et al. | 252/182.32 |
| 2010/0092368 A1 | 4/2010 | Neumann et al. | 423/437.1 |
| 2010/0095842 A1 | 4/2010 | Lackner et al. | 95/107 |
| 2010/0105126 A1 | 4/2010 | Wright et al. | 435/257.1 |
| 2010/0116137 A1 | 5/2010 | Wright et al. | 95/150 |
| 2010/0155258 A1 | 6/2010 | Kirk et al. | 205/351 |
| 2010/0202937 A1 | 8/2010 | Lackner et al. | 422/187 |
| 2011/0027142 A1 | 2/2011 | Wright et al. | 422/187 |
| 2011/0027143 A1 | 2/2011 | Wright et al. | 422/187 |
| 2011/0027157 A1 | 2/2011 | Wright et al. | 423/230 |
| 2011/0033357 A1 | 2/2011 | Wright et al. | 423/230 |
| 2011/0033358 A1 | 2/2011 | Wright et al. | 423/230 |
| 2011/0056382 A1 | 3/2011 | Lackner et al. | 96/329 |
| 2011/0079144 A1 | 4/2011 | Wright et al. | 95/54 |
| 2011/0079146 A1 | 4/2011 | Wright et al. | 95/92 |
| 2011/0079147 A1 | 4/2011 | Wright et al. | 95/92 |
| 2011/0079149 A1 | 4/2011 | Wright et al. | 96/143 |
| 2011/0079150 A1 | 4/2011 | Wright et al. | 96/143 |
| 2011/0081709 A1 | 4/2011 | Wright et al. | 435/257.1 |
| 2011/0081710 A1 | 4/2011 | Wright et al. | 435/257.1 |
| 2011/0081712 A1 | 4/2011 | Wright et al. | 435/296.1 |
| 2011/0083554 A1 | 4/2011 | Wright et al. | 95/92 |
| 2011/0091955 A1 | 4/2011 | Constantz et al. | 435/168 |
| 2011/0135551 A1 | 6/2011 | House et al. | 423/234 |
| 2014/0147371 A1 | 5/2014 | Blencoe et al. | 423/419.1 |

FOREIGN PATENT DOCUMENTS

| | | |
|---|---|---|
| GB | 2460910 | 6/2010 |
| GE | 1999-1612 | 4/1999 |
| GE | 2001-2514 | 8/2001 |
| GE | 2004-3357 | 10/2004 |
| JP | 49-023797 | 3/1974 |
| JP | 51-023499 | 2/1976 |
| JP | 52-085997 | 7/1977 |
| JP | 55-056015 | 4/1980 |
| JP | 61-048587 | 3/1986 |
| JP | 10-001307 | 1/1998 |
| JP | 2002-273163 | 9/2002 |
| JP | 2004-174369 | 6/2004 |
| JP | 2006-137620 | 6/2006 |
| JP | 2010-125354 | 6/2010 |
| JP | 2011-521879 | 7/2011 |
| JP | 2012-504043 | 2/2012 |
| RU | 2 019 271 | 9/1994 |
| RU | 2 031 695 | 3/1995 |
| RU | 2054959 | 2/1996 |
| RU | 2199374 | 2/2003 |
| RU | 2334547 | 8/2005 |
| WO | WO 98/24725 | 6/1998 |
| WO | WO 2004/037391 | 5/2004 |
| WO | WO 2004/098740 | 11/2004 |
| WO | WO 2005/108291 | 11/2005 |
| WO | WO 2005/108297 | 11/2005 |
| WO | WO 2006/009600 | 1/2006 |
| WO | WO 2006/023743 | 3/2006 |
| WO | WO 2006/034339 | 3/2006 |
| WO | WO 2006/036396 | 4/2006 |
| WO | WO 2006/084008 | 8/2006 |
| WO | WO 2006/113673 | 10/2006 |
| WO | WO 2006/113997 | 11/2006 |
| WO | WO 2007/016271 | 2/2007 |
| WO | WO 2007/018558 | 2/2007 |
| WO | WO 2007/078017 | 7/2007 |
| WO | WO 2007/003013 | 11/2007 |
| WO | WO 2008/018928 | 2/2008 |
| WO | WO 2008/042919 | 4/2008 |
| WO | WO 2008/061210 | 5/2008 |
| WO | WO 2008/124538 | 10/2008 |
| WO | WO 2008/131132 | 10/2008 |
| WO | WO 2008/148055 | 12/2008 |
| WO | WO 2009/039445 | 3/2009 |
| WO | WO 2009/061836 | 5/2009 |
| WO | WO 2009/086460 | 7/2009 |
| WO | WO 2009/102816 | 8/2009 |
| WO | WO 2009/105566 | 8/2009 |
| WO | WO 2009/149292 | 12/2009 |
| WO | WO 2010/019600 | 2/2010 |
| WO | WO 2010/022399 | 2/2010 |
| WO | WO 2010/132395 | 11/2010 |
| WO | WO 2011/011740 | 1/2011 |

OTHER PUBLICATIONS

Calcium Nitrate Tetrahydrate, Material Safety Data Sheet, CAS No. 13477-34-4, available on the internet at http://avogadro.chem.iastate.edu/MSDS/Ca%28NO3%292-4H2O.htm. MSDS Creation Date: Jan. 21, 1998. Revision #4 Date: Oct. 3, 2005. Accessed Dec. 28, 2011.

Cobalt Iodide, Material Safety Data Sheet, CAS No. 45238-00-3, ESPI Metals, available on the internet at http://www.espimetals.com/index.php/msds/527-cobalt-iodide. Revised/Verified Dec. 2004. Accessed Dec. 28, 2011.

Cobalt(II) Sulfate Heptahydrate, Material Safety Data Sheet, CAS No. 10026-24-1, Chemical Book, available on the internet at http://www.chemicalbook.com/ProductMSDSDetailCB0323842_EN.htm. Copyright 2008. Accessed Dec. 28, 2011.

Goldberg et al., "CO2 mineral sequestration studies in US," *Proceedings of First National Conference on Carbon Sequestration, May 14-17, 2001, Washington, DC., section 6c, United States Department of Energy, National Energy Technology Laboratory.* available at: http://www.netl.doe.gov/publications/proceedings/01/carbon_seq/6c1.pdf.

Kelley, "Energy requirements and equilibria in the dehydration, hydrolysis, and decomposition of magnesium chloride", Technical Paper 676, United States Government Printing Office, pp. 1-26, 1945.

Kirk-Othmer Encyclopedia of Chemical Technology, 4$^{th}$ ed. vol. 15 p. 343, 1998, New York: John Wiley and Sons.

(56) References Cited

OTHER PUBLICATIONS

Kirsh et al., "Kinetic analysis of thermal dehydration and hydrolysis of MgCl2.6H2O by DTA and TG," *Journal of Thermal Analysis*, 32:393-408, 1987.

Lackner et al., "Magnesite disposal of carbon dioxide," submitted to 22$^{nd}$ International Technical Conference on Coal Utilization and Fuel System, Clearwater, Florida, Mar. 16-19, 1997.

Lithium Bromide, Material Safety Data Sheet, CAS No. 7550-35-8, ChemCas, available on the internet at http://www.chemcas.com/material/cas/archive/7550-35-8_v1.asp. Material Safety Data Sheet Creation Date: Jun. 29, 1999. Revision #3 Date: Mar. 18, 2003. Accessed Dec. 28, 2011.

Magnesium Nitrate Hexahydrate, Material Safety Data Sheet, CAS No. 13446-18-9, available on the internet at http://avogadro.chem.iastate.edu/MSDS/MgNO3-6H2O.htm. Material Safety Data Sheet Creation Date: Sep. 2, 1997. Revision #6 Date: Aug. 11, 2004. Accessed Dec. 28, 2011.

Manganese (II) Chloride Tetrahydrate, Material Safety Data Sheet, CAS No. 13446-34-9, available on the internet at http://avogadro.chem.iastate.edu/MSDS/MnCl2.htm. Material Safety Data Sheet Creation Date: Dec. 12, 1997. Revision #2 Date: Mar. 18, 2003. Accessed Dec. 28, 2011.

Office Communication issued in Australian Patent Application No. 2005286729, dated Mar. 5, 2010.

Office Communication issued in Australian Patent Application No. 2005286729, dated Sep. 27, 2010.

Office Communication issued in Australian Patent Application No. 2010212414, dated Mar. 28, 2011.

Office Communication issued in Australian Patent Application No. 2010212413, dated Mar. 25, 2011.

Office Communication issued in Chinese Patent Application No. 20050038754.5, dated Jun. 2, 2010.

Office Communication issued in Chinese Patent Application No. 20050038754.5, dated Nov. 21, 2008.

Office Communication issued in Chinese Patent Application No. 20050038754.5, dated Oct. 30, 2009.

Office Communication issued in Chinese Patent Application No. 200580038754.5, dated May 4, 2011.

Office Communication issued in European Patent Application No. 05799708.2, dated Jan. 20, 2011.

Office Communication issued in European Patent Application No. 08831664.1-2113, dated Sep. 10, 2009.

Office Communication issued in Georgian Patent Application No. AP 2005 009999, dated Jul. 26, 2010. (English translation).

Office Communication issued in Georgian Patent Application No. AP 2005 009999, dated Jan. 8, 2009. (English translation).

Office Communication issued in Japanese Patent Application No. 2007533607, dated Oct. 6, 2010. (English translation).

Office Communication issued in Korean Patent Application No. 10-2007-7009233, dated Nov. 1, 2010. (English Translation).

Office Communication issued in Russian Patent Application No. 2007115051, dated Sep. 18, 2009. (English translation).

Office Communication issued in Russian Patent Application No. 2007115051, dated Apr. 1, 2010. (English translation).

Office Communication issued in Taiwanese Patent Application No. 09413312, dated Dec. 15, 2010 (English translation).

Office Communication issued in U.S. Appl. No. 12/235,482, dated Sep. 3, 2010.

Office Communication issued in U.S. Appl. No. 12/235,482, dated Mar. 31, 2011.

Office Communication issued in U.S. Appl. No. 12/790,121, dated Oct. 28, 2010.

Office Communication issued in U.S. Appl. No. 12/790,121, dated Sep. 2, 2011.

Office Communication issued in U.S. Appl. No. 11/233,509, dated Oct. 2, 2009.

Office Communication issued in U.S. Appl. No. 11/233,509, dated May 27, 2009.

Office Communication issued in U.S. Appl. No. 11/233,509, dated Dec. 24, 2008.

Office Communication issued in U.S. Appl. No. 11/233,509, dated Sep. 4, 2008.

PCT International Preliminary Report on Patentability issued in International Application No. PCT/US2008/077122, dated Apr. 1, 2010.

PCT International Search Report and Written Opinion issued in International Application No. PCT/US2005/033814, dated Feb. 15, 2006.

PCT International Search Report and Written Opinion issued in International Application No. PCT/US2010/061111, dated Feb. 18, 2011.

PCT International Search Report and Written Opinion issued in International Application No. PCT/US11/43470, dated Dec. 6, 2011.

PCT International Search Report issued in International Application No. PCT/US2008/077122, dated Oct. 30, 2009.

PCT Invitation to Pay Additional Fees issued in PCT International Application No. PCT/US2008/077122, dated Mar. 4, 2009.

Proceedings of First National Conference on Carbon Sequestration, May 14-17, 2001, Washington, DC. United States Department of Energy, National Energy Technology Laboratory. CD-ROM USDOE/NETL-2001/1144; also available at http://www.netl.doe.gov/publications/proceedings/01/carbon_seq/carbon_seq01.html.

Pulvirenti et al., "Acid generation upon thermal concentration of natural water: The critical ate content and the effects of ionic composition," *Journal of Contaminant Hydrology*, 109:62-81, 2009.

Search Report, issued by Georgian National Center of Intellectual Property "SAK:ATENT", issued in Georgian Application No. AP 2005 009999, dated Jan. 8, 2010. (English Translation).

Shore et al., "V.F.1—Platinum Group Metal Recycling Technology Development," Department of Energy Hydrogen Program, United States. Department of Energy Fiscal Year 2008 Annual Progress Report, pp. 35-938. Published Nov. 2008. Available on the internet at http://www.hydrogen.energy.gov/pdfs/progress08/v_f_1_shore.pdf. Accessed Dec. 28, 2011.

Sodium Iodide, Material Safety Data Sheet, CAS No. 7681-82-5, Chemical Book, available on the internet at http://www.chemicalbook.com/ProductMSDSDetailCB6170714_EN.htm. Copyright 2008. Accessed Dec. 28, 2011.

U.S. Appl. No. 60/612,355 entitled "Removing Carbon Dioxide From Waste Streams Through Co-Generation of Synthetic Carbonate Minerals," by Joe David Jones, filed Sep. 23, 2004.

U.S. Appl. No. 60/642,698 entitled "Removing Carbon Dioxide From Waste Streams Through Co-Generation of Synthetic Carbonate Minerals," by Joe David Jones, Jan. 10, 2005.

U.S. Appl. No. 60/718,906 entitled "Removing Carbon Dioxide From Waste Streams Through Co-Generation of Synthetic Carbonate Minerals," by Joe David Jones, filed Sep. 20, 2005.

U.S. Appl. No. 60/973,948 entitled "Removing Carbon Dioxide From Waste Streams Through Co-Generation of Carbonate and/or Bicarbonate Minerals," by Joe David Jones, filed Sep. 20, 2007.

U.S. Appl. No. 61/032,802 entitled "Removing Carbon Dioxide From Waste Streams Through Co-Generation of Carbonate and/or Bicarbonate Minerals," by Joe David Jones, filed Feb. 29, 2008.

U.S. Appl. No. 61/033,298 entitled "Removing Carbon Dioxide From Waste Streams Through Co-Generation of Carbonate and/or Bicarbonate Minerals," by Joe David Jones, filed Mar. 3, 2008.

U.S. Appl. No. 61/288,242 entitled "Carbon Dioxide Sequestration Through Formation of Group-2 Carbonates and Silicon Dioxide", by Joe David Jones, filed Dec. 18, 2009.

U.S. Appl. No. 61/362,607 entitled "Carbon Dioxide Sequestration Involving Energy-Efficient Conversion of Group 2 Chlorides to Group 2 Hydroxides," by Joe David Jones, filed Jul. 8, 2010.

U.S. Appl. No. 61/370,030 entitled "Carbon Dioxide Sequestration Involving Energy-Efficient Conversion of Group 2 Chlorides to Group 2 Hydroxides," by Joe David Jones and Al Yablonsky, filed Aug. 2, 2010.

U.S. Appl. No. 61/406,536 entitled "Carbon Dioxide Sequestration Involving Energy-Efficient Conversion of Group 2 Chlorides to Group 2 Hydroxides," by Joe David Jones and Al Yablonsky, filed Oct. 25, 2010.

(56) References Cited

OTHER PUBLICATIONS

U.S. Appl. No. 61/451,078 entitled "Carbon Dioxide Sequestration Involving Energy-Efficient Conversion of Group 2 Chlorides to Group 2 Hydroxides," by Joe David Jones and Al Yablonsky, filed Mar. 9, 2011.

Wei, Xinchao, "Technological evaluation of mineral sequestration of $CO_2$ by carbonation," Thesis submitted to College of Engineering and Mineral Resources at West Virginia University in partial fulfillment of the requirements for the degree of Master of Science in Mining Engineering, 2003.

Huijgen & Comans, *Carbon dioxide sequestration by mineral carbonation Literature Review*, 2003.

Haywood, et al. "Carbon Dioxide Sequestration as Stable Carbonate Minerals—Environmental Barriers." Environmental Geology 41:11-16 (2001).

Lackner, et al., "Carbon Dioxide Disposal in Carbonate Minerals," Energy vol. 20, No. 11, pp. 1153-1170 (1995).

CARBON DIOXIDE SEQUESTRATION INVOLVING TWO-SALT-BASED THERMOLYTIC PROCESSES

The present application claims priority to U.S. Provisional Application Ser. Nos. 61/362,607, filed Jul. 8, 2010, 61/370,030, filed Aug. 2, 2010, 61/406,536, filed Oct. 25, 2010, and 61/451,078, filed Mar. 9, 2011, the entire contents of each of which are incorporated herein by reference in their entirety.

BACKGROUND OF THE INVENTION

I. Field of the Invention

The present invention generally relates to the field of removing carbon dioxide from a source, such as the waste stream (e.g. flue gas) of a power plant, whereby Group 2 silicate minerals are converted into Group 2 chloride salts and $SiO_2$, Group 2 chloride salts are converted into Group 2 hydroxide and/or Group 2 hydroxychloride salts. These in turn may be reacted with carbon dioxide to form Group 2 carbonate salts, optionally in the presence of catalysts. These steps may be combined to form a cycle in which carbon dioxide is sequestered in the form of carbonate salts and byproducts from one or more steps, such as heat and chemicals, are re-used or recycled in one or more other steps.

II. Description of Related Art

Considerable domestic and international concern has been increasingly focused on the emission of $CO_2$ into the air. In particular, attention has been focused on the effect of this gas on the retention of solar heat in the atmosphere, producing the "greenhouse effect." Despite some debate regarding the magnitude of the effect, all would agree there is a benefit to removing $CO_2$ (and other chemicals) from point-emission sources, especially if the cost for doing so were sufficiently small.

Greenhouse gases are predominately made up of carbon dioxide and are produced by municipal power plants and large-scale industry in site-power-plants, though they are also produced in any normal carbon combustion (such as automobiles, rain-forest clearing, simple burning, etc.). Though their most concentrated point-emissions occur at power-plants across the planet, making reduction or removal from those fixed sites an attractive point to effect a removal-technology. Because energy production is a primary cause of greenhouse gas emissions, methods such as reducing carbon intensity, improving efficiency, and sequestering carbon from power-plant flue-gas by various means has been researched and studied intensively over the last thirty years.

Attempts at sequestration of carbon (in the initial form of gaseous $CO_2$) have produced many varied techniques, which can be generally classified as geologic, terrestrial, or ocean systems. An overview of such techniques is provided in the *Proceedings of First National Conference on Carbon Sequestration*, (2001). To date, many if not all of these techniques are too energy intensive and therefore not economically feasible, in many cases consuming more energy than the energy obtained by generating the carbon dioxide. Alternative processes that overcome one or more of these disadvantages would be advantageous.

The referenced shortcomings are not intended to be exhaustive, but rather are among many that tend to impair the effectiveness of previously known techniques for removing carbon dioxide from waste streams; however, those mentioned here are sufficient to demonstrate that the methodologies appearing in the art have not been altogether satisfactory and that a significant need exists for the techniques described and claimed in this disclosure.

SUMMARY OF THE INVENTION

Disclosed herein are methods and apparatuses for carbon dioxide sequestration, including removing carbon dioxide from waste streams. In one aspect there are provided methods of sequestering carbon dioxide produced by a source, comprising:

(a) reacting a first cation-based halide, sulfate or nitrate salt or hydrate thereof with water in a first admixture under conditions suitable to form a first product mixture comprising a first step (a) product comprising a first cation-based hydroxide salt, a first cation-based oxide salt and/or a first cation-based hydroxychloride salt and a second step (a) product comprising HCl, $H_2SO_4$ or $HNO_3$;

(b) admixing some or all of the first step (a) product with a second cation-based halide, sulfate or nitrate salt or hydrate thereof and carbon dioxide produced by the source in a second admixture under conditions suitable to form a second product mixture comprising a first step (b) product comprising a first cation-based halide, sulfate and/or nitrate salt or hydrate thereof, a second step (b) product comprising a second cation-based carbonate salt, and a third step (b) product comprising water; and (c) separating some or all of the second cation-based carbonate salt from the second product mixture, whereby the carbon dioxide is sequestered into a mineral product form.

In some embodiments, the first cation-based halide sulfate or nitrate salt or hydrate thereof of step (a) is a first cation-based chloride salt or hydrate thereof, and the second step (a) product is HCl. In some embodiments, the first cation-based halide, sulfate, or nitrate salt or hydrate thereof of step (b) is a first cation-based chloride salt or hydrate thereof.

In some embodiments, the first cation-based chloride salt or hydrate thereof of step (a) is $MgCl_2$. In some embodiments, the first cation-based chloride salt or hydrate thereof of step (a) is a hydrated form of $MgCl_2$. In some embodiments, the first cation-based chloride salt or hydrate thereof of step (a) is $MgCl_2 \cdot 6H_2O$. In some embodiments, the first cation-based hydroxide salt of step (a) is $Mg(OH)_2$. In some embodiments, the first cation-based hydroxychloride salt of step (a) is Mg(OH)Cl. In some embodiments, the first step (a) product comprises predominantly Mg(OH)Cl. In some embodiments, the first step (a) product comprises greater than 90% by weight Mg(OH)Cl. In some embodiments, the first step (a) product is Mg(OH)Cl. In some embodiments, the first cation-based oxide salt of step (a) is MgO.

In some embodiments, the second cation-based halide, sulfate or nitrate salt or hydrate thereof of step (b) is a second cation-based chloride salt or hydrate thereof, for example, $CaCl_2$. In some embodiments, the first cation-based chloride salt of step (b) is $MgCl_2$. In some embodiments, the first cation-based chloride salt of step (b) is a hydrated form of $MgCl_2$. In some embodiments, the first cation-based chloride salt of step (b) is $MgCl_2 \cdot 6H_2O$.

In some embodiments, some or all of the water in step (a) is present in the form of steam or supercritical water. In some embodiments, some or all of the water of step (a) is obtained from the water of step (b). In some embodiments, step (b) further comprises admixing sodium hydroxide salt in the second admixture.

In some embodiments, the methods further comprise:

(d) admixing a Group 2 silicate mineral with HCl under conditions suitable to form a third product mixture comprising a Group 2 chloride salt, water, and silicon dioxide.

In some embodiments, some or all of the HCl in step (d) is obtained from step (a). In some embodiments, the methods of step (d) further comprises agitating the Group 2 silicate mineral with HCl. In some embodiments, some or all of the heat generated in step (d) is recovered. In some embodiments, some or all of the second cation-based chloride salt of step (b) is the Group 2 chloride salt of step (d). In some embodiments, the methods further comprise a separation step, wherein the silicon dioxide is removed from the Group 2 chloride salt formed in step (d). In some embodiments, some or all of the water of step (a) is obtained from the water of step (d).

In some embodiments, the Group 2 silicate mineral of step (d) comprises a Group 2 inosilicate. In some embodiments, the Group 2 silicate mineral of step (d) comprises $CaSiO_3$. In some embodiments, the Group 2 silicate mineral of step (d) comprises $MgSiO_3$. In some embodiments, the Group 2 silicate mineral of step (d) comprises olivine ($Mg_2[SiO_4]$). In some embodiments, the Group 2 silicate mineral of step (d) comprises serpentine ($Mg_6[OH]_8[Si_4O_{10}]$). In some embodiments, the Group 2 silicate mineral of step (d) comprises sepiolite ($Mg_4[(OH)_2Si_6O_{15}].6H_2O$), enstatite ($Mg_2[Si_2O_6]$), diopside ($CaMg[Si_2O_6]$), and/or tremolite $Ca_2Mg_5\{[OH]Si_4O_{11}\}_2$. In some embodiments, the Group 2 silicate further comprises iron and or manganese silicates. In some embodiments, the iron silicate is fayalite ($Fe_2[SiO_4]$).

In some embodiments, some or all of the first cation-based chloride salt formed in step (b) is the first cation-based chloride salt used in step (a).

In some embodiments, the carbon dioxide is in the form of flue gas, wherein the flue gas further comprises $N_2$ and $H_2O$.

In some embodiments, suitable reacting conditions of step (a) comprise a temperature from about 200° C. to about 500° C. In some embodiments, the temperature is from about 230° C. to about 260° C. In some embodiments, the temperature is about 250° C. In some embodiments, the temperature is from about 200° C. to about 250° C. In some embodiments, the temperature is about 240° C.

In some embodiments, suitable reacting conditions of step (a) comprise a temperature from about 50° C. to about 200° C. In some embodiments, the temperature is from about 90° C. to about 260° C. In some embodiments, the temperature is from about 90° C. to about 230° C. In some embodiments, the temperature is about 130° C.

In some embodiments, suitable reacting conditions of step (a) comprise a temperature from about 400° C. to about 550° C. In some embodiments, the temperature is from about 450° C. to about 500° C.

In some embodiments, suitable reacting conditions of step (a) comprise a temperature from about 20° C. to about 100° C. In some embodiments, the temperature is from about 25° C. to about 95° C.

In some embodiments, suitable reacting conditions of step (a) comprise a temperature from about 50° C. to about 200° C. In some embodiments, the temperature is from about 90° C. to about 150° C.

In another aspect, the present invention provides methods of sequestering carbon dioxide produced by a source, comprising:

(a) admixing a magnesium chloride salt and water in a first admixture under conditions suitable to form (i) magnesium hydroxide, magnesium oxide and/or Mg(OH)Cl and (ii) hydrogen chloride;

(b) admixing (i) magnesium hydroxide, magnesium oxide and/or Mg(OH)Cl, (ii) $CaCl_2$ and (iii) carbon dioxide produced by the source in a second admixture under conditions suitable to form (iv) calcium carbonate, (v) a magnesium chloride salt, and (vi) water; and (c) separating the calcium carbonate from the second admixture, whereby the carbon dioxide is sequestered into a mineral product form.

In some embodiments, some or all of the hydrogen chloride of step (a) is admixed with water to form hydrochloric acid. In some embodiments, some or all of the magnesium hydroxide, magnesium oxide and/or Mg(OH)Cl of step (b)(i) is obtained from step (a)(i). In some embodiments, some of all the water in step (a) is present in the form of a hydrate of the magnesium chloride salt. In some embodiments, step (a) occurs in one, two or three reactors. In some embodiments, step (a) occurs in one reactor. In some embodiments, the magnesium hydroxide, magnesium oxide and/or Mg(OH)Cl of step (a)(i) is greater than 90% by weight Mg(OH)Cl. In some embodiments, the magnesium chloride salt is greater than 90% by weight $MgCl_2.6(H_2O)$.

In some embodiments, the methods further comprise:

(d) admixing a Group 2 silicate mineral with hydrogen chloride under conditions suitable to form a Group 2 chloride salt, water, and silicon dioxide.

In some embodiments, some or all of the hydrogen chloride in step (d) is obtained from step (a). In some embodiments, step (d) further comprises agitating the Group 2 silicate mineral with the hydrochloric acid. In some embodiments, some or all of the magnesium chloride salt in step (a) is obtained from step (d). In some embodiments, the methods further comprise a separation step, wherein the silicon dioxide is removed from the Group 2 chloride salt formed in step (d). In some embodiments, some or all of the water of step (a) is obtained from the water of step (d). In some embodiments, the Group 2 silicate mineral of step (d) comprises a Group 2 inosilicate.

In some embodiments, the Group 2 silicate mineral of step (d) comprises $CaSiO_3$. In some embodiments, the Group 2 silicate mineral of step (d) comprises $MgSiO_3$. In some embodiments, the Group 2 silicate mineral of step (d) comprises olivine. In some embodiments, the Group 2 silicate mineral of step (d) comprises serpentine. In some embodiments, the Group 2 silicate mineral of step (d) comprises sepiolite, enstatite, diopside, and/or tremolite. In some embodiments, the Group 2 silicate further comprises mineralized iron and or manganese.

In some embodiments, step (b) further comprises admixing $CaCl_2$ and water to the second admixture.

Other objects, features and advantages of the present disclosure will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present disclosure. The invention may be better understood by reference to one of these drawings in combination with the detailed description of specific embodiments presented herein.

| | | |
|---|---|---|
| $1^{st}$ Chamber: $MgCl_2 \cdot 6H_2O \rightarrow MgCl_2 \cdot 4H_2O + 2H_2O$ | | 100° C. |
| $2^{nd}$ Chamber: $MgCl_2 \cdot 4H_2O \rightarrow MgCl_2 \cdot 2H_2O + 2H_2O$ | | 125° C. |
| $3^{rd}$ Chamber: $MgCl_2 \cdot 2H_2O \rightarrow MgCl_2 \cdot H_2O + H_2O$ (HCl vapor present) | | 160° C. |
| $4^{th}$ Chamber: $MgCl_2 \cdot H_2O \rightarrow Mg(OH)Cl + HCl$ HCl recirculates to the $3^{rd}$ chamber. | | 130° C. |

| Chamber | Reaction | Model Temp. | Preferred Temp. Range | Notes |
|---|---|---|---|---|
| $1^{st}$ | $MgCl_2 \cdot 6H_2O \rightarrow MgCl_2 \cdot 4H_2O + 2H_2O$ | 100° C. | 90° C.-120° C. | |
| $2^{nd}$ | $MgCl_2 \cdot 4H_2O \rightarrow MgCl_2 \cdot 2H_2O + 2H_2O$ | 125° C. | 160° C.-185° C. | |
| $3^{rd}$ | $MgCl_2 \cdot 2H_2O \rightarrow MgCl_2 \cdot H_2O + H_2O$ | 160° C. | 190° C.-230° C. | * |
| $4^{th}$ | $MgCl_2 \cdot H_2O \rightarrow Mg(OH)Cl + HCl$ | 130° C. | 230° C.-260° C. | ** |

* HCl Vapor Present
** HCl Vapor Recirculates to the $3^{rd}$ Chamber

The first three reactions above may be characterized as dehydrations, while the fourth may be characterized as a decomposition. Results from this simulation, which is explained in greater detail in Example 2, indicate that at lower temperatures (130-250° C.) the decomposition of $MgCl_2.6H_2O$ results in the formation of $Mg(OH)Cl$ instead of MgO. The $Mg(OH)Cl$ then reacts with $H_2O$ to form $MgCl_2$ and $Mg(OH)_2$, which then reacts with a saturated $CaCl_2/H_2O$ solution and $CO_2$ from the flue gas to form $CaCO_3$, which is filtered out of the stream. The resulting $MgCl_2$ formed is recycled to the first reactor to begin the process again.

Figure 7:
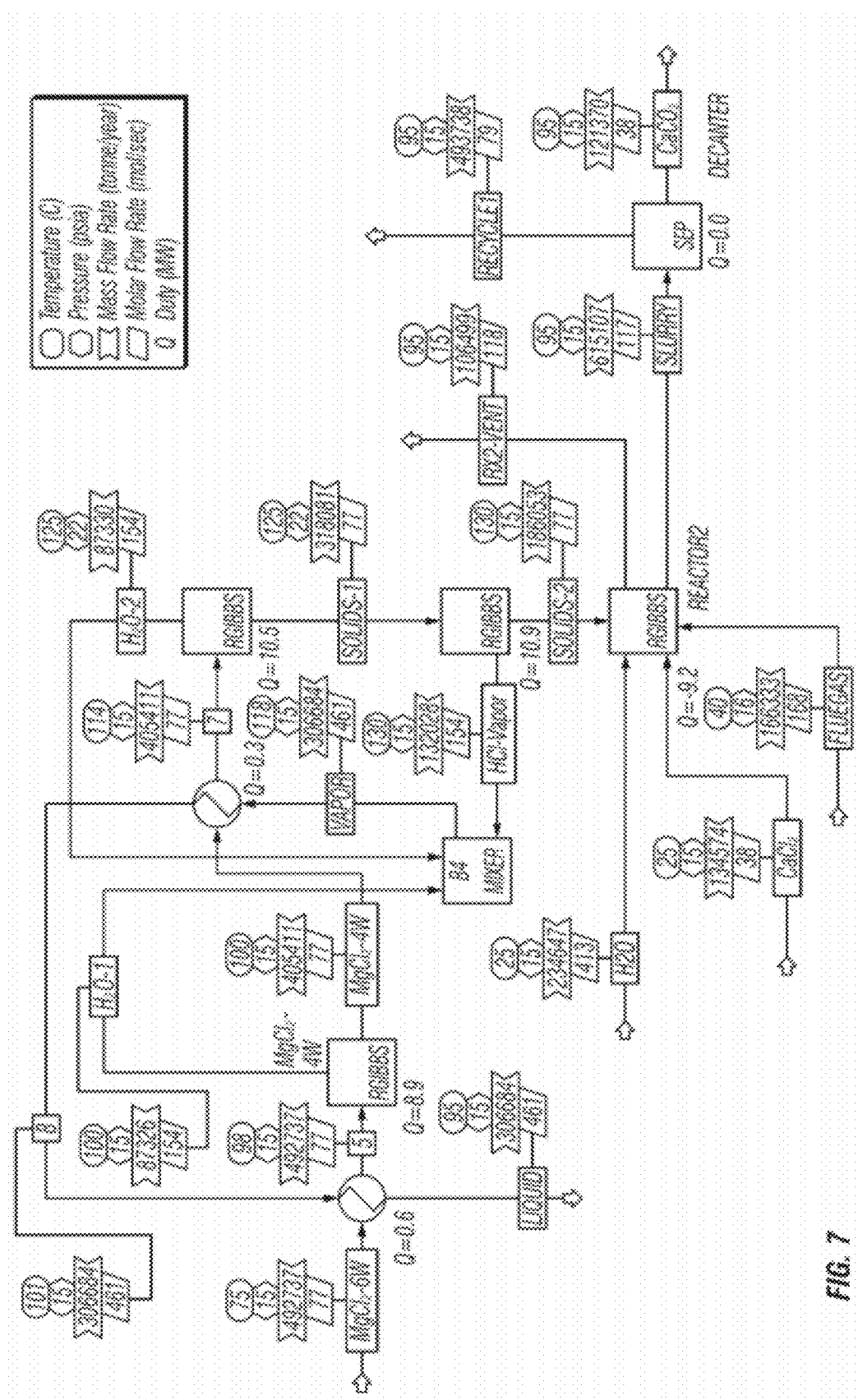

FIG. 7 is a process flow diagram showing parameters and results from a process simulation using Aspen Plus process software. The net reaction is the capture of $CO_2$ from flue gas using inexpensive raw materials, $CaCl_2$ and water, to form $CaCO_3$. In this embodiment, the magnesium hexahydrate is dehydrated in two separate chambers and decomposed in a third chamber. Both dehydration and decomposition reactions occur in the third chamber. There is no recirculating HCl. Reactions occurring in these chambers include the following:

| | | |
|---|---|---|
| 1$^{st}$ Chamber: MgCl$_2$•6H$_2$O → MgCl$_2$•4H$_2$O + 2H$_2$O | | 100° C. |
| 2$^{nd}$ Chamber: MgCl$_2$•4H$_2$O → MgCl$_2$•2H$_2$O + 2H$_2$O | | 125° C. |
| 3$^{rd}$ Chamber: MgCl$_2$•2H$_2$O → Mg(OH)Cl + HCl + H$_2$O | | 130° C. |
| 3$^{rd}$ Chamber: MgCl$_2$•2H$_2$O → MgCl$_2$•H$_2$O + H$_2$O | | 130° C. |

| Chamber | Reaction | Model Temp. | Preferred Temp. Range | Notes |
|---|---|---|---|---|
| 1$^{st}$ | MgCl$_2$•6H$_2$O→MgCl$_2$•4H$_2$O + 2H$_2$O | 100° C. | 90° C.-120° C. | |
| 2$^{nd}$ | MgCl$_2$•4H$_2$O→MgCl$_2$•2H$_2$O + 2H$_2$O | 125° C. | 160° C.-185° C. | |
| 3$^{rd}$ | MgCl$_2$•2H$_2$O→Mg(OH)Cl + HCl + H$_2$O<br>MgCl$_2$•2H$_2$O → MgCl$_2$•H$_2$O + H$_2$O | 130° C. | 190° C.-230° C. | * |

* No recirculating HCl

The first, second and fourth reactions above may be characterized as dehydrations, while the third may be characterized as a decomposition. As in the embodiment of FIG. 6, the temperatures used in this embodiment result in the formation of Mg(OH)Cl from the MgCl$_2$.6H$_2$O rather than MgO. The Mg(OH)Cl then reacts with H$_2$O to form MgCl$_2$ and Mg(OH)$_2$, which reacts with a saturated CaCl$_2$/H$_2$O solution and CO$_2$ from the flue gas to form CaCO$_3$, which is filtered out of the stream. The resulting MgCl$_2$ formed is recycled to the first reactor to begin the process again. Additional details regarding this simulation are provided in Example 3 below.

Figure 8:
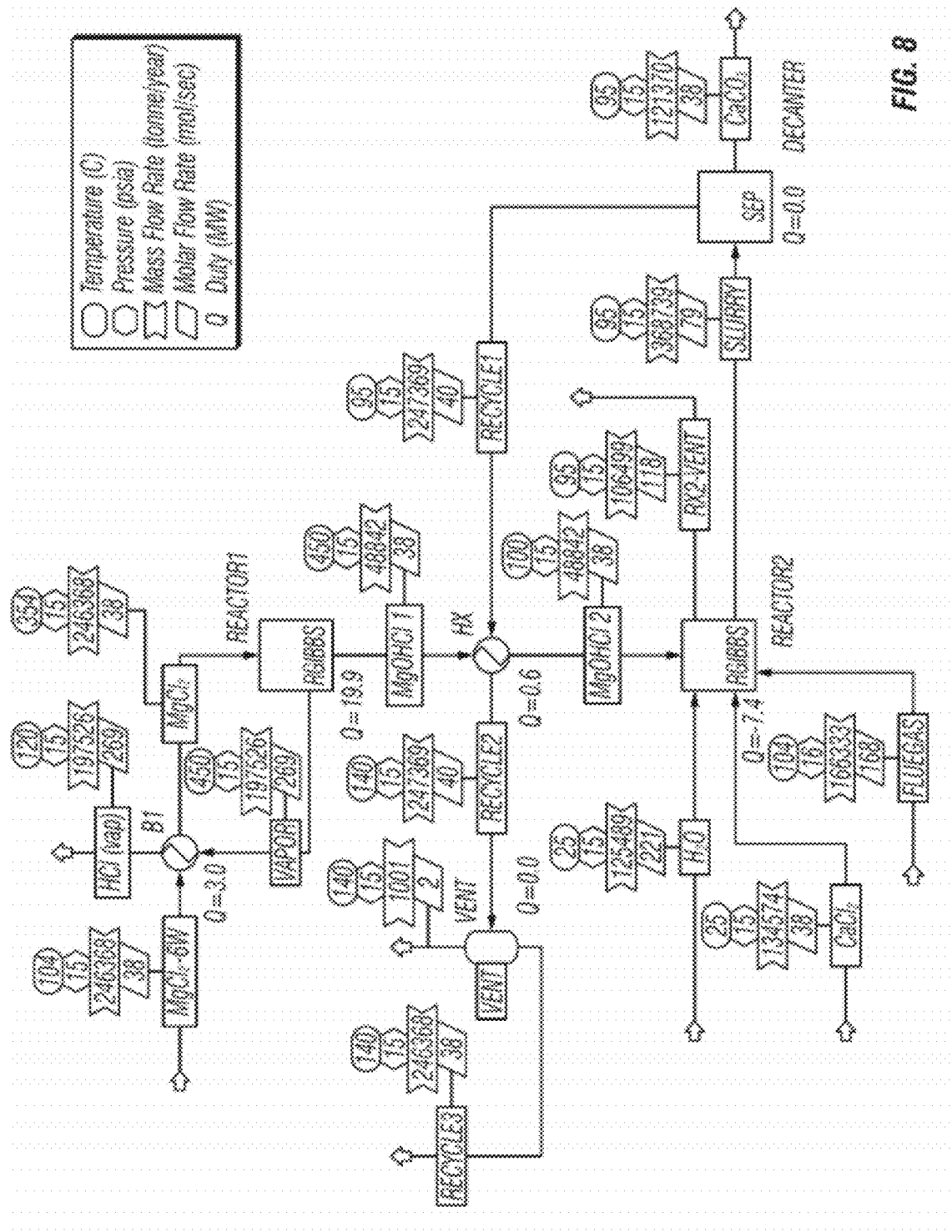

FIG. 8 is a process flow diagram showing parameters and results from a process simulation using Aspen Plus process software. The net reaction is the capture of CO$_2$ from flue gas using inexpensive raw materials, CaCl$_2$ and water, to form CaCO$_3$. Results from this simulation indicate that it is efficient to heat MgCl$_2$.6H$_2$O to form MgO. The MgO then reacts with H$_2$O to form Mg(OH)$_2$, which then reacts with a saturated CaCl$_2$/H$_2$O solution and CO$_2$ from the flue gas to form CaCO$_3$, which is filtered out of the stream. The resulting MgCl$_2$ formed is recycled to the first reactor to begin the process again. In this embodiment, the magnesium hexahydrate is simultaneously dehydrated and decomposed in one chamber at 450° C. This is the model termperature range. The preferred range in some emobodiments, is 450° C.-500° C. Thus the decomposition goes completely to MgO. The main reaction occurring in this chamber can be represented as follows:

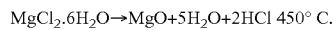

MgCl$_2$.6H$_2$O→MgO+5H$_2$O+2HCl 450° C.

Additional details regarding this simulation are provided in Example 4 below.

Figure 9:
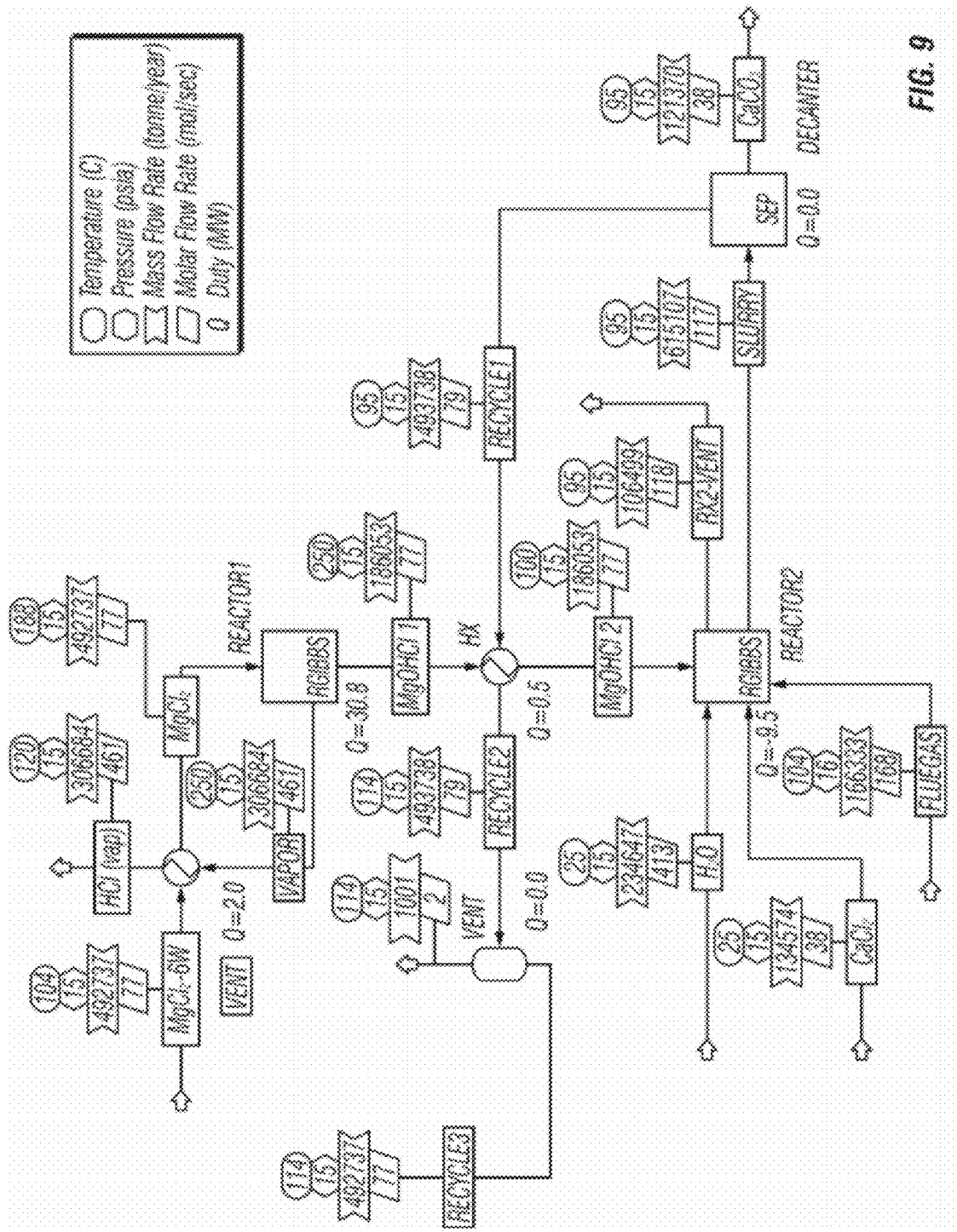

FIG. 9 is a process flow diagram showing parameters and results from a process simulation using Aspen Plus process software similar to the embodiment of FIG. 8 except that the MgCl$_2$.6H$_2$O is decomposed into an intermediate compound, Mg(OH)Cl at a lower temperature of 250° C. in one chamber. The Mg(OH)Cl is then dissolved in water to form MgCl$_2$ and Mg(OH)$_2$, which follows through with the same reaction with CaCl$_2$ and CO$_2$ to form CaCO$_3$ and MgCl$_2$. The main reaction occurring in this chamber can be represented as follows:

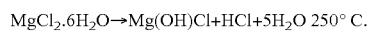

MgCl$_2$.6H$_2$O→Mg(OH)Cl+HCl+5H$_2$O 250° C.

The reaction was modeled at 250° C. In some embodiments, the preferred range is from 230° C. to 260° C. Additional details regarding this simulation are provided in Example 5 below.

Figure 10:
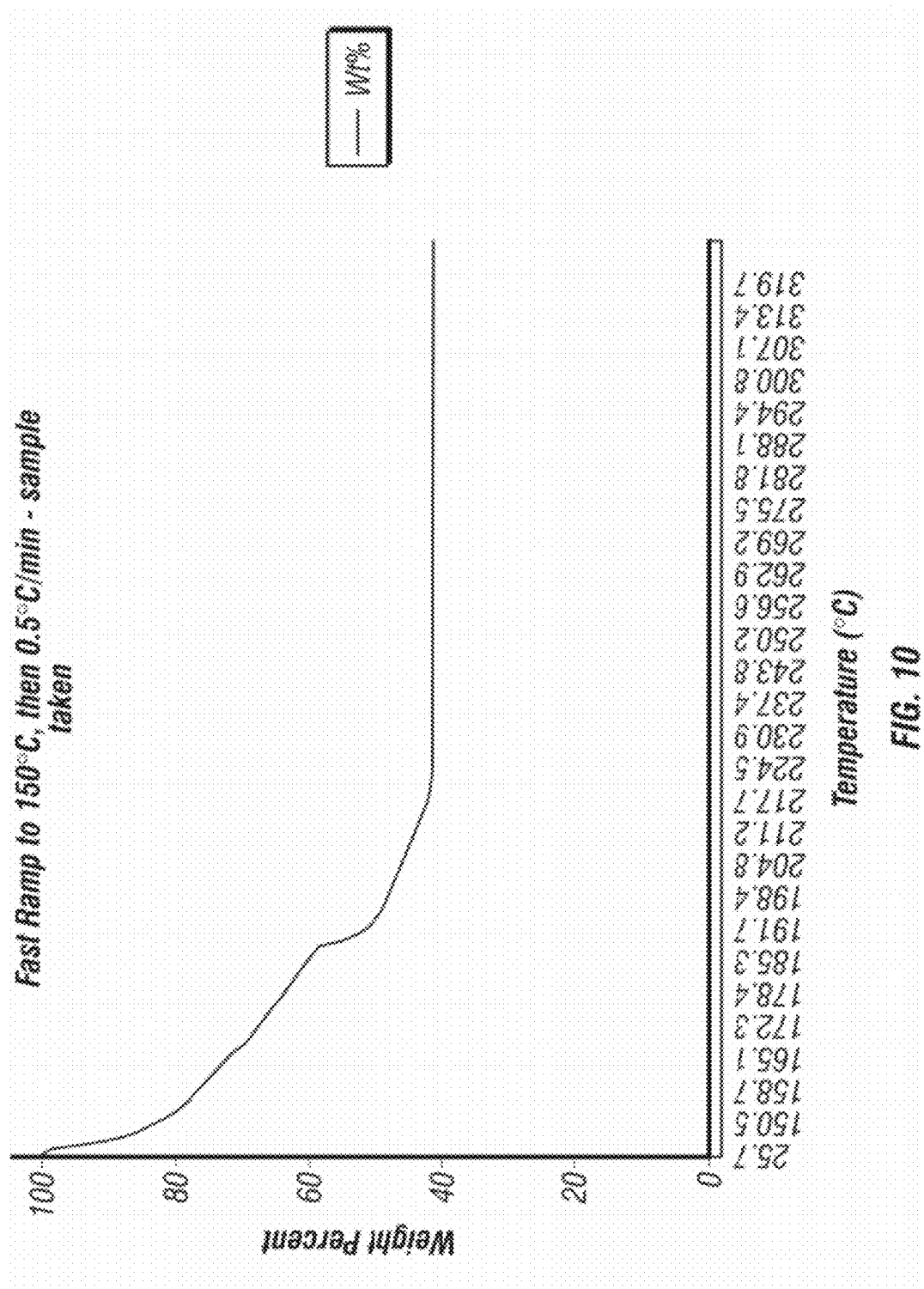

FIG. 10 shows a graph of the mass percentage of a heated sample of MgCl$_2$.6H$_2$O. The sample's initial mass was approximately 70 mg and set at 100%. During the experiment, the sample's mass was measured while it was being thermally decomposed. The temperature was quickly ramped up to 150° C., and then slowly increased by 0.5° C. per minute. At approximately 220° C., the weight became constant, consistent with the formation of Mg(OH)Cl.

Figure 11:
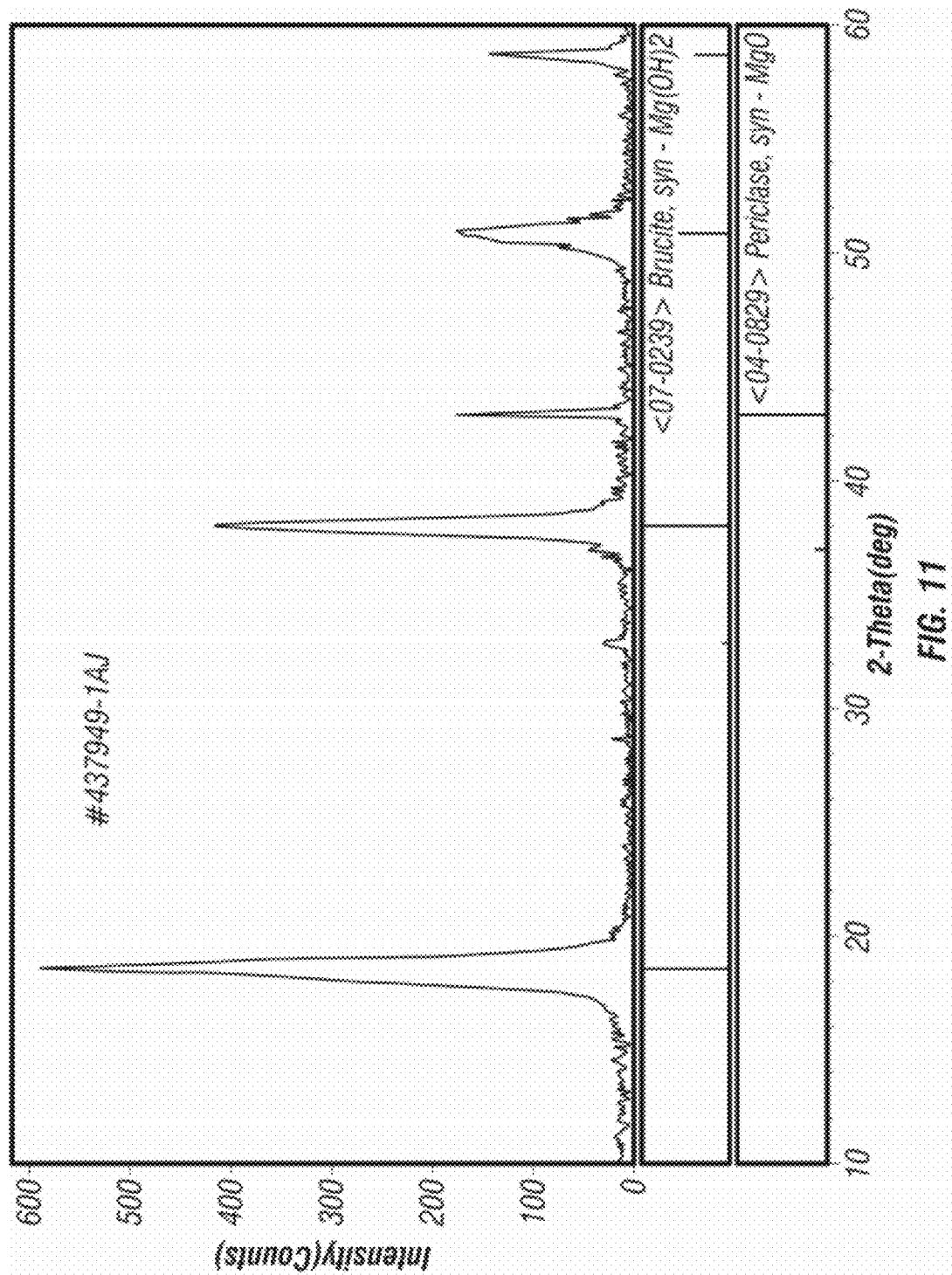

FIG. 11 shows X-ray diffraction data corresponding to the product of Example 7.

Figure 12:
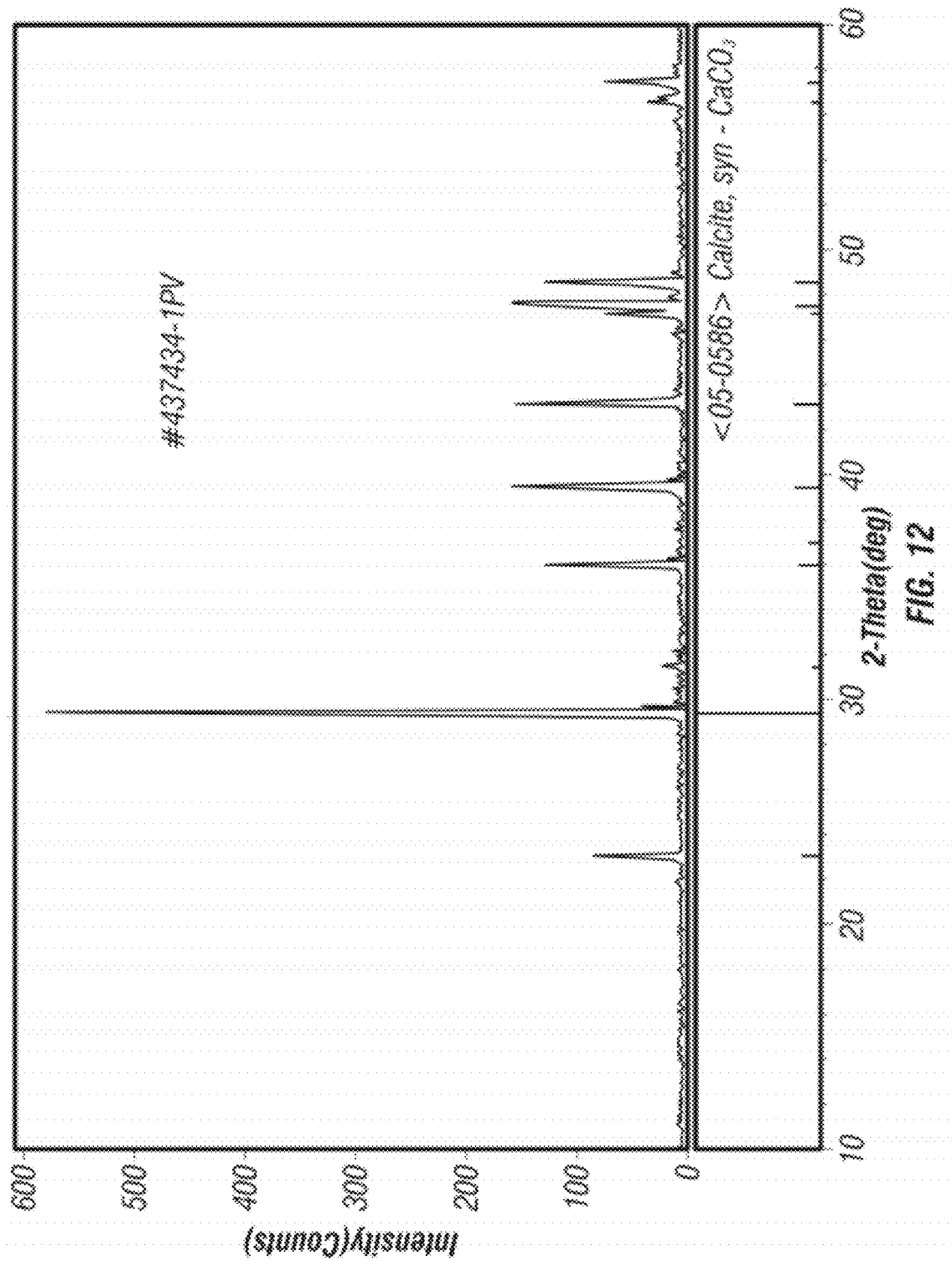

FIG. 12 shows X-ray diffraction data corresponding to the product from the reaction using Mg(OH)$_2$ of Example 8.

Figure 13:
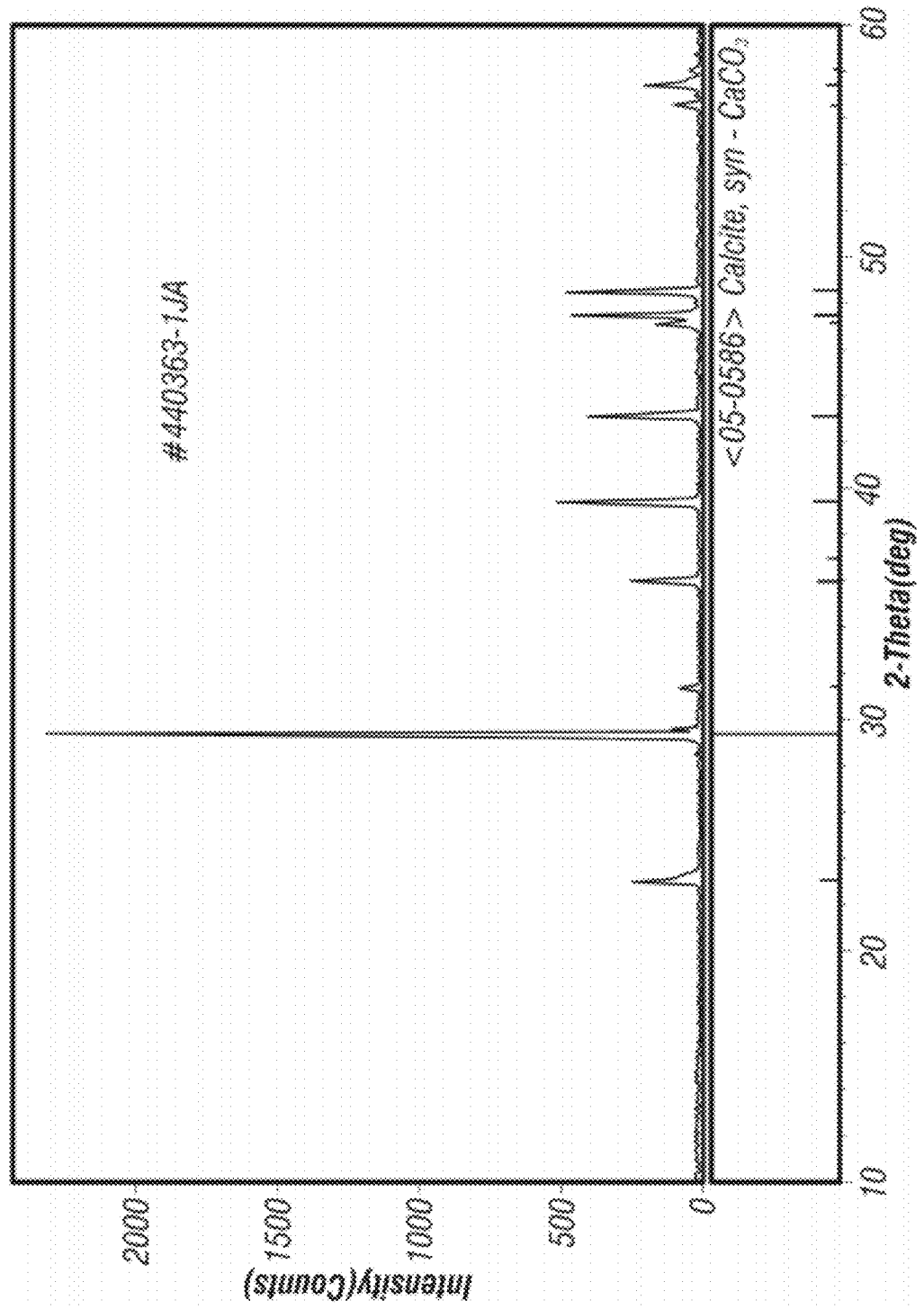

FIG. 13 shows X-ray diffraction data corresponding to the product from the reaction using Mg(OH)Cl of Example 8.

Figure 14:
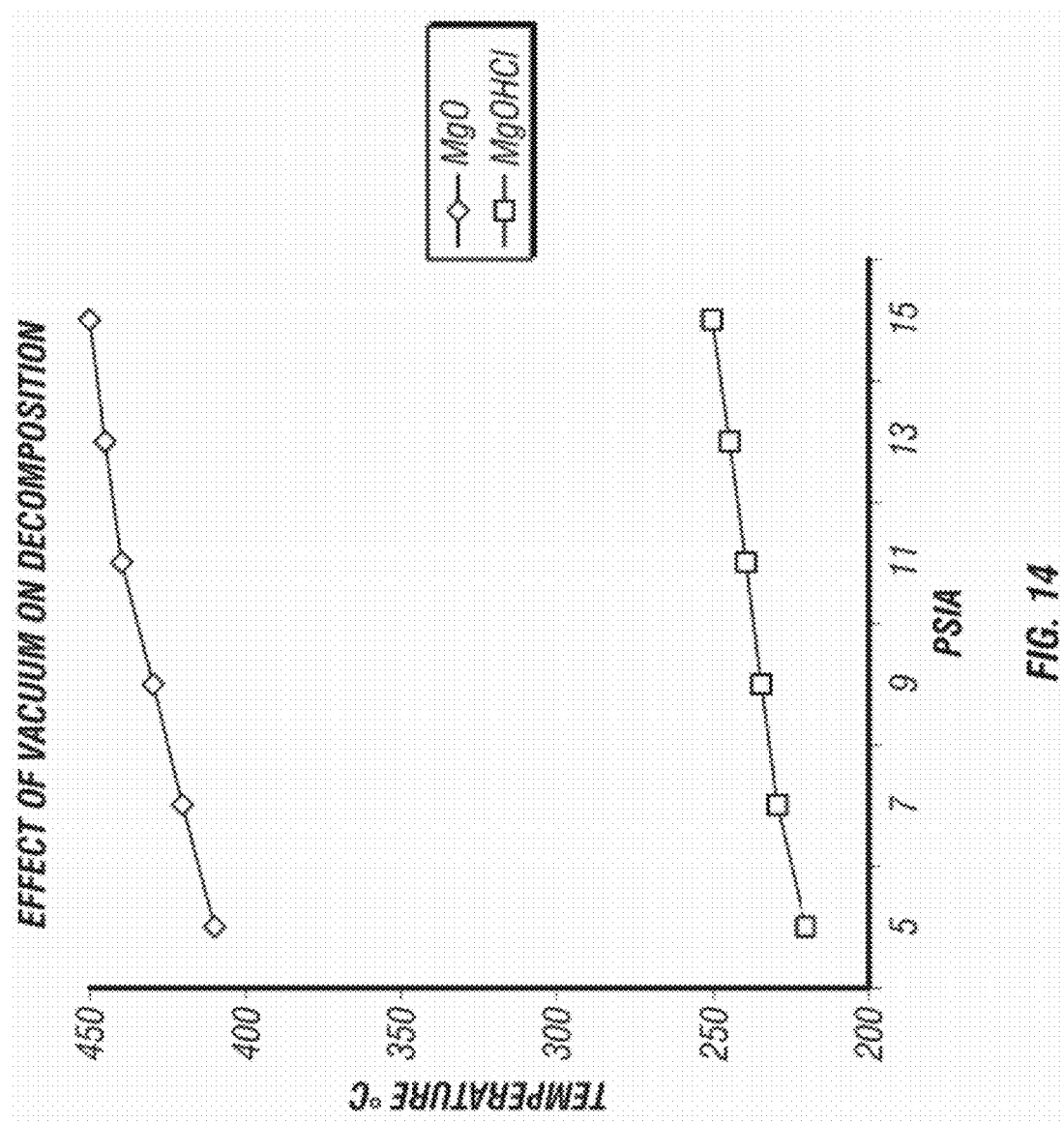

FIG. 14 shows the effect of temperature and pressure on the decomposition of MgCl$_2$.(H$_2$O).

Figure 15:
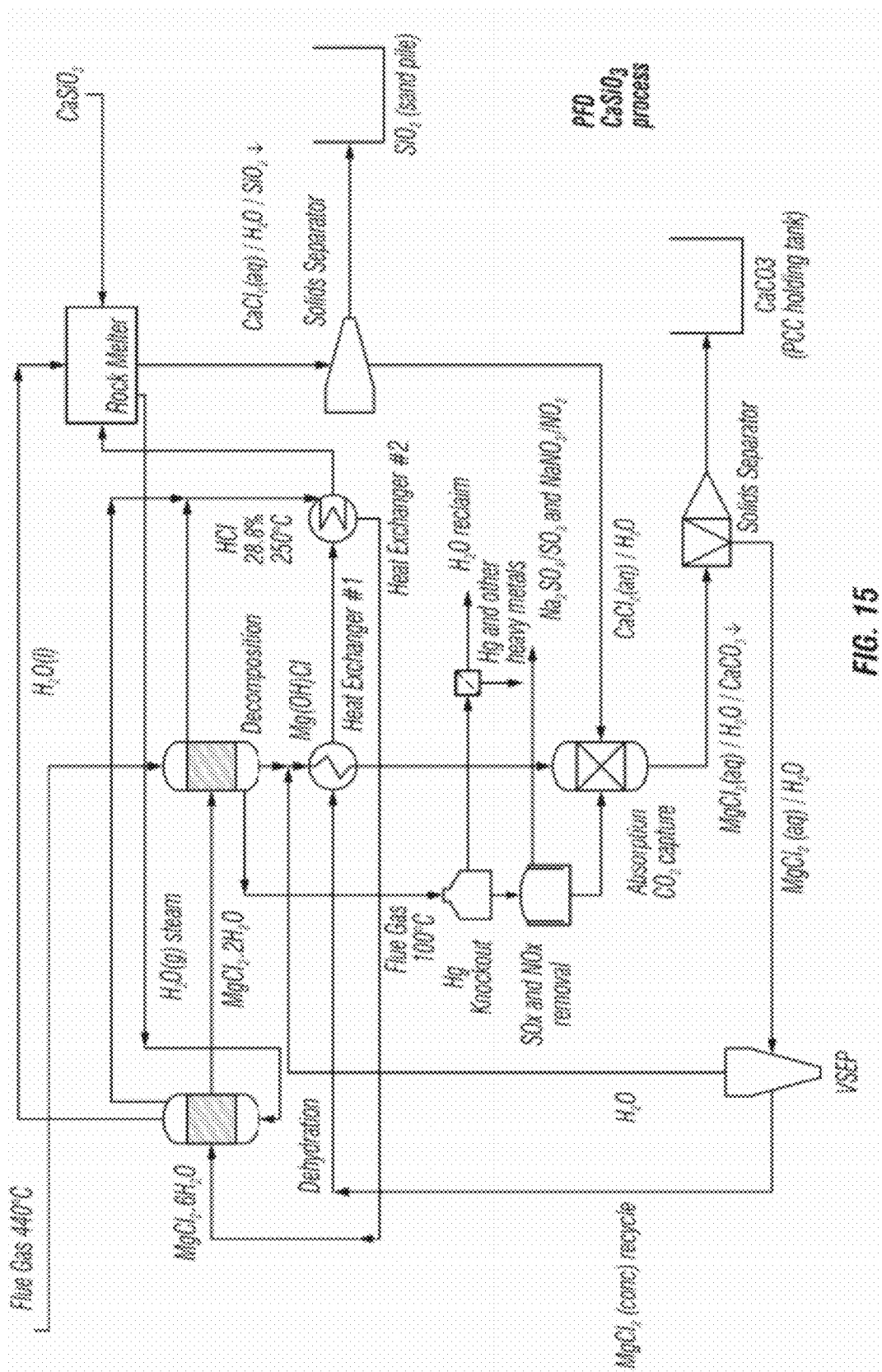

FIG. 15 is a process flow diagram of an embodiment of the Ca/Mg process described herein.

Figure 16:
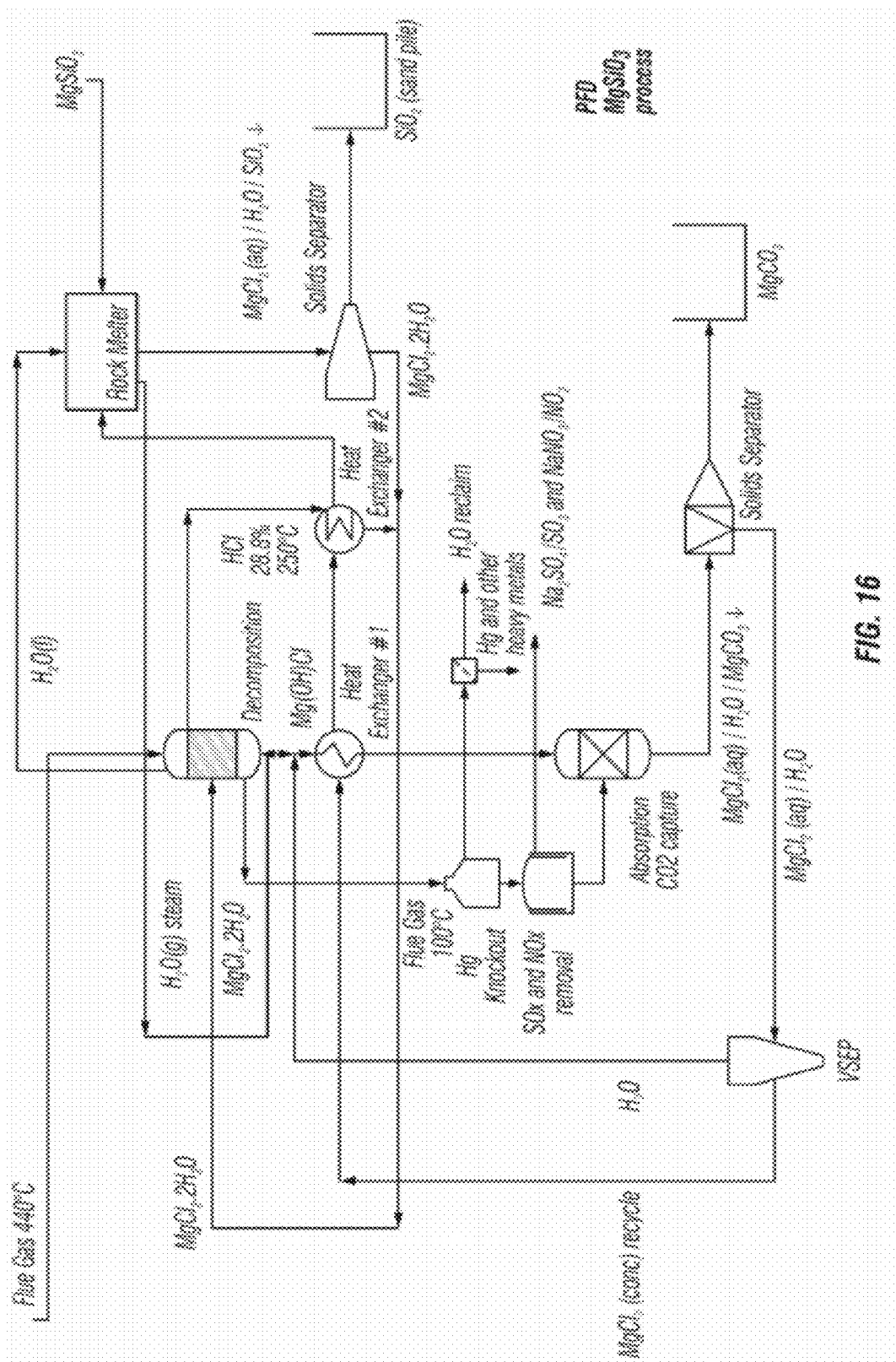

FIG. 16 is a process flow diagram of a variant of the process, whereby only magnesium compounds are used. In this embodiment the Ca$^{2+}$—Mg$^{2+}$ switching reaction does not occur.

Figure 17:
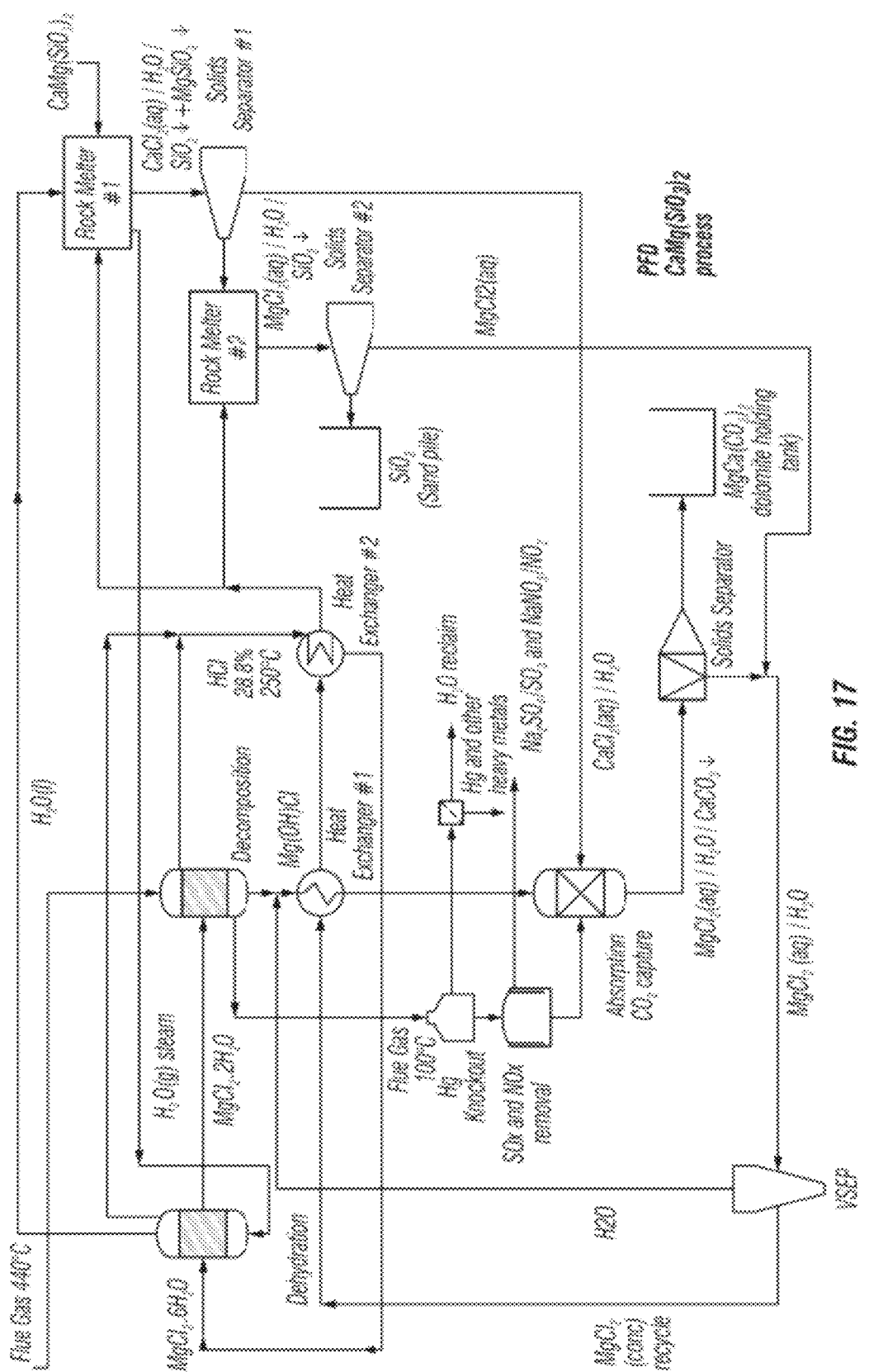

FIG. 17 is a process flow diagram of a different variant of the process which is in between the previous two embodiments. Half of the Mg$^{2+}$ is replaced by Ca$^{2+}$, thereby making the resulting mineralized carbonate MgCa(CO$_3$)$_2$ or dolomite.

Figure 18:
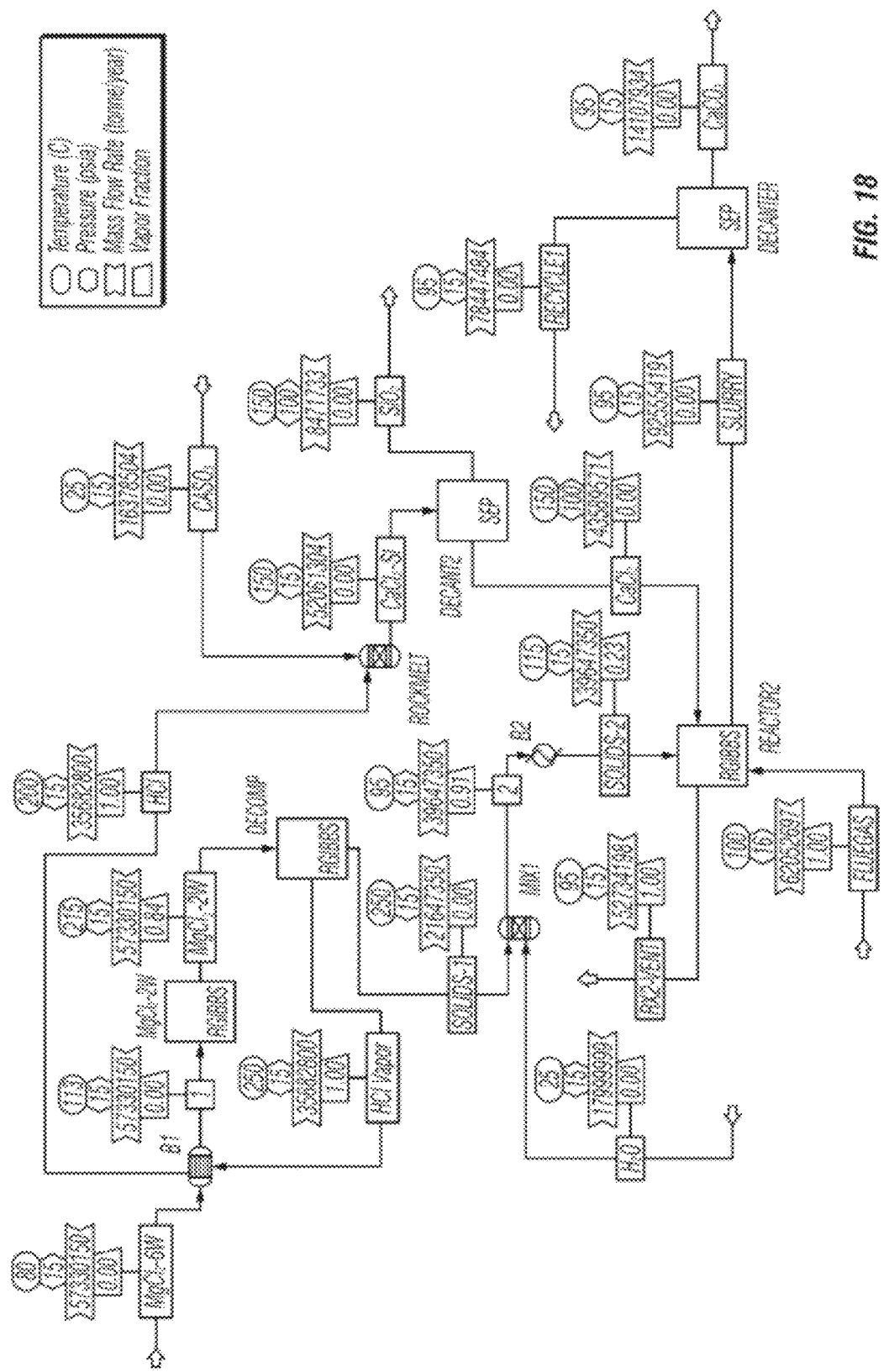

FIG. 18—CaSiO$_3$—Mg(OH)Cl Process, Cases 10 & 11. This figure shows a process flow diagram providing parameters and results from a process simulation using Aspen Plus process software. The net reaction is the capture of CO$_2$ from flue gas using inexpensive raw materials, CaSiO$_3$, CO$_2$ and water, to form SiO$_2$ and CaCO$_3$. Results from this simulation indicate that it is efficient to use heat from the HCl reacting with CaSiO$_3$ and heat from the flue gas emitted by a natural gas or coal fired power plant to carry out the decomposition of MgCl$_2$.6H$_2$O to form Mg(OH)Cl. The Mg(OH)Cl then reacts with H$_2$O to form MgCl$_2$ and Mg(OH)$_2$, which then reacts with a saturated CaCl$_2$/H$_2$O solution and CO$_2$ from the flue gas to form CaCO$_3$, which is filtered out of the stream. The resulting MgCl$_2$ formed is recycled to the first reactor to begin the process again. In this embodiment, the magnesium chloride hexahydrate is dehydrated to magnesium chloride dihydrate MgCl$_2$.2H$_2$O in the first chamber using heat from the HCl and CaSiO$_3$ reaction and decomposed in a second chamber at 250° C. using heat from the flue gas. Thus the decomposition goes partially to Mg(OH)Cl. The main reactions occurring in this chamber can be represented as follows:

| Reaction | ΔH** kJ/mole | Reaction Temp. Range |
|---|---|---|
| MgCl$_2$•6H$_2$O → Mg(OH)Cl + 5H$_2$O + HCl | 433 | 230° C.-260° C. |
| 2HCl(g) + CaSiO$_3$ → CaCl$_2$(aq) + H$_2$O + SiO$_2$↓ | −259 | 90° C.-150° C. |

-continued

| Reaction | ΔH** kJ/mole | Reaction Temp. Range |
|---|---|---|
| $2Mg(OH)Cl + CO_2 + CaCl_2 \rightarrow 2MgCl_2 + CaCO_3\downarrow + H_2O$ | −266 | 25° C.-95° C. |

**Enthalpies are based on reaction temperatures, and temperatures of incoming reactant and outgoing product streams. Additional details regarding this simulation are provided in Examples 10 and 11 below.

Figure 19:
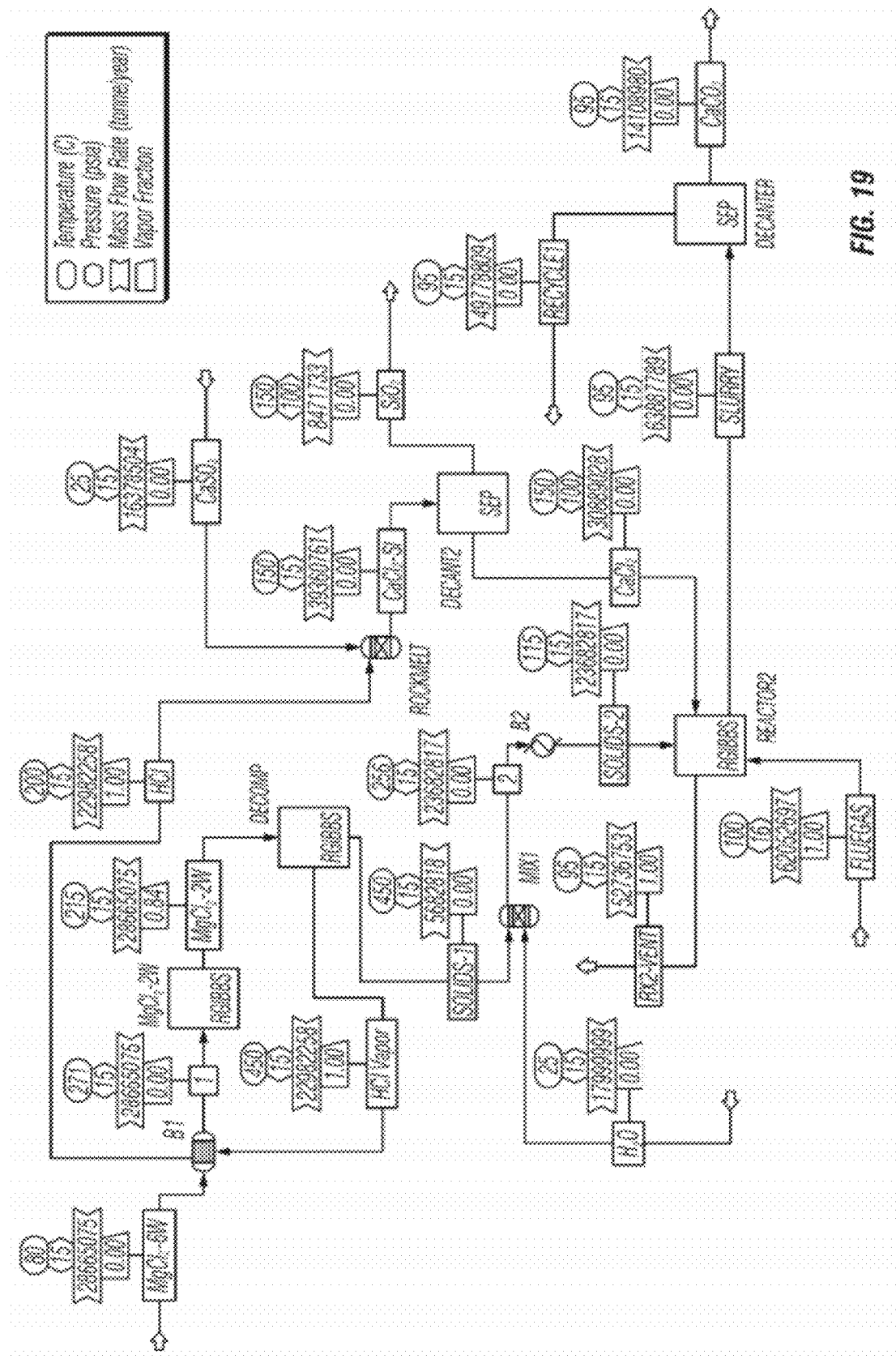

FIG. 19—$CaSiO_3$—MgO Process, Cases 12 & 13. This figure shows a process flow diagram providing parameters and results from a process simulation using Aspen Plus process software. The net reaction is the capture of $CO_2$ from flue gas using inexpensive raw materials, $CaSiO_3$, $CO_2$ and water, to form $SiO_2$ and $CaCO_3$. Results from this simulation indicate that it is efficient to use heat from the HCl reacting with $CaSiO_3$ and heat from flue gas emitted by a natural gas or coal fired power plant to carry out the decomposition of $MgCl_2.6H_2O$ to form MgO. The MgO then reacts with $H_2O$ to form $Mg(OH)_2$, which then reacts with a saturated $CaCl_2/H_2O$ solution and $CO_2$ from the flue gas to form $CaCO_3$, which is filtered out of the stream. The resulting $MgCl_2$ formed is recycled to the first reactor to begin the process again. In this embodiment, the magnesium chloride hexahydrate is dehydrated to magnesium chloride dihydrate $MgCl_2.2H_2O$ in the first chamber using heat from the HCl and $CaSiO_3$ reaction and decomposed in a second chamber at 450° C. using heat from the flue gas. Thus the decomposition goes completely to MgO. The main reactions occurring in this chamber can be represented as follows:

| Reaction | ΔH kJ/mole** | Reaction Temp. Range |
|---|---|---|
| $MgCl_2 \cdot 6H_2O \rightarrow MgO + 5H_2O + 2HCl$ | 560 | 450° C.-500° C. |
| $2HCl(g) + CaSiO_3 \rightarrow CaCl_2(aq) + H_2O + SiO_2\downarrow$ | −264 | 90° C.-150° C. |
| $MgO + CO_2 + CaCl_2(aq) \rightarrow MgCl_2(aq) + CaCO_3\downarrow$ | −133 | 25° C.-95° C. |

**Enthalpies are based on reaction temperatures, and temperatures of incoming reactant and outgoing product streams. Additional details regarding this simulation are provided in Examples 12 and 13 below.

Figure 20:
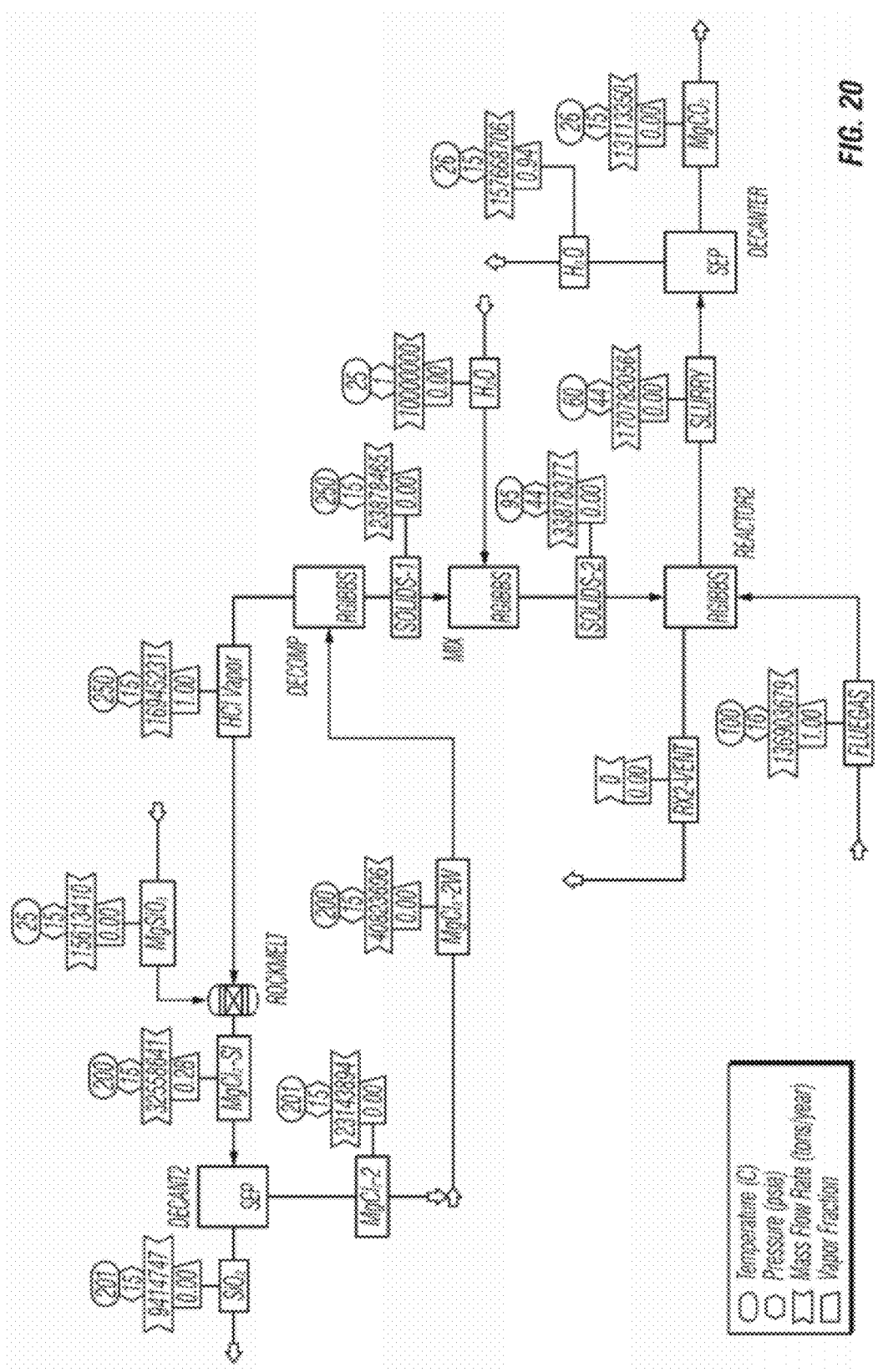

FIG. 20—$MgSiO_3$—Mg(OH)Cl Process, Cases 14 & 15. This figure shows a process flow diagram providing parameters and results from a process simulation using Aspen Plus process software. The net reaction is the capture of $CO_2$ from flue gas using inexpensive raw materials, $MgSiO_3$, $CO_2$ and water, to form $SiO_2$ and $MgCO_3$. Results from this simulation indicate that it is efficient to use heat from the HCl reacting with $MgSiO_3$ and heat from the flue gas emitted by a natural gas or coal fired power plant to carry out the decomposition of $MgCl_2.2H_2O$ to form Mg(OH)Cl. The Mg(OH)Cl then reacts with $H_2O$ to form $MgCl_2$ and $Mg(OH)_2$, which then reacts with $CO_2$ from the flue gas to form $MgCO_3$, which is filtered out of the stream. The resulting $MgCl_2$ formed is recycled to the first reactor to begin the process again. In this embodiment, the magnesium chloride remains in the dihydrate form $MgCl_2.2H_2O$ due to the heat from the HCl and $MgSiO_3$ prior to decomposition at 250° C. using heat from the flue gas. Thus the decomposition goes partially to Mg(OH)Cl. The main reactions occurring in this chamber can be represented as follows:

| Reaction | ΔH kJ/mole ** | Reaction Temp. Ranges |
|---|---|---|
| $MgCl_2 \cdot 2H_2O \rightarrow Mg(OH)Cl + H_2O(g) + HCl(g)$ | 139.8 | 230° C.-260° C. |
| $2HCl(g) + MgSiO_3 \rightarrow MgCl_2 + H_2O + SiO_2\downarrow$ | −282.8 | 90° C.-150° C. |
| $2Mg(OH)Cl + CO_2 \rightarrow MgCl_2 + MgCO_3\downarrow + H_2O$ | −193.1 | 25° C.-95° C. |

** Enthalpies are based on reaction temperatures, and temperatures of incoming reactant and outgoing product streams. Additional details regarding this simulation are provided in Examples 14 and 15 below.

Figure 21:
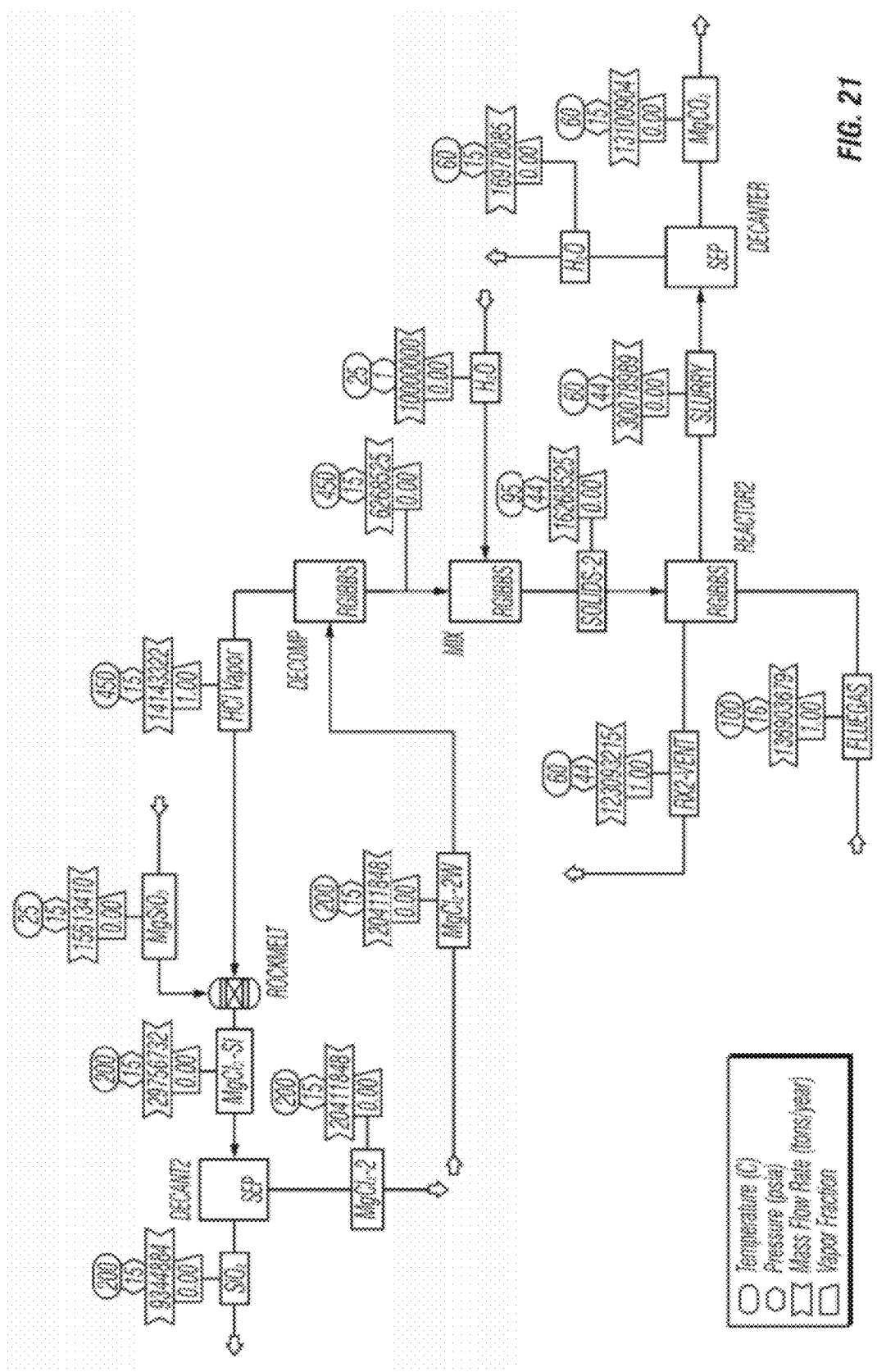

FIG. 21—$MgSiO_3$—MgO Process, Cases 16 & 17. This figure shows a process flow diagram providing parameters and results from a process simulation using Aspen Plus process software. The net reaction is the capture of $CO_2$ from flue gas using inexpensive raw materials, $MgSiO_3$, $CO_2$ and water, to form $SiO_2$ and $MgCO_3$. Results from this simulation indicate that it is efficient to use heat from the HCl reacting with $MgSiO_3$ and heat from the flue gas emitted by a natural gas or coal fired power plant to carry out the decomposition of $MgCl_2.2H_2O$ to form MgO. The MgO then reacts with $H_2O$ to form $Mg(OH)_2$, which then reacts with $CO_2$ from the flue gas to form $MgCO_3$, which is filtered out of the stream. In this embodiment, the magnesium chloride remains in the dihydrate form $MgCl_2.2H_2O$ due to the heat from the HCl and $MgSiO_3$ prior to decomposition at 450° C. using heat from the flue gas. Thus the decomposition goes completely to MgO. The main reactions occurring in this chamber can be represented as follows:

| Reaction | ΔH kJ/mole ** | Reaction Temp. Range |
|---|---|---|
| $MgCl_2 \cdot 2H_2O \rightarrow MgO + H_2O(g) + 2HCl(g)$ | 232.9 | 450° C.-500° C. |
| $2HCl(g) + MgSiO_3 \rightarrow MgCl_2(aq) + H_2O(g) + SiO_2\downarrow$ | −293.5 | 90° C.-150° C. |
| $MgO + CO_2 \rightarrow MgCO_3\downarrow$ | −100 | 25° C.-95° C. |

** Enthalpies are based on reaction temperatures, and temperatures of incoming reactant and outgoing product streams. Additional details regarding this simulation are provided in Examples 16 and 17 below.

Figure 22:
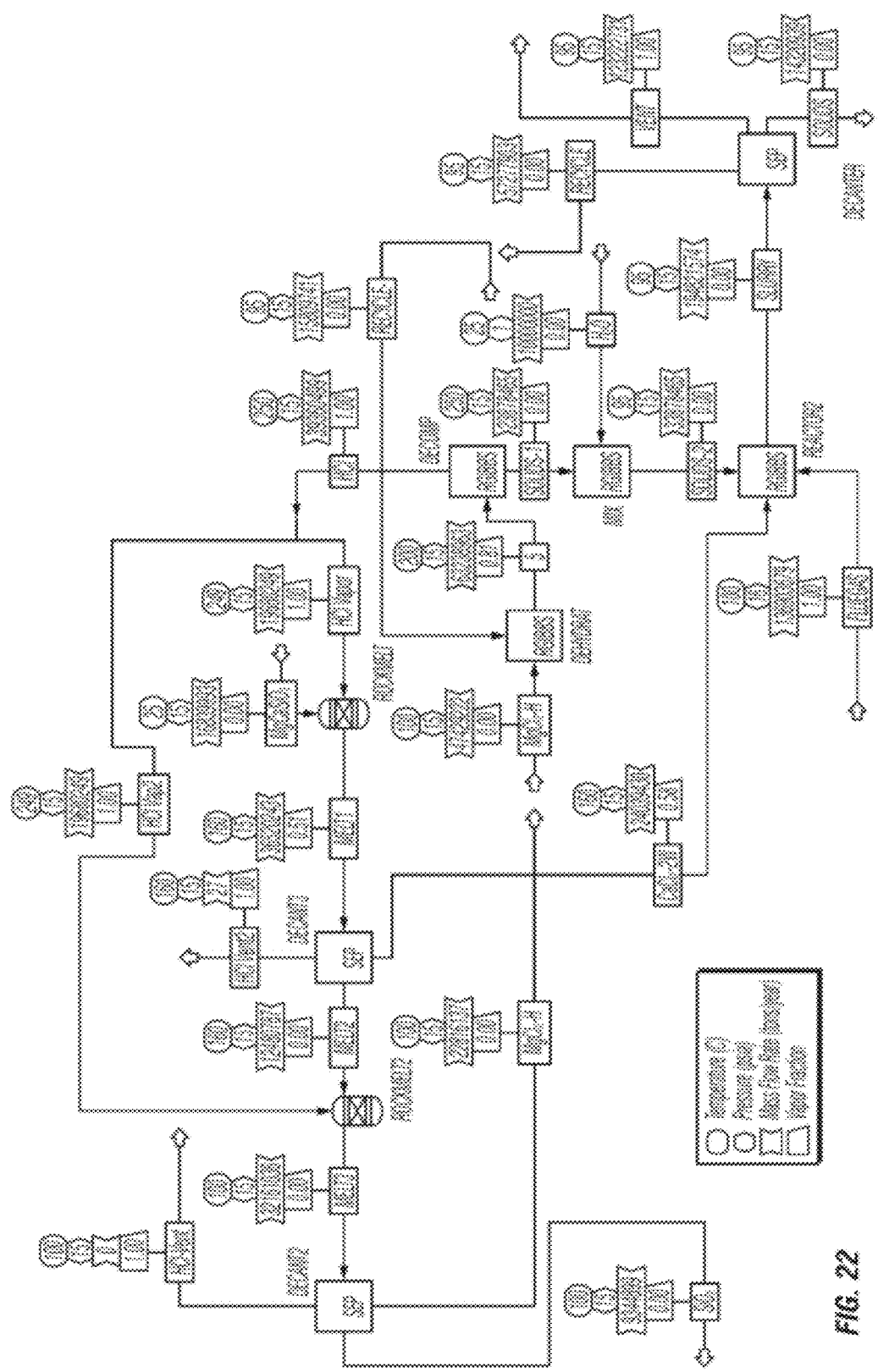

FIG. 22—Diopside-Mg(OH)Cl Process, Cases 18 & 19. This figure shows a process flow diagram providing parameters and results from a process simulation using Aspen Plus process software. The net reaction is the capture of $CO_2$ from flue gas using inexpensive raw materials, diopside $MgCa(SiO_3)_2$, $CO_2$ and water, to form $SiO_2$ and dolomite $MgCa(CO_3)_2$. Results from this simulation indicate that it is efficient to use heat from the HCl reacting with $MgCa(SiO_3)_2$ and heat from the flue gas emitted by a natural gas or coal fired power plant to carry out the decomposition of $MgCl_2.6H_2O$ to form Mg(OH)Cl. The Mg(OH)Cl then reacts with $H_2O$ to form $MgCl_2$ and $Mg(OH)_2$, which then reacts with a saturated $CaCl_2/H_2O$ solution and $CO_2$ from the flue gas to form $MgCa(CO_3)_2$ which is filtered out of the stream. The resulting $MgCl_2$ formed is recycled to the first reactor to begin the process again. In this embodiment, the magnesium chloride hexahydrate is dehydrated to magnesium chloride dihydrate $MgCl_2.2H_2O$ in the first chamber using heat from the HCl and $CaSiO_3$ reaction and decomposed to Mg(OH)Cl in a second chamber at 250° C. using heat from the flue gas. The main reactions occurring in this chamber can be represented as follows:

| Reaction | ΔH kJ/mole** | Reaction Temp. Range |
|---|---|---|
| $MgCl_2 \cdot 6H_2O \rightarrow Mg(OH)Cl + 5H_2O(g) + HCl(g)$ | 433 | 230° C.-260° C. |
| $2HCl(g) + MgCa(SiO_3)_2 \rightarrow CaCl_2(aq) + MgSiO_3\downarrow + SiO_2\downarrow + H_2O$ | −235 | 90° C.-150° C. |
| $2HCl(g) + MgSiO_3 \rightarrow MgCl_2(aq) + SiO_2\downarrow + H_2O$ | −282.8 | 90° C.-150° C. |
| $4Mg(OH)Cl + 2CO_2 + CaCl_2(aq) \rightarrow MgCa(CO_3)_2\downarrow + 3MgCl_2(aq) + 2H_2O$ | −442 | 25° C.-95° C. |

**Enthalpies are based on reaction temperatures, and temperatures of incoming reactant and outgoing product streams. Additional details regarding this simulation are provided in Examples 18 and 19 below.

Figure 23:
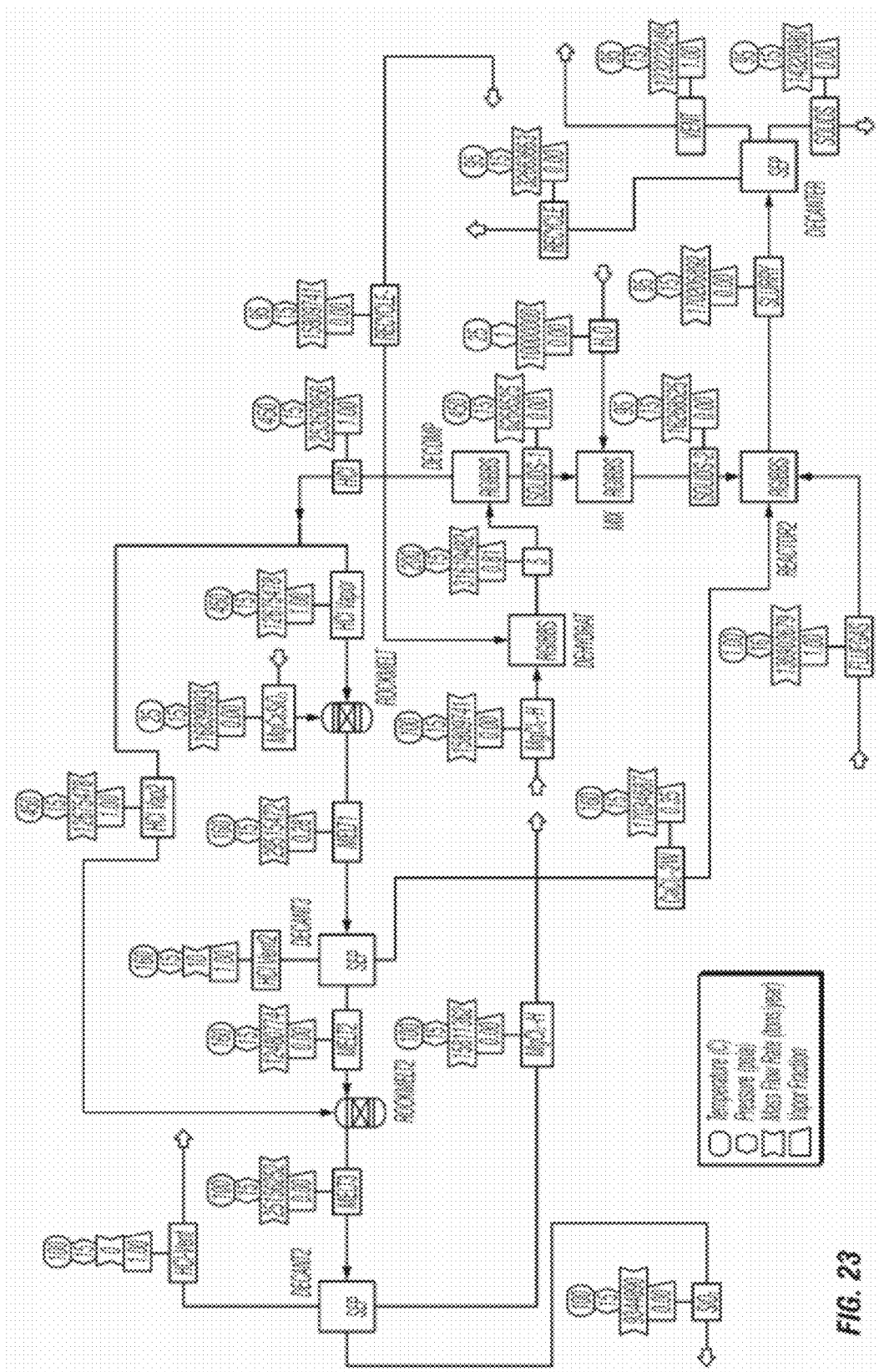

FIG. 23—Diopside-MgO Process, Cases 20 & 21. This figure shows a process flow diagram providing parameters and results from a process simulation using Aspen Plus process software. The net reaction is the capture of $CO_2$ from flue gas using inexpensive raw materials, diopside $MgCa(SiO_3)_2$, $CO_2$ and water, to form $SiO_2$ and dolomite $MgCa(CO_3)_2$. Results from this simulation indicate that it is efficient to use heat from the HCl reacting with $MgCa(SiO_3)_2$ and heat from the flue gas emitted by a natural gas or coal fired power plant and/or other heat source to carry out the decomposition of $MgCl_2 \cdot 6H_2O$ to form MgO. The MgO then reacts with $H_2O$ to form $Mg(OH)_2$, which then reacts with a saturated $CaCl_2/H_2O$ solution and $CO_2$ from the flue gas to form $MgCa(CO_3)_2$ which is filtered out of the stream. The resulting $MgCl_2$ formed is recycled to the first reactor to begin the process again. In this embodiment, the magnesium chloride hexahydrate is dehydrated to magnesium chloride dihydrate $MgCl_2 \cdot 2H_2O$ in the first chamber using heat from the HCl and $CaSiO_3$ reaction and decomposed to MgO in a second chamber at 450° C. using heat from the flue gas. The main reactions occurring in this chamber can be represented as follows:

| Reaction | ΔH kJ/mole** | Reaction Temp. Range |
|---|---|---|
| $MgCl_2 \cdot 6H_2O \rightarrow MgO + 5H_2O + 2HCl$ | 560 | 450° C.-500° C. |
| $2HCl(g) + MgCa(SiO_3)_2 \rightarrow CaCl_2(g) + MgSiO_3\downarrow + SiO_2\downarrow + H_2O$ | −240 | 90° C.-150° C. |
| $2HCl(aq) + MgSiO_3 \rightarrow MgCl_2(aq) + SiO_2\downarrow + H_2O$ | −288 | 90° C.-150° C. |
| $2MgO + 2CO_2 + CaCl_2(aq) \rightarrow MgCa(CO_3)_2\downarrow + MgCl_2(aq)$ | −258 | 25° C.-95° C. |

**Enthalpies are based on reaction temperatures, and temperatures of incoming reactant and outgoing product streams. Additional details regarding this simulation are provided in Examples 20 and 21 below.

Figure 24:
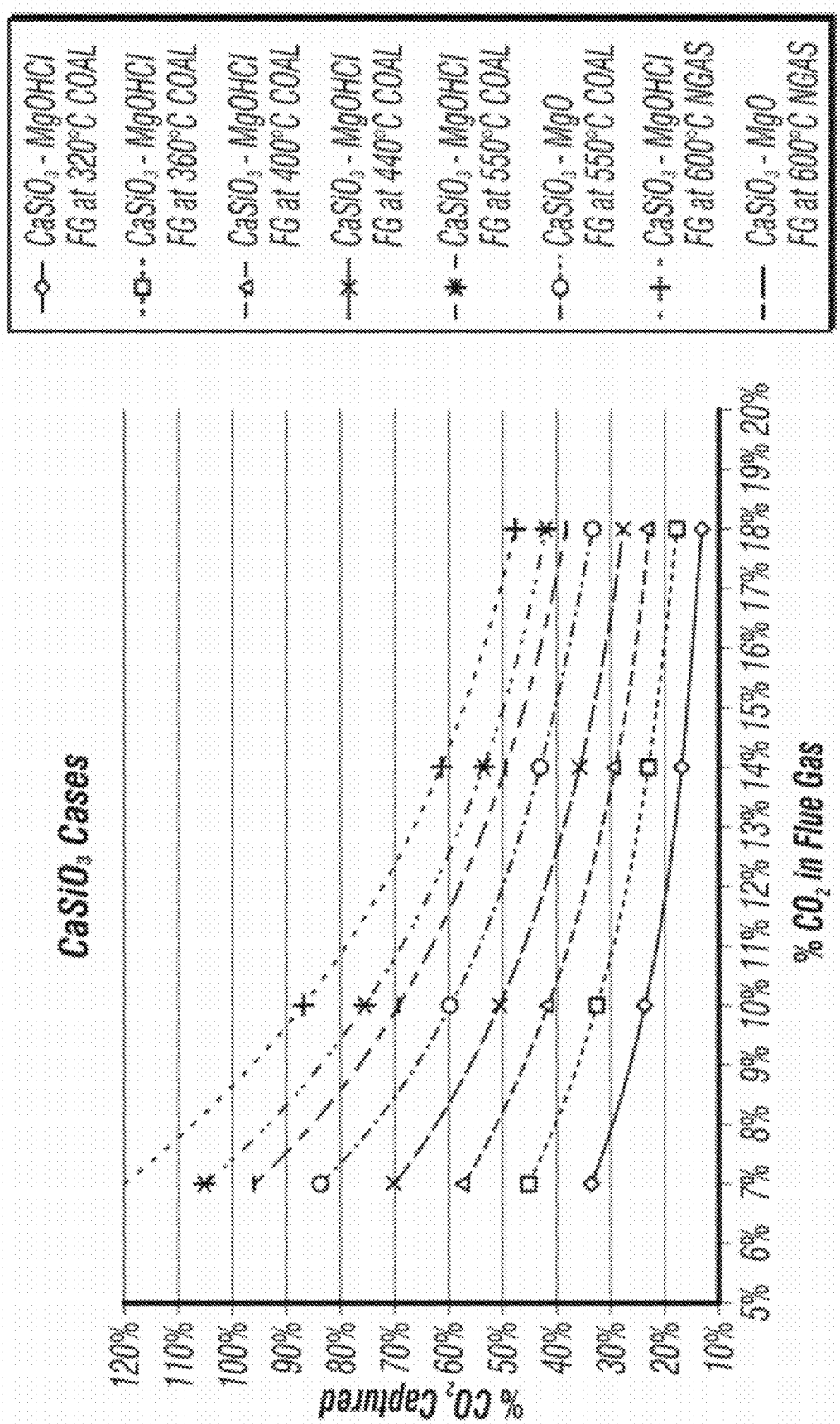

FIG. 24 illustrates the percent $CO_2$ captured for varying $CO_2$ flue gas concentrations, varying temperatures, whether the flue gas was originated from coal or natural gas, and also whether the process relied on full or partial decomposition. See Examples 10 through 13 of the $CaSiO_3$—Mg(OH)Cl and $CaSiO_3$—MgO processes.

Figure 25:
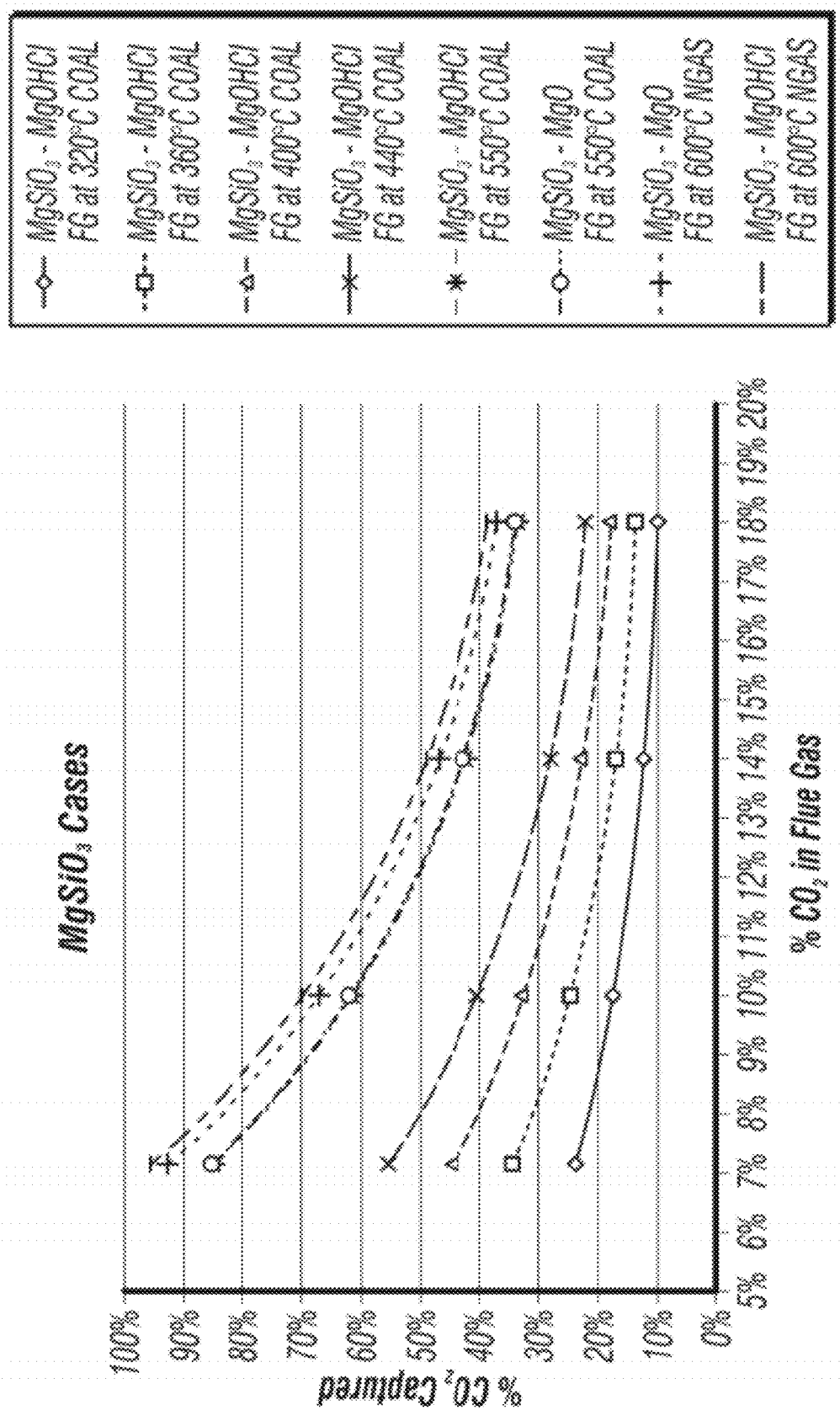

FIG. 25 illustrates the percent $CO_2$ captured for varying $CO_2$ flue gas concentrations, varying temperatures, whether the flue gas was originated from coal or natural gas, and also whether the process relied on full or partial decomposition. See Examples 14 through 17 of the $MgSiO_3$—Mg(OH)Cl and $MgSiO_3$—MgO processes.

Figure 26:
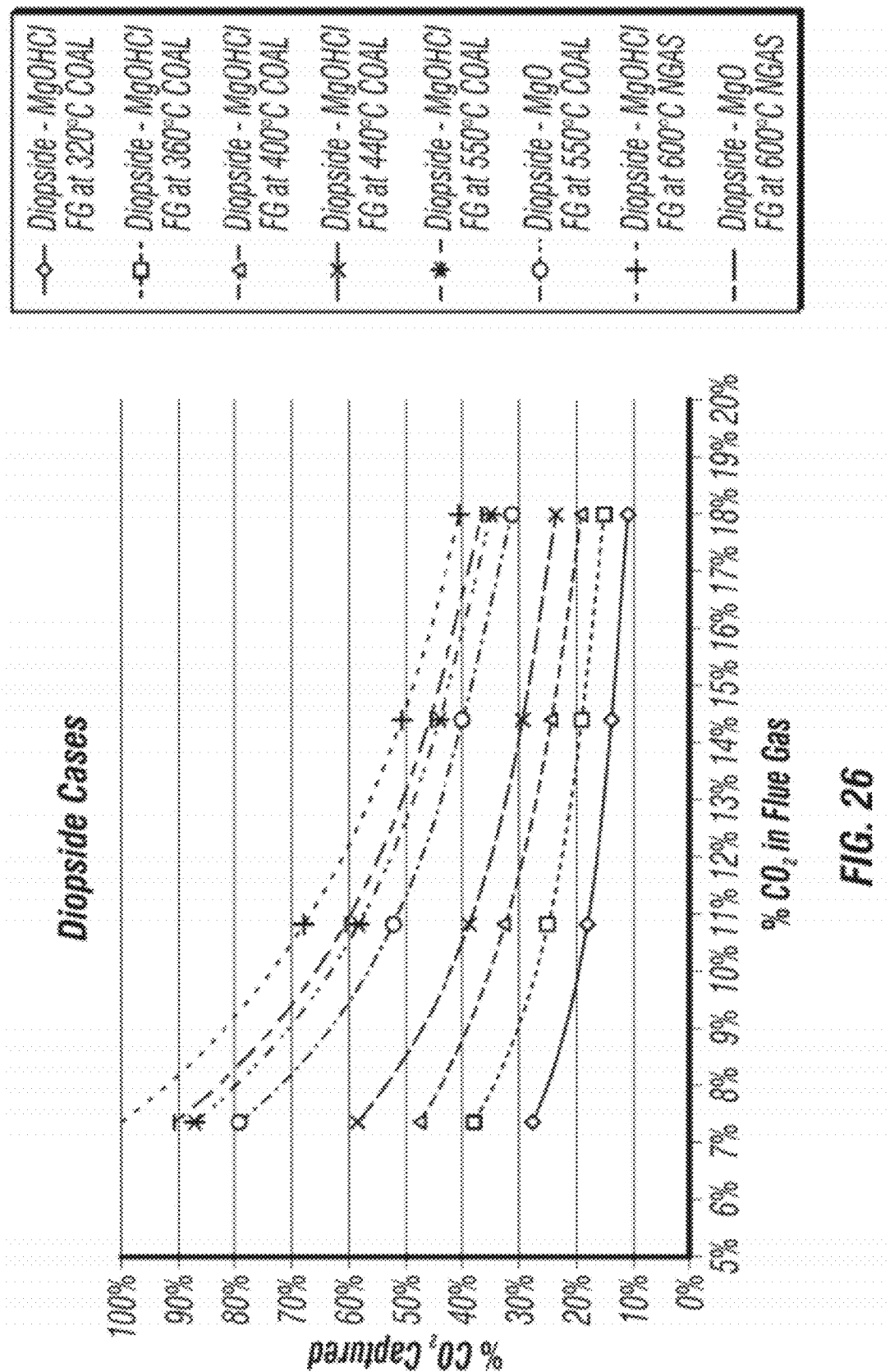

FIG. 26 illustrates the percent $CO_2$ captured for varying $CO_2$ flue gas concentrations, varying temperatures, whether the flue gas was originated from coal or natural gas, and also whether the process relied on full or partial decomposition. See Examples 18 through 21 of the Diopside—Mg(OH)Cl and Diopside—MgO processes.

Figure 27:
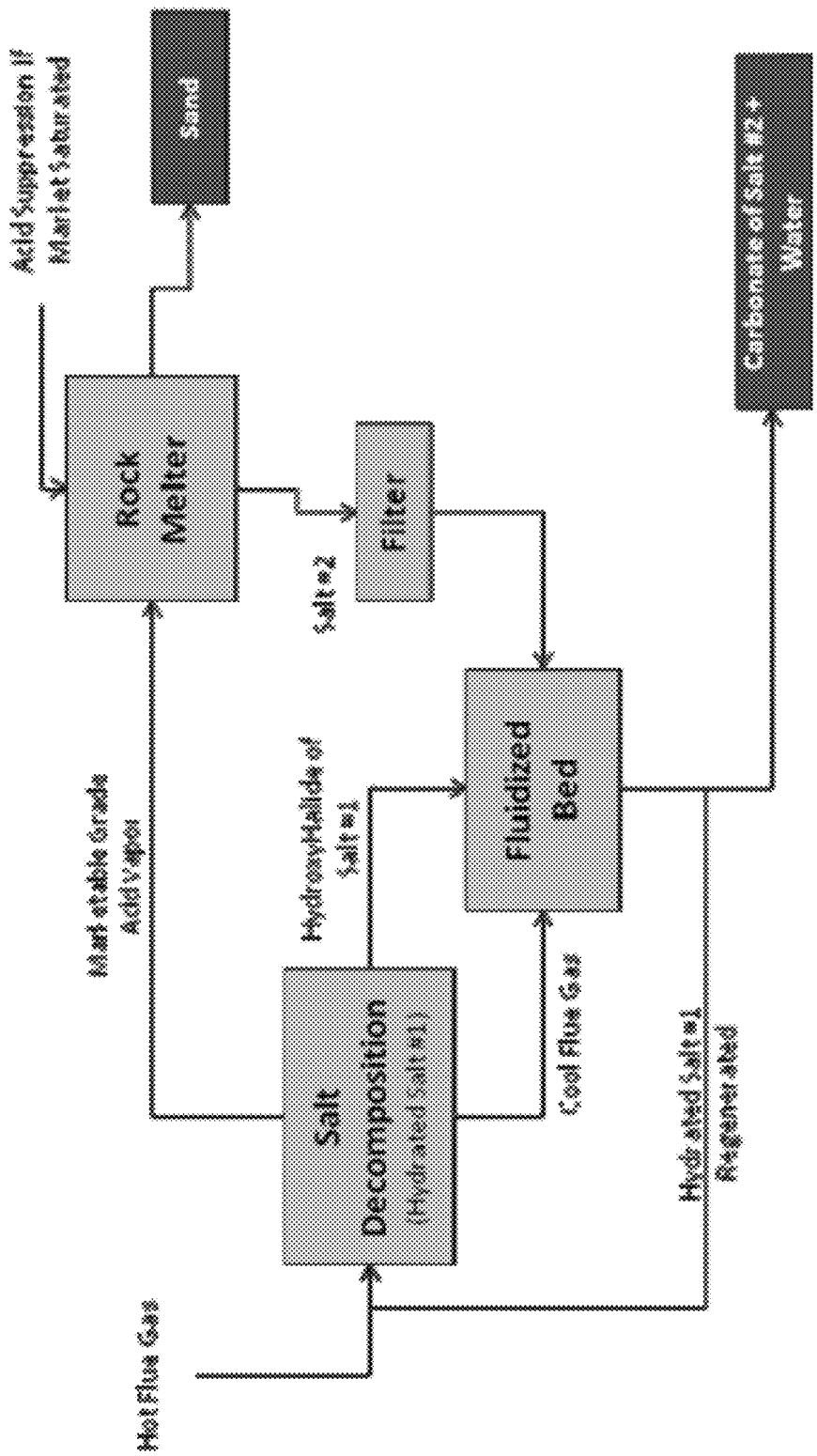

FIG. 27 is a simplified process-flow diagram corresponding to some embodiments of the present invention in which two different salts, e.g., $Ca^{2+}$ and $Mg^{2+}$, are used for decomposition and carbonation.

Figure 28:
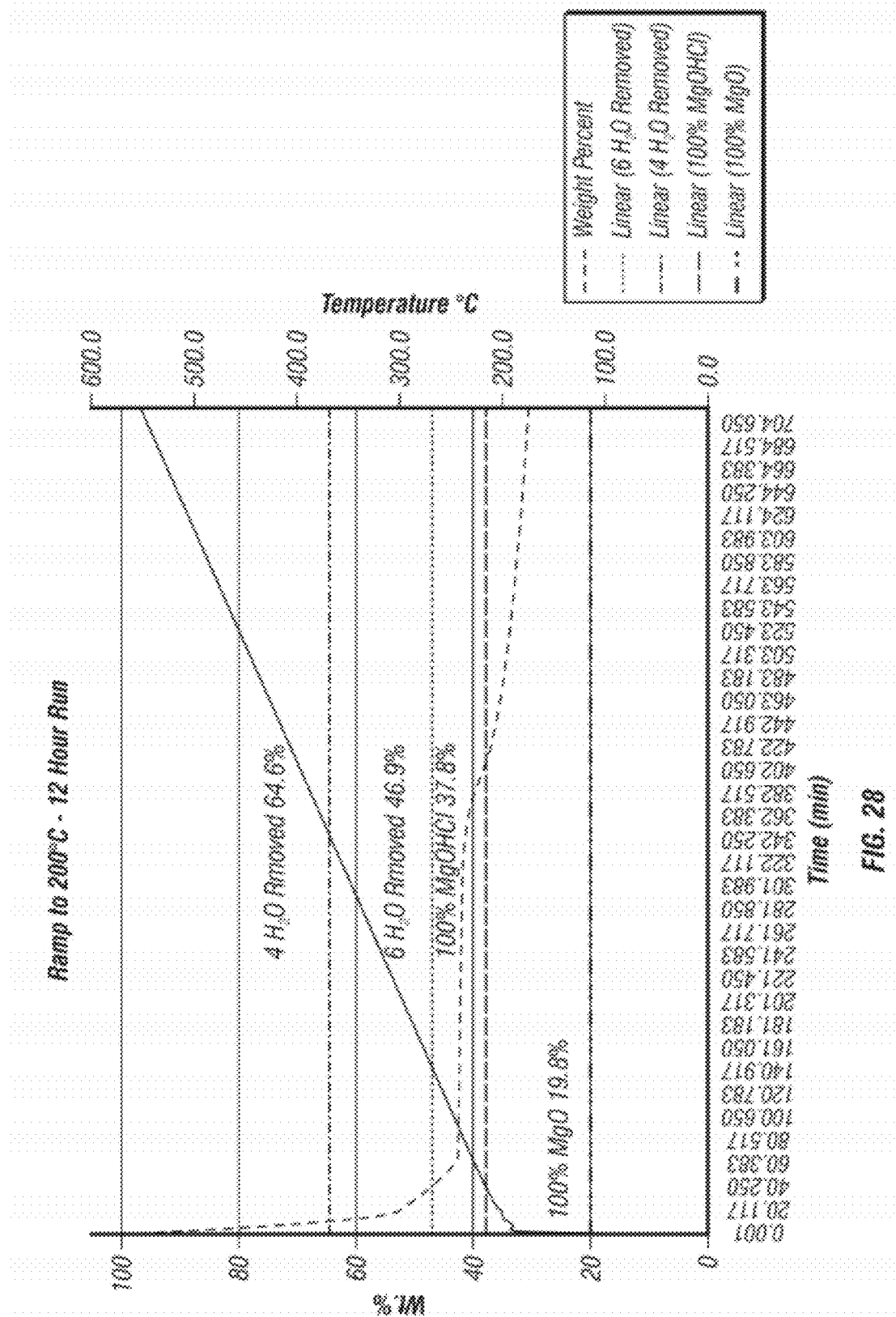
Figure 29:
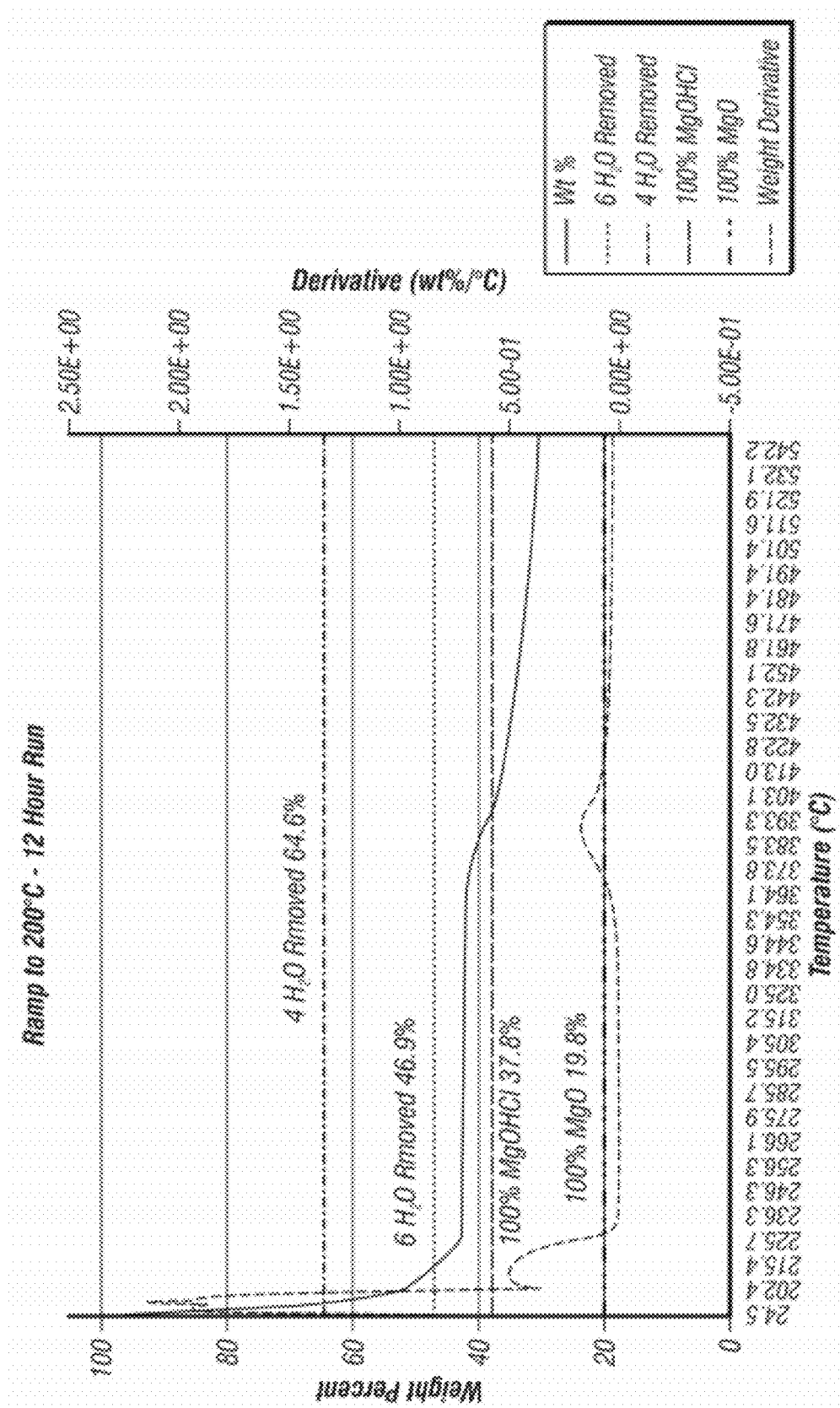

FIGS. 28-29 show graphs of the mass percentages of heated samples of $MgCl_2 \cdot 6H_2O$. The initial masses of the samples were approximately 70 mg each and were each set at 100%. During the experiment, the masses of the samples were measured while they was being thermally decomposed. The temperature was ramped up to 200° C. then further increased over the course of a 12 hour run. The identities of the decomposed materials can be confirmed by comparing against the theoretical plateaus provided. FIG. 28 is a superposition of two plots, the first one being the solid line, which is a plot of time (minutes) versus temperature (° C.). The line illustrates the ramping of temperature over time; the second plot, being the dashed line is a plot of weight % (100%=original weight of sample) versus time, which illustrates the reduction of the sample's weight over time whether by dehydration or decomposition. FIG. 29 is also a superposition of two plots, the first (the solid line) is a plot of weight % versus temperature (° C.), illustrating the sample's weight decreasing as the temperature increases; the second plot (the dashed line) is a plot of the derivative of the weight % with respect to temperature (wt. %/° C.) versus temperature ° C. When this value is high it indicates a higher rate of weight loss for each change per degree. If this value is zero, the sample's weight remains the same although the temperature is increasing, indicating an absence of dehydration or decomposition. Note FIGS. 28 and 29 are of the same sample.

Figure 30:
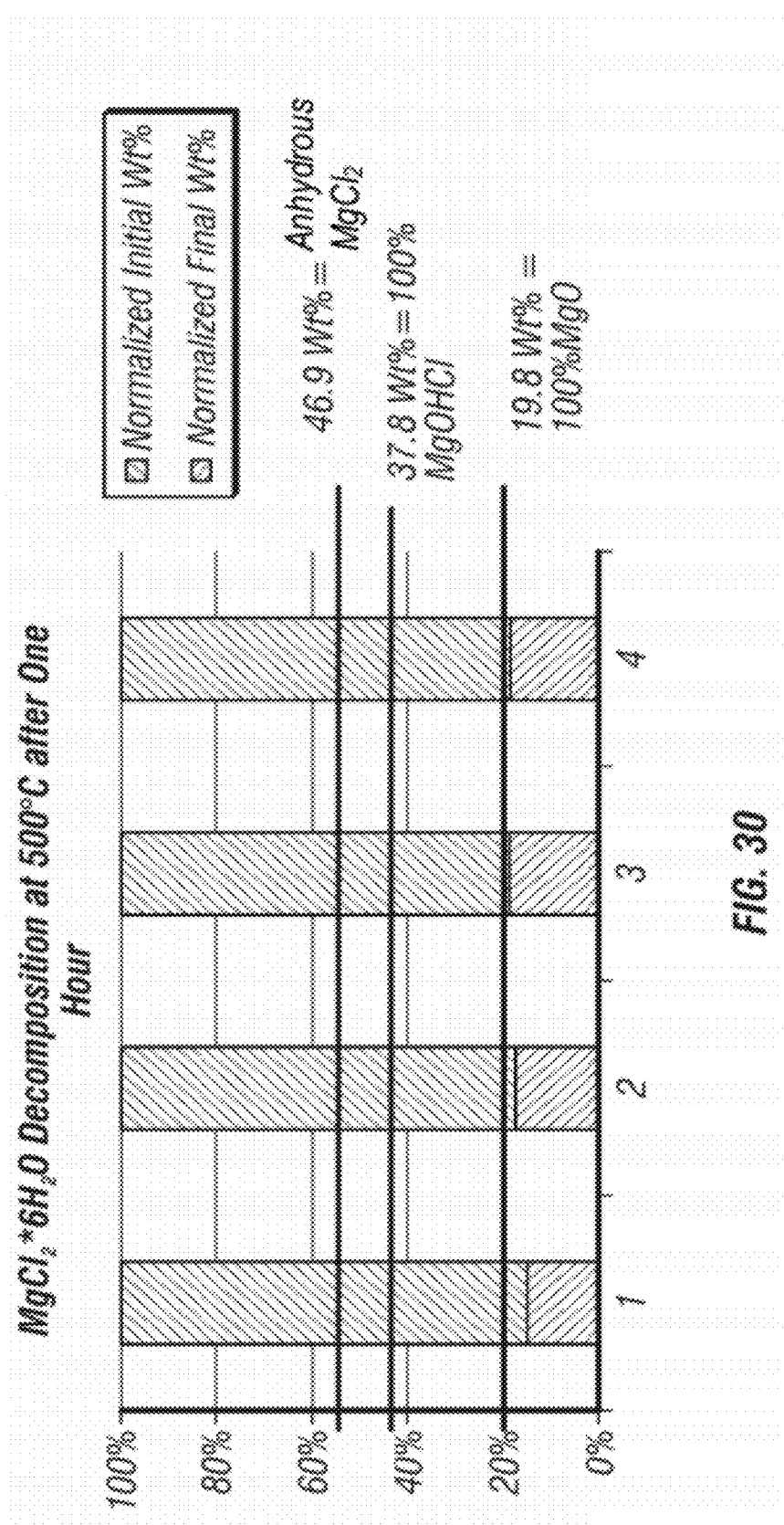

FIG. 30—$MgCl_2 \cdot 6H_2O$ Decomposition at 500° C. after One Hour. This graph shows the normalized final and initial weights of four test runs of $MgCl_2 \cdot 6H_2O$ after heating at 500° C. for one hour. The consistent final weight confirms that MgO is made by decomposition at this temperature.

Figure 31:
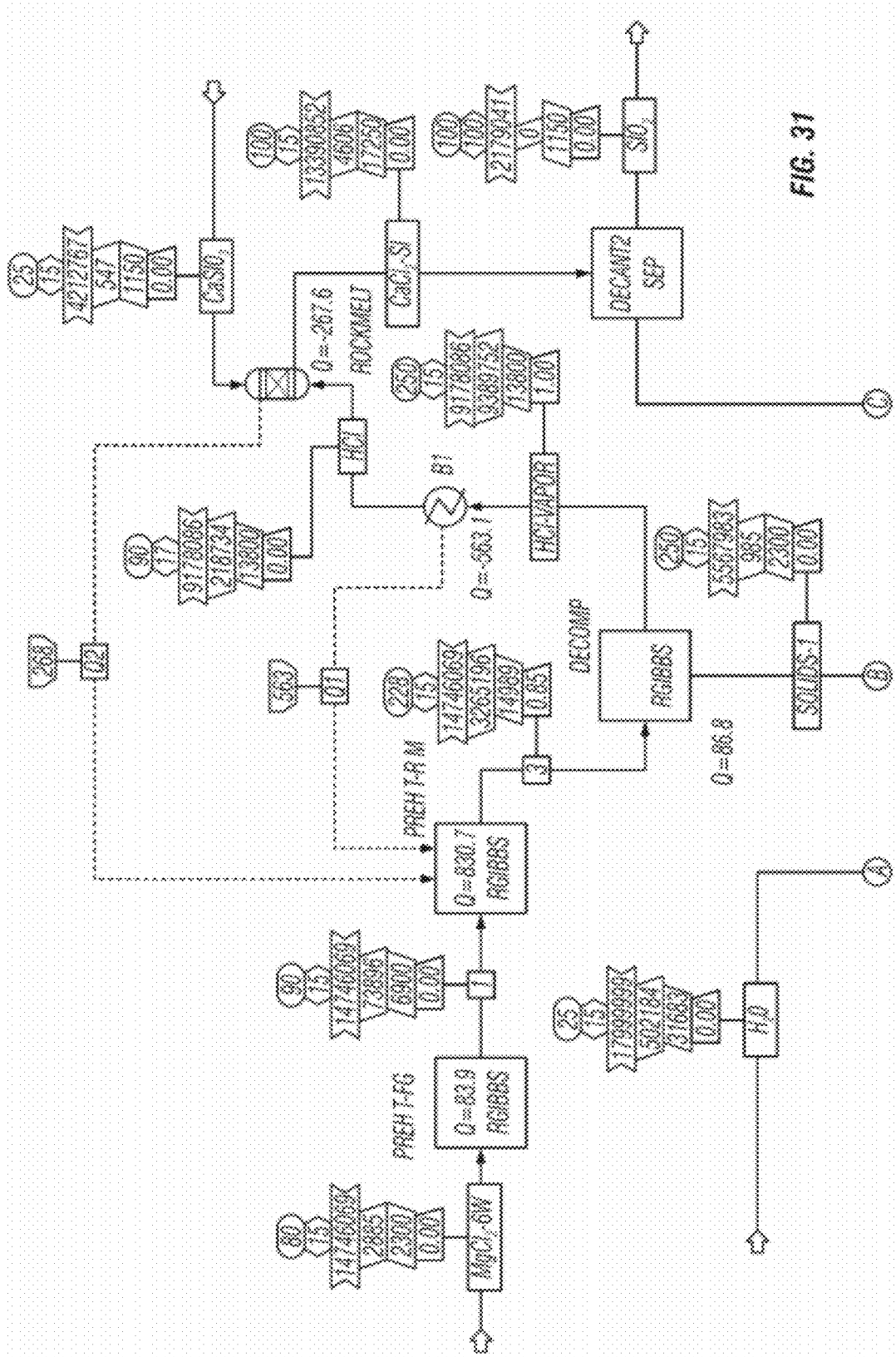
Figure 31:
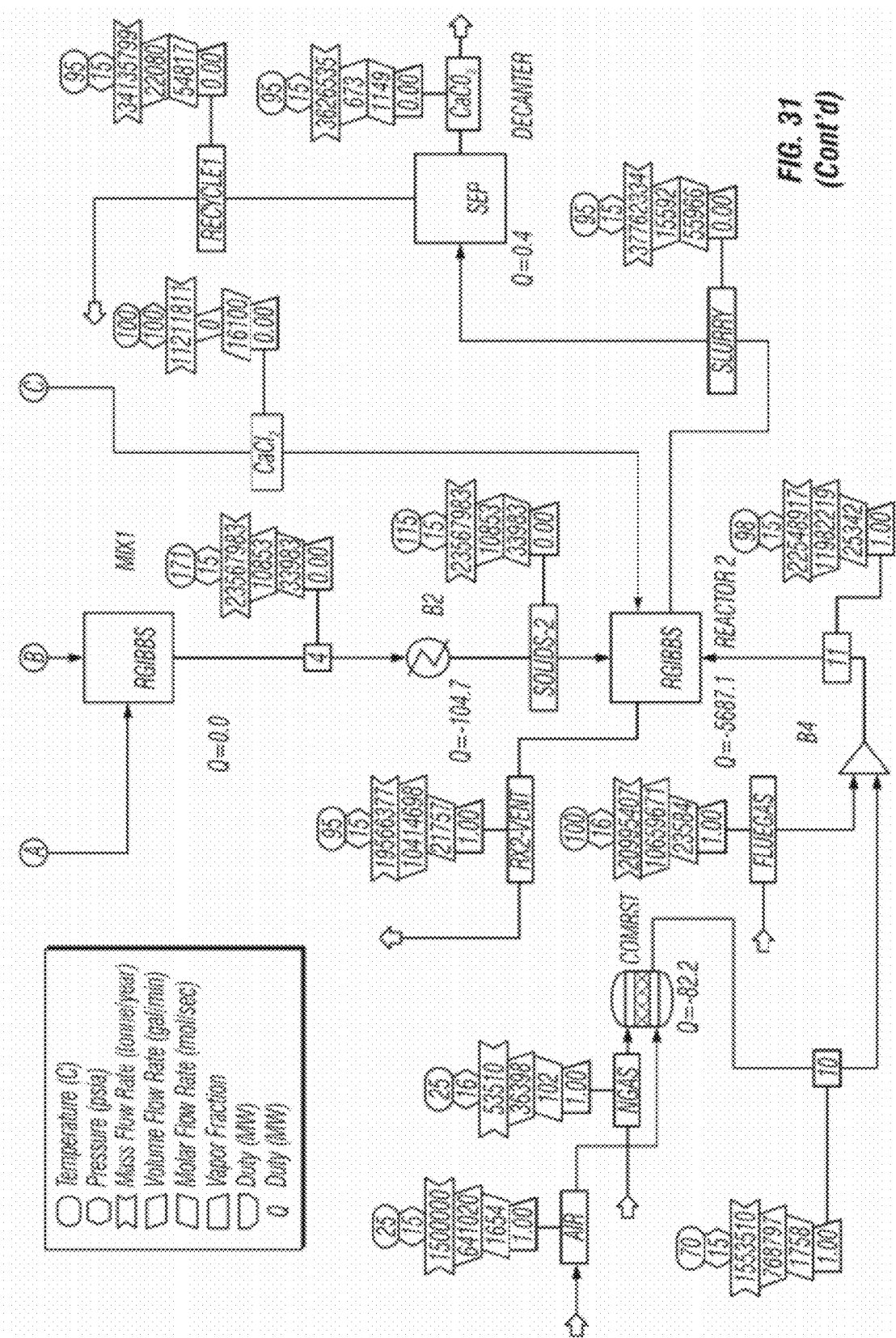

FIG. 31—Three-Chamber Decomposition. This figure shows a process flow diagram providing parameters and results from a process simulation using Aspen Plus process software. In this embodiment, heat from cold flue gas (chamber 1), heat from mineral dissolution reactor (chamber 2), and external natural gas (chamber 3) are used as heat sources. This process flow diagram illustrates a three chamber process for the decomposition to Mg(OH)Cl. The first chamber is heated by 200° C. flue gas to provide some initial heat about ~8.2% of the total required heat, the second chamber which relies on heat recovered from the mineral dissolution reactor to provide 83% of the needed heat for the decomposition of which 28% is from the hydrochloric acid/mineral silicate reaction and 55% is from the condensation and formation of hydrochloric acid, and finally the third chamber, which uses natural gas as an external source of the remaining heat which is 8.5% of the total heat. The $CO_2$ is from a combined cycle power natural gas plant, so very little heat is available from the power plant to power the decomposition reaction.

Figure 32:
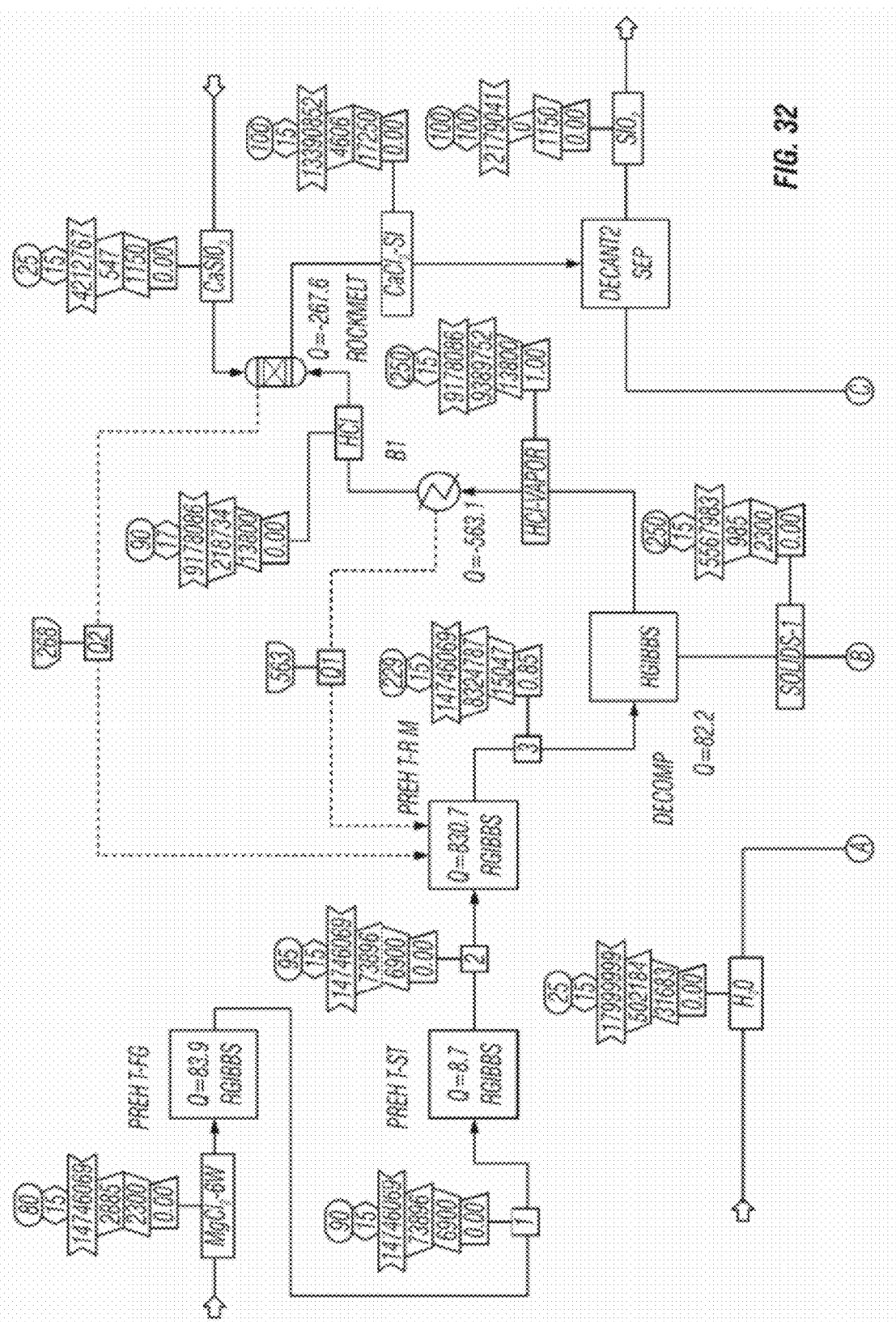
Figure 32:
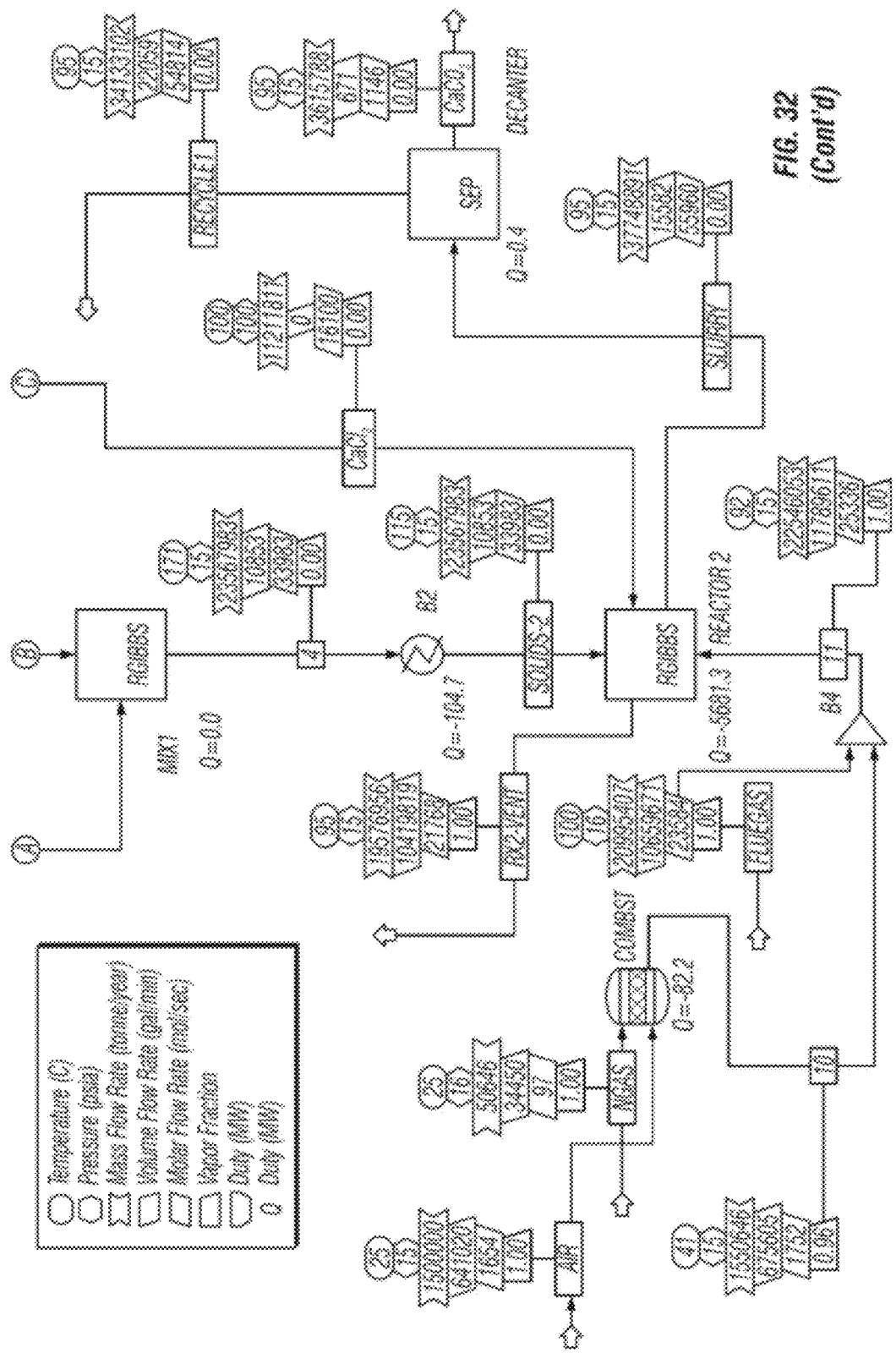

FIG. 32—Four-Chamber Decomposition. This figure shows a process flow diagram providing parameters and results from a process simulation using Aspen Plus process software. In this embodiment, heat from cold flue gas (chamber 1), heat from additional steam (chamber 2), heat from mineral dissolution reactor (chamber 3), and external natural gas (chamber 4) are used as heat sources. This process flow diagram illustrates a four chamber process for the decomposition to Mg(OH)Cl, the first chamber provides 200° C. flue gas to provide some initial heat about ~8.2% of the total required heat, the second chamber provides heat in the form of extra steam which is 0.8% of the total heat needed, the third chamber which relies on heat recovered from the mineral dissolution reactor to provide 83% of the needed heat for the decomposition of which 28% is from the hydrochloric acid/mineral silicate reaction and 55% is from the condensation and formation of hydrochloric acid, and finally the fourth chamber, which uses natural gas as an external source of the remaining heat which is 8.0% of the total heat. The $CO_2$ is from a combined cycle natural gas power plant, so very little heat is available from the power plant to power the decomposition reaction.

Figure 33:
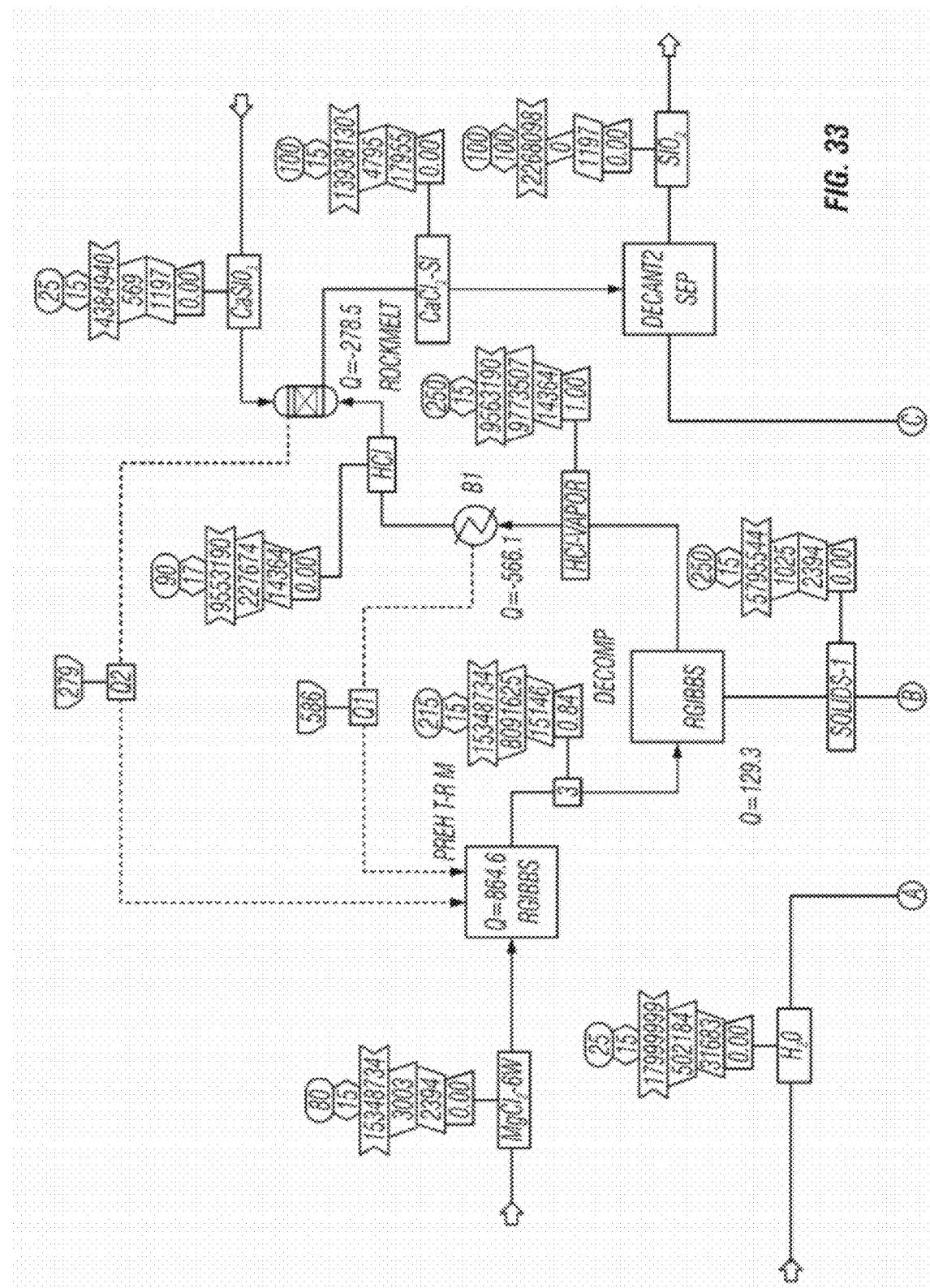
Figure 33:
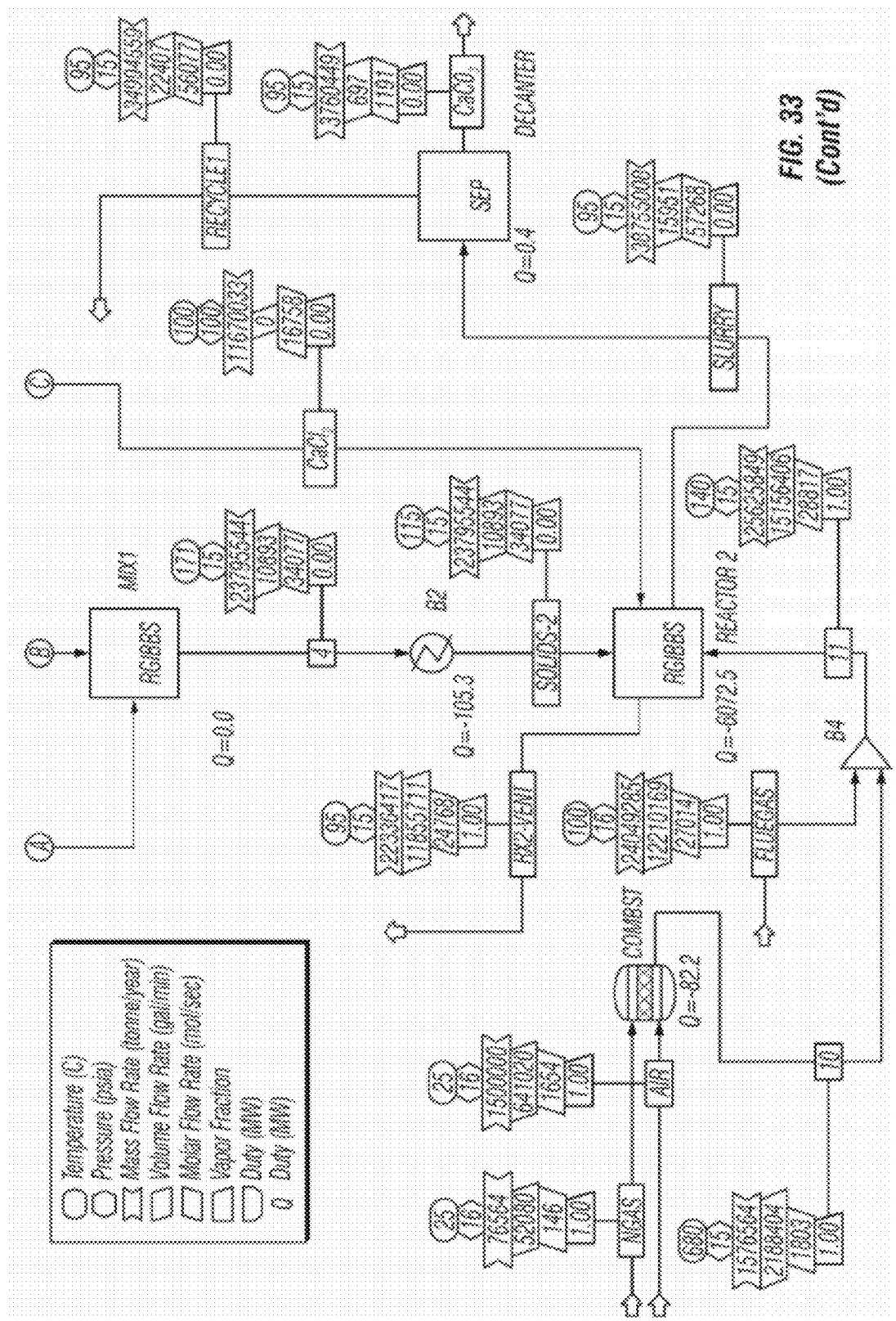

FIG. 33—Two-Chamber Decomposition. This figure shows a process flow diagram providing parameters and results from a process simulation using Aspen Plus process software. In this embodiment, heat from mineral dissolution reactor (chamber 1), and external natural gas (chamber 2) are used as heat sources. This process flow diagram illustrates a two chamber process for the decomposition to Mg(OH)Cl, the first chamber which relies on heat recovered from the mineral dissolution reactor to provide 87% of the needed heat for the decomposition of which 28% is from the hydrochloric acid/mineral silicate reaction and 59% is from the condensation and formation of hydrochloric acid, and the second chamber, which uses natural gas as an external source of the remaining heat which is 13% of the total heat. The $CO_2$ is from a combined cycle natural gas power plant, so very little heat is available from the power plant to power the decomposition reaction.

Figure 34:
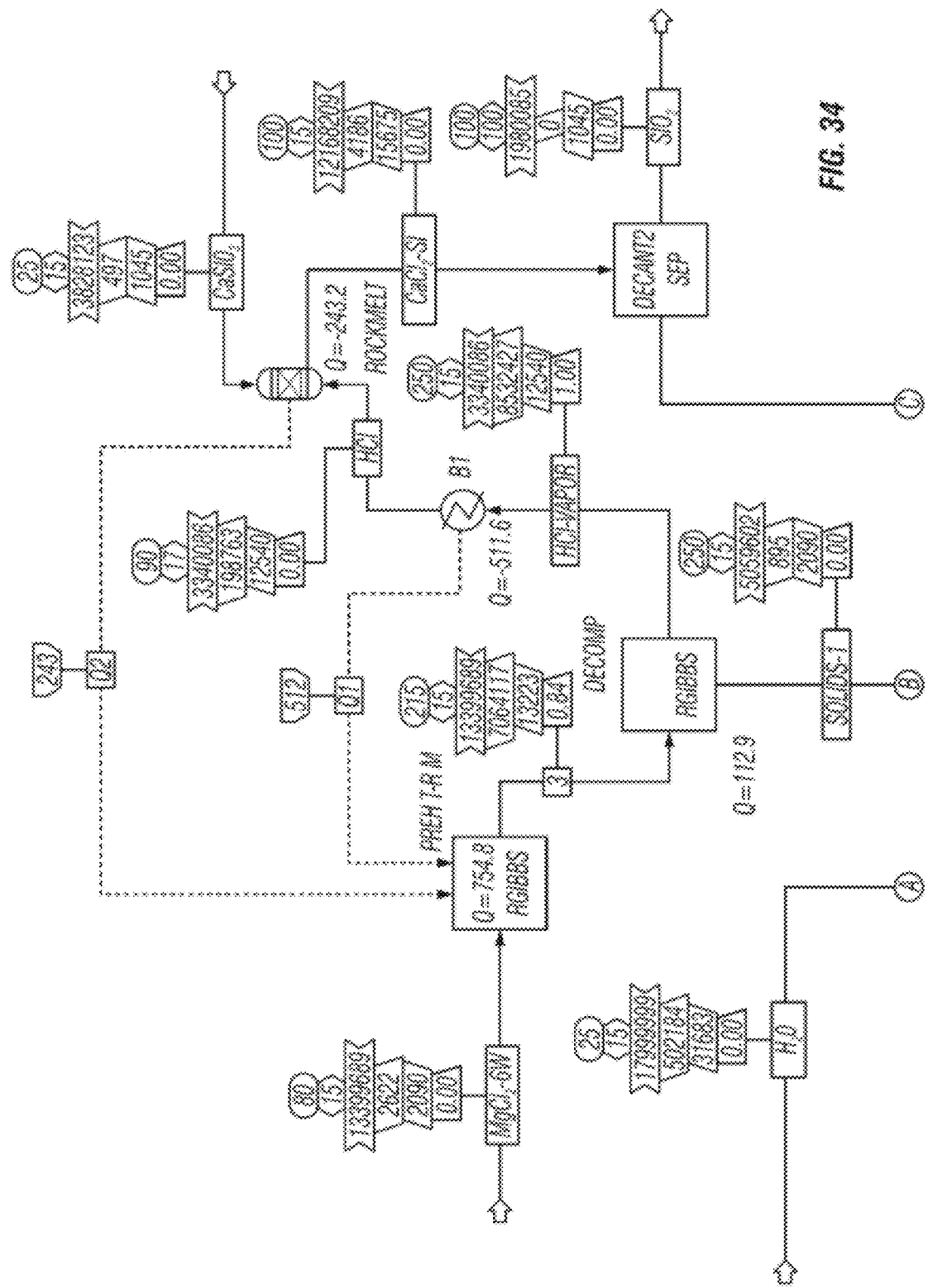
Figure 34:
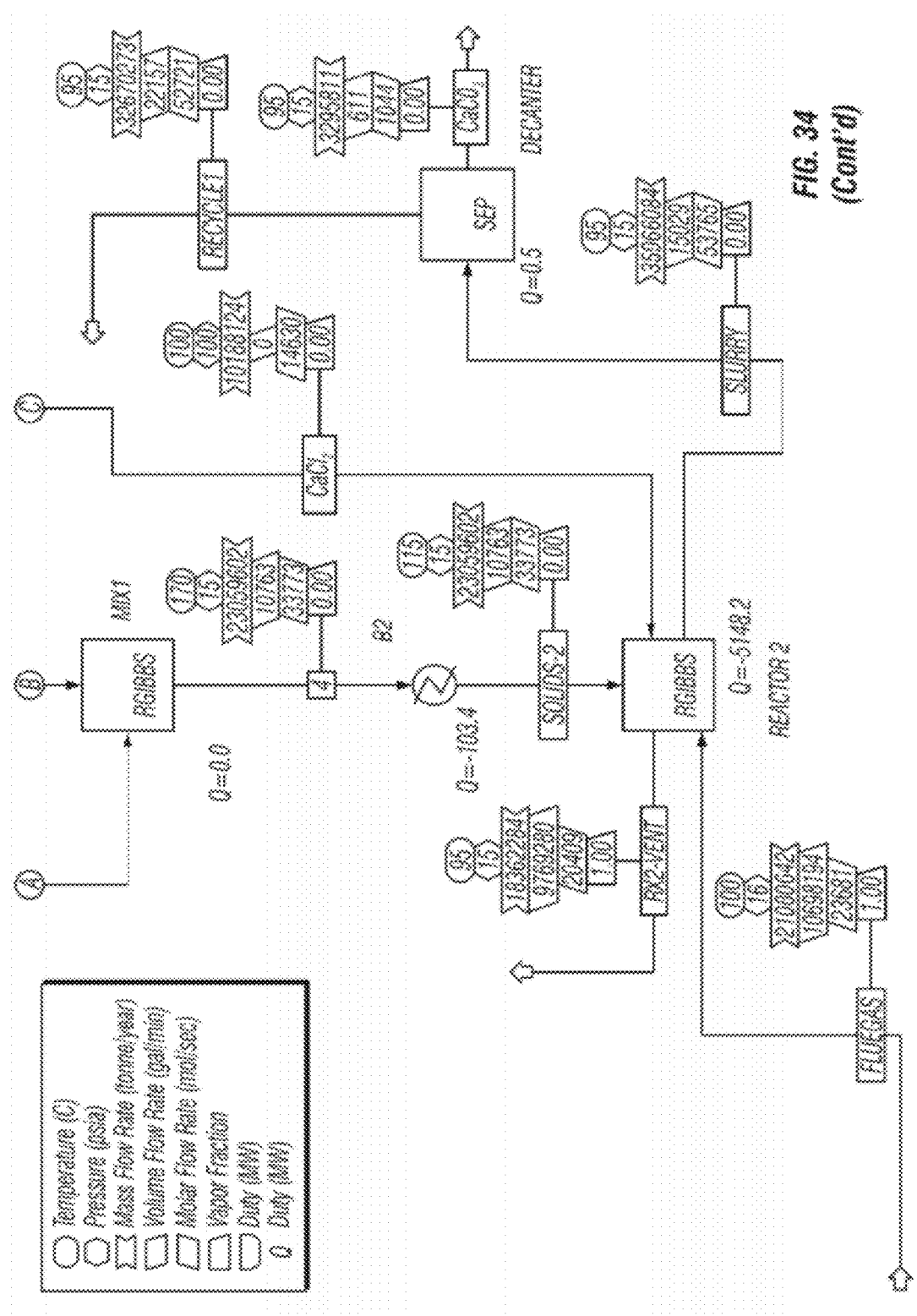

FIG. 34—Two-Chamber Decomposition. This figure shows a process flow diagram providing parameters and results from a process simulation using Aspen Plus process software. In this embodiment, heat from mineral dissolution reactor (chamber 1), and hot flue gas from open cycle natural gas plant (chamber 2) are used as heat sources. This process flow diagram illustrates a two chamber process for the decomposition to Mg(OH)Cl, the first chamber which relies on heat recovered from the mineral dissolution reactor to provide 87% of the needed heat for the decomposition of which 28% is from the hydrochloric acid/mineral silicate reaction and 59% is from the condensation and formation of hydrochloric acid, and the second chamber, which uses hot flue gas as an external source of the remaining heat which is 13% of the total heat. The $CO_2$ is from an open cycle natural gas power plant, therefore substantial heat is available from the power plant in the form of 600° C. flue gas to power the decomposition reaction.

Figure 35:
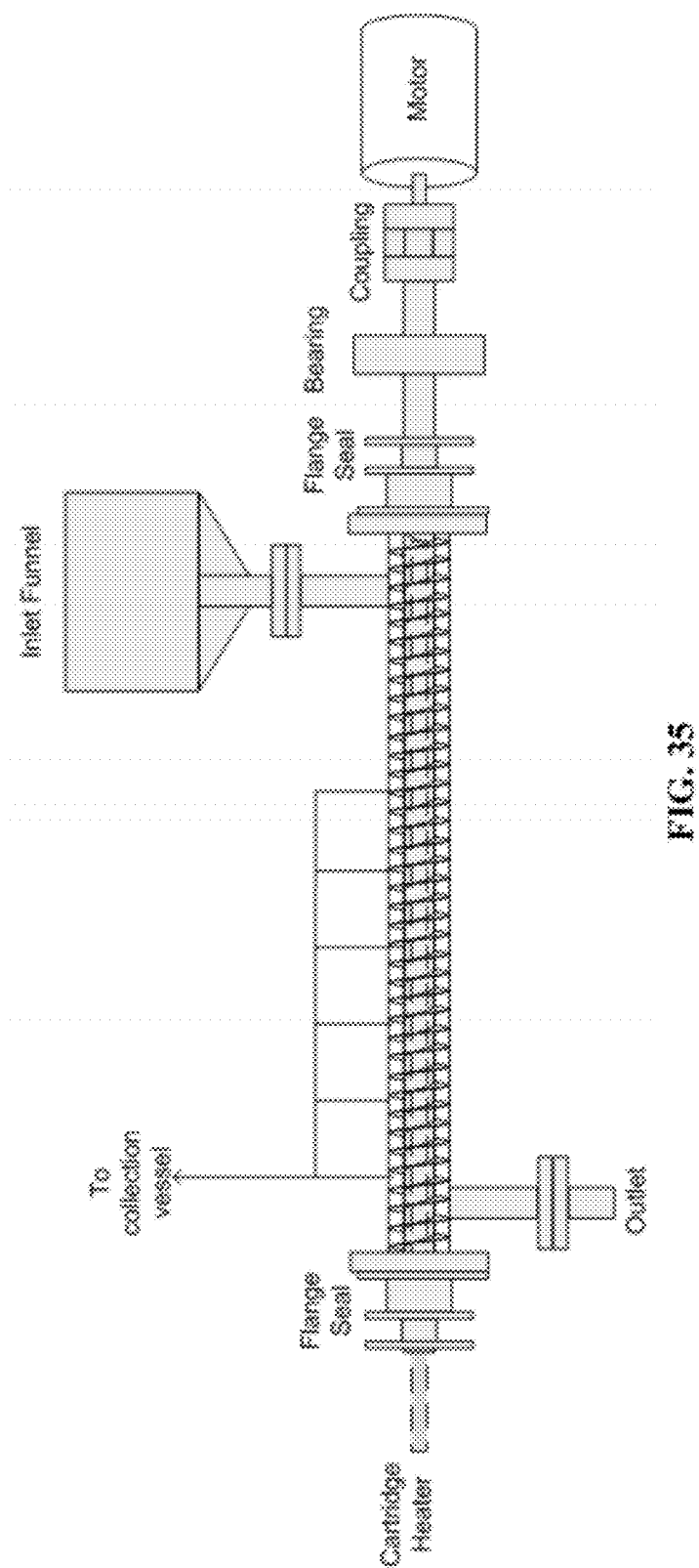

FIG. 35 shows a schematic diagram of a Auger reactor which may be used for the salt decomposition reaction, including the decomposition of $MgCl_2 \cdot 6H_2O$ to M(OH)Cl or MgO. Such reactors may comprises internal heating for efficient heat utilization, external insulation for efficient heat utilization, a screw mechanism for adequate solid transport (when solid is present), adequate venting for HCl removal. Such a reactors has been used to prepare ~1.8 kg of ~90% Mg(OH)Cl.

Figure 36:
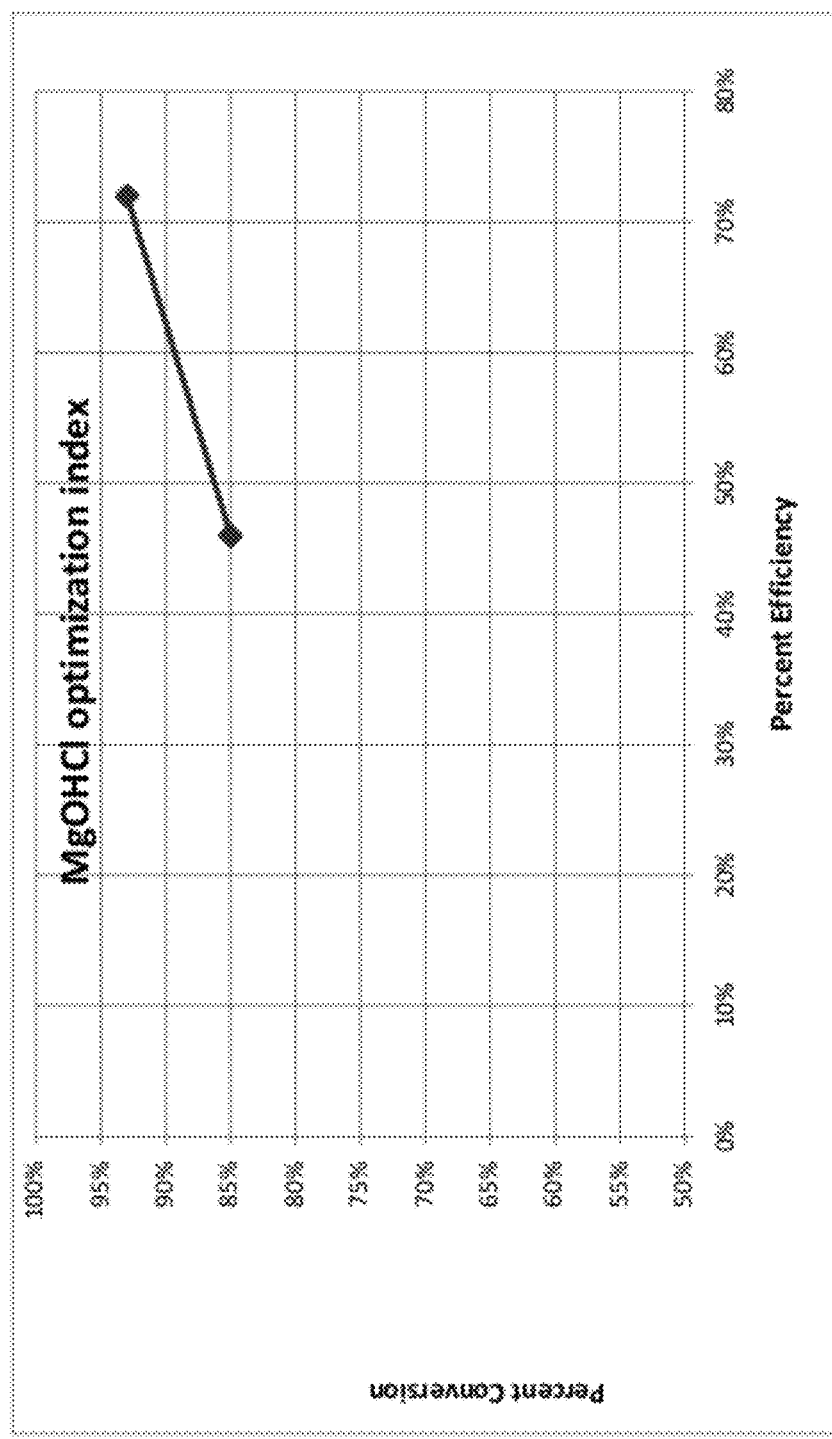

FIG. 36 shows the optimization index for two separate runs of making Mg(OH)Cl using an Auger reactor. The optimization index= % conversion× % efficiency.

Figure 37:
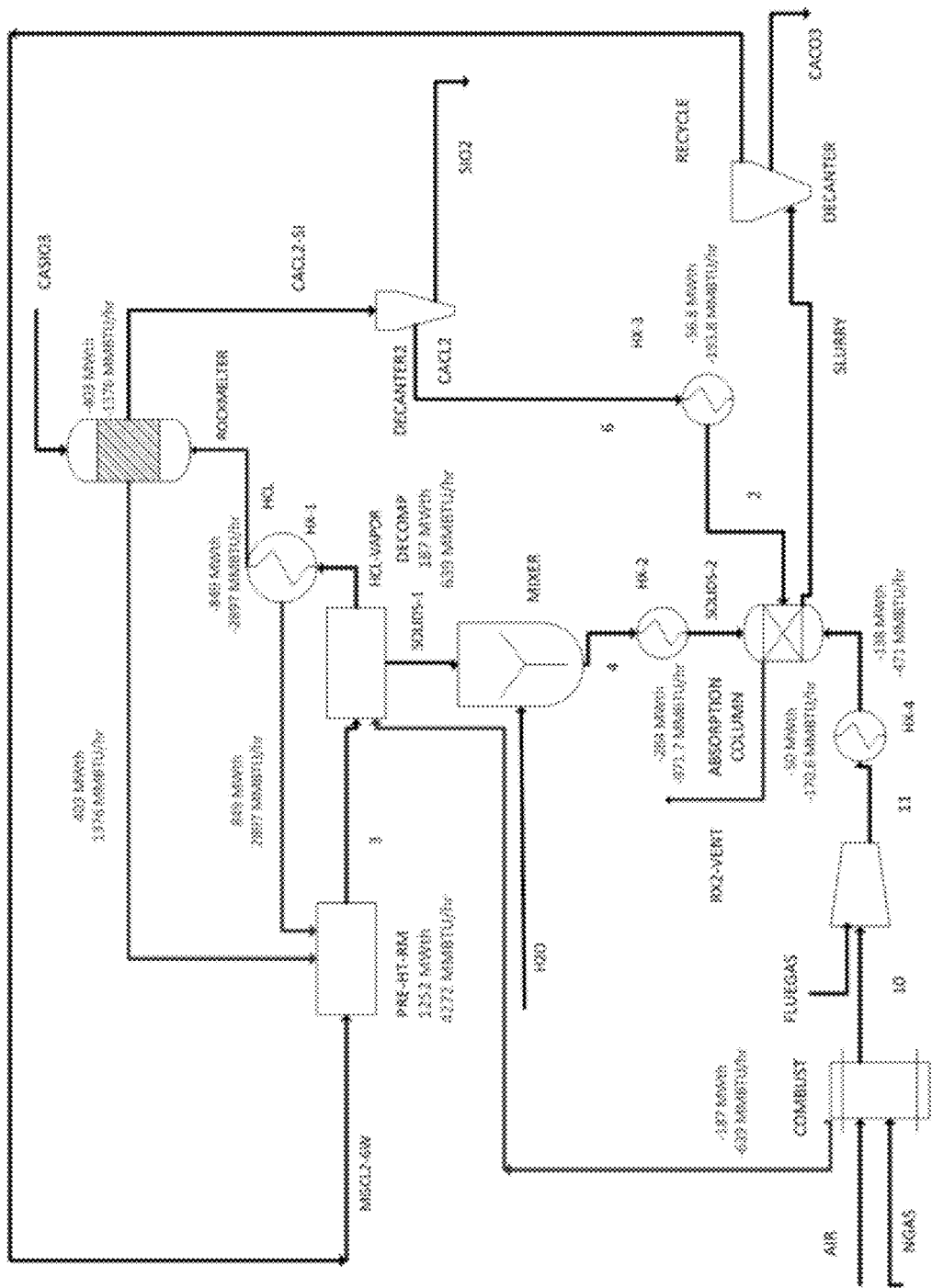

FIG. 37 shows a process flow diagram of an Aspen model that simulates an $CaSiO_3$—Mg(OH)Cl Process.

DESCRIPTION OF ILLUSTRATIVE EMBODIMENTS

The present invention relates to carbon dioxide sequestration, including energy-efficient processes in which Group 2 chlorides are converted to Group 2 hydroxides and hydrogen chloride, which are then used to remove carbon dioxide from waste streams. In some embodiments, hydrogen chloride may be further reacted with Group 2 silicates to produce additional Group 2 chloride starting materials and silica.

In some embodiments, the methods and apparatuses of the invention comprise one or more of the following general components: (1) the conversion of Group 2 silicate minerals with hydrogen chloride into Group 2 chlorides and silicon dioxide, (2) conversion of Group 2 chlorides into Group 2 hydroxides and hydrogen chloride, (3) an aqueous decarbonation whereby gaseous $CO_2$ is absorbed into an aqueous caustic mixture comprising Group 2 hydroxides to form Group 2 carbonate and/or bicarbonate products and water, (4) a separation process whereby the carbonate and/or bicarbonate products are separated from the liquid mixture, (5) the reuse or cycling of by-products, including energy, from one or more of the steps or process streams into another one or more steps or process streams. Each of these general components is explained in further detail below.

While many embodiments of the present invention consume some energy to accomplish the absorption of $CO_2$ and other chemicals from flue-gas streams and to accomplish the other objectives of embodiments of the present invention as described herein, one advantage of certain embodiments of the present invention is that they provide ecological efficiencies that are superior to those of the prior art, while absorbing most or all of the emitted $CO_2$ from a given source, such as a power plant.

Another additional benefit of certain embodiments of the present invention that distinguishes them from other $CO_2$-removal processes is that in some market conditions, the products are worth considerably more than the reactants required or the net-power or plant-depreciation costs. In other words, certain embodiments are industrial methods of producing chloro-hydro-carbonate products at a profit, while accomplishing considerable removal of $CO_2$ and incidental pollutants of concern.

I. Definitions

As used herein, the terms "carbonates" or "carbonate products" are generally defined as mineral components containing the carbonate group, $[CO_3]^{2-}$. Thus, the terms encompass both carbonate/bicarbonate mixtures and species containing solely the carbonate ion. The terms "bicarbonates" and "bicarbonate products" are generally defined as mineral components containing the bicarbonate group, $[HCO_3]^{1-}$. Thus, the terms encompass both carbonate/bicarbonate mixtures and species containing solely the bicarbonate ion.

As used herein "Ca/Mg" signifies either Ca alone, Mg alone or a mixture of both Ca and Mg. The ratio of Ca to Mg may range from 0:100 to 100:0, including, e.g., 1:99, 5:95, 10:90, 20:80, 30:70, 40:60, 50:50, 60:40, 70:30, 80:20, 90:10, 95:5, and 99:1. The symbols "Ca/Mg", "$Mg_xCa_{(1-x)}$" and "$Ca_xMg_{(1-x)}$" are synonymous. In contrast, "CaMg" or "MgCa" refers to a 1:1 ratio of these two ions.

As used herein, the term "ecological efficiency" is used synonymously with the term "thermodynamic efficiency" and is defined as the amount of $CO_2$ sequestered by certain embodiments of the present invention per energy consumed (represented by the equation "$\partial CO_2/\partial E$"), appropriate units for this value are kWh/ton $CO_2$. $CO_2$ sequestration is denominated in terms of percent of total plant $CO_2$; energy consumption is similarly denominated in terms of total plant power consumption.

The terms "Group II" and "Group 2" are used interchangeably.

"Hexahydrate" refers to $MgCl_2 \cdot 6H_2O$.

In the formation of bicarbonates and carbonates using some embodiments of the present invention, the term "ion ratio" refers to the ratio of cations in the product divided by the number of carbons present in that product. Hence, a product stream formed of calcium bicarbonate ($Ca(HCO_3)_2$) may be said to have an "ion ratio" of 0.5 (Ca/C), whereas a product stream formed of pure calcium carbonate ($CaCO_3$) may be said to have an "ion ratio" of 1.0 (Ca/C). By extension, an infinite number of continuous mixtures of carbonate and bicarbonate of mono-, di- and trivalent cations may be said to have ion ratios varying between 0.5 and 3.0.

Based on the context, the abbreviation "MW" either means molecular weight or megawatts.

The abbreviation "PFD" is process flow diagram.

The abbreviation "Q" is heat (or heat duty), and heat is a type of energy. This does not include any other types of energy.

As used herein, the term "sequestration" is used to refer generally to techniques or practices whose partial or whole effect is to remove $CO_2$ from point emissions sources and to store that $CO_2$ in some form so as to prevent its return to the atmosphere. Use of this term does not exclude any form of the described embodiments from being considered "sequestration" techniques.

In the context of a chemical formula, the abbreviation "W" refers to $H_2O$.

The pyroxenes are a group of silicate minerals found in many igneous and metamorphic rocks. They share a common structure consisting of single chains of silica tetrahedra and they crystallize in the monoclinic and orthorhombic systems. Pyroxenes have the general formula $XY(Si,Al)_2O_6$, where X represents calcium, sodium, iron (II) and magnesium and more rarely zinc, manganese and lithium and Y represents ions of smaller size, such as chromium, aluminium, iron(III), magnesium, manganese, scandium, titanium, vanadium and even iron (II).

In addition, atoms making up the compounds of the present invention are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}C$ and $^{14}C$.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result.

The above definitions supersede any conflicting definition in any of the reference that is incorporated by reference herein. The fact that certain terms are defined, however, should not be considered as indicative that any term that is undefined is indefinite. Rather, all terms used are believed to describe the invention in terms such that one of ordinary skill can appreciate the scope and practice the present invention.

II. Sequestration of Carbon Dioxide Using Salts of Group II Metals

Figure 1:
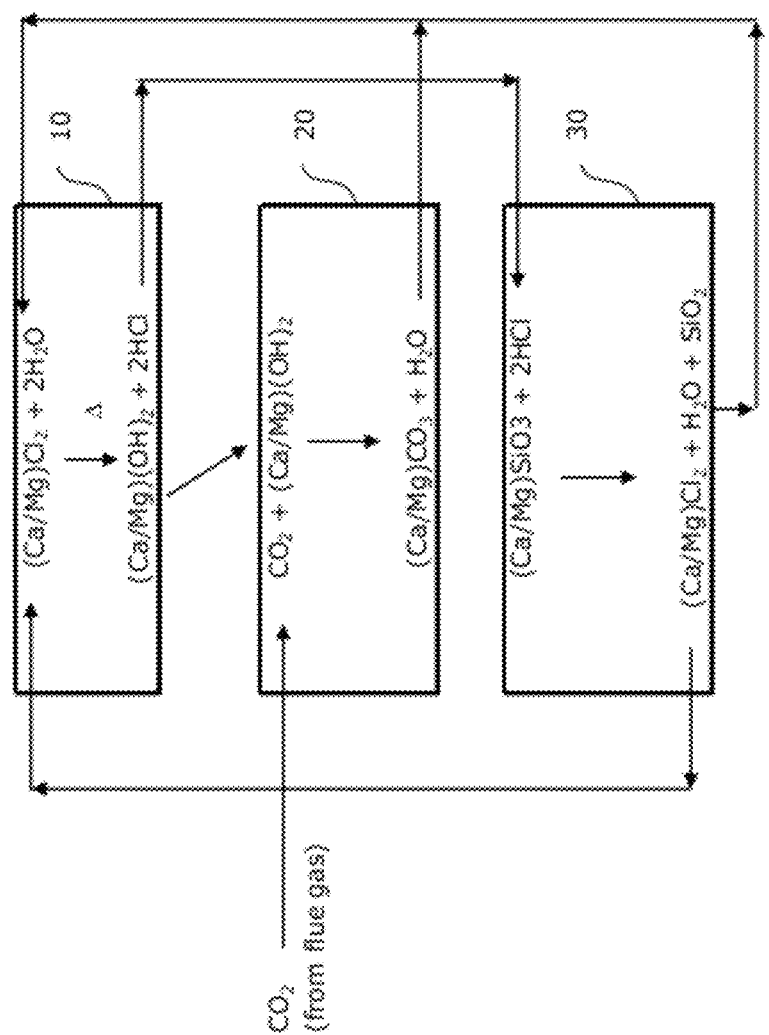
FIG. 1 is block diagram of a system for a Group 2 hydroxide-based process to sequester $CO_2$ as Group 2 carbonates according to some embodiments of the present invention.

FIG. 1 depicts a simplified process-flow diagram illustrating general, exemplary embodiments of the apparatuses and methods of the present disclosure. This diagram is offered for illustrative purposes only, and thus it merely depicts specific embodiments of the present invention and is not intended to limit the scope of the claims in any way.

In the embodiment shown in FIG. 1, reactor 10 (e.g., a road salt boiler) uses power, such as external power and/or recaptured power (e.g., heat from hot flue gas or an external source of heat such as solar concentration or combustion), to drive a reaction represented by equation 1.

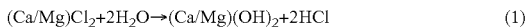

$$(Ca/Mg)Cl_2 + 2H_2O \rightarrow (Ca/Mg)(OH)_2 + 2HCl \qquad (1)$$

The water used in this reaction may be in the form of liquid, steam, a crystalline hydrate, e.g., $MgCl_2.6H_2O$, $CaCl_2.2H_2O$, or it may be supercritical. In some embodiments, the reaction uses $MgCl_2$ to form $Mg(OH)_2$ and/or $Mg(OH)Cl$ (see, e.g., FIG. 2). In some embodiments, the reaction uses $CaCl_2$ to form $Ca(OH)_2$. Some or all of the Group 2 hydroxide or hydroxychloride (not shown) from equation 1 may be delivered to reactor 20. In some embodiments, some or all of the Group 2 hydroxide and/or Group 2 hydroxychloride is delivered to reactor 20 as an aqueous solution. In some embodiments, some or all of the Group 2 hydroxide is delivered to reactor 20 in an aqueous suspension. In some embodiments, some or all of the Group 2 hydroxide is delivered to reactor 20 as a solid. In some embodiments, some or all of the hydrogen chloride (e.g., in the form of vapor or in the form of hydrochloric acid) may be delivered to reactor 30 (e.g., a rock melter). In some embodiments, the resulting Group 2 hydroxides are further heated to remove water and form corresponding Group 2 oxides. In some variants, some or all of these Group 2 oxides may then be delivered to reactor 20.

Carbon dioxide from a source, e.g., flue-gas, enters the process at reactor 20 (e.g., a fluidized bed reactor, a spray-tower decarbonator or a decarbonation bubbler), potentially after initially exchanging waste-heat with a waste-heat/DC generation system. In some embodiments the temperature of the flue gas is at least 125° C. The Group 2 hydroxide, some or all of which may be obtained from reactor 10, reacts with carbon dioxide in reactor 20 according to the reaction represented by equation 2.

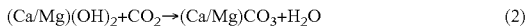

$$(Ca/Mg)(OH)_2 + CO_2 \rightarrow (Ca/Mg)CO_3 + H_2O \qquad (2)$$

The water produced from this reaction may be delivered back to reactor 10. The Group 2 carbonate is typically separated from the reaction mixture. Group 2 carbonates have a very low $K_{sp}$ (solubility product constant). So they be separated as solids from other, more soluble compounds that can be kept in solution. In some embodiments, the reaction proceeds through Group 2 bicarbonate salts. In some embodiments, Group 2 bicarbonate salts are generated and optionally then separated from the reaction mixture. In some embodiments, Group 2 oxides, optionally together with or separately from the Group 2 hydroxides, are reacted with carbon dioxide to also form Group 2 carbonate salts. In some embodiments, the flue gas, from which $CO_2$ and/or other pollutants have been removed, is released to the air.

Group 2 silicates (e.g., $CaSiO_3$, $MgSiO_3$, $MgO.FeO.SiO_2$, etc.) enter the process at reactor 30 (e.g., a rock melter or a mineral dissociation reactor). In some embodiments, these Group 2 silicates are ground in a prior step. In some embodiments, the Group 2 silicates are inosilicates. These minerals may be reacted with hydrochloric acid, either as a gas or in the form of hydrochloric acid, some or all of which may be obtained from reactor 10, to form the corresponding Group 2 metal chlorides (CaCl$_2$ and/or MgCl$_2$), water and sand (SiO$_2$). The reaction can be represented by equation 3.

$$2HCl+(Ca/Mg)SiO_3 \rightarrow (Ca/Mg)Cl_2+H_2O+SiO_2 \qquad (3)$$

Some or all of the water produced from this reaction may be delivered to reactor 10. Some or all of the Group 2 chlorides from equation 3 may be delivered to reactor 20. In some embodiments, some or all of the Group 2 chloride is delivered to reactor 20 as an aqueous solution. In some embodiments, some or all of the Group 2 chloride is delivered to reactor 20 in an aqueous suspension. In some embodiments, some or all of the Group 2 chloride is delivered to reactor 20 as a solid.

The net reaction capturing the summation of equations 1-3 is shown here as equation 4:

$$CO_2+(Ca/Mg)SiO_3 \rightarrow (Ca/Mg)CO_3+SiO_2 \qquad (4)$$

In another embodiment, the resulting Mg$_x$Ca$_{(1-x)}$CO$_3$ sequestrant is reacted with HCl in a manner to regenerate and concentrate the CO$_2$. The Ca/MgCl$_2$ thus formed is returned to the decomposition reactor to produce CO$_2$ absorbing hydroxides or hydroxyhalides.

Through the process shown in FIG. 1 and described herein, Group 2 carbonates are generated as end-sequestrant material from the captured CO$_2$. Some or all of the water, hydrogen chloride and/or reaction energy may be cycled. In some embodiments, only some or none of these are cycled. In some embodiments, the water, hydrogen chloride and reaction energy made be used for other purposes.

In some embodiments, and depending on the concentration of CO$_2$ in the flue gas stream of a given plant, the methods disclosed herein may be used to capture 33-66% of the plant's CO$_2$ using heat-only as the driver (no electrical penalty). In some embodiments, the efficiencies of the methods disclosed herein improve with lower CO$_2$-concentrations, and increase with higher (unscrubbed) flue-gas temperatures. For example, at 320° C. and 7% CO$_2$ concentration, 33% of flue-gas CO$_2$ can be mineralized from waste-heat alone. In other embodiments, e.g., at the exit temperatures of natural gas turbines approximately 100% mineralization can be achieved.

These methods and devices can be further modified, e.g., with modular components, optimized and scaled up using the principles and techniques of chemistry, chemical engineering, and/or materials science as applied by a person skilled in the art. Such principles and techniques are taught, for example, in U.S. Pat. No. 7,727,374, U.S. Patent Application Publications 2006/0185985 and 2009/0127127, U.S. patent application Ser. No. 11/233,509, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, U.S. Provisional Application No. 61/288,242, filed Jan. 20, 2010, U.S. Provisional Application No. 61/362,607, filed Jul. 8, 2010, and International Application No. PCT/US08/77122, filed Sep. 19, 2008. The entire text of each of the above-referenced disclosures (including any appendices) is specifically incorporated by reference herein.

The above examples were included to demonstrate particular embodiments of the invention. However, those of skill in the art should, in light of the present disclosure, appreciate that many changes can be made in the specific embodiments which are disclosed and still obtain a like or similar result without departing from the spirit and scope of the invention.

III. Sequestration of Carbon Dioxide Using Mg$^{2+}$ as Catalyst

Figure 2:
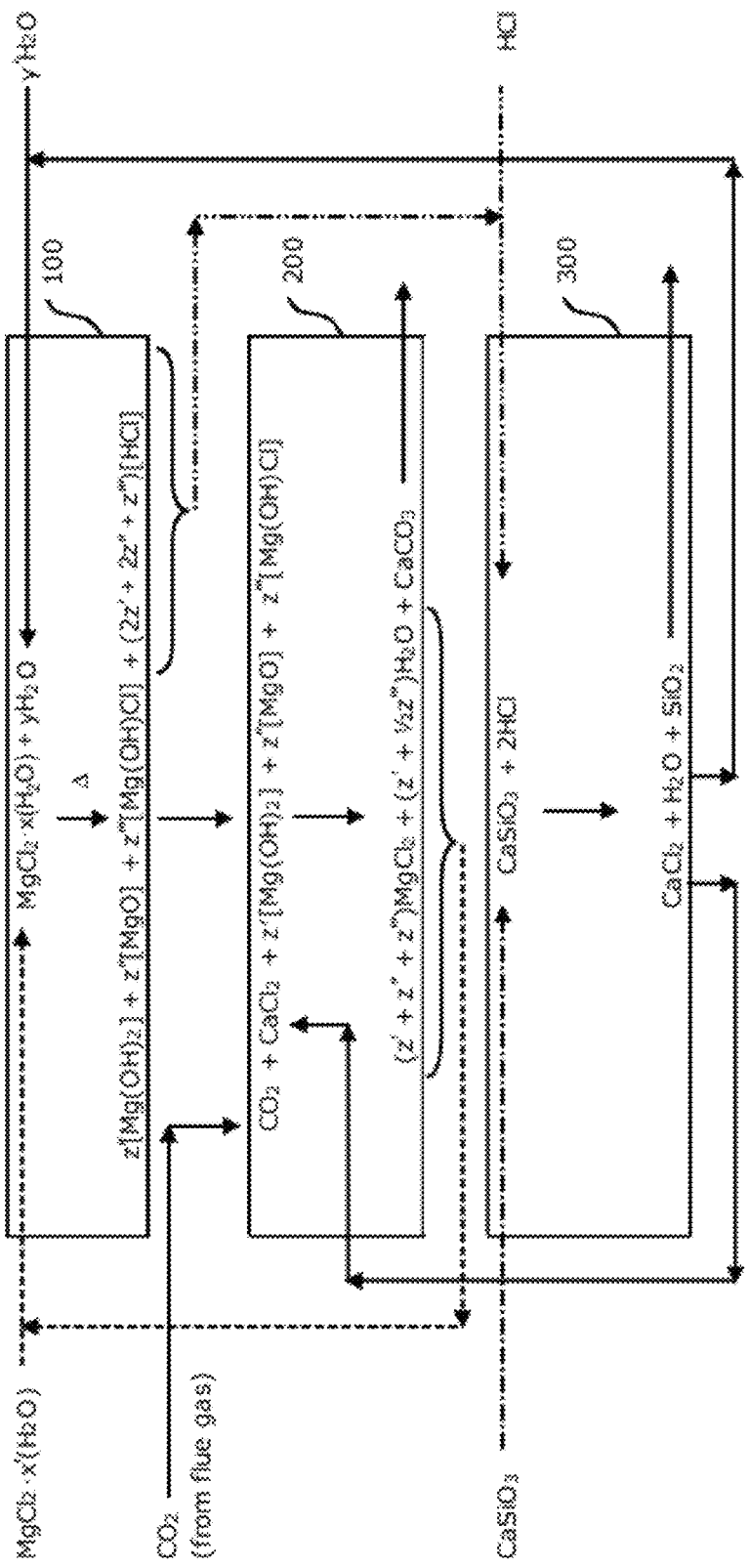
FIG. 2 is block diagram of a system in which $Mg^{2+}$ functions as a catalyst for the sequestration of $CO_2$ as calcium carbonate according to some embodiments of the present invention.
Figure 3:
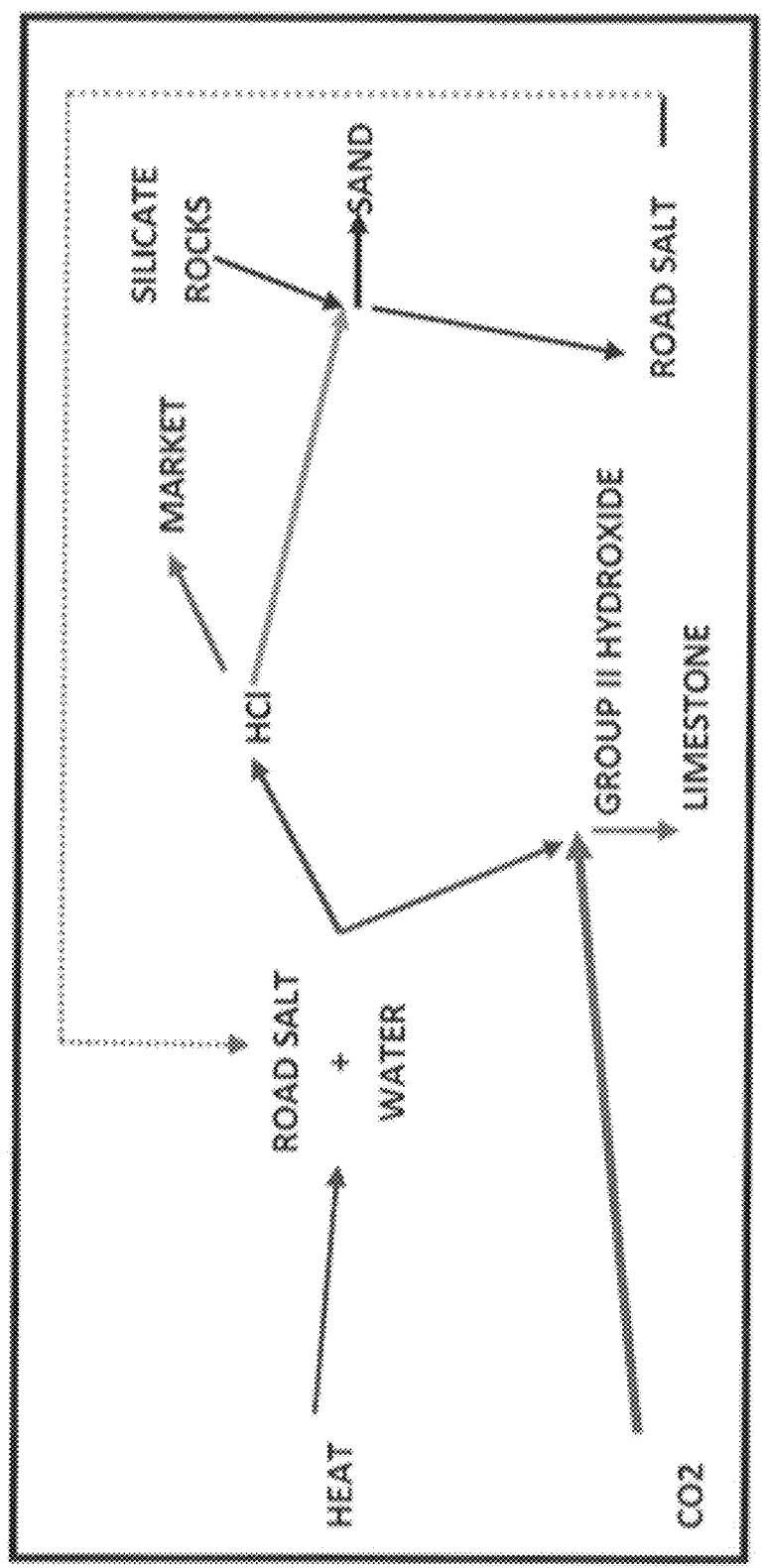
FIG. 3 is a simplified process flow diagram according to some embodiments of the processes provided herein. Shown is a Group-II hydroxide-based process, which sequesters $CO_2$ as limestone (composed largely of the mineral calcite, $CaCO_3$). The term "road salt" in this figure refers to a Group II chloride, such as $CaCl_2$ and/or $MgCl_2$, either or both of which are optionally hydrated. In embodiments comprising $MgCl_2$, heat may be used to drive the reaction between road salt and water (including water of hydration) to form HCl and magnesium hydroxide, $Mg(OH)_2$, and/or magnesium hydroxychloride, $Mg(OH)Cl$. In embodiments comprising $CaCl_2$, heat may be used to drive the reaction between road salt and water to form calcium hydroxide and HCl. The HCl is reacted with, for example, calcium inosilicate rocks (optionally ground), to form additional road salt, e.g., $CaCl_2$, and sand ($SiO_2$).
Figure 4:
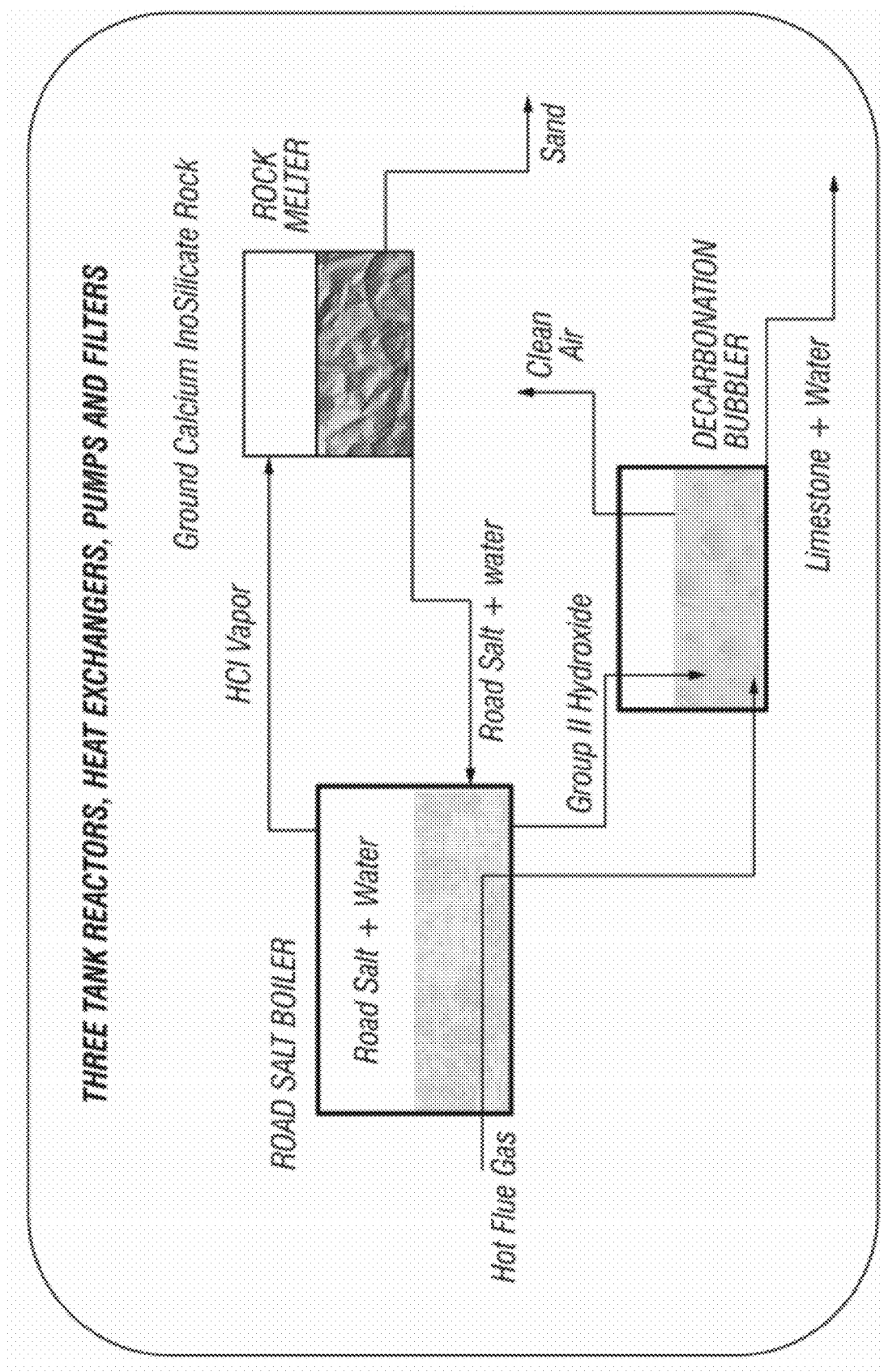
FIG. 4 is a simplified process-flow diagram corresponding to some embodiments of the present invention. Silicate rocks may be used in some embodiments of the present invention to sequester $CO_2$ as $CaCO_3$. The term "road salt" in this figure refers to a Group II chloride, such as $CaCl_2$ and/or $MgCl_2$, either or both of which are optionally hydrated. In the road salt boiler, heat may be used to drive the reaction between road salt, e.g., $MgCl_2.6H_2O$, and water (including water of hydration) to form HCl and Group II hydroxides, oxides, and/or mixed hydroxide-chlorides, including, for example, magnesium hydroxide, $Mg(OH)_2$, and/or magnesium hydroxychloride, $Mg(OH)Cl$. In embodiments comprising $CaCl_2$, heat may be used to drive the reaction between road salt and water to form calcium hydroxide and HCl. The HCl may be sold or reacted with silicate rocks, e.g., inosilicates, to form additional road salt, e.g., $CaCl_2$, and sand ($SiO_2$). Ion exchange reaction between $Mg^{2+}$ and $Ca^{2+}$ may used, in some of these embodiments, to allow, for example, the cycling of $Mg^{2+}$ ions.

FIG. 2 depicts a simplified process-flow diagram illustrating general, exemplary embodiments of the apparatuses and methods of the present disclosure. This diagram is offered for illustrative purposes only, and thus it merely depicts specific embodiments of the present invention and is not intended to limit the scope of the claims in any way.

In the embodiment shown in FIG. 2, reactor 100 uses power, such as external power and/or recaptured power (e.g., heat from hot flue gas), to drive a decomposition-type reaction represented by equation 5.

$$MgCl_2.x(H_2O)+yH_2O \rightarrow z'[Mg(OH)_2]+z''[MgO]+z'''[MgCl(OH)]+(2z'+2z''+z''')[HCl] \qquad (5)$$

The water used in this reaction may be in the form of a hydrate of magnesium chloride, liquid, steam and/or it may be supercritical. In some embodiments, the reaction may occur in one, two, three or more reactors. In some embodiments, the reaction may occur as a batch, semi-batch of continuous process. In some embodiments, some or all of the magnesium salt product may be delivered to reactor 200. In some embodiments, some or all of the magnesium salt product is delivered to reactor 200 as an aqueous solution. In some embodiments, some or all of the magnesium salt product is delivered to reactor 200 in an aqueous suspension. In some embodiments, some or all of the magnesium salt product is delivered to reactor 200 as a solid. In some embodiments, some or all of the hydrogen chloride (e.g., in the form of vapor or in the form of hydrochloric acid) may be delivered to reactor 300 (e.g., a rock melter). In some embodiments, the Mg(OH)$_2$ is further heated to remove water and form MgO. In some embodiments, the MgCl(OH) is further heated to remove HCl and form MgO. In some variants, one or more of Mg(OH)$_2$, MgCl(OH) and MgO may then be delivered to reactor 200.

Carbon dioxide from a source, e.g., flue-gas, enters the process at reactor 200 (e.g., a fluidized bed reactor, a spray-tower decarbonator or a decarbonation bubbler), potentially after initially exchanging waste-heat with a waste-heat/DC generation system. In some embodiments the temperature of the flue gas is at least 125° C. Admixed with the carbon dioxide is the magnesium salt product from reactor 100 and CaCl$_2$ (e.g., rock salt). The carbon dioxide reacts with the magnesium salt product and CaCl$_2$ in reactor 200 according to the reaction represented by equation 6.

$$CO_2+CaCl_2+z'[Mg(OH)_2]+z''[MgO]+z'''[MgCl(OH)] \rightarrow (z'+z''+z''')MgCl_2+(z'+\tfrac{1}{2}z''')H_2O+CaCO_3 \qquad (6)$$

In some embodiments, the water produced from this reaction may be delivered back to reactor 100. The calcium carbonate product (e.g., limestone, calcite) is typically separated (e.g., through precipitation) from the reaction mixture. In some embodiments, the reaction proceeds through magnesium carbonate and bicarbonate salts. In some embodiments, the reaction proceeds through calcium bicarbonate salts. In some embodiments, various Group 2 bicarbonate salts are generated and optionally then separated from the reaction mixture. In some embodiments, the flue gas, from which CO$_2$ and/or other pollutants have been removed, is released to the air, optionally after one or more further purification and/or treatment steps. In some embodiments, the MgCl$_2$ product, optionally hydrated, is returned to reactor 100. In some embodiments, the MgCl$_2$ product is subjected to one or more isolation, purification and/or hydration steps before being returned to reactor 100.

Calcium silicate (e.g., $3CaO.SiO_2$, $Ca_3SiO_5$; $2CaO.SiO_2$, $Ca_2SiO_4$; $3Ca.2SiO_2$, $Ca_3Si_2O_7$ and $CaO.SiO_2$, $CaSiO_3$ enters the process at reactor 300 (e.g., a rock melter). In some embodiments, these Group 2 silicates are ground in a prior step. In some embodiments, the Group 2 silicates are inosilicates. In the embodiment of FIG. 2, the inosilicate is $CaSiO_3$ (e.g., wollastonite, which may itself, in some embodiments, contain small amounts of iron, magnesium and/or manganese substituting for iron). The $CaSiO_3$ is reacted with hydrogen chloride, either gas or in the form of hydrochloric acid, some or all of which may be obtained from reactor 100, to form $CaCl_2$, water and sand ($SiO_2$). The reaction can be represented by equation 7.

$$2HCl+(Ca/Mg)SiO_3 \rightarrow (Ca/Mg)Cl_2+H_2O+SiO_2 \qquad (7)$$

| Reaction | ΔH kJ/mole** | Reaction Temp. Range |
|---|---|---|
| $2\ HCl(g) + CaSiO_3 \rightarrow CaCl_2 + H_2O + SiO_2$ | −254 | 90° C.-150° C. |
| $2\ HCl(g) + MgSiO_3 \rightarrow MgCl_2(aq) + H_2O + SiO_2$ | −288 | 90° C.-150° C. |

**Enthalpies are based on reaction temperatures, and temperatures of incoming reactant and outgoing product streams. Some or all of the water produced from this reaction may be delivered to reactor 100. Some or all of the $CaCl_2$ from equation 7 may be delivered to reactor 200. In some embodiments, some or all of the $CaCl_2$ is delivered to reactor 200 as an aqueous solution. In some embodiments, some or all of the $CaCl_2$ is delivered to reactor 200 in an aqueous suspension. In some embodiments, some or all of the $CaCl_2$ is delivered to reactor 200 as a solid.

The net reaction capturing the summation of equations 5-7 is shown here as equation 8:

$$CO_2+CaSiO_3 \rightarrow CaCO_3+SiO_2 \qquad (8)$$

| Reaction | ΔH kJ/mole** | ΔG kJ/mole** |
|---|---|---|
| $CO_2 + CaSiO_3 \rightarrow CaCO_3 + SiO_2$ | −89 | −39 |

**Measured at standard temperature and pressure (STP). Through the process shown in FIG. 2 and described herein, calcium carbonates are generated as end-sequestrant material from $CO_2$ and calcium inosilicate. Some or all of the various magnesium salts, water, hydrogen chloride and reaction energy may be cycled. In some embodiments, only some or none of these are cycled. In some embodiments, the water, hydrogen chloride and/or reaction energy made be used for other purposes.

These methods and devices can be further modified, optimized and scaled up using the principles and techniques of chemistry, chemical engineering, and/or materials science as applied by a person skilled in the art. Such principles and techniques are taught, for example, in U.S. Pat. No. 7,727,374, U.S. Patent Application Publications 2006/0185985 and 2009/0127127, U.S. patent application Ser. No. 11/233,509, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, U.S. Provisional Application No. 61/288,242, filed Jan. 20, 2010, U.S. Provisional Application No. 61/362,607, filed Jul. 8, 2010, and International Application No. PCT/US08/77122, filed Sep. 19, 2008. The entire text of each of the above-referenced disclosures (including any appendices) is specifically incorporated by reference herein.

The above examples were included to demonstrate particular embodiments of the invention. However, those of skill in the art should, in light of the present disclosure, appreciate that many changes can be made in the specific embodiments which are disclosed and still obtain a like or similar result without departing from the spirit and scope of the invention.

IV. Conversion of Group 2 Chlorides into Group 2 Hydroxides or Group II Hydroxy Chlorides Disclosed herein are processes that react a Group 2 chloride, e.g., $CaCl_2$ or $MgCl_2$, with water to form a Group 2 hydroxide, a Group 2 oxide, and/or a mixed salt such as a Group 2 hydroxide chloride. Such reactions are typically referred to as decompositions. In some embodiments, the water may be in the form of liquid, steam, from a hydrate of the Group 2 chloride, and/or it may be supercritical. The steam may come from a heat exchanger whereby heat from an immensely combustible reaction, i.e. natural gas and oxygen or hydrogen and chlorine heats a stream of water. In some embodiments, steam may also be generated through the use of plant or factory waste heat. In some embodiments, the chloride salt, anhydrous or hydrated, is also heated.

In the case of $Mg^{2+}$ and $Ca^{2+}$, the reactions may be represented by equations 9 and 10, respectively:

$$MgCl_2+2H_2O \rightarrow Mg(OH)_2+2HCl(g) \Delta H=263\ kJ/mole** \qquad (9)$$

$$CaCl_2+2H_2O \rightarrow Ca(OH)_2+2HCl(g) \Delta H=284\ kJ/mole** \qquad (10)$$

**Measured at 100° C. The reactions are endothermic meaning energy, e.g., heat has to be applied to make these reactions occur. Such energy may be obtained from the waste-heat generated from one or more of the exothermic process steps disclosed herein. The above reactions may occur according to one of more of the following steps:

$$CaCl_2+(x+y+z)H_2O \rightarrow Ca^{2+}.xH_2O+Cl^-.yH_2O+Cl^-.zH_2O \qquad (11)$$

$$Ca^{+2}.xH_2O+Cl^-.yH_2O+Cl^-.zH_2O \rightarrow [Ca^{2+}.(x-1)(H_2O)OH^-]^++Cl^-.(yH_2O)+Cl^-.(z-1)H_2O+H_3O^+ \qquad (12)$$

$$[Ca^{2+}.(x-1)(H_2O)OH^-]^++Cl^-.(yH_2O)+Cl^-.(z-1)H_2O+H_3O^+ \rightarrow [Ca^{2+}.(x-1)(H_2O)OH^-]^++Cl^-.(yH_2O)+zH_2O+HCl(g)\uparrow \qquad (13)$$

$$[Ca^{2+}.(x-1)(H_2O)OH^-]^++Cl^-.(yH_2O) \rightarrow [Ca^{2+}.(x-2)(H_2O)(OH^-)_2]+Cl^-.(y-1)H_2O+H_3O^+ \qquad (14)$$

$$[Ca^{2+}.(x-2)(H_2O)(OH^-)_2]+Cl^-.(y-1)H_2O+H_3O^+ \rightarrow Ca(OH)_2\downarrow+(x-2)H_2O+yH_2O+HCl\uparrow \qquad (15)$$

The reaction enthalpy (ΔH) for $CaCl_2+2\ H_2O \rightarrow Ca(OH)_2+2HCl(g)$ is 284 kJ/mole at 100° C. In some variants, the salt $MgCl_2.6H_2O$, magnesium hexahydrate, is used. Since water is incorporated into the molecular structure of the salt, direct heating without any additional steam or water may be used to initiate the decomposition. Typical reactions temperatures for the following reactions are shown here:

From 95-110° C.:

$$MgCl_2.6H_2O \rightarrow MgCl_2.4H_2O+2H_2O \qquad (16)$$

$$MgCl_2.4H_2O \rightarrow MgCl_2.2H_2O+2H_2O \qquad (17)$$

From 135-180° C.:

$$MgCl_2.4H_2O \rightarrow Mg(OH)Cl+HCl+3H_2O \qquad (18)$$

$$MgCl_2.2H_2O \rightarrow MgCl_2.H_2O+H_2O \qquad (19)$$

From 185-230° C.:

$$MgCl_2.2H_2O \rightarrow Mg(OH)Cl+HCl+H_2O \qquad (20)$$

From >230° C.:

$$MgCl_2 \cdot H_2O \rightarrow MgCl_2 + H_2O \quad (21)$$

$$MgCl_2 \cdot H_2O \rightarrow Mg(OH)Cl + HCl \quad (22)$$

$$Mg(OH)Cl \rightarrow MgO + HCl \quad (23)$$

In some embodiments, an initially formed Group 2 may undergo an salt exchange reaction with a second Group 2 hydroxide to transfer the carbonate anion. For example:

$$CaCl_2 + MgCO_3 + \rightarrow MgCl_2 + CaCO_3 \quad (25a)$$

| Reaction | Referenced Temp. Range | ΔH kJ/mole** | Temp. Reaction |
|---|---|---|---|
| $MgCl_2 \cdot 6H_2O \rightarrow MgCl_2 \cdot 4H_2O + 2\ H_2O(g)$ | 95° C.-110° C. | 115.7 | 100° C. |
| $MgCl_2 \cdot 4H_2O \rightarrow MgCl_2 \cdot 2H_2O + 2\ H_2O(g)$ | 95° C.-110° C. | 134.4 | 100° C. |
| $MgCl_2 \cdot 4H_2O \rightarrow Mg(OH)Cl + HCl(g) + 3\ H_2O(g)$ | 135° C.-180° C. | 275 | 160° C. |
| $MgCl_2 \cdot 2H_2O \rightarrow MgCl_2 \cdot H_2O + H_2O(g)$ | 135° C.-180° C. | 70.1 | 160° C. |
| $MgCl_2 \cdot 2H_2O \rightarrow Mg(OH)Cl + HCl(g) + H_2O(g)$ | 185° C.-230° C. | 141 | 210° C. |
| $MgCl_2 \cdot H_2O \rightarrow MgCl_2 + H_2O(g)$ | >230° C. | 76.6 | 240° C. |
| $MgCl_2 \cdot H_2O \rightarrow Mg(OH)Cl + HCl(g)$ | >230° C. | 70.9 | 240° C. |
| $Mg(OH)Cl \rightarrow MgO + HCl(g)$ | >230° C. | 99.2 | 450° C. |

**ΔH values were calculated at the temperature of reaction (column "Temp. Reaction"). See the chemical reference Kirk Othmer 4th ed. Vol. 15 p. 343 1998 John Wiley and Sons, which is incorporated herein by reference. See example 1, below, providing results from a simulation that demonstrating the ability to capture $CO_2$ from flue gas using an inexpensive raw material, $CaCl_2$, to form $CaCO_3$. See also Energy Requirements and Equilibrium in the dehydration, hydrolysis and decomposition of Magnesium Chloride - K. K. Kelley, Bureau of Mines 1941 and Kinetic Analysis of Thermal Dehydration and Hydrolysis of MgCl2•6H2O by DTA and TG - Y. Kirsh, S. Yariv and S. Shoval - Journal of Thermal Analysis, Vol. 32 (1987), both of which are incorporated herein by reference in their entireties.

V. Reaction of Group 2 Hydroxides and $CO_2$ to Form Group 2 Carbonates

In another aspect of the present disclosure, there are provided apparatuses and methods for the decarbonation of carbon dioxide sources using Group 2 hydroxides, Group 2 oxides, and/or Group 2 hydroxide chlorides as $CO_2$ adsorbents. In some embodiments, $CO_2$ is absorbed into an aqueous caustic mixture and/or solution where it reacts with the hydroxide and/or oxide salts to form carbonate and bicarbonate products. Sodium hydroxide, calcium hydroxide and magnesium hydroxide, in various concentrations, are known to readily absorb $CO_2$. Thus, in embodiments of the present invention, Group 2 hydroxides, Group 2 oxides (such as CaO and/or MgO) and/or other hydroxides and oxides, e.g., sodium hydroxide may be used as the absorbing reagent.

For example, a Group 2 hydroxide, e.g., obtained from a Group 2 chloride, may be used in an adsorption tower to react with and thereby capture $CO_2$ based on one or both of the following reactions:

$$Ca(OH)_2 + CO_2 \rightarrow CaCO_3 + H_2O \quad (24)$$

$$\Delta H = -117.92\ kJ/mol**$$

$$\Delta G = -79.91\ kJ/mol**$$

$$Mg(OH)_2 + CO_2 \rightarrow MgCO_3 + H_2O \quad (25)$$

$$\Delta H = -58.85\ kJ/mol**$$

$$\Delta G = -16.57\ kJ/mol**$$

** Calculated at STP.

In some embodiments of the present invention, most or nearly all of the carbon dioxide is reacted in this manner. In some embodiments, the reaction may be driven to completion, for example, through the removal of water, whether through continuous or discontinous processes, and/or by means of the precipitation of bicarbonate, carbonate, or a mixture of both types of salts. See example 1, below, providing a simulation demonstrating the ability to capture $CO_2$ from flue gas using an inexpensive raw material, $Ca(CO)_2$ derived from $CaCl_2$, to form $CaCO_3$.

These methods and devices can be further modified, optimized and scaled up using the principles and techniques of chemistry, chemical engineering, and/or materials science as applied by a person skilled in the art. Such principles and techniques are taught, for example, in U.S. Pat. No. 7,727,374, U.S. patent application Ser. No. 11/233,509, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, U.S. Provisional Application No. 61/288,242, filed Jan. 20, 2010, U.S. Provisional Application No. 61/362,607, filed Jul. 8, 2010, and International Application No. PCT/US08/77122, filed Sep. 19, 2008. The entire text of each of the above-referenced disclosures (including any appendices) is specifically incorporated by reference herein.

VI. Silicate Minerals For The Sequestration Of Carbon Dioxide

In aspects of the present invention there are provided methods of sequestering carbon dioxide using silicate minerals. The silicate minerals make up one of the largest and most important classes of rock-forming minerals, constituting approximately 90 percent of the crust of the Earth. They are classified based on the structure of their silicate group. Silicate minerals all contain silicon and oxygen. In some aspects of the present invention, Group 2 silicates may be used to accomplish the energy efficient sequestration of carbon dioxide.

In some embodiments, compositions comprising Group 2 inosilicates may be used. Inosilicates, or chain silicates, have interlocking chains of silicate tetrahedra with either $SiO_3$, 1:3 ratio, for single chains or $Si_4O_{11}$, 4:11 ratio, for double chains.

In some embodiments, the methods disclosed herein use compositions comprising Group 2 inosilicates from the pyroxene group. For example, enstatite ($MgSiO_3$) may be used.

In some embodiments, compositions comprising Group 2 inosilicates from the pyroxenoid group are used. For example, wollastonite ($CaSiO_3$) may be used. In some embodiments, compositions comprising mixtures of Group 2 inosilicates may be employed, for example, mixtures of enstatite and wollastonite. In some embodiments, compositions comprising mixed-metal Group 2 inosilicates may be used, for example, diopside ($CaMgSi_2O_6$).

Wollastonite usually occurs as a common constituent of a thermally metamorphosed impure limestone. Typically wollastonite results from the following reaction (equation 26) between calcite and silica with the loss of carbon dioxide:

$$CaCO_3 + SiO_2 \rightarrow CaSiO_3 + CO_2 \qquad (26)$$

In some embodiments, the present invention has the result of effectively reversing this natural process. Wollastonite may also be produced in a diffusion reaction in skarn. It develops when limestone within a sandstone is metamorphosed by a dyke, which results in the formation of wollastonite in the sandstone as a result of outward migration of calcium ions.

In some embodiments, the purity of the Group 2 inosilicate compositions may vary. For example, it is contemplated that the Group 2 inosilicate compositions used in the disclosed processes may contain varying amounts of other compounds or minerals, including non-Group 2 metal ions. For example, wollastonite may itself contain small amounts of iron, magnesium, and manganese substituting for calcium.

In some embodiments, compositions comprising olivine and/or serpentine may be used. $CO_2$ mineral sequestration processes utilizing these minerals have been attempted. The techniques of Goldberg et al. (2001) are incorporated herein by reference.

The mineral olivine is a magnesium iron silicate with the formula $(Mg,Fe)_2SiO_4$. When in gem-quality, it is called peridot. Olivine occurs in both mafic and ultramafic igneous rocks and as a primary mineral in certain metamorphic rocks. Mg-rich olivine is known to crystallize from magma that is rich in magnesium and low in silica. Upon crystallization, the magna forms mafic rocks such as gabbro and basalt. Ultramafic rocks, such as peridotite and dunite, can be residues left after extraction of magmas and typically are more enriched in olivine after extraction of partial melts. Olivine and high pressure structural variants constitute over 50% of the Earth's upper mantle, and olivine is one of the Earth's most common minerals by volume. The metamorphism of impure dolomite or other sedimentary rocks with high magnesium and low silica content also produces Mg-rich olivine, or forsterite.

VII. Generation of Group 2 Chlorides from Group 2 Silicates

Group 2 silicates, e.g., $CaSiO_3$, $MgSiO_3$, and/or other silicates disclosed herein, may be reacted with hydrochloric acid, either as a gas or in the form of aqueous hydrochloric acid, to form the corresponding Group 2 metal chlorides ($CaCl_2$ and/or $MgCl_2$), water and sand. In some embodiments the HCl produced in equation 1 is used to regenerate the $MgCl_2$ and/or $CaCl_2$ in equation 3. A process loop is thereby created. Table 1 below depicts some of the common calcium/magnesium containing silicate minerals that may be used, either alone or in combination. Initial tests by reacting olivine and serpentine with HCl have been successful. $SiO_2$ was observed to precipitate out and $MgCl_2$ and $CaCl_2$ were collected.

TABLE 1

Calcium/Magnesium Minerals.

| Mineral | Formula (std. notation) | Formula (oxide notation) | Ratio Group 2:$SiO_2$ | Ratio Group 2:total |
|---|---|---|---|---|
| Olivine | $(Mg,Fe)_2[SiO_4]$ | $(MgO,FeO)_2 \cdot SiO_2$ | 1:1 | 1:2 |
| Serpentine | $Mg_6[OH]_8[Si_4O_{10}]$ | $6MgO \cdot 4SiO_2 \cdot 4H_2O$ | 3:2 | undefined |
| Sepiolite | $Mg_4[(OH)_2Si_6O_{15}]6H_2O$ | $3MgO \cdot Mg(OH)_2 \cdot 6SiO_2 \cdot 6H_2O$ | 2:3 | undefined |
| Enstatite | $Mg_2[Si_2O_6]$ | $2MgO \cdot 2SiO_2$ | 1:1 | undefined |
| Diopside | $CaMg[Si_2O_6]$ | $CaO \cdot MgO \cdot 2SiO_2$ | 1:1 | undefined |
| Tremolite | $Ca_2Mg_5\{[OH]Si_4O_{11}\}_2$ | $2CaO \cdot 5MgO \cdot 8SiO_2H_2O$ | 7:8 | undefined |
| Wollastonite | $CaSiO_3$ | $CaO \cdot SiO_2$ | 1:1 | undefined |

See "Handbook of Rocks, Minerals & Gemstones by Walter Schumann Published 1993, Houghton Mifflin Co., Boston, New York, which is incorporated herein by reference.

VIII. Further Embodiments

In some embodiments, the conversion of carbon dioxide to mineral carbonates may be defined by two salts. The first salt is one that may be heated to decomposition until it becomes converted to a base (hydroxide and/or oxide) and emits an acid, for example, as a gas. This same base reacts with carbon dioxide to form a carbonate, bicarbonate or basic carbonate salt.

For example, in some embodiments, the present disclosure provides processes that react one or more salts from Tables A-C below with water to form a hydroxides, oxides, and/or a mixed hydroxide halides. Such reactions are typically referred to as decompositions. In some embodiments, the water may be in the form of liquid, steam, and/or from a hydrate of the selected salt. The steam may come from a heat exchanger whereby heat from an immensely combustible reaction, i.e. natural gas and oxygen or hydrogen and chlorine heats a stream of water. In some embodiments, steam may also be generated through the use of plant or factory waste heat. In some embodiments, the halide salt, anhydrous or hydrated, is also heated.

TABLE A

Decomposition Salts

| | $Li^+$ | | $Na^+$ | | $K^+$ | | $Rb^+$ | | $Cs^+$ | |
|---|---|---|---|---|---|---|---|---|---|---|
| $F^-$ | NC | N | 4747 | N | NC | N | 10906 | N | 7490 | N |
| $Cl^-$ | 3876 | N | 19497 | N | 8295 | N | 13616 | N | 7785 | N |
| $Br^-$ | 3006 | N | 4336 | N | 9428 | N | 13814 | N | 8196 | N |
| $I^-$ | 6110 | N | 6044 | N | 11859 | N | 9806 | N | 8196 | N |

TABLE B

Decomposition Salts (cont.)

| | $Mg^{+2}$ | | $Ca^{+2}$ | | $Sr^{+2}$ | | $Ba^{+2}$ | |
|---|---|---|---|---|---|---|---|---|
| $F^-$ | 4698 | N | 3433 | N | 10346 | N | 6143 | N |
| $Cl^-$ | 4500* | 6W* | 5847 | 2W | 9855 | 6W | 8098 | 2W |

TABLE B-continued

| Decomposition Salts (cont.) | | | | | | | |
|---|---|---|---|---|---|---|---|
| $Mg^{+2}$ | | $Ca^{+2}$ | | $Sr^{+2}$ | | $Ba^{+2}$ | |
| $Br^-$ | 5010 | 6W | 2743 | N | 10346 | 6W | 8114 | 2W |
| $I^-$ | 2020 | N | 4960 | N | 9855 | 6W | 10890 | 2W |

*Subsequent tests have proven the heat of reaction within 1.5-4% of the thermodynamically derived value using TGA (thermogravinometric analysis) of heated samples and temperature ramp settings.

TABLE C

| Decomposition Salts (cont.) | | | | | | | | | |
|---|---|---|---|---|---|---|---|---|---|
| | $Mn^{+2}$ | | $Fe^{+2}$ | | $Co^{+2}$ | | $Ni^{+2}$ | | $Zn^{+2}$ | |
| $F^-$ | 3318 | N | 2101 | N | 5847 | N | 5847 | N | 3285 | N |
| $Cl^-$ | 5043 | 6W | 3860 | 4W | 3860 | 6W | 4550 | 6W | 8098 | 4W |
| $Br^-$ | 5256 | 6W | 11925 | 4W | 9855 | 6W | 5010 | 6W | 4418 | 4W |
| $I^-$ | 5043 | 6W | 3055 | 4W | 4123 | 6W | 5831 | 6W | 4271 | 4W |
| $SO_4^{-2}$ | NC | 4W | 13485 | 4W | 3351 | 4W | 8985 | 6W | 8344 | 7W |

TABLE D

| Decomposition Salts (cont.) | | | |
|---|---|---|---|
| | $Ag^+$ | | $La^{+3}$ | |
| $F^-$ | 2168 | N | 13255 | 7W |
| $Cl^-$ | 5486 | N | 7490 | 7W |
| $Br^-$ | 6242 | N | 5029 | 7W |
| $I^-$ | 6110 | N | 4813 | 7W |
| $SO_4^{-2}$ | 6159 | N | 10561 | 6W |

For Tables A-D, the numerical data corresponds to the energy per amount of $CO_2$ captured in kWh/tonne, NC=did not converge, and NA=data not available.

This same carbonate, bicarbonate or basic carbonate of the first salt reacts with a second salt to do a carbonate/bicarbonate exchange, such that the anion of second salt combines with the cation of the first salt and the cation of the second salt combines with the carbonate/bicarbonate ion of the first salt, which forms the final carbonate/bicarbonate.

In some cases the hydroxide derived from the first salt is reacted with carbon dioxide and the second salt directly to form a carbonate/bicarbonate derived from (combined with the cation of) the second salt. In other cases the carbonate/bicarbonate/basic carbonate derived from (combined with the cation of) the first salt is removed from the reactor chamber and placed in a second chamber to react with the second salt. FIG. 27 shows an embodiment of this 2-salt process.

This reaction may be beneficial when making a carbonate/bicarbonate when a salt of the second metal is desired, and this second metal is not as capable of decomposing to form a $CO_2$ absorbing hydroxide, and if the carbonate/bicarbonate compound of the second salt is insoluble, i.e. it precipitates from solution. Below is a non-exhaustive list of examples of such reactions that may be used either alone or in combination, including in combination with one or more either reactions discussed herein.

Examples for a Decomposition of a Salt-1

$2NaI+H_2O \rightarrow Na_2O+2HI$ and/or $Na_2O+H_2O \rightarrow 2NaOH$ $MgCl_2 \cdot 6H_2O \rightarrow MgO+5H_2O+2HCl$ and/or $MgO+H_2O \rightarrow Mg(OH)_2$ Examples of a Decarbonation $2NaOH+CO_2 \rightarrow Na_2CO_3+H_2O$ and/or $Na_2CO_3+CO_2+H_2O \rightarrow 2NaHCO_3$ $Mg(OH)_2+CO_2 \rightarrow MgCO_3+H_2O$ and/or $Mg(OH)_2+2CO_2Mg(HCO_3)_2$ Examples of a Carbonate exchange with a Salt-2:

$Na_2CO_3+CaCl_2 \rightarrow CaCO_3 \downarrow +2NaCl$ $Na_2CO_3+2AgNO_3 \rightarrow Ag_2CO_3 \downarrow +2NaNO_3$ $Ca(OH)_2+Na_2CO_3 \rightarrow CaCO_3 \downarrow +2NaOH*$

* In this instance the carbonate, $Na_2CO_3$ is Salt-2, and the salt decomposed to form $Ca(OH)_2$, i.e. $CaCl_2$ is the Salt-1.

This is the reverse of some of the previous examples in that the carbonate ion remains with Salt-1.

Known carbonate compounds include $H_2CO_3$, $Li_2CO_3$, $Na_2CO_3$, $K_2CO_3$, $Rb_2CO_3$, $Cs_2CO_3$, $BeCO_3$, $MgCO_3$, $CaCO_3$, $MgCO_3$, $SrCO_3$, $BaCO_3$, $MnCO_3$, $FeCO_3$, $CoCO_3$, $CuCO_3$, $ZnCO_3$, $Ag_2CO_3$, $CdCO_3$, $Al_2(CO_3)_3$, $Tl_2CO_3$, $PbCO_3$, and $La_2(CO_3)_3$. Group IA elements are known to be stable bicarbonates, e.g., $LiHCO_3$, $NaHCO_3$, $RbHCO_3$, and $CsHCO_3$. Group IIA and some other elements can also form bicarbonates, but in some cases, they may only be stable in solution. Typically rock-forming elements are H, C, O, F, Na, Mg, Al, Si, P, S, Cl, K, Ca, Ti, Mg and Fe. Salts of these that can be thermally decomposed into corresponding hydroxides by the least amount of energy per mole of $CO_2$ absorbing hydroxide may therefore be considered potential Salt-1 candidates.

Based on the energies calculated in Tables A-D, several salts have lower energies than $MgCl_2 \cdot 6H_2O$. Table E below, summarizes these salts and the percent penalty reduction through their use relative to $MgCl_2 \cdot 6H_2O$.

TABLE E

| Section Lower Energy Alternative Salts | | |
|---|---|---|
| Compound | kw-hr/tonne | % reduction |
| $MgCl_2 \cdot 6H_2O$ | 4500 | 0% |
| LiCl | 3876 | 16% |
| LiBr | 3006 | 50% |
| NaBr | 4336 | 4% |
| $MgI_2$ | 2020 | 123% |
| $CaF_2$ | 3433 | 31% |
| $CaBr_2$ | 2743 | 64% |
| $MnF_2$ | 3318 | 36% |
| $FeF_2$ | 2102 | 114% |
| $FeCl_2 \cdot 4H_2O$ | 3860 | 17% |
| $FeI_2 \cdot 4H_2O$ | 3055 | 47% |
| $CoCl_2 \cdot 6H_2O$ | 3860 | 17% |
| $CoI_2 \cdot 6H_2O$ | 4123 | 9% |
| $CoSO_4 \cdot 4H_2O$ | 3351 | 34% |
| $ZnF_2 \cdot 2H_2O$ | 3285 | 37% |
| $ZnBr_2 \cdot 4H_2O$ | 4418 | 2% |
| $ZnI_2 \cdot 4H_2O$ | 4271 | 5% |
| $CdF_2$ | 3137 | 43% |
| AgF | 2168 | 108% |

The following salts specify a decomposition reaction through their respective available MSDS information.

TABLE F

| Compound | Decomposition Energy | Notes |
|---|---|---|
| $MgCl_2 \cdot 6H_2O$ | 4500 | |
| $MnCl_2 \cdot 4H_2O$ | 5043 | only $Mn^{+2}$ forms a stable carbonate |
| $NaI \cdot 2H_2O$ | 1023 | too rare |
| $CoI_2 \cdot 6H_2O$ | 4123 | too rare |
| $FeCl_2 \cdot 4H_2O$ | 3860 | May oxidize to ferric oxide, this will not form a stable carbonate |
| LiBr | 3006 | too rare |
| $Mg(NO_3)_2 \cdot 4H_2O$ | 1606 | leaves Nox |
| $CoSO_4 \cdot 4H_2O$ | 3351 | somewhat rare leaves $SO_3$ |
| $CdCl_2 \cdot 2.5H_2O$ | not aval. | toxic byproducts |
| $Ca(NO_3)_2 \cdot 4H_2O$ | 2331 | leaves $NO_2$ |

| Compound | References |
|---|---|
| $MgCl_2 \cdot 6H_2O$ | |
| $MnCl_2 \cdot 4H_2O$ | http://avogadro.chem.iastate.edu/MSDS/MnCl2.htm |
| $NaI_2 \cdot H_2O$ | http://www.chemicalbook.com/ProductMSDSDetailCB6170714_EN.htm |
| $CoI_2 \cdot 6H_2O$ | http://www.espimetals.com/index.php/msds/527-cobalt-iodide |
| $FeCl_2 \cdot 4H_2O$ | |
| LiBr | http://www.chemcas.com/material/cas/archive/7550-35-8_v1.asp |
| $Mg(NO_3)_2 \cdot 4H_2O$ | http://avogadro.chem.iastate.edu/MSDS/MgNO3-6H2O.htm |
| $CoSO_4 \cdot 4H_2O$ | http://www.chemicalbook.com/ProductMSDSDetailCB0323842_EN.htm |
| $CdCl_2$-2.5H2O | http://www.espimetals.com/index.php/msds/460-cadmium-chloride |
| $Ca(NO_3)_2 \cdot 4H2O$ | http://avogadro.chem.iastate.edu/MSDS/Ca%28NO3%292-4H2O.htm |

IX. Limestone Generation and Uses

In aspects of the present invention there are provided methods of sequestering carbon dioxide in the form of limestone. Limestone is a sedimentary rock composed largely of the mineral calcite (calcium carbonate: $CaCO_3$). This mineral has many uses, some of which are identified below.

Limestone in powder or pulverized form, as formed in some embodiments of the present invention, may be used as a soil conditioner (agricultural lime) to neutralize acidic soil conditions, thereby, for example, neutralizing the effects of acid rain in ecosystems. Upstream applications include using limestone as a reagent in desulfurizations.

Limestone is an important stone for masonry and architecture. One of its advantages is that it is relatively easy to cut into blocks or more elaborate carving. It is also long-lasting and stands up well to exposure. Limestone is a key ingredient of quicklime, mortar, cement, and concrete.

Calcium carbonate is also used as an additive for paper, plastics, paint, tiles, and other materials as both white pigment and an inexpensive filler. Purified forms of calcium carbonate may be used in toothpaste and added to bread and cereals as a source of calcium. $CaCO_3$ is also commonly used medicinally as an antacid.

Currently, the majority of calcium carbonate used in industry is extracted by mining or quarrying. By co-generating this mineral as part of carbon dioxide sequestration in some embodiments, this invention provides a non-extractive source of this important product.

X. Magnesium Carbonate Generation and Uses

In aspects of the present invention there are provided methods of sequestering carbon dioxide in the form of magnesium carbonate. Magnesium carbonate, $MgCO_3$, is a white solid that occurs in nature as a mineral. The most common magnesium carbonate forms are the anhydrous salt called magnesite ($MgCO_3$) and the di, tri, and pentahydrates known as barringtonite ($MgCO_3 \cdot 2H_2O$), nesquehonite ($MgCO_3 \cdot 3H_2O$), and lansfordite ($MgCO_3 \cdot 5H_2O$), respectively. Magnesium carbonate has a variety of uses; some of these are briefly discussed below.

Magnesium carbonate may be used to produce magnesium metal and basic refractory bricks. $MgCO_3$ is also used in flooring, fireproofing, fire extinguishing compositions, cosmetics, dusting powder, and toothpaste. Other applications are as filler material, smoke suppressant in plastics, a reinforcing agent in neoprene rubber, a drying agent, a laxative, and for color retention in foods. In addition, high purity magnesium carbonate is used as antacid and as an additive in table salt to keep it free flowing.

Currently magnesium carbonate is typically obtained by mining the mineral magnesite. By co-generating this mineral as part of carbon dioxide sequestration in some embodiments, this invention provides a non-extractive source of this important product.

XI. Silicon Dioxide Generation and Uses

In aspects of the present invention there are provided methods of sequestering carbon dioxide that produce silicon dioxide as a byproduct. Silicon dioxide, also known as silica, is an oxide of silicon with a chemical formula of $SiO_2$ and is known for its hardness. Silica is most commonly found in nature as sand or quartz, as well as in the cell walls of diatoms. Silica is the most abundant mineral in the Earth's crust. This compound has many uses; some of these are briefly discussed below.

Silica is used primarily in the production of window glass, drinking glasses and bottled beverages. The majority of optical fibers for telecommunications are also made from silica. It is a primary raw material for many whiteware ceramics such as earthenware, stoneware and porcelain, as well as industrial Portland cement.

Silica is a common additive in the production of foods, where it is used primarily as a flow agent in powdered foods, or to absorb water in hygroscopic applications. In hydrated form, silica is used in toothpaste as a hard abrasive to remove tooth plaque. Silica is the primary component of diatomaceous earth which has many uses ranging from filtration to insect control. It is also the primary component of rice husk ash which is used, for example, in filtration and cement manufacturing.

Thin films of silica grown on silicon wafers via thermal oxidation methods can be quite beneficial in microelectronics, where they act as electric insulators with high chemical stability. In electrical applications, it can protect the silicon, store charge, block current, and even act as a controlled pathway to limit current flow.

Silica is typically manufactured in several forms including glass, crystal, gel, aerogel, fumed silica, and colloidal silica. By co-generating this mineral as part of carbon dioxide sequestration in some embodiments, this invention provides another source of this important product.

XII. Separation of Products

Separation processes may be employed to separate carbonate and bicarbonate products from the liquid solution and/or reaction mixture. By manipulating the basic concentration, temperature, pressure, reactor size, fluid depth, and degree of carbonation, precipitates of one or more carbonate and/or bicarbonate salts may be caused to occur.

Alternatively, carbonate/bicarbonate products may be separated from solution by the exchange of heat energy with incoming flue-gases.

The exit liquid streams, depending upon reactor design, may include water, $CaCO_3$, $MgCO_3$, $Ca(HCO_3)_2$, $Mg(HCO_3)_2$, $Ca(OH)_2$, $Ca(OH)_2$, $NaOH$, $NaHCO_3$, $Na_2CO_3$, and other dissolved gases in various equilibria. Dissolved trace emission components such as $H_2SO_4$, $HNO_3$, and Hg may also be found. In one embodiment, removing/separating the water from the carbonate product involves adding heat energy to evaporate water from the mixture, for example, using a reboiler. Alternatively, retaining a partial basic solution and subsequently heating the solution in a separating chamber may be used to cause relatively pure carbonate salts to precipitate into a holding tank and the remaining hydroxide salts to recirculate back to the reactor. In some embodiments, pure carbonate, pure bicarbonate, and mixtures of the two in equilibrium concentrations and/or in a slurry or concentrated form may then be periodically transported to a truck/tank-car. In some embodiments, the liquid streams may be displaced to evaporation tanks/fields where the liquid, such as water, may be carried off by evaporation.

The release of gaseous products includes a concern whether hydroxide or oxide salts will be released safely, i.e., emitting "basic rain." Emission of such aerosolized caustic salts may be prevented in some embodiments by using a simple and inexpensive condenser/reflux unit.

In some embodiments, the carbonate salt may be precipitated using methods that are used separately or together with a water removal process. Various carbonate salt equilibria have characteristic ranges where, when the temperature is raised, a given carbonate salt, e.g., $CaCO_3$ will naturally precipitate and collect, which makes it amenable to be withdrawn as a slurry, with some fractional NaOH drawn off in the slurry.

XIII. Recovery of Waste-Heat

Because certain embodiments of the present invention are employed in the context of large emission of $CO_2$ in the form of flue-gas or other hot gases from combustion processes, such as those which occur at a power plant, there is ample opportunity to utilize this 'waste' heat, for example, for the conversion of Group 2 chlorides salts into Group 2 hydroxides. For instance, a typical incoming flue-gas temperature (after electro-static precipitation treatment, for instance) is approximately 300° C. Heat exchangers can lower that flue-gas to a point less than 300° C., while warming the water and/or Group 2 chloride salt to facilitate this conversion.

Generally, since the flue-gas that is available at power-plant exits at temperatures between 100° C. (scrubbed typical), 300° C. (after precipitation processing), and 900° C. (precipitation entrance), or other such temperatures, considerable waste-heat processing can be extracted by cooling the incoming flue-gas through heat-exchange with a power-recovery cycle, for example an ammonia-water cycle (e.g., a "Kalina" cycle), a steam cycle, or any such cycle that accomplishes the same thermodynamic means. Since some embodiments of the present invention rely upon DC power to accomplish the manufacture of the reagent/absorbent, the process can be directly powered, partially or wholly, by waste-heat recovery that is accomplished without the normal transformer losses associated with converting that DC power to AC power for other uses. Further, through the use of waste-heat-to-work engines, significant efficiencies can be accomplished without an electricity generation step being employed at all. In some conditions, these waste-heat recovery energy quantities may be found to entirely power embodiments of the present invention.

XIV. Alternative Processes

As noted above, some embodiments of the apparatuses and methods of the present disclosure produce a number of useful intermediates, by-products, and final products from the various reaction steps, including hydrogen chloride, Group 2 carbonate salts, Group 2 hydroxide salts, etc. In some embodiments, some or all of these may be used in one or more of the methods described below. In some embodiments, some or all of one of the starting materials or intermediates employed in one or more of the steps described above are obtained using one or more of the methods outlined below.

A. Use of Chlorine for the Chlorination of Group 2 Silicates

In some embodiments the chlorine gas may be liquefied to hydrochloric acid that is then used to chlorinate Group 2 silicate minerals. Liquefaction of chlorine and subsequent use of the hydrochloric acid is particularly attractive especially in situations where the chlorine market is saturated. Liquefaction of chlorine may be accomplished according to equation 27:

$$Cl_2(g)+2H_2O(l)+hv(363\ nm) \rightarrow 2HCl(l)+\tfrac{1}{2}O_2(g) \qquad (27)$$

In some embodiments, the oxygen so produced may be returned to the air-inlet of the power plant itself, where it has been demonstrated throughout the course of power-industry investigations that enriched oxygen-inlet plants have (a) higher Carnot-efficiencies, (b) more concentrated $CO_2$ exit streams, (c) lower heat-exchange to warm inlet air, and (d) other advantages over non-oxygen-enhanced plants. In some embodiments, the oxygen may be utilized in a hydrogen/oxygen fuel cell. In some embodiments, the oxygen may serve as part of the oxidant in a turbine designed for natural gas power generation, for example, using a mixture of hydrogen and natural gas.

B. Use of Chlorine for the Chlorination of Group 2 Hydroxides

In some embodiments the chlorine gas may be reacted with a Group 2 hydroxide salts to yield a mixture of a chloride and a hypochlorite salts (equation 28). For example, HCl may be sold as a product and the Group 2 hydroxide salt may be used to remove excess chlorine.

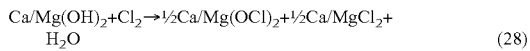

$$Ca/Mg(OH)_2+Cl_2 \rightarrow \tfrac{1}{2}Ca/Mg(OCl)_2+\tfrac{1}{2}Ca/MgCl_2+H_2O \qquad (28)$$

The Group 2 hypochlorites may then be decomposed using a cobalt or nickel catalyst to form oxygen and the corresponding chloride (equation 29).

$$Ca/Mg(OCl)_2 \rightarrow Ca/MgCl_2+O_2 \qquad (29)$$

The calcium chloride and/or the magnesium chloride may then be recovered.

XV. Removal of Other Pollutants from Source

In addition to removing $CO_2$ from the source, in some embodiments of the invention, the decarbonation conditions will also remove $SO_X$ and $NO_X$ and, to a lesser extent, mercury. In some embodiments of the present invention, the incidental scrubbing of $NO_x$, $SO_x$, and mercury compounds can assume greater economic importance; i.e., by employing embodiments of the present invention, coals that contain large amounts of these compounds can be combusted in the power plant with, in some embodiments, less resulting pollution than with higher-grade coals processed without the benefit of the $CO_2$ absorption process. Such principles and techniques are taught, for example, in U.S. Pat. No. 7,727,374, U.S. patent application Ser. No. 11/233,509, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, U.S. Provisional Application No. 61/288,242, filed Jan. 20, 2010, U.S. Provisional Application No. 61/362,607, filed Jul. 8, 2010, and International Application No. PCT/US08/77122, filed Sep. 19, 2008. The entire text of each of the above-referenced disclosures (including any appendices) is specifically incorporated by reference herein.

XVI. Examples

The following examples are included to demonstrate some embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Process Simulation of Capture $CO_2$ from Flue Gas Using $CaCl_2$ to form $CaCO_3$ One embodiment of the present invention was simulated using Aspen Plus v. 7.1 software using known reaction enthalpies, reaction free energies and defined parameters to determine mass and energy balances and suitable conditions for capturing $CO_2$ from a flue gas stream utilizing $CaCl_2$ and heat to form $CaCO_3$ product. These results show that it is possible to capture $CO_2$ from flue gas using inexpensive raw materials, $CaCl_2$ and water, to form $CaCO_3$.

Figure 5:
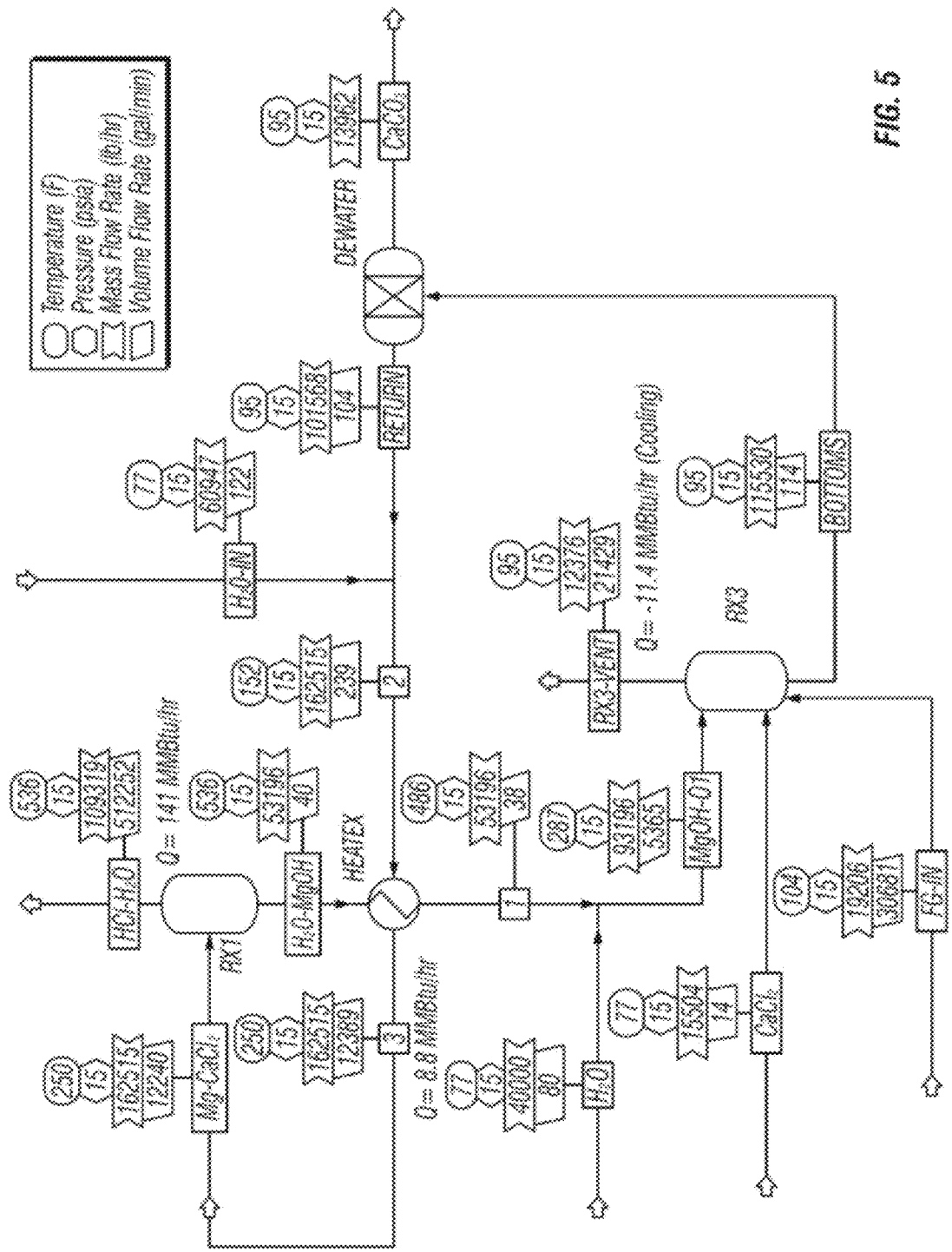
FIG. 5 is a process flow diagram showing parameters and results from a process simulation using Aspen Plus process software. In this embodiment, a 35% $MgCl_2$, 65% $H_2O$ solution is heated to 536° F. (280° C.), then the stream leaves in the stream labeled "$H_2O$—MgOH," which comprises a solution of $MgCl_2$ and solid $Mg(OH)_2$. Typically, when $Mg(OH)Cl$ dissolves in water it forms $Mg(OH)_2$ (solid) and $MgCl_2$ (dissolved). Here the $MgCl_2$ is not used to absorb $CO_2$ directly, rather it is recycled. The net reaction is the capture of $CO_2$ from flue gas using inexpensive raw materials, $CaCl_2$ and water, to form $CaCO_3$. Results from the simulation suggest that it is efficient to recirculate a $MgCl_2$ stream and then to react it with $H_2O$ and heat to form $Mg(OH)_2$. One or more of the aforementioned compounds then reacts with a $CaCl_2/H_2O$ solution and $CO_2$ from the flue gas to ultimately form $CaCO_3$, which is filtered out of the stream. The resulting $MgCl_2$ formed is recycled to the first reactor to repeat the process.

Part of the defined parameters includes the process flow diagram shown in FIG. 5. Results from the simulation suggest that it is efficient to recirculate an $MgCl_2$ stream to react with $H_2O$ and heat to form $Mg(OH)_2$. This $Mg(OH)_2$ then reacts with a saturated $CaCl_2/H_2O$ solution and $CO_2$ from the flue gas to form $CaCO_3$, which is filtered out of the stream. The resulting $MgCl_2$ formed is recycled to the first reactor to begin the process again. This process is not limited to any particular source for $CaCl_2$. For example, it may be obtained from reacting calcium silicate with HCl to yield $CaCl_2$.

Constraints and parameters specified for this simulation include:

The reactions were run at 100% efficiencies with no losses. The simulations can be modified when pilot runs determine the reaction efficiencies.

Simulations did not account for impurities in the $CaCl_2$ feed stock or in any make-up $MgCl_2$ required due to losses from the system.

The results of this simulation indicate a preliminary net energy consumption of approximately 130 mM Btu/hr. Tables 2a and 2b provide mass and energy accounting for the various streams (the columns in the table) of the simulated process. Each stream corresponds to the stream of FIG. 5.

The process consists of two primary reaction sections and one solids filtration section. The first reactor heats $MgCl_2$/water solution causing it to break down into a $HCl/H_2O$ vapor stream and a liquid stream of $Mg(OH)_2$. The $HCl/H_2O$ vapor stream is sent to the HCl absorber column. The $Mg(OH)_2$ solution is sent to reactor 2 for further processing. The chemical reaction for this reactor can be represented by the following equation:

$$MgCl_2 + 2H_2O \rightarrow Mg(OH)_2 + 2HCl \qquad (30)$$

A $CaCl_2$ solution and a flue gas stream are added to the $MgCl_2$ in reactor 2. This reaction forms $CaCO_3$, $MgCl_2$ and water. The $CaCO_3$ precipitates and is removed in a filter or decanter. The remaining $MgCl_2$ and water are recycled to the first reactor. Additional water is added to complete the water balance required by the first reactor. The chemical reaction for this reactor can be represented by the following equation:

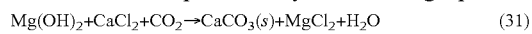

$$Mg(OH)_2 + CaCl_2 + CO_2 \rightarrow CaCO_3(s) + MgCl_2 + H_2O \qquad (31)$$

The primary feeds to this process are $CaCl_2$, flue gas ($CO_2$) and water. $MgCl_2$ in the system is used, reformed and recycled. The only $MgCl_2$ make-up required is to replace small amounts that leave the system with the $CaCO_3$ product, and small amounts that leave with the HCl/water product.

This process is a net energy user. There is cross heat exchange to recover the heat in high temperature streams to preheat the feed streams. Significant heat recovery may be obtained by reacting the concentrated HCl thus formed with silicate minerals.

TABLE 2a

Mass and Energy Accounting for Simulation of Capture $CO_2$ from Flue Gas Using $CaCl_2$ to form $CaCO_3$.

| | Process Stream Names | | | | | | | | |
|---|---|---|---|---|---|---|---|---|---|
| | 1 | 2 | 3 | BOTTOMS | $CaCl_2$ | $CaCO_3$ | FG-IN | $H_2O$ | $H_2O$—MgOH |
| Temperature F. | 485.8 | 151.6 | 250 | 95 | 77 | 95 | 104 | 77 | 536 |
| Pressure psia | 15 | 15 | 15 | 15 | 15 | 15 | 15 | 15 | 15 |
| Vapor Frac | 0 | 0 | 0.025 | 0 | 0 | | 1 | 0 | 0 |
| Mole Flow lbmol/hr | 1594.401 | 7655.248 | 7653.691 | 3568.272 | 139.697 | 139.502 | 611.154 | 2220.337 | 1594.401 |
| Mass Flow lb/hr | 53195.71 | 162514.8 | 162514.8 | 115530.1 | 15504 | 13962.37 | 19206 | 40000 | 53195.71 |
| Volume Flow gal/min | 38.289 | 238.669 | 12389.12 | 114.43 | 14.159 | | 30680.73 | 80.111 | 40.178 |
| Enthalpy MMBtu/hr | −214.568 | −918.028 | −909.155 | −574.405 | −47.795 | | −27.903 | −273.013 | −205.695 |
| $H_2O$ | 1473.175 | 105624.1 | 105603 | 33281.39 | | | 750.535 | 40000 | 1473.172 |
| $H_2$ | | | | | | | | | |
| $Cl_2$ | | | | | | | | | |

TABLE 2a-continued

Mass and Energy Accounting for Simulation of Capture $CO_2$ from Flue Gas Using $CaCl_2$ to form $CaCO_3$.

| | Process Stream Names | | | | | | | | |
|---|---|---|---|---|---|---|---|---|---|
| | 1 | 2 | 3 | BOTTOMS | $CaCl_2$ | $CaCO_3$ | FG-IN | $H_2O$ | $H_2O$—MgOH |
| HCl | trace | trace | 0.001 | trace | | | | | trace |
| $CO_2$ | | <0.001 | 0.091 | 0.005 | | | 6158.236 | | |
| CO | | | | | | | | | |
| $O_2$ | | 0.055 | 0.055 | 0.055 | | | 2116.894 | | |
| $N_2$ | | 0.137 | 0.137 | 0.137 | | | 10180.34 | | |
| $CaCl_2$ | | | | | 15504 | | | | |
| $Ca(OH)_2$ | | | | | | | | | |
| $CaCO_3$ | | | | | | | | | |
| $Mg(OH)_2$ | | | | | | | | | |
| $Mg(OH)Cl$ | | | | | | | | | |
| $MgCl_2$ | | | | | | | | | |
| $MgCO_3$ | | | | | | | | | |
| $Ca(O)Cl_2$ | | | | | | | | | |
| $CaCl_2O_2$ | | | | | | | | | |
| $Ca^{2+}$ | | 7.797 | trace | 7.797 | | | | | |
| $Mg^{2+}$ | 11114.84 | 14507.52 | 14506.86 | 11942.37 | | | | | 11115.59 |
| $H^+$ | <0.001 | trace | trace | trace | | | | trace | <0.001 |
| $CaOH^+$ | | <0.001 | trace | <0.001 | | | | | |
| $MgOH^+$ | 22.961 | 15.364 | 17.613 | 25.319 | | | | | 20.435 |
| HClO | | | | | | | | | |
| $MgCO_3$—3W | | | | | | | | | |
| $MgCl_2(s)$ | | | | | | | | | |
| $MgCl_2$—6W | | | | 21433.25 | | | | | |
| $MgCl_2$—4W | | | | | | | | | |
| $CaCl_2(s)$ | | | | | | | | | |
| $CaCO_3(s)$ | | | | 13962.37 | | 13962.37 | | | |
| $MgCO_3(s)$ | | 0.174 | | | | | | | |
| $CaCl_2$—6W | | | 42.623 | | | | | | |
| $CaCl_2$—4W | | | | | | | | | |
| $CaCl_2$—2W | | | | | | | | | |
| $MgCl_2$—2W | | | | | | | | | |
| $MgCl_2$—W | | | | | | | | | |
| $Ca(OH)_2(s)$ | | | | | | | | | |
| $Mg(OH)_2(s)$ | 8137.518 | 7.043 | 5.576 | 0.08 | | | | | 8139.306 |
| $ClO^-$ | | | | | | | | | |
| $HCO_3^-$ | | 0.001 | <0.001 | 0.119 | | | | | |
| $Cl^-$ | 32447.21 | 42352.6 | 42338.81 | 34877.24 | | | | | 32447.21 |
| $OH^-$ | <0.001 | 0.001 | 0.001 | <0.001 | | | | <0.001 | <0.001 |
| $CO_3^{2-}$ | | trace | trace | 0.001 | | | | | |
| $H_2O$ | 0.028 | 0.65 | 0.65 | 0.288 | | | 0.039 | 1 | 0.028 |
| $H_2$ | | | | | | | | | |
| $Cl_2$ | | | | | | | | | |
| HCl | trace | trace | 3 PPB | trace | | | | | trace |
| $CO_2$ | | trace | 563 PPB | 40 PPB | | | 0.321 | | |
| CO | | | | | | | | | |
| $O_2$ | | 336 PPB | 336 PPB | 473 PPB | | | 0.11 | | |
| $N_2$ | | 844 PPB | 844 PPB | 1 PPM | | | 0.53 | | |
| $CaCl_2$ | | | | | 1 | | | | |
| $Ca(OH)_2$ | | | | | | | | | |
| $CaCO_3$ | | | | | | | | | |
| $Mg(OH)_2$ | | | | | | | | | |
| $Mg(OH)Cl$ | | | | | | | | | |
| $MgCl_2$ | | | | | | | | | |
| $MgCO_3$ | | | | | | | | | |
| $Ca(O)Cl_2$ | | | | | | | | | |
| $CaCl_2O_2$ | | | | | | | | | |
| $Ca^{2+}$ | | 48 PPM | trace | 67 PPM | | | | | |
| $Mg^{2+}$ | 0.209 | 0.089 | 0.089 | 0.103 | | | | | 0.209 |
| $H^+$ | 1 PPB | trace | trace | trace | | | | trace | 5 PPB |
| $CAOH^+$ | | 1 PPB | trace | 1 PPB | | | | | |
| $MgOH^+$ | 432 PPM | 95 PPM | 108 PPM | 219 PPM | | | | | 384 PPM |
| HClO | | | | | | | | | |
| $MgCO_3$—3W | | | | | | | | | |
| $MgCl_2(s)$ | | | | | | | | | |
| $MgCl_2$—6W | | | | 0.186 | | | | | |
| $MgCl_2$—4W | | | | | | | | | |
| $CaCl_2(s)$ | | | | | | | | | |
| $CaCO_3(s)$ | | | | 0.121 | | 1 | | | |
| $MgCO_3(s)$ | | 1 PPM | | | | | | | |
| $CaCl_2$—6W | | | 262 PPM | | | | | | |
| $CaCl_2$—4W | | | | | | | | | |
| $CaCl_2$—2W | | | | | | | | | |
| $MgCl_2$—2W | | | | | | | | | |
| $MgCl_2$—W | | | | | | | | | |

TABLE 2a-continued

Mass and Energy Accounting for Simulation of Capture $CO_2$ from Flue Gas Using $CaCl_2$ to form $CaCO_3$.

| | Process Stream Names | | | | | | | | |
|---|---|---|---|---|---|---|---|---|---|
| | 1 | 2 | 3 | BOTTOMS | $CaCl_2$ | $CaCO_3$ | FG-IN | $H_2O$ | $H_2O$—MgOH |
| $Ca(OH)_2(s)$ | | | | | | | | | |
| $Mg(OH)_2(s)$ | 0.153 | 43 PPM | 34 PPM | 691 PPB | | | | | 0.153 |
| $ClO^-$ | | | | | | | | | |
| $HCO_3^-$ | | 5 PPB | trace | 1 PPM | | | | | |
| $Cl^-$ | 0.61 | 0.261 | 0.261 | 0.302 | | | | | 0.61 |
| $OH^-$ | trace | 6 PPB | 6 PPB | trace | | | | 2 PPB | trace |
| $CO_3^{2-}$ | | trace | trace | 12 PPB | | | | | |
| $H_2O$ | 81.774 | 5863.026 | 5861.857 | 1847.398 | | | 41.661 | 2220.337 | 81.773 |
| $H_2$ | | | | | | | | | |
| $Cl_2$ | | | | | | | | | |
| HCl | trace | trace | <0.001 | trace | | | | | trace |
| $CO_2$ | | trace | 0.002 | <0.001 | | | 139.929 | | |
| CO | | | | | | | | | |
| $O_2$ | | 0.002 | 0.002 | 0.002 | | | 66.155 | | |
| $N_2$ | | 0.005 | 0.005 | 0.005 | | | 363.408 | | |
| $CaCl_2$ | | | | | 139.697 | | | | |
| $Ca(OH)_2$ | | | | | | | | | |
| $CaCO_3$ | | | | | | | | | |
| $Mg(OH)_2$ | | | | | | | | | |
| $Mg(OH)Cl$ | | | | | | | | | |
| $MgCl_2$ | | | | | | | | | |
| $MgCO_3$ | | | | | | | | | |
| $Ca(O)Cl_2$ | | | | | | | | | |
| $CaCl_2O_2$ | | | | | | | | | |
| $Ca^{2+}$ | | 0.195 | trace | 0.195 | | | | | |
| $Mg^{2+}$ | 457.328 | 596.922 | 596.894 | 491.376 | | | | | 457.358 |
| $H^+$ | <0.001 | trace | trace | trace | | | | trace | <0.001 |
| $CAOH^+$ | | trace | trace | trace | | | | | |
| $MgOH^+$ | 0.556 | 0.372 | 0.426 | 0.613 | | | | | 0.495 |
| HClO | | | | | | | | | |
| $MgCO_3$—3W | | | | | | | | | |
| $MgCl_2(s)$ | | | | | | | | | |
| $MgCl_2$—6W | | | | 105.426 | | | | | |
| $MgCl_2$—4W | | | | | | | | | |
| $CaCl_2(s)$ | | | | | | | | | |
| $CaCO_3(s)$ | | | | 139.502 | | 139.502 | | | |
| $MgCO_3(s)$ | | 0.002 | | | | | | | |
| $CaCl_2$—6W | | | 0.195 | | | | | | |
| $CaCl_2$—4W | | | | | | | | | |
| $CaCl_2$—2W | | | | | | | | | |
| $MgCl_2$—2W | | | | | | | | | |
| $MgCl_2$—W | | | | | | | | | |
| $Ca(OH)_2(s)$ | | | | | | | | | |
| $Mg(OH)_2(s)$ | 139.533 | 0.121 | 0.096 | 0.001 | | | | | 139.564 |
| $ClO^-$ | | | | | | | | | |
| $HCO_3^-$ | | <0.001 | trace | 0.002 | | | | | |
| $Cl^-$ | 915.211 | 1194.604 | 1194.215 | 983.753 | | | | | 915.211 |
| $OH^-$ | trace | <0.001 | <0.001 | trace | | | | trace | trace |
| $CO_3^{2-}$ | | trace | trace | <0.001 | | | | | |
| $H_2O$ | 0.051 | 0.766 | 0.766 | 0.518 | | | 0.068 | 1 | 0.051 |
| $H_2$ | | | | | | | | | |
| $Cl_2$ | | | | | | | | | |
| HCl | trace | trace | 2 PPB | trace | | | | | trace |
| $CO_2$ | | trace | 271 PPB | 29 PPB | | | 0.229 | | |
| CO | | | | | | | | | |
| $O_2$ | | 223 PPB | 223 PPB | 478 PPB | | | 0.108 | | |
| $N_2$ | | 640 PPB | 640 PPB | 1 PPM | | | 0.595 | | |
| $CaCl_2$ | | | | | 1 | | | | |
| $Ca(OH)_2$ | | | | | | | | | |
| $CaCO_3$ | | | | | | | | | |
| $Mg(OH)_2$ | | | | | | | | | |
| $Mg(OH)Cl$ | | | | | | | | | |
| $MgCl_2$ | | | | | | | | | |
| $MgCO_3$ | | | | | | | | | |
| $Ca(O)Cl_2$ | | | | | | | | | |
| $CaCl_2O_2$ | | | | | | | | | |
| $Ca^{2+}$ | | 25 PPM | trace | 55 PPM | | | | | |
| $Mg^{2+}$ | 0.287 | 0.078 | 0.078 | 0.138 | | | | | 0.287 |
| $H^+$ | 49 PPB | trace | trace | trace | | | | 2 PPB | 156 PPB |
| $CaOH^+$ | | trace | trace | trace | | | | | |
| $MgOH^+$ | 349 PPM | 49 PPM | 56 PPM | 172 PPM | | | | | 310 PPM |
| HClO | | | | | | | | | |
| $MgCO_3$—3W | | | | | | | | | |
| $MgCl_2(s)$ | | | | | | | | | |

TABLE 2a-continued

Mass and Energy Accounting for Simulation of Capture $CO_2$ from Flue Gas Using $CaCl_2$ to form $CaCO_3$.

| | Process Stream Names | | | | | | | | |
|---|---|---|---|---|---|---|---|---|---|
| | 1 | 2 | 3 | BOTTOMS | $CaCl_2$ | $CaCO_3$ | FG-IN | $H_2O$ | $H_2O$—MgOH |
| $MgCl_2$—6W | | | | 0.03 | | | | | |
| $MgCl_2$—4W | | | | | | | | | |
| $CaCl_2(s)$ | | | | | | | | | |
| $CaCO_3(s)$ | | | | 0.039 | | 1 | | | |
| $MgCO_3(s)$ | | 269 PPB | | | | | | | |
| $CaCl_2$—6W | | | 25 PPM | | | | | | |
| $CaCl_2$—4W | | | | | | | | | |
| $CaCl_2$—2W | | | | | | | | | |
| $MgCl_2$—2W | | | | | | | | | |
| $MgCl_2$—W | | | | | | | | | |
| $Ca(OH)_2(s)$ | | | | | | | | | |
| $Mg(OH)_2(s)$ | 0.088 | 16 PPM | 12 PPM | 383 PPB | | | | | 0.088 |
| $ClO^-$ | | | | | | | | | |
| $HCO_3^-$ | | 2 PPB | trace | 547 PPB | | | | | |
| $Cl^-$ | 0.574 | 0.156 | 0.156 | 0.276 | | | | | 0.574 |
| $OH^-$ | 1 PPB | 8 PPB | 7 PPB | trace | | | | 2 PPB | 1 PPB |
| $CO_3^{2-}$ | | trace | trace | 6 PPB | | | | | |
| PH | 5.319 | 6.955 | 5.875 | 7.557 | | | | 6.999 | 5.152 |

TABLE 2b

Mass and Energy Accounting for Simulation of Capture $CO_2$ from Flue Gas Using $CaCl_2$ to form $CaCO_3$.

| | Process Stream Names | | | | | |
|---|---|---|---|---|---|---|
| | $H_2O$—IN | $HCl$—$H_2O$ | Mg—$CaCl_2$ | MgOH—O1 | RETURN | RX3-VENT |
| Temperature F. | 77 | 536 | 250 | 286.8 | 95 | 95 |
| Pressure psia | 15 | 15 | 15 | 15 | 15 | 15 |
| Vapor Frac | 0 | 1 | 0.025 | 0.021 | 0 | 1 |
| Mole Flow lbmol/hr | 3383.073 | 5781.846 | 7655.866 | 3814.738 | 3427.371 | 433.305 |
| Mass Flow lb/hr | 60947 | 109319.3 | 162515 | 93195.71 | 101567.8 | 12375.59 |
| Volume Flow gal/min | 122.063 | 512251.6 | 12240.14 | 5364.891 | 104.123 | 21428.56 |
| Enthalpy MMBtu/hr | −415.984 | −561.862 | −909.177 | −487.581 | −502.044 | −0.364 |
| $H_2O$ | 60947 | 99124.11 | 105634.7 | 41473.17 | 33262.52 | 59.861 |
| $H_2$ | | | | | | |
| $Cl_2$ | | | | | | |
| HCl | | 10195.18 | 0.087 | 0.009 | trace | trace |
| $CO_2$ | | | | | trace | 18.689 |
| CO | | | | | | |
| $O_2$ | | | | | 0.055 | 2116.839 |
| $N_2$ | | | | | 0.137 | 10180.2 |
| $CaCl_2$ | | | | | | |
| $Ca(OH)_2$ | | | | | | |
| $CaCO_3$ | | | | | | |
| $Mg(OH)_2$ | | | | | | |
| $Mg(OH)Cl$ | | | | | | |
| $MgCl_2$ | | | | | | |
| $MgCO_3$ | | | | | | |
| $Ca(O)Cl_2$ | | | | | | |
| $CaCl_2O_2$ | | | | | | |
| $Ca^{2+}$ | | | | | 7.797 | |
| $Mg^{2+}$ | | | 14519.48 | 11116.3 | 11938.09 | |
| $H^+$ | trace | | <0.001 | trace | trace | |
| $CaOH^+$ | | | | | <0.001 | |
| $MgOH^+$ | | | 0.112 | 17.999 | 25.309 | |
| HClO | | | | | | |
| $MgCO_3$—3W | | | | | | |
| $MgCl_2(s)$ | | | | | | |
| $MgCl_2$—6W | | | | | 21468.81 | |
| $MgCl_2$—4W | | | | | | |
| $CaCl_2(s)$ | | | | | | |
| $CaCO_3(s)$ | | | | | | |
| $MgCO_3(s)$ | | | | | 0.175 | |
| $CaCl_2$—6W | | | | | | |
| $CaCl_2$—4W | | | | | | |
| $CaCl_2$—2W | | | | | | |

TABLE 2b-continued

Mass and Energy Accounting for Simulation of Capture $CO_2$ from Flue Gas Using $CaCl_2$ to form $CaCO_3$.

| | Process Stream Names | | | | | |
|---|---|---|---|---|---|---|
| | $H_2O$—IN | HCl—$H_2O$ | Mg—$CaCl_2$ | MgOH—O1 | RETURN | RX3-VENT |
| $MgCl_2$—2W | | | | | | |
| $MgCl_2$—W | | | | | | |
| $Ca(OH)_2(s)$ | | | | | | |
| $Mg(OH)_2(s)$ | | | | 8141.025 | 0.024 | |
| $ClO^-$ | | | | | | |
| $HCO_3^-$ | | | | | trace | |
| $Cl^-$ | | | 42360.62 | 32447.2 | 34864.84 | |
| $OH^-$ | <0.001 | | trace | <0.001 | <0.001 | |
| $CO_3^{2-}$ | | | | | trace | |
| Mass Frac | | | | | | |
| $H_2O$ | 1 | 0.907 | 0.65 | 0.445 | 0.327 | 0.005 |
| $H_2$ | | | | | | |
| $Cl_2$ | | | | | | |
| HCl | | 0.093 | 534 PPB | 92 PPB | trace | trace |
| $CO_2$ | | | | | trace | 0.002 |
| CO | | | | | | |
| $O_2$ | | | | | 538 PPB | 0.171 |
| $N_2$ | | | | | 1 PPM | 0.823 |
| $CaCl_2$ | | | | | | |
| $Ca(OH)_2$ | | | | | | |
| $CaCO_3$ | | | | | | |
| $Mg(OH)_2$ | | | | | | |
| $Mg(OH)Cl$ | | | | | | |
| $MgCl_2$ | | | | | | |
| $MgCO_3$ | | | | | | |
| $Ca(O)Cl_2$ | | | | | | |
| $CaCl_2O_2$ | | | | | | |
| $Ca^{2+}$ | | | | | 77 PPM | |
| $Mg^{2+}$ | | | 0.089 | 0.119 | 0.118 | |
| $H^+$ | trace | | 2 PPB | trace | trace | |
| $CaOH^+$ | | | | | 1 PPB | |
| $MgOH^+$ | | | 689 PPB | 193 PPM | 249 PPM | |
| HClO | | | | | | |
| $MgCO_3$—3W | | | | | | |
| $MgCl_2(s)$ | | | | | | |
| $MgCl_2$—6W | | | | | 0.211 | |
| $MgCl_2$—4W | | | | | | |
| $CaCl_2(s)$ | | | | | | |
| $CaCO_3(s)$ | | | | | | |
| $MgCO_3(s)$ | | | | | 2 PPM | |
| $CaCl_2$—6W | | | | | | |
| $CaCl_2$—4W | | | | | | |
| $CaCl_2$—2W | | | | | | |
| $MgCl_2$—2W | | | | | | |
| $MgCl_2$—W | | | | | | |
| $Ca(OH)_2(s)$ | | | | | | |
| $Mg(OH)_2(s)$ | | | | 0.087 | 240 PPB | |
| $ClO^-$ | | | | | | |
| $HCO_3^-$ | | | | | trace | |
| $Cl^-$ | | | 0.261 | 0.348 | 0.343 | |
| $OH^-$ | 2 PPB | | trace | 2 PPB | trace | |
| $CO_3^{2-}$ | | | | | trace | |
| $H_2O$ | 3383.073 | 5502.224 | 5863.617 | 2302.111 | 1846.35 | 3.323 |
| $H_2$ | | | | | | |
| $Cl_2$ | | | | | | |
| HCl | | 279.622 | 0.002 | <0.001 | trace | trace |
| $CO_2$ | | | | | trace | 0.425 |
| CO | | | | | | |
| $O_2$ | | | | | 0.002 | 66.154 |
| $N_2$ | | | | | 0.005 | 363.404 |
| $CaCl_2$ | | | | | | |
| $Ca(OH)_2$ | | | | | | |
| $CaCO_3$ | | | | | | |
| $Mg(OH)_2$ | | | | | | |
| $Mg(OH)Cl$ | | | | | | |
| $MgCl_2$ | | | | | | |
| $MgCO_3$ | | | | | | |
| $Ca(O)Cl_2$ | | | | | | |
| $CaCl_2O_2$ | | | | | | |
| $Ca^{2+}$ | | | | | 0.195 | |
| $Mg^{2+}$ | | | 597.414 | 457.388 | 491.201 | |
| $H^+$ | trace | | <0.001 | trace | trace | |
| $CaOH^+$ | | | | | trace | |

TABLE 2b-continued

Mass and Energy Accounting for Simulation of Capture $CO_2$ from Flue Gas Using $CaCl_2$ to form $CaCO_3$.

| | Process Stream Names | | | | | |
|---|---|---|---|---|---|---|
| | $H_2O$—IN | HCl—$H_2O$ | Mg—$CaCl_2$ | MgOH—O1 | RETURN | RX3-VENT |
| $MgOH^+$ | | | 0.003 | 0.436 | 0.613 | |
| HClO | | | | | | |
| $MgCO_3$—3W | | | | | | |
| $MgCl_2(s)$ | | | | | | |
| $MgCl_2$—6W | | | | | 105.601 | |
| $MgCl_2$—4W | | | | | | |
| $CaCl_2(s)$ | | | | | | |
| $CaCO_3(s)$ | | | | | | |
| $MgCO_3(s)$ | | | | | 0.002 | |
| $CaCl_2$—6W | | | | | | |
| $CaCl_2$—4W | | | | | | |
| $CaCl_2$—2W | | | | | | |
| $MgCl_2$—2W | | | | | | |
| $MgCl_2$—W | | | | | | |
| $Ca(OH)_2(s)$ | | | | | | |
| $Mg(OH)_2(s)$ | | | | 139.593 | <0.001 | |
| $ClO^-$ | | | | | | |
| $HCO_3^-$ | | | | | trace | |
| $Cl^-$ | | | 1194.83 | 915.211 | 983.403 | |
| $OH^-$ | trace | | trace | trace | trace | |
| $CO_3^{2-}$ | | | | | trace | |
| $H_2O$ | 1 | 0.952 | 0.766 | 0.603 | 0.539 | 0.008 |
| $H_2$ | | | | | | |
| $Cl_2$ | | | | | | |
| HCl | | 0.048 | 311 PPB | 62 PPB | trace | trace |
| $CO_2$ | | | | | trace | 980 PPM |
| CO | | | | | | |
| $O_2$ | | | | | 498 PPB | 0.153 |
| $N_2$ | | | | | 1 PPM | 0.839 |
| $CaCl_2$ | | | | | | |
| $Ca(OH)_2$ | | | | | | |
| $CaCO_3$ | | | | | | |
| $Mg(OH)_2$ | | | | | | |
| $Mg(OH)Cl$ | | | | | | |
| $MgCl_2$ | | | | | | |
| $MgCO_3$ | | | | | | |
| $Ca(O)Cl_2$ | | | | | | |
| $CaCl_2O_2$ | | | | | | |
| $Ca^{2+}$ | | | | | 57 PPM | |
| $Mg^{2+}$ | | | 0.078 | 0.12 | 0.143 | |
| $H^+$ | 2 PPB | | 43 PPB | trace | trace | |
| $CaOH^+$ | | | | | trace | |
| $MgOH^+$ | | | 354 PPB | 114 PPM | 179 PPM | |
| HClO | | | | | | |
| $MgCO_3$—3W | | | | | | |
| $MgCl_2(s)$ | | | | | | |
| $MgCl_2$—6W | | | | | 0.031 | |
| $MgCl_2$—4W | | | | | | |
| $CaCl_2(s)$ | | | | | | |
| $CaCO_3(s)$ | | | | | | |
| $MgCO_3(s)$ | | | | | 607 PPB | |
| $CaCl_2$—6W | | | | | | |
| $CaCl_2$—4W | | | | | | |
| $CaCl_2$—2W | | | | | | |
| $MgCl_2$—2W | | | | | | |
| $MgCl_2$—W | | | | | | |
| $Ca(OH)_2(s)$ | | | | | | |
| $Mg(OH)_2(s)$ | | | | 0.037 | 122 PPB | |
| $ClO^-$ | | | | | | |
| $HCO_3^-$ | | | | | trace | |
| $Cl^-$ | | | 0.156 | 0.24 | 0.287 | |
| $OH^-$ | 2 PPB | | trace | 2 PPB | trace | |
| $CO_3^{2-}$ | | | | | trace | |
| PH | 6.999 | | 3.678 | 5.438 | 7.557 | |

Example 2

(Case 1)—Process Simulation of Magnesium Ion Catalyzed Capture CO₂ from Flue Gas Using CaCl₂ to form CaCO₃

Results from the simulation suggest that it is efficient to heat a MgCl₂.6H₂O stream in three separate dehydration reactions, each in its own chamber, followed by a decomposition reaction, also in its own chamber, to form Mg(OH)Cl and HCl, i.e. total of four chambers. The Mg(OH)Cl is reacted with H₂O to form MgCl₂ and Mg(OH)₂, which then reacts with a saturated CaCl₂/H₂O solution and CO₂ from the flue gas to form CaCO₃, which is filtered out of the stream. The resulting MgCl₂.6H₂O formed is recycled along with the earlier product to the first reactor to begin the process again.

This process is not limited to any particular source for CaCl₂. For example, it may be obtained from reacting calcium silicate with HCl to yield CaCl₂.

Constraints and parameters specified for this simulation include:

The reactions were run at 100% efficiencies with no losses. The simulations can be modified when pilot runs determine the reaction efficiencies.

Simulations did not account for impurities in the CaCl₂ feed stock or in any make-up MgCl₂ required due to losses from the system.

Figure 6:
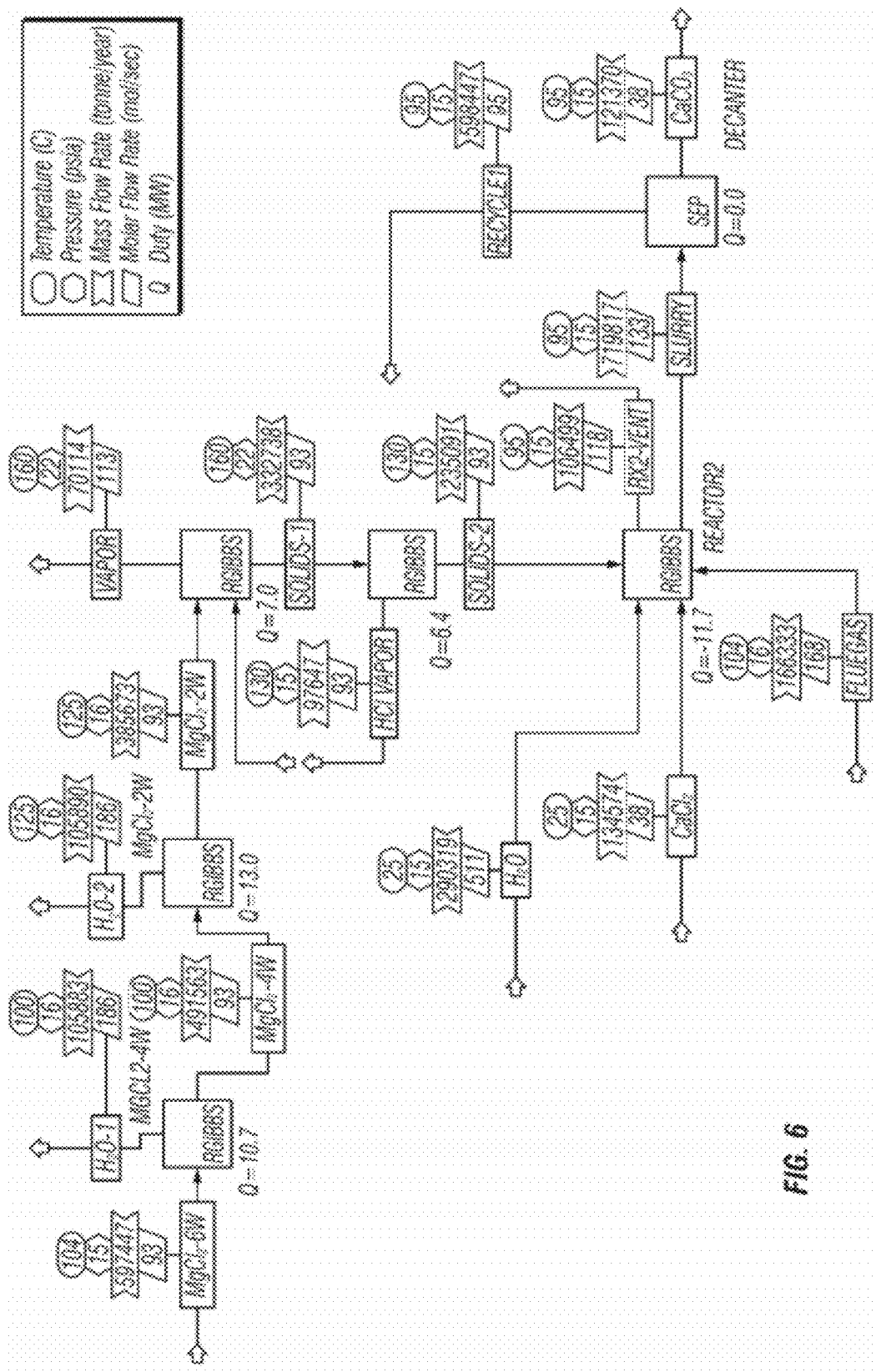
FIG. 6 is a process flow diagram showing parameters and results from a process simulation using Aspen Plus process software. The net reaction is the capture of $CO_2$ from flue gas using inexpensive raw materials, $CaCl_2$ and water, to form $CaCO_3$. In this embodiment, the hexahydrate is dehydrated in three separate chambers and decomposed in the fourth chamber where the HCl that is formed from the decomposition is recirculated back to the third chamber to prevent any side reactions. Reactions occurring in these chambers include the following.

Part of the defined parameters include the process flow diagram shown in FIG. 6.

The results of this simulation indicate a preliminary net energy consumption of 5946 kwh/tonne CO₂. Table 3 provides mass and energy accounting for the various streams of the simulated process. Each stream corresponds to the stream of FIG. 6.

The process consists of two primary reactors and one solids filtration section. The first reactor heats MgCl₂.6H₂O causing it to break down into a HCl/H₂O vapor stream and a solid stream of Mg(OH)Cl. The HCl/H₂O vapor stream is sent to a heat exchanger to recover extra heat. The Mg(OH)₂ formed from the Mg(OH)Cl is sent to reactor 2 for further processing. Chemical reaction(s) occurring in this reactor include the following:

$$MgCl_2.6H_2O + \Delta \rightarrow Mg(OH)Cl + 5H_2O\uparrow + HCl\uparrow \quad (32)$$

$$2Mg(OH)Cl(aq) \rightarrow Mg(OH)_2 + MgCl_2 \quad (33)$$

A CaCl₂ solution and a flue gas stream are added to the Mg(OH)₂ in reactor 2. This reaction forms CaCO₃, MgCl₂ and water. The CaCO₃ precipitates and is removed in a filter or decanter. The remaining MgCl₂ and water are recycled to the first reactor. Additional water is added to complete the water balance required by the first reactor. Chemical reaction(s) occurring in this reactor include the following:

$$Mg(OH)_2 + CaCl_2 + CO_2 \rightarrow CaCO_3\downarrow(s) + MgCl_2 + H_2O \quad (34)$$

The primary feeds to this process are CaCl₂, flue gas (CO₂) and water. MgCl₂ in the system is used, reformed and recycled. The only MgCl₂ make-up required is to replace small amounts that leave the system with the CaCO₃ product, and small amounts that leave with the HCl/water product.

This process is a net energy user. The amount of energy is under investigation and optimization. There is cross heat exchange to recover the heat in high temperature streams to preheat the feed streams.

The steps for this process (Case 1) are summarized below:

CASE 1
3 STEP Dehydration then Decomposition
Hexahydrate is dehydrated in 3 separate chambers. Step 1 hex to tetra, Step 2 tetra to di, Step 3 di to mono. Monohydrate is decomposed into 80% Mg(OH)Cl 20% MgCl₂ in a fourth chamber.

| | | |
|---|---:|---|
| CO₂ Absorbed | 53333 | MTPY |
| CaCl₂ | 134574 | MTPY |
| HCl Dry | 88368 | MTPY |
| CaCO₃ | 105989 | MTPY |
| Hexahydrate recycled | 597447 | MTPY |
| HEX TO TETRA (100° C.) | 1757 | kWh/tonne CO₂ |
| TETRA TO DI (125 C. °) | 2135 | kWh/tonne CO₂ |
| DI TO MONO (160° C. & HCl PP) | 1150 | kWh/tonne CO₂ |
| DECOMPOSITION (130° C.) TO 80% Mg(OH)Cl 20% MgCl₂ YIELDS 90% HCl VAPOR | 1051 | kWh/tonne CO₂ |
| | 0.9 | MW |
| Heat Recovery from 28% HCl vapor | 148 | kWh/tonne CO₂ |
| TOTAL | 5946 | kWh/tonne CO₂ |

TABLE 3a

Mass and Energy Accounting for Case 1 Simulation.

| | \multicolumn{8}{c}{Process Stream Names} |
|---|---|---|---|---|---|---|---|---|
| | CaCl₂ | CaCO₃ | FLUEGAS | H₂O | H₂O-1 | H₂O-2 | HCl-PP | HCl VAPOR |
| Temperature C. | 25 | 95 | 104 | 25 | 100 | 125 | 160 | 130 |
| Pressure psia | 14.7 | 14.7 | 15.78 | 14.7 | 16.166 | 16.166 | 16.166 | 14.696 |
| Mass VFrac | 0 | 0 | 1 | 0 | 1 | 1 | 1 | 1 |
| Mass SFrac | 1 | 1 | 0 | 0 | 0 | 0 | 0 | 0 |
| Mass Flow tonne/year | 134573.943 | 121369.558 | 166332.6 | 290318.99 | 105883.496 | 105890.399 | 17179.526 | 97647.172 |
| Volume Flow gal/min | 30.929 | 22.514 | 76673.298 | 8099.644 | 82228.086 | 87740.919 | 10242.935 | 48861.42 |
| Enthalpy MW | −30.599 | −46.174 | −17.479 | −146.075 | −44.628 | −44.47 | −3.258 | −10.757 |
| Density lb/cuft | 136.522 | 169.146 | 0.068 | 1.125 | 0.04 | 0.038 | 0.053 | 0.063 |
| H₂O | 0 | 0 | 6499.971 | 290318.99 | 105883.496 | 105885.779 | 5681.299 | 9278.695 |
| H₂ | 0 | 0 | 0 | 0 | 0 | 0 | 0 | 0 |
| Cl₂ | 0 | 0 | 0 | 0 | 0 | 0 | 0 | 0 |
| HCl | 0 | 0 | 0 | 0 | 0 | 4.62 | 11498.227 | 88368.477 |
| CO₂ | 0 | 0 | 53333.098 | 0 | 0 | 0 | 0 | 0 |
| CO | 0 | 0 | 0 | 0 | 0 | 0 | 0 | 0 |
| O₂ | 0 | 0 | 18333.252 | 0 | 0 | 0 | 0 | 0 |
| N₂ | 0 | 0 | 88166.278 | 0 | 0 | 0 | 0 | 0 |
| CaCl₂ | 134573.943 | 80.499 | 0 | 0 | 0 | 0 | 0 | 0 |
| Ca(OH)₂ | 0 | 0 | 0 | 0 | 0 | 0 | 0 | 0 |
| CaCO₃ | 0 | 121289.059 | 0 | 0 | 0 | 0 | 0 | 0 |
| MgCO₃ | 0 | 0 | 0 | 0 | 0 | 0 | 0 | 0 |

TABLE 3a-continued

Mass and Energy Accounting for Case 1 Simulation.

Process Stream Names

| | CaCl$_2$ | CaCO$_3$ | FLUEGAS | H$_2$O | H$_2$O-1 | H$_2$O-2 | HCl-PP | HCl VAPOR |
|---|---|---|---|---|---|---|---|---|
| Ca(O)Cl$_2$ | 0 | 0 | 0 | 0 | 0 | 0 | 0 | 0 |
| MgCl$_2$ | 0 | 0 | 0 | 0 | 0 | 0 | 0 | 0 |
| MgCl$_2$*W | 0 | 0 | 0 | 0 | 0 | 0 | 0 | 0 |
| MgCl$_2$*2W | 0 | 0 | 0 | 0 | 0 | 0 | 0 | 0 |
| MgCl$_2$*4W | 0 | 0 | 0 | 0 | 0 | 0 | 0 | 0 |
| MgCl$_2$*6W | 0 | 0 | 0 | 0 | 0 | 0 | 0 | 0 |
| Mg(OH)Cl | 0 | 0 | 0 | 0 | 0 | 0 | 0 | 0 |
| Mg(OH)$_2$ | 0 | 0 | 0 | 0 | 0 | 0 | 0 | 0 |
| MgO | 0 | 0 | 0 | 0 | 0 | 0 | 0 | 0 |
| MgHCO$_3^+$ | 0 | 0 | 0 | 0 | 0 | 0 | 0 | 0 |
| H$_2$O | 0 | 0 | 0.039 | 1 | 1 | 1 | 0.331 | 0.095 |
| H$_2$ | 0 | 0 | 0 | 0 | 0 | 0 | 0 | 0 |
| Cl$_2$ | 0 | 0 | 0 | 0 | 0 | 0 | 0 | 0 |
| HCl | 0 | 0 | 0 | 0 | 0 | 0 | 0.669 | 0.905 |
| CO$_2$ | 0 | 0 | 0.321 | 0 | 0 | 0 | 0 | 0 |
| CO | 0 | 0 | 0 | 0 | 0 | 0 | 0 | 0 |
| O$_2$ | 0 | 0 | 0.11 | 0 | 0 | 0 | 0 | 0 |
| N$_2$ | 0 | 0 | 0.53 | 0 | 0 | 0 | 0 | 0 |
| CaCl$_2$ | 1 | 0.001 | 0 | 0 | 0 | 0 | 0 | 0 |
| Ca(OH)$_2$ | 0 | 0 | 0 | 0 | 0 | 0 | 0 | 0 |
| CaCO$_3$ | 0 | 0.999 | 0 | 0 | 0 | 0 | 0 | 0 |
| MgCO$_3$ | 0 | 0 | 0 | 0 | 0 | 0 | 0 | 0 |
| Ca(O)Cl$_2$ | 0 | 0 | 0 | 0 | 0 | 0 | 0 | 0 |
| MgCl$_2$ | 0 | 0 | 0 | 0 | 0 | 0 | 0 | 0 |
| MgCl$_2$*W | 0 | 0 | 0 | 0 | 0 | 0 | 0 | 0 |
| MgCl$_2$*2W | 0 | 0 | 0 | 0 | 0 | 0 | 0 | 0 |
| MgCl$_2$*4W | 0 | 0 | 0 | 0 | 0 | 0 | 0 | 0 |
| MgCl$_2$*6W | 0 | 0 | 0 | 0 | 0 | 0 | 0 | 0 |
| Mg(OH)Cl | 0 | 0 | 0 | 0 | 0 | 0 | 0 | 0 |
| Mg(OH)$_2$ | 0 | 0 | 0 | 0 | 0 | 0 | 0 | 0 |
| MgO | 0 | 0 | 0 | 0 | 0 | 0 | 0 | 0 |
| MgHCO$_3^+$ | 0 | 0 | 0 | 0 | 0 | 0 | 0 | 0 |
| H$_2$O | 0 | 0 | 11.441 | 511.008 | 186.372 | 186.376 | 10 | 16.332 |
| H$_2$ | 0 | 0 | 0 | 0 | 0 | 0 | 0 | 0 |
| Cl$_2$ | 0 | 0 | 0 | 0 | 0 | 0 | 0 | 0 |
| HCl | 0 | 0 | 0 | 0 | 0 | 0.004 | 10 | 76.854 |
| CO$_2$ | 0 | 0 | 38.427 | 0 | 0 | 0 | 0 | 0 |
| CO | 0 | 0 | 0 | 0 | 0 | 0 | 0 | 0 |
| O$_2$ | 0 | 0 | 18.168 | 0 | 0 | 0 | 0 | 0 |
| N$_2$ | 0 | 0 | 99.8 | 0 | 0 | 0 | 0 | 0 |
| CaCl$_2$ | 38.45 | 0.023 | 0 | 0 | 0 | 0 | 0 | 0 |
| Ca(OH)$_2$ | 0 | 0 | 0 | 0 | 0 | 0 | 0 | 0 |
| CaCO$_3$ | 0 | 38.427 | 0 | 0 | 0 | 0 | 0 | 0 |
| MgCO$_3$ | 0 | 0 | 0 | 0 | 0 | 0 | 0 | 0 |
| Ca(O)Cl$_2$ | 0 | 0 | 0 | 0 | 0 | 0 | 0 | 0 |
| MgCl$_2$ | 0 | 0 | 0 | 0 | 0 | 0 | 0 | 0 |
| MgCl$_2$*W | 0 | 0 | 0 | 0 | 0 | 0 | 0 | 0 |
| MgCl$_2$*2W | 0 | 0 | 0 | 0 | 0 | 0 | 0 | 0 |
| MgCl$_2$*4W | 0 | 0 | 0 | 0 | 0 | 0 | 0 | 0 |
| MgCl$_2$*6W | 0 | 0 | 0 | 0 | 0 | 0 | 0 | 0 |
| Mg(OH)Cl | 0 | 0 | 0 | 0 | 0 | 0 | 0 | 0 |
| Mg(OH)$_2$ | 0 | 0 | 0 | 0 | 0 | 0 | 0 | 0 |
| MgO | 0 | 0 | 0 | 0 | 0 | 0 | 0 | 0 |
| MgHCO$_3^+$ | 0 | 0 | 0 | 0 | 0 | 0 | 0 | 0 |

TABLE 3b

Mass and Energy Accounting for Case 1 Simulation.

Process Stream Names

| | MgCl$_2$—2W | MgCl$_2$—4W | MgCl$_2$—6W | RECYCIE1 | RX2-VENT | SLURRY | SOLIDS-1 | SOLIDS-2 | VAPOR |
|---|---|---|---|---|---|---|---|---|---|
| Temperature ° C. | 125 | 100 | 104 | 95 | 95 | 95 | 160 | 130 | 160 |
| Pressure psia | 16.166 | 16.166 | 14.696 | 14.7 | 14.7 | 14.7 | 22.044 | 14.696 | 22.044 |
| Mass VFrac | 0 | 0 | 0 | 0 | 1 | 0 | 0 | 0 | 1 |
| Mass SFrac | 1 | 1 | 1 | 0.998 | 0 | 0.999 | 1 | 1 | 0 |
| Mass Flow tonne/year | 385672.688 | 491563.087 | 597446.583 | 598447.468 | 106499.178 | 719817.026 | 332737.843 | 235090.671 | 70114.371 |
| Volume Flow gal/min | 39.902 | 39.902 | 116.892 | 147.062 | 56469.408 | 167.321 | 39.902 | 43.473 | 42506.729 |
| Enthalpy MW | −117.767 | −175.272 | −230.554 | −231.312 | 0.241 | −277.487 | −88.626 | −71.431 | −25.379 |

TABLE 3b-continued

Mass and Energy Accounting for Case 1 Simulation.

| | Process Stream Names | | | | | | | | |
|---|---|---|---|---|---|---|---|---|---|
| | $MgCl_2$—2W | $MgCl_2$—4W | $MgCl_2$—6W | RECYCIE1 | RX2-VENT | SLURRY | SOLIDS-1 | SOLIDS-2 | VAPOR |
| Density lb/cuft | 303.274 | 386.542 | 160.371 | 127.684 | 0.059 | 134.984 | 261.649 | 169.678 | 0.052 |
| $H_2O$ | 0 | 0 | 0 | 1000 | 0 | 1000 | 0 | 0 | 58620.764 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0 | 0 | 0 | 0 | 0 | 0 | 0 | 0 | 11493.607 |
| $CO_2$ | 0 | 0 | 0 | 0 | 0.532 | 0 | 0 | 0 | 0 |
| CO | 0 | 0 | 0 | 0 | 0 | 0 | 0 | 0 | 0 |
| $O_2$ | 0 | 0 | 0 | 0.165 | 18333.088 | 0.165 | 0 | 0 | 0 |
| $N_2$ | 0 | 0 | 0 | 0.72 | 88165.558 | 0.72 | 0 | 0 | 0 |
| $CaCl_2$ | 0 | 0 | 0 | 0 | 0 | 80.499 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 121289.059 | 0 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 49037.72 | 0 |
| $MgCl_2$*W | 0 | 0 | 0 | 0 | 0 | 0 | 332737.843 | 0 | 0 |
| $MgCl_2$*2W | 385662.96 | 0 | 0 | 0 | 0 | 0 | 0 | 0 | 0 |
| $MgCl_2$*4W | 0 | 491563.087 | 0 | 0 | 0 | 0 | 0 | 0 | 0 |
| $MgCl_2$*6W | 0 | 0 | 597446.583 | 597446.583 | 0 | 597446.583 | 0 | 0 | 0 |
| Mg(OH)Cl | 9.728 | 0 | 0 | 0 | 0 | 0 | 0 | 186052.951 | 0 |
| $Mg(OH)_2$ | 0 | 0 | 0 | 0 | 0 | 0 | 0 | 0 | 0 |
| MgO | 0 | 0 | 0 | 0 | 0 | 0 | 0 | 0 | 0 |
| $MgHCO_3^+$ | 0 | 0 | 0 | 0 | 0 | 0 | 0 | 0 | 0 |
| $H_2O$ | 0 | 0 | 0 | 0.002 | 0 | 0.001 | 0 | 0 | 0.836 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0 | 0 | 0 | 0 | 0 | 0 | 0 | 0 | 0.164 |
| $CO_2$ | 0 | 0 | 0 | 0 | 0 | 0 | 0 | 0 | 0 |
| CO | 0 | 0 | 0 | 0 | 0 | 0 | 0 | 0 | 0 |
| $O_2$ | 0 | 0 | 0 | 0 | 0.172 | 0 | 0 | 0 | 0 |
| $N_2$ | 0 | 0 | 0 | 0 | 0.828 | 0 | 0 | 0 | 0 |
| $CaCl_2$ | 0 | 0 | 0 | 0 | 0 | 0 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 0.168 | 0 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0.209 | 0 |
| $MgCl_2$*W | 0 | 0 | 0 | 0 | 0 | 0 | 1 | 0 | 0 |
| $MgCl_2$*2W | 1 | 0 | 0 | 0 | 0 | 0 | 0 | 0 | 0 |
| $MgCl_2$*4W | 0 | 1 | 0 | 0 | 0 | 0 | 0 | 0 | 0 |
| $MgCl_2$*6W | 0 | 0 | 1 | 0.998 | 0 | 0.83 | 0 | 0 | 0 |
| Mg(OH)Cl | 0 | 0 | 0 | 0 | 0 | 0 | 0 | 0.791 | 0 |
| $Mg(OH)_2$ | 0 | 0 | 0 | 0 | 0 | 0 | 0 | 0 | 0 |
| MgO | 0 | 0 | 0 | 0 | 0 | 0 | 0 | 0 | 0 |
| $MgHCO_3^+$ | 0 | 0 | 0 | 0 | 0 | 0 | 0 | 0 | 0 |
| $H_2O$ | 0 | 0 | 0 | 1.76 | 0 | 1.76 | 0 | 0 | 103.182 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0 | 0 | 0 | 0 | 0 | 0 | 0 | 0 | 9.996 |
| $CO_2$ | 0 | 0 | 0 | 0 | 0 | 0 | 0 | 0 | 0 |
| CO | 0 | 0 | 0 | 0 | 0 | 0 | 0 | 0 | 0 |
| $O_2$ | 0 | 0 | 0 | 0 | 18.168 | 0 | 0 | 0 | 0 |
| $N_2$ | 0 | 0 | 0 | 0.001 | 99.799 | 0.001 | 0 | 0 | 0 |
| $CaCl_2$ | 0 | 0 | 0 | 0 | 0 | 0.023 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 38.427 | 0 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 16.332 | 0 |
| $MgCl_2$*W | 0 | 0 | 0 | 0 | 0 | 0 | 93.186 | 0 | 0 |
| $MgCl_2$*2W | 93.182 | 0 | 0 | 0 | 0 | 0 | 0 | 0 | 0 |
| $MgCl_2$*4W | 0 | 93.186 | 0 | 0 | 0 | 0 | 0 | 0 | 0 |
| $MgCl_2$*6W | 0 | 0 | 93.186 | 93.186 | 0 | 93.186 | 0 | 0 | 0 |
| Mg(OH)Cl | 0.004 | 0 | 0 | 0 | 0 | 0 | 0 | 76.854 | 0 |
| $Mg(OH)_2$ | 0 | 0 | 0 | 0 | 0 | 0 | 0 | 0 | 0 |
| MgO | 0 | 0 | 0 | 0 | 0 | 0 | 0 | 0 | 0 |
| $MgHCO_3^+$ | 0 | 0 | 0 | 0 | 0 | 0 | 0 | 0 | 0 |

Example 3

Process Simulation of Magnesium Ion Catalyzed Capture CO$_2$ from Flue Gas Using CaCl$_2$ to form CaCO$_3$ Part of the defined parameters includes the process flow diagram shown in FIG. 7. Results from the simulation suggest that it is efficient to heat a MgCl$_2$.6H$_2$O stream to form Mg(OH)Cl in two separate dehydration reactions, each in their own chambers followed by a decomposition reaction, also in its own chamber to form Mg(OH)Cl and HCl, i.e. a total of three chambers. The Mg(OH)Cl is reacted with H$_2$O to form MgCl$_2$ and Mg(OH)$_2$, which then reacts with a saturated CaCl$_2$/H$_2$O solution and CO$_2$ from the flue gas to form CaCO$_3$, which is filtered out of the stream. The resulting MgCl$_2$.6H$_2$O formed is recycled to the first reactor to begin the process again. This process is not limited to any particular source for CaCl$_2$. For example, it may be obtained from reacting calcium silicate with HCl to yield CaCl$_2$.

Constraints and parameters specified for this simulation include:

The reactions were run at 100% efficiencies with no losses. The simulations can be modified when pilot runs determine the reaction efficiencies.

Simulations did not account for impurities in the CaCl$_2$ feed stock or in any make-up MgCl$_2$ required due to losses from the system.

The results of this simulation indicate a preliminary net energy consumption of 4862 kwh/tonne CO$_2$. Table 4 provides mass and energy accounting for the various streams of the simulated process. Each stream corresponds to the stream in FIG. 7.

The process consists of two primary reactors and one solids filtration section. The first reactor heats MgCl$_2$.6H$_2$O causing it to break down into a HCl/H$_2$O vapor stream and a solid stream of Mg(OH)Cl. The HCl/H$_2$O vapor stream is sent to a heat exchanger to recover extra heat. The Mg(OH)$_2$ formed from the Mg(OH)Cl is sent to reactor 2 for further processing. Chemical reaction(s) occurring in this reactor include the following:

$$MgCl_2.6H_2O + \Delta \rightarrow Mg(OH)Cl + 5H_2O\uparrow HCl\uparrow \quad (35)$$

$$2Mg(OH)Cl(aq) \rightarrow Mg(OH)_2 + MgCl_2 \quad (36)$$

A CaCl$_2$ solution and a flue gas stream are added to the Mg(OH)$_2$ in reactor 2. This reaction forms CaCO$_3$, MgCl$_2$ and water. The CaCO$_3$ precipitates and is removed in a filter or decanter. The remaining MgCl$_2$ and water are recycled to the first reactor. Additional water is added to complete the water balance required by the first reactor. Chemical reaction(s) occurring in this reactor include the following:

$$Mg(OH)_2 + CaCl_2 + CO_2 \rightarrow CaCO_3\downarrow(s) + MgCl_2 + H_2O \quad (37)$$

The primary feeds to this process are CaCl$_2$, flue gas (CO$_2$) and water. MgCl$_2$ in the system is used, reformed and recycled. The only MgCl$_2$ make-up required is to replace small amounts that leave the system with the CaCO$_3$ product, and small amounts that leave with the HCl/water product.

This process is a net energy user. The amount of energy is under investigation and optimization. There is cross heat exchange to recover the heat in high temperature streams to preheat the feed streams.

The steps for this process (Case 2) are summarized below:

CASE 2
2 STEP Dehydration then Decomposition
Hexahydrate is dehydrated in 2 separate chambers. Step 1 hex to tetra, Step 2 tetra to di. Di-hydrate is decomposed into 100% Mg(OH)Cl.

| | | |
|---|---|---|
| CO$_2$ Absorbed | 53333 | MTPY |
| CaCl$_2$ | 134574 | MTPY |
| HCl Dry | 88368 | MTPY |
| CaCO$_3$ | 105989 | MTPY |
| Hexahydrate recycled | 492737 | MTPY |
| HEX TO TETRA (100° C.) | 1445 | kWh/tonne CO$_2$ |
| TETRA TO DI (125° C.) | 1774 | kWh/tonne CO$_2$ |
| DI-HYDRATE DEHYDRATION & DECOMPOSITION TO 100% Mg(OH)Cl (130° C.) YEILDS 66% HCl VAPOR NO CARRIER MgCl$_2$ = BETTER OVERALL EFFICIENCY NO USE OF HCl PP | 1790 | kWh/tonne CO$_2$ |
| | 0.9 | |
| Heat Recovery from 28% HCl vapor | 148 | kWh/tonne CO$_2$ |
| TOTAL | 4862 | kWh/tonne CO$_2$ |

TABLE 4a

Mass and Energy Accounting for Case 2 Simulation.

| | Process Stream Names | | | | |
|---|---|---|---|---|---|
| | 5 | 7 | 8 | CaCl$_2$ | CaCO$_3$ |
| Temperature ° C. | 98 | 114.1 | 101 | 25 | 95 |
| Pressure psia | 14.696 | 14.696 | 14.696 | 14.7 | 14.7 |
| Mass VFrac | 0 | 0 | 1 | 0 | 0 |
| Mass SFrac | 1 | 1 | 0 | 1 | 1 |
| Mass Flow tonne/year | 492736.693 | 405410.587 | 306683.742 | 134573.943 | 121369.558 |
| Volume Flow gal/min | 96.405 | 32.909 | 224394.519 | 30.929 | 22.514 |
| Enthalpy MW | −190.292 | −144.291 | −98.931 | −30.599 | −46.174 |
| Density lb/cuft | 160.371 | 386.542 | 0.043 | 136.522 | 169.146 |
| H$_2$O | 0 | 0 | 218315.265 | 0 | 0 |
| H$_2$ | 0 | 0 | 0 | 0 | 0 |
| Cl$_2$ | 0 | 0 | 0 | 0 | 0 |
| HCl | 0 | 0 | 88368.477 | 0 | 0 |
| CO$_2$ | 0 | 0 | 0 | 0 | 0 |
| CO | 0 | 0 | 0 | 0 | 0 |

TABLE 4a-continued

Mass and Energy Accounting for Case 2 Simulation.

| | | | | | |
|---|---|---|---|---|---|
| $O_2$ | 0 | 0 | 0 | 0 | 0 |
| $N_2$ | 0 | 0 | 0 | 0 | 0 |
| $CaCl_2$ | 0 | 0 | 0 | 134573.943 | 80.499 |
| $Ca(OH)_2$ | 0 | 0 | 0 | 0 | 0 |
| $CaCO_3$ | 0 | 0 | 0 | 0 | 121289.059 |
| $MgCO_3$ | 0 | 0 | 0 | 0 | 0 |
| $Ca(O)Cl_2$ | 0 | 0 | 0 | 0 | 0 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 405410.587 | 0 | 0 | 0 |
| $MgCl_2*6W$ | 492736.693 | 0 | 0 | 0 | 0 |
| $Mg(OH)Cl$ | 0 | 0 | 0 | 0 | 0 |
| $Mg(OH)_2$ | 0 | 0 | 0 | 0 | 0 |
| $MgO$ | 0 | 0 | 0 | 0 | 0 |
| $MgHCO_3^+$ | 0 | 0 | 0 | 0 | 0 |
| $H_2O$ | 0 | 0 | 0.712 | 0 | 0 |
| $H_2$ | 0 | 0 | 0 | 0 | 0 |
| $Cl_2$ | 0 | 0 | 0 | 0 | 0 |
| HCl | 0 | 0 | 0.288 | 0 | 0 |
| $CO_2$ | 0 | 0 | 0 | 0 | 0 |
| CO | 0 | 0 | 0 | 0 | 0 |
| $O_2$ | 0 | 0 | 0 | 0 | 0 |
| $N_2$ | 0 | 0 | 0 | 0 | 0 |
| $CaCl_2$ | 0 | 0 | 0 | 1 | 0.001 |
| $Ca(OH)_2$ | 0 | 0 | 0 | 0 | 0 |
| $CaCO_3$ | 0 | 0 | 0 | 0 | 0.999 |
| $MgCO_3$ | 0 | 0 | 0 | 0 | 0 |
| $Ca(O)Cl_2$ | 0 | 0 | 0 | 0 | 0 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 1 | 0 | 0 | 0 |
| $MgCl_2*6W$ | 1 | 0 | 0 | 0 | 0 |
| $Mg(OH)Cl$ | 0 | 0 | 0 | 0 | 0 |
| $Mg(OH)_2$ | 0 | 0 | 0 | 0 | 0 |
| $MgO$ | 0 | 0 | 0 | 0 | 0 |
| $MgHCO_3^+$ | 0 | 0 | 0 | 0 | 0 |
| $H_2O$ | 0 | 0 | 384.27 | 0 | 0 |
| $H_2$ | 0 | 0 | 0 | 0 | 0 |
| $Cl_2$ | 0 | 0 | 0 | 0 | 0 |
| HCl | 0 | 0 | 76.854 | 0 | 0 |
| $CO_2$ | 0 | 0 | 0 | 0 | 0 |
| CO | 0 | 0 | 0 | 0 | 0 |
| $O_2$ | 0 | 0 | 0 | 0 | 0 |
| $N_2$ | 0 | 0 | 0 | 0 | 0 |
| $CaCl_2$ | 0 | 0 | 0 | 38.45 | 0.023 |
| $Ca(OH)_2$ | 0 | 0 | 0 | 0 | 0 |
| $CaCO_3$ | 0 | 0 | 0 | 0 | 38.427 |
| $MgCO_3$ | 0 | 0 | 0 | 0 | 0 |
| $Ca(O)Cl_2$ | 0 | 0 | 0 | 0 | 0 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 76.854 | 0 | 0 | 0 |
| $MgCl_2*6W$ | 76.854 | 0 | 0 | 0 | 0 |
| $Mg(OH)Cl$ | 0 | 0 | 0 | 0 | 0 |
| $Mg(OH)_2$ | 0 | 0 | 0 | 0 | 0 |
| $MgO$ | 0 | 0 | 0 | 0 | 0 |
| $MgHCO_3^+$ | 0 | 0 | 0 | 0 | 0 |

| | Process Stream Names | | | | |
|---|---|---|---|---|---|
| | FLUEGAS | $H_2O$ | $H_2O$-1 | $H_2O$-2 | HCl Vapor |
| Temperature ° C. | 40 | 25 | 100 | 125 | 130 |
| Pressure psia | 15.78 | 14.7 | 14.696 | 22.044 | 14.696 |
| Mass VFrac | 1 | 0 | 1 | 1 | 1 |
| Mass SFrac | 0 | 0 | 0 | 0 | 0 |
| Mass Flow tonne/year | 166332.6 | 234646.82 | 87326.106 | 87329.947 | 132027.689 |
| Volume Flow gal/min | 63660.018 | 6546.44 | 74598.258 | 53065.241 | 80593.954 |
| Enthalpy MW | −17.821 | −118.063 | −36.806 | −36.675 | −25.187 |
| Density lb/cuft | 0.082 | 1.125 | 0.037 | 0.052 | 0.051 |
| $H_2O$ | 6499.971 | 234646.82 | 87326.106 | 87326.106 | 43663.053 |
| $H_2$ | 0 | 0 | 0 | 0 | 0 |
| $Cl_2$ | 0 | 0 | 0 | 0 | 0 |

TABLE 4a-continued

| Mass and Energy Accounting for Case 2 Simulation. | | | | | |
|---|---|---|---|---|---|
| HCl | 0 | 0 | 0 | 3.841 | 88364.636 |
| $CO_2$ | 53333.098 | 0 | 0 | 0 | 0 |
| CO | 0 | 0 | 0 | 0 | 0 |
| $O_2$ | 18333.252 | 0 | 0 | 0 | 0 |
| $N_2$ | 88166.278 | 0 | 0 | 0 | 0 |
| $CaCl_2$ | 0 | 0 | 0 | 0 | 0 |
| $Ca(OH)_2$ | 0 | 0 | 0 | 0 | 0 |
| $CaCO_3$ | 0 | 0 | 0 | 0 | 0 |
| $MgCO_3$ | 0 | 0 | 0 | 0 | 0 |
| $Ca(O)Cl_2$ | 0 | 0 | 0 | 0 | 0 |
| $MgCl_2$ | 0 | 0 | 0 | 0 | 0 |
| $MgCl_2 \ast W$ | 0 | 0 | 0 | 0 | 0 |
| $MgCl_2 \ast 2W$ | 0 | 0 | 0 | 0 | 0 |
| $MgCl_2 \ast 4W$ | 0 | 0 | 0 | 0 | 0 |
| $MgCl_2 \ast 6W$ | 0 | 0 | 0 | 0 | 0 |
| Mg(OH)Cl | 0 | 0 | 0 | 0 | 0 |
| $Mg(OH)_2$ | 0 | 0 | 0 | 0 | 0 |
| MgO | 0 | 0 | 0 | 0 | 0 |
| $MgHCO_3^+$ | 0 | 0 | 0 | 0 | 0 |
| $H_2O$ | 0.039 | 1 | 1 | 1 | 0.331 |
| $H_2$ | 0 | 0 | 0 | 0 | 0 |
| $Cl_2$ | 0 | 0 | 0 | 0 | 0 |
| HCl | 0 | 0 | 0 | 0 | 0.669 |
| $CO_2$ | 0.321 | 0 | 0 | 0 | 0 |
| CO | 0 | 0 | 0 | 0 | 0 |
| $O_2$ | 0.11 | 0 | 0 | 0 | 0 |
| $N_2$ | 0.53 | 0 | 0 | 0 | 0 |
| $CaCl_2$ | 0 | 0 | 0 | 0 | 0 |
| $Ca(OH)_2$ | 0 | 0 | 0 | 0 | 0 |
| $CaCO_3$ | 0 | 0 | 0 | 0 | 0 |
| $MgCO_3$ | 0 | 0 | 0 | 0 | 0 |
| $Ca(O)Cl_2$ | 0 | 0 | 0 | 0 | 0 |
| $MgCl_2$ | 0 | 0 | 0 | 0 | 0 |
| $MgCl_2 \ast W$ | 0 | 0 | 0 | 0 | 0 |
| $MgCl_2 \ast 2W$ | 0 | 0 | 0 | 0 | 0 |
| $MgCl_2 \ast 4W$ | 0 | 0 | 0 | 0 | 0 |
| $MgCl_2 \ast 6W$ | 0 | 0 | 0 | 0 | 0 |
| Mg(OH)Cl | 0 | 0 | 0 | 0 | 0 |
| $Mg(OH)_2$ | 0 | 0 | 0 | 0 | 0 |
| MgO | 0 | 0 | 0 | 0 | 0 |
| $MgHCO_3^+$ | 0 | 0 | 0 | 0 | 0 |
| $H_2O$ | 11.441 | 413.016 | 153.708 | 153.708 | 76.854 |
| $H_2$ | 0 | 0 | 0 | 0 | 0 |
| $Cl_2$ | 0 | 0 | 0 | 0 | 0 |
| HCl | 0 | 0 | 0 | 0.003 | 76.851 |
| $CO_2$ | 38.427 | 0 | 0 | 0 | 0 |
| CO | 0 | 0 | 0 | 0 | 0 |
| $O_2$ | 18.168 | 0 | 0 | 0 | 0 |
| $N_2$ | 99.8 | 0 | 0 | 0 | 0 |
| $CaCl_2$ | 0 | 0 | 0 | 0 | 0 |
| $Ca(OH)_2$ | 0 | 0 | 0 | 0 | 0 |
| $CaCO_3$ | 0 | 0 | 0 | 0 | 0 |
| $MgCO_3$ | 0 | 0 | 0 | 0 | 0 |
| $Ca(O)Cl_2$ | 0 | 0 | 0 | 0 | 0 |
| $MgCl_2$ | 0 | 0 | 0 | 0 | 0 |
| $MgCl_2 \ast W$ | 0 | 0 | 0 | 0 | 0 |
| $MgCl_2 \ast 2W$ | 0 | 0 | 0 | 0 | 0 |
| $MgCl_2 \ast 4W$ | 0 | 0 | 0 | 0 | 0 |
| $MgCl_2 \ast 6W$ | 0 | 0 | 0 | 0 | 0 |
| Mg(OH)Cl | 0 | 0 | 0 | 0 | 0 |
| $Mg(OH)_2$ | 0 | 0 | 0 | 0 | 0 |
| MgO | 0 | 0 | 0 | 0 | 0 |
| $MgHCO_3^+$ | 0 | 0 | 0 | 0 | 0 |

TABLE 4b

Mass and Energy Accounting for Case 2 Simulation.

| | Process Stream Names | | | | | | | | |
|---|---|---|---|---|---|---|---|---|---|
| | LIQUID | $MgCl_2$—4W | $MgCl_2$—6W | RECYCLE1 | RX2-VENT | SLURRY | SOLIDS-1 | SOLIDS-2 | VAPOR |
| Temperature ° C. | 94.9 | 100 | 75 | 95 | 95 | 95 | 125 | 130 | 118.1 |
| Pressure psia | 14.696 | 14.696 | 14.696 | 14.7 | 14.7 | 14.7 | 22.044 | 14.696 | 14.696 |
| Mass VFrac | 0.979 | 0 | 0 | 0 | 1 | 0 | 0 | 0 | 1 |
| Mass SFrac | 0 | 1 | 1 | 0.998 | 0 | 0.998 | 1 | 1 | 0 |
| Mass Flow tonne/year | 306683.742 | 405410.587 | 492736.693 | 493737.578 | 106499.178 | 615107.136 | 318080.64 | 186052.951 | 306683.742 |
| Volume Flow gal/min | 215496.035 | 32.909 | 96.405 | 126.575 | 56469.408 | 146.834 | 32.909 | 32.909 | 234621.606 |
| Enthalpy MW | −99.487 | −144.553 | −190.849 | −190.859 | 0.241 | −237.034 | −97.128 | −61.083 | −98.668 |
| Density lb/cuft | 0.045 | 386.542 | 160.371 | 122.394 | 0.059 | 131.442 | 303.277 | 177.393 | 0.041 |
| $H_2O$ | 218315.265 | 0 | 0 | 1000 | 0 | 1000 | 0 | 0 | 218315.265 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 88368.477 | 0 | 0 | 0 | 0 | 0 | 0 | 0 | 88368.477 |
| $CO_2$ | 0 | 0 | 0 | 0 | 0.532 | 0 | 0 | 0 | 0 |
| CO | 0 | 0 | 0 | 0 | 0 | 0 | 0 | 0 | 0 |
| $O_2$ | 0 | 0 | 0 | 0.165 | 18333.088 | 0.165 | 0 | 0 | 0 |
| $N_2$ | 0 | 0 | 0 | 0.72 | 88165.558 | 0.72 | 0 | 0 | 0 |
| $CaCl_2$ | 0 | 0 | 0 | 0 | 0 | 80.499 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 121289.059 | 0 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0 | 0 |
| $MgCl_2$*W | 0 | 0 | 0 | 0 | 0 | 0 | 0 | 0 | 0 |
| $MgCl_2$*2W | 0 | 0 | 0 | 0 | 0 | 0 | 318077.568 | 0 | 0 |
| $MgCl_2$*4W | 0 | 405410.587 | 0 | 0 | 0 | 0 | 0 | 0 | 0 |
| $MgCl_2$*6W | 0 | 0 | 492736.693 | 492736.693 | 0 | 492736.693 | 0 | 0 | 0 |
| Mg(OH)Cl | 0 | 0 | 0 | 0 | 0 | 0 | 0 | 186052.951 | 0 |
| $Mg(OH)_2$ | 0 | 0 | 0 | 0 | 0 | 0 | 3.072 | 0 | 0 |
| MgO | 0 | 0 | 0 | 0 | 0 | 0 | 0 | 0 | 0 |
| $MgHCO_3^+$ | 0 | 0 | 0 | 0 | 0 | 0 | 0 | 0 | 0 |
| Mass Frac | | | | | | | | | |
| $H_2O$ | 0.712 | 0 | 0 | 0.002 | 0 | 0.002 | 0 | 0 | 0.712 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0.288 | 0 | 0 | 0 | 0 | 0 | 0 | 0 | 0.288 |
| $CO_2$ | 0 | 0 | 0 | 0 | 0 | 0 | 0 | 0 | 0 |
| CO | 0 | 0 | 0 | 0 | 0 | 0 | 0 | 0 | 0 |
| $O_2$ | 0 | 0 | 0 | 0 | 0.172 | 0 | 0 | 0 | 0 |
| $N_2$ | 0 | 0 | 0 | 0 | 0.828 | 0 | 0 | 0 | 0 |
| $CaCl_2$ | 0 | 0 | 0 | 0 | 0 | 0 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 0.197 | 0 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0 | 0 |
| $MgCl_2$*W | 0 | 0 | 0 | 0 | 0 | 0 | 0 | 0 | 0 |
| $MgCl_2$*2W | 0 | 0 | 0 | 0 | 0 | 0 | 1 | 0 | 0 |
| $MgCl_2$*4W | 0 | 1 | 0 | 0 | 0 | 0 | 0 | 0 | 0 |
| $MgCl_2$*6W | 0 | 0 | 1 | 0.998 | 0 | 0.801 | 0 | 0 | 0 |
| Mg(OH)Cl | 0 | 0 | 0 | 0 | 0 | 0 | 0 | 1 | 0 |
| $Mg(OH)_2$ | 0 | 0 | 0 | 0 | 0 | 0 | 0 | 0 | 0 |
| MgO | 0 | 0 | 0 | 0 | 0 | 0 | 0 | 0 | 0 |
| $MgHCO_3^+$ | 0 | 0 | 0 | 0 | 0 | 0 | 0 | 0 | 0 |
| $H_2O$ | 384.27 | 0 | 0 | 1.76 | 0 | 1.76 | 0 | 0 | 384.27 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 76.854 | 0 | 0 | 0 | 0 | 0 | 0 | 0 | 76.854 |
| $CO_2$ | 0 | 0 | 0 | 0 | 0 | 0 | 0 | 0 | 0 |
| CO | 0 | 0 | 0 | 0 | 0 | 0 | 0 | 0 | 0 |
| $O_2$ | 0 | 0 | 0 | 0 | 18.168 | 0 | 0 | 0 | 0 |
| $N_2$ | 0 | 0 | 0 | 0.001 | 99.799 | 0.001 | 0 | 0 | 0 |
| $CaCl_2$ | 0 | 0 | 0 | 0 | 0 | 0.023 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 38.427 | 0 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0 | 0 |
| $MgCl_2$*W | 0 | 0 | 0 | 0 | 0 | 0 | 0 | 0 | 0 |
| $MgCl_2$*2W | 0 | 0 | 0 | 0 | 0 | 0 | 76.852 | 0 | 0 |
| $MgCl_2$*4W | 0 | 76.854 | 0 | 0 | 0 | 0 | 0 | 0 | 0 |
| $MgCl_2$*6W | 0 | 0 | 76.854 | 76.854 | 0 | 76.854 | 0 | 0 | 0 |
| Mg(OH)Cl | 0 | 0 | 0 | 0 | 0 | 0 | 0 | 76.854 | 0 |

TABLE 4b-continued

Mass and Energy Accounting for Case 2 Simulation.

| | Process Stream Names | | | | | | | | |
|---|---|---|---|---|---|---|---|---|---|
| | LIQUID | MgCl$_2$—4W | MgCl$_2$—6W | RECYCLE1 | RX2-VENT | SLURRY | SOLIDS-1 | SOLIDS-2 | VAPOR |
| Mg(OH)$_2$ | 0 | 0 | 0 | 0 | 0 | 0 | 0.002 | 0 | 0 |
| MgO | 0 | 0 | 0 | 0 | 0 | 0 | 0 | 0 | 0 |
| MgHCO$_3$$^+$ | 0 | 0 | 0 | 0 | 0 | 0 | 0 | 0 | 0 |

Example 4

Process Simulation of Magnesium Ion Catalyzed Capture CO$_2$ from Flue Gas Using CaCl$_2$ to Form CaCO$_3$ Part of the defined parameters include the process flow diagram shown in FIG. 8. Results from the simulation suggest that it is efficient to heat a MgCl$_2$.6H$_2$O stream to form MgO in a single chamber. The MgO is reacted with H$_2$O to form Mg(OH)$_2$, which then reacts with a saturated CaCl$_2$/H$_2$O solution and CO$_2$ from the flue gas to form CaCO$_3$, which is filtered out of the stream. The resulting MgCl$_2$.6H$_2$O formed is recycled to the first reactor to begin the process again. This process is not limited to any particular source for CaCl$_2$. For example, it may be obtained from reacting calcium silicate with HCl to yield CaCl$_2$.

Constraints and parameters specified for this simulation include:

The reactions were run at 100% efficiencies with no losses. The simulations can be modified when pilot runs determine the reaction efficiencies.

Simulations did not account for impurities in the CaCl$_2$ feed stock or in any make-up MgCl$_2$ required due to losses from the system.

The results of this simulation indicate a preliminary net energy consumption of 3285 kwh/tonne CO$_2$. Table 5 provides mass and energy accounting for the various streams of the simulated process. Each stream corresponds to the stream of FIG. 8.

The process consists of two primary reactors and one solids filtration section. The first reactor heats MgCl$_2$.6H$_2$O causing it to break down into a HCl/H$_2$O vapor stream and a solid stream of MgO. The HCl/H$_2$O vapor stream is sent to a heat exchanger to recover extra heat. The Mg(OH)$_2$ formed from the MgO is sent to reactor 2 for further processing. Chemical reaction(s) occurring in this reactor include the following:

$$MgCl_2.6H_2O + \Delta \rightarrow MgO + 5H_2O\uparrow + 2HCl\uparrow \quad (38)$$

$$MgO + H_2O \rightarrow Mg(OH)_2 \quad (39)$$

A CaCl$_2$ solution and a flue gas stream are added to the Mg(OH)$_2$ in reactor 2. This reaction forms CaCO$_3$, MgCl$_2$ and water. The CaCO$_3$ precipitates and is removed in a filter or decanter. The remaining MgCl$_2$ and water are recycled to the first reactor. Additional water is added to complete the water balance required by the first reactor. Chemical reaction(s) occurring in this reactor include the following:

$$Mg(OH)_2 + CaCl_2 + CO_2 \rightarrow CaCO_3\downarrow(s) + MgCl_2 + H_2O \quad (40)$$

The primary feeds to this process are CaCl$_2$, flue gas (CO$_2$) and water. MgCl$_2$ in the system is used, reformed and recycled. The only MgCl$_2$ make-up required is to replace small amounts that leave the system with the CaCO$_3$ product, and small amounts that leave with the HCl/water product.

This process is a net energy user. The amount of energy is under investigation and optimization. There is cross heat exchange to recover the heat in high temperature streams to preheat the feed streams.

The steps for this process (Case 3) are summarized below:

CASE 3
Combined Dehydration/Decomposition to MgO
Hexahydrate is dehydrated and decomposed simultaneously
at 450 C. Reactor yeilds 100% MgO.

| | | |
|---|---|---|
| CO$_2$ Absorbed | 53333 | MTPY |
| CaCl$_2$ | 134574 | MTPY |
| HCl Dry | 88368 | MTPY |
| CaCO$_3$ | 105989 | MTPY |
| Hexahydrate recycled | 246368 | MTPY |
| HEXAHYDRATE DEHYDRATION & DECOMPOSITION TO 100% MgO (450° C.) YIELDS 44.7% HCl VAPOR RECYCLES HALF AS MUCH HEXAHYDRATE BUT NEEDS HIGH QUALITY HEAT | 3778 | kWh/tonne CO2 |
| Heat Recovery from 45% HCl vapor | 493 | kWh/tonne CO2 |
| TOTAL | 3285 | kWh/tonne CO2 |

TABLE 5a

Mass and Energy Accounting for Case 3 Simulation.

| | Process Stream Names | | | | | | |
|---|---|---|---|---|---|---|---|
| | CaCl$_2$ | CaCO$_3$ | FLUE GAS | H$_2$O | HCl VAP | MgCl$_2$ | MgCl$_2$—6W |
| Temperature ° C. | 25 | 95 | 104 | 25 | 120 | 353.8 | 104 |
| Pressure psia | 14.7 | 14.7 | 15.78 | 14.7 | 14.696 | 14.7 | 14.7 |
| Mass VFrac | 0 | 0 | 1 | 0 | 1 | 0 | 0 |
| Mass SFrac | 1 | 1 | 0 | 0 | 0 | 1 | 1 |
| Mass Flow tonne/year | 134573.943 | 121369.558 | 166332.6 | 125489.188 | 197526.11 | 246368.347 | 246368.347 |
| Volume Flow gal/min | 30.929 | 22.514 | 76673.298 | 3501.038 | 137543.974 | 48.203 | 48.203 |
| Enthalpy MW | −30.599 | −46.174 | −17.479 | −63.14 | −52.762 | −92.049 | −95.073 |
| Density lb/cuft | 136.522 | 169.146 | 0.068 | 1.125 | 0.045 | 160.371 | 160.371 |
| H$_2$O | 0 | 0 | 6499.971 | 125489.188 | 109157.633 | 0 | 0 |

TABLE 5a-continued

Mass and Energy Accounting for Case 3 Simulation.

| | CaCl$_2$ | CaCO$_3$ | FLUE GAS | H$_2$O | HCl VAP | MgCl$_2$ | MgCl$_2$—6W |
|---|---|---|---|---|---|---|---|
| H$_2$ | 0 | 0 | 0 | 0 | 0 | 0 | 0 |
| Cl$_2$ | 0 | 0 | 0 | 0 | 0 | 0 | 0 |
| HCl | 0 | 0 | 0 | 0 | 88368.477 | 0 | 0 |
| CO$_2$ | 0 | 0 | 53333.098 | 0 | 0 | 0 | 0 |
| CO | 0 | 0 | 0 | 0 | 0 | 0 | 0 |
| O$_2$ | 0 | 0 | 18333.252 | 0 | 0 | 0 | 0 |
| N$_2$ | 0 | 0 | 88166.278 | 0 | 0 | 0 | 0 |
| CaCl$_2$ | 134573.943 | 80.499 | 0 | 0 | 0 | 0 | 0 |
| Ca(OH)$_2$ | 0 | 0 | 0 | 0 | 0 | 0 | 0 |
| CaCO$_3$ | 0 | 121289.059 | 0 | 0 | 0 | 0 | 0 |
| MgCO$_3$ | 0 | 0 | 0 | 0 | 0 | 0 | 0 |
| Ca(O)Cl$_2$ | 0 | 0 | 0 | 0 | 0 | 0 | 0 |
| MgCl$_2$ | 0 | 0 | 0 | 0 | 0 | 0 | 0 |
| MgCl$_2$*W | 0 | 0 | 0 | 0 | 0 | 0 | 0 |
| MgCl$_2$*2W | 0 | 0 | 0 | 0 | 0 | 0 | 0 |
| MgCl$_2$*4W | 0 | 0 | 0 | 0 | 0 | 0 | 0 |
| MgCl$_2$*6W | 0 | 0 | 0 | 0 | 0 | 246368.347 | 246368.347 |
| Mg(OH)Cl | 0 | 0 | 0 | 0 | 0 | 0 | 0 |
| Mg(OH)$_2$ | 0 | 0 | 0 | 0 | 0 | 0 | 0 |
| MgO | 0 | 0 | 0 | 0 | 0 | 0 | 0 |
| H$_2$O | 0 | 0 | 0.039 | 1 | 0.553 | 0 | 0 |
| H$_2$ | 0 | 0 | 0 | 0 | 0 | 0 | 0 |
| Cl$_2$ | 0 | 0 | 0 | 0 | 0 | 0 | 0 |
| HCl | 0 | 0 | 0 | 0 | 0.447 | 0 | 0 |
| CO$_2$ | 0 | 0 | 0.321 | 0 | 0 | 0 | 0 |
| CO | 0 | 0 | 0 | 0 | 0 | 0 | 0 |
| O$_2$ | 0 | 0 | 0.11 | 0 | 0 | 0 | 0 |
| N$_2$ | 0 | 0 | 0.53 | 0 | 0 | 0 | 0 |
| CaCl$_2$ | 1 | 0.001 | 0 | 0 | 0 | 0 | 0 |
| Ca(OH)$_2$ | 0 | 0 | 0 | 0 | 0 | 0 | 0 |
| CaCO$_3$ | 0 | 0.999 | 0 | 0 | 0 | 0 | 0 |
| MgCO$_3$ | 0 | 0 | 0 | 0 | 0 | 0 | 0 |
| Ca(O)Cl$_2$ | 0 | 0 | 0 | 0 | 0 | 0 | 0 |
| MgCl$_2$ | 0 | 0 | 0 | 0 | 0 | 0 | 0 |
| MgCl$_2$*W | 0 | 0 | 0 | 0 | 0 | 0 | 0 |
| MgCl$_2$*2W | 0 | 0 | 0 | 0 | 0 | 0 | 0 |
| MgCl$_2$*4W | 0 | 0 | 0 | 0 | 0 | 0 | 0 |
| MgCl$_2$*6W | 0 | 0 | 0 | 0 | 0 | 1 | 1 |
| Mg(OH)Cl | 0 | 0 | 0 | 0 | 0 | 0 | 0 |
| Mg(OH)$_2$ | 0 | 0 | 0 | 0 | 0 | 0 | 0 |
| MgO | 0 | 0 | 0 | 0 | 0 | 0 | 0 |
| H$_2$O | 0 | 0 | 11.441 | 220.881 | 192.135 | 0 | 0 |
| H$_2$ | 0 | 0 | 0 | 0 | 0 | 0 | 0 |
| Cl$_2$ | 0 | 0 | 0 | 0 | 0 | 0 | 0 |
| HCl | 0 | 0 | 0 | 0 | 76.854 | 0 | 0 |
| CO$_2$ | 0 | 0 | 38.427 | 0 | 0 | 0 | 0 |
| CO | 0 | 0 | 0 | 0 | 0 | 0 | 0 |
| O$_2$ | 0 | 0 | 18.168 | 0 | 0 | 0 | 0 |
| N$_2$ | 0 | 0 | 99.8 | 0 | 0 | 0 | 0 |
| CaCl$_2$ | 38.45 | 0.023 | 0 | 0 | 0 | 0 | 0 |
| Ca(OH)$_2$ | 0 | 0 | 0 | 0 | 0 | 0 | 0 |
| CaCO$_3$ | 0 | 38.427 | 0 | 0 | 0 | 0 | 0 |
| MgCO$_3$ | 0 | 0 | 0 | 0 | 0 | 0 | 0 |
| Ca(O)Cl$_2$ | 0 | 0 | 0 | 0 | 0 | 0 | 0 |
| MgCl$_2$ | 0 | 0 | 0 | 0 | 0 | 0 | 0 |
| MgCl$_2$*W | 0 | 0 | 0 | 0 | 0 | 0 | 0 |
| MgCl$_2$*2W | 0 | 0 | 0 | 0 | 0 | 0 | 0 |
| MgCl$_2$*4W | 0 | 0 | 0 | 0 | 0 | 0 | 0 |
| MgCl$_2$*6W | 0 | 0 | 0 | 0 | 0 | 38.427 | 38.427 |
| Mg(OH)Cl | 0 | 0 | 0 | 0 | 0 | 0 | 0 |
| Mg(OH)$_2$ | 0 | 0 | 0 | 0 | 0 | 0 | 0 |
| MgO | 0 | 0 | 0 | 0 | 0 | 0 | 0 |

TABLE 5b

Mass and Energy Accounting for Case 3 Simulation.

| | Process Stream Names | | | | | | | | |
|---|---|---|---|---|---|---|---|---|---|
| | Mg(OH)Cl1 | Mg(OH)Cl2 | RECYCLE1 | RECYCLE2 | RECYCLE3 | RX2-VENT | SLURRY | VAPOR | VENT |
| Temperature ° C. | 450 | 100 | 95 | 140 | 140 | 95 | 95 | 450 | 140 |
| Pressure psia | 14.696 | 14.696 | 14.7 | 14.7 | 14.7 | 14.7 | 14.7 | 14.696 | 14.7 |
| Mass VFrac | 0 | 0 | 0 | 0.004 | 0 | 1 | 0 | 1 | 1 |
| Mass SFrac | 1 | 1 | 0.996 | 0.996 | 1 | 0 | 0.997 | 0 | 0 |
| Mass Flow tonne/year | 48842.237 | 48842.237 | 247369.231 | 247369.231 | 246368.347 | 106499.178 | 368738.79 | 197526.11 | 1000.885 |
| Volume Flow gal/min | 6.851 | 6.851 | 78.372 | 994.232 | 48.203 | 56469.408 | 98.632 | 252994.849 | 946.03 |
| Enthalpy MW | −22.38 | −23 | −95.676 | −95.057 | −94.638 | 0.241 | −141.851 | −49.738 | −0.419 |
| Density lb/cuft | 223.695 | 223.695 | 99.036 | 7.807 | 160.371 | 0.059 | 117.304 | 0.024 | 0.033 |
| $H_2O$ | 0 | 0 | 1000 | 1000 | 0 | 0 | 1000 | 109157.633 | 1000 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0 | 0 | 0 | 0 | 0 | 0 | 0 | 88368.477 | 0 |
| $CO_2$ | 0 | 0 | 0 | 0 | 0 | 0.532 | 0 | 0 | 0 |
| CO | 0 | 0 | 0 | 0 | 0 | 0 | 0 | 0 | 0 |
| $O_2$ | 0 | 0 | 0.165 | 0.165 | 0 | 18333.088 | 0.165 | 0 | 0.165 |
| $N_2$ | 0 | 0 | 0.72 | 0.72 | 0 | 88165.558 | 0.72 | 0 | 0.72 |
| $CaCl_2$ | 0 | 0 | 0 | 0 | 0 | 0 | 80.499 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 0 | 121289.059 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0 | 0 |
| $MgCl_2*W$ | 0 | 0 | 0 | 0 | 0 | 0 | 0 | 0 | 0 |
| $MgCl_2*2W$ | 0 | 0 | 0 | 0 | 0 | 0 | 0 | 0 | 0 |
| $MgCl_2*4W$ | 0 | 0 | 0 | 0 | 0 | 0 | 0 | 0 | 0 |
| $MgCl_2*6W$ | 0 | 0 | 246368.347 | 246368.347 | 246368.347 | 0 | 246368.347 | 0 | 0 |
| Mg(OH)Cl | 0 | 0 | 0 | 0 | 0 | 0 | 0 | 0 | 0 |
| $Mg(OH)_2$ | 0 | 0 | 0 | 0 | 0 | 0 | 0 | 0 | 0 |
| MgO | 48842.237 | 48842.237 | 0 | 0 | 0 | 0 | 0 | 0 | 0 |
| $H_2O$ | 0 | 0 | 0.004 | 0.004 | 0 | 0 | 0.003 | 0.553 | 0.999 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0 | 0 | 0 | 0 | 0 | 0 | 0 | 0.447 | 0 |
| $CO_2$ | 0 | 0 | 0 | 0 | 0 | 0 | 0 | 0 | 0 |
| CO | 0 | 0 | 0 | 0 | 0 | 0 | 0 | 0 | 0 |
| $O_2$ | 0 | 0 | 0 | 0 | 0 | 0.172 | 0 | 0 | 0 |
| $N_2$ | 0 | 0 | 0 | 0 | 0 | 0.828 | 0 | 0 | 0.001 |
| $CaCl_2$ | 0 | 0 | 0 | 0 | 0 | 0 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 0 | 0.329 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0 | 0 |
| $MgCl_2*W$ | 0 | 0 | 0 | 0 | 0 | 0 | 0 | 0 | 0 |
| $MgCl_2*2W$ | 0 | 0 | 0 | 0 | 0 | 0 | 0 | 0 | 0 |
| $MgCl_2*4W$ | 0 | 0 | 0 | 0 | 0 | 0 | 0 | 0 | 0 |
| $MgCl_2*6W$ | 0 | 0 | 0.996 | 0.996 | 1 | 0 | 0.668 | 0 | 0 |
| Mg(OH)Cl | 0 | 0 | 0 | 0 | 0 | 0 | 0 | 0 | 0 |
| $Mg(OH)_2$ | 0 | 0 | 0 | 0 | 0 | 0 | 0 | 0 | 0 |
| MgO | 1 | 1 | 0 | 0 | 0 | 0 | 0 | 0 | 0 |
| $H_2O$ | 0 | 0 | 1.76 | 1.76 | 0 | 0 | 1.76 | 192.135 | 1.76 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0 | 0 | 0 | 0 | 0 | 0 | 0 | 76.854 | 0 |
| $CO_2$ | 0 | 0 | 0 | 0 | 0 | 0 | 0 | 0 | 0 |
| CO | 0 | 0 | 0 | 0 | 0 | 0 | 0 | 0 | 0 |
| $O_2$ | 0 | 0 | 0 | 0 | 0 | 18.168 | 0 | 0 | 0 |
| $N_2$ | 0 | 0 | 0.001 | 0.001 | 0 | 99.799 | 0.001 | 0 | 0.001 |
| $CaCl_2$ | 0 | 0 | 0 | 0 | 0 | 0 | 0.023 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 0 | 38.427 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0 | 0 |
| $MgCl_2*W$ | 0 | 0 | 0 | 0 | 0 | 0 | 0 | 0 | 0 |
| $MgCl_2*2W$ | 0 | 0 | 0 | 0 | 0 | 0 | 0 | 0 | 0 |
| $MgCl_2*4W$ | 0 | 0 | 0 | 0 | 0 | 0 | 0 | 0 | 0 |
| $MgCl_2*6W$ | 0 | 0 | 38.427 | 38.427 | 38.427 | 0 | 38.427 | 0 | 0 |
| Mg(OH)Cl | 0 | 0 | 0 | 0 | 0 | 0 | 0 | 0 | 0 |
| $Mg(OH)_2$ | 0 | 0 | 0 | 0 | 0 | 0 | 0 | 0 | 0 |
| MgO | 38.427 | 38.427 | 0 | 0 | 0 | 0 | 0 | 0 | 0 |

Example 5

Process Simulation of Magnesium Ion Catalyzed Capture CO$_2$ from Flue Gas Using CaCl$_2$ to form CaCO$_3$ Part of the defined parameters include the process flow diagram shown in FIG. 9. Results from the simulation suggest that it is efficient to heat a MgCl$_2$.6H$_2$O stream to form Mg(OH)Cl in a single chamber. The Mg(OH)Cl is reacted with H$_2$O to form MgCl$_2$ and Mg(OH)$_2$, which then reacts with a saturated CaCl$_2$/H$_2$O solution and CO$_2$ from the flue gas to form CaCO$_3$, which is filtered out of the stream. The resulting MgCl$_2$.6H$_2$O formed is recycled to the first reactor to begin the process again. This process is not limited to any particular source for CaCl$_2$. For example, it may be obtained from reacting calcium silicate with HCl to yield CaCl$_2$.

Constraints and parameters specified for this simulation include:

The reactions were run at 100% efficiencies with no losses. The simulations can be modified when pilot runs determine the reaction efficiencies.

Simulations did not account for impurities in the CaCl$_2$ feed stock or in any make-up MgCl$_2$ required due to losses from the system.

The results of this simulation indicate a preliminary net energy consumption of 4681 kwh/tonne CO$_2$. Table 6 provides mass and energy accounting for the various streams of the simulated process. Each stream corresponds to the stream of FIG. 9.

The process consists of two primary reactors and one solids filtration section. The first reactor heats MgCl$_2$.6H$_2$O causing it to break down into a HCl/H$_2$O vapor stream and a solid stream of Mg(OH)Cl. The HCl/H$_2$O vapor stream is sent to a heat exchanger to recover extra heat. The Mg(OH)$_2$ formed from the Mg(OH)Cl is sent to reactor 2 for further processing.

Chemical reaction(s) occurring in this reactor include the following:

$$MgCl_2 \cdot 6H_2O + \Delta \rightarrow Mg(OH)Cl + 5H_2O\uparrow + HCl\uparrow \quad (41)$$

$$2Mg(OH)Cl(aq) \rightarrow Mg(OH)_2 + MgCl_2 \quad (42)$$

A CaCl$_2$ solution and a flue gas stream are added to the Mg(OH)$_2$ in reactor 2. This reaction forms CaCO$_3$, MgCl$_2$ and water. The CaCO$_3$ precipitates and is removed in a filter or decanter. The remaining MgCl$_2$ and water are recycled to the first reactor. Additional water is added to complete the water balance required by the first reactor. Chemical reaction(s) occurring in this reactor include the following:

$$Mg(OH)_2 + CaCl_2 + CO_2 \rightarrow CaCO_3\downarrow(s) + MgCl_2 + H_2O \quad (43)$$

The primary feeds to this process are CaCl$_2$, flue gas (CO$_2$) and water. MgCl$_2$ in the system is used, reformed and recycled. The only MgCl$_2$ make-up required is to replace small amounts that leave the system with the CaCO$_3$ product, and small amounts that leave with the HCl/water product.

This process is a net energy user. The amount of energy is under investigation and optimization. There is cross heat exchange to recover the heat in high temperature streams to preheat the feed streams.

The steps for this process (Case 4) are summarized below:

CASE 4
Combined Dehydration/Decomposition to Mg(OH)Cl
Hexahydrate is dehydrated and decomposed simultaneously at 250° C. Reactor yields 100% Mg(OH)Cl.

| | | |
|---|---|---|
| CO$_2$ Absorbed | 53333 | MTPY |
| CaCl$_2$ | 134574 | MTPY |
| HCl Dry | 88368 | MTPY |
| CaCO$_3$ | 105989 | MTPY |
| Hexahydrate recycled | 492737 | MTPY |
| DEHYDRATION & DECOMPOSITION TO 100% Mg(OH)Cl (250° C.) YEILDS 28.8% HCl VAPOR | 5043 | kWh/tonne CO2 |
| Heat Recovery from 28% HCl vapor | 2.2 361 | MW kWh/tonne CO2 |
| TOTAL | 4681 | kWh/tonne CO2 |

TABLE 6a

Mass and Energy Accounting for Case 4 Simulation.

| | \multicolumn{8}{c}{Process Stream Names} |
|---|---|---|---|---|---|---|---|---|
| | CaCl$_2$ | CaCO$_3$ | FLUEGAS | H$_2$O | HCIVAP | MgCl$_2$ | MgCl$_2$—6W | Mg(OH)Cl1 |
| Temperature ° C. | 25 | 95 | 104 | 25 | 120 | 188 | 104 | 250 |
| Pressure psia | 14.7 | 14.7 | 15.78 | 14.7 | 14.696 | 14.7 | 14.7 | 14.696 |
| Mass VFrac | 0 | 0 | 1 | 0 | 1 | 0 | 0 | 0 |
| Mass SFrac | 1 | 1 | 0 | 0 | 0 | 1 | 1 | 1 |
| Mass Flow tonne/year | 134573.943 | 121369.558 | 166332.6 | 234646.82 | 306683.742 | 492736.693 | 492736.693 | 186052.951 |
| Volume Flow gal/min | 30.929 | 22.514 | 76673.298 | 6546.44 | 235789.67 | 96.405 | 96.405 | 32.909 |
| Enthalpy MW | −30.599 | −46.174 | −17.479 | −118.063 | −98.638 | −188.114 | −190.147 | −60.661 |
| Density lb/cuft | 136.522 | 169.146 | 0.068 | 1.125 | 0.041 | 160.371 | 160.371 | 177.393 |
| H$_2$O | 0 | 0 | 6499.971 | 234646.82 | 218315.265 | 0 | 0 | 0 |
| H$_2$ | 0 | 0 | 0 | 0 | 0 | 0 | 0 | 0 |
| Cl$_2$ | 0 | 0 | 0 | 0 | 0 | 0 | 0 | 0 |
| HCl | 0 | 0 | 0 | 0 | 88368.477 | 0 | 0 | 0 |
| CO$_2$ | 0 | 0 | 53333.098 | 0 | 0 | 0 | 0 | 0 |
| CO | 0 | 0 | 0 | 0 | 0 | 0 | 0 | 0 |
| O$_2$ | 0 | 0 | 18333.252 | 0 | 0 | 0 | 0 | 0 |
| N$_2$ | 0 | 0 | 88166.278 | 0 | 0 | 0 | 0 | 0 |
| CaCl$_2$ | 134573.943 | 80.499 | 0 | 0 | 0 | 0 | 0 | 0 |
| Ca(OH)$_2$ | 0 | 0 | 0 | 0 | 0 | 0 | 0 | 0 |
| CaCO$_3$ | 0 | 121289.059 | 0 | 0 | 0 | 0 | 0 | 0 |
| MgCO$_3$ | 0 | 0 | 0 | 0 | 0 | 0 | 0 | 0 |
| Ca(O)Cl$_2$ | 0 | 0 | 0 | 0 | 0 | 0 | 0 | 0 |
| MgCl$_2$ | 0 | 0 | 0 | 0 | 0 | 0 | 0 | 0 |

TABLE 6a-continued

Mass and Energy Accounting for Case 4 Simulation.

Process Stream Names

| | $CaCl_2$ | $CaCO_3$ | FLUEGAS | $H_2O$ | HClVAP | $MgCl_2$ | $MgCl_2$—6W | $Mg(OH)Cl1$ |
|---|---|---|---|---|---|---|---|---|
| $MgCl_2$*W | 0 | 0 | 0 | 0 | 0 | 0 | 0 | 0 |
| $MgCl_2$*2W | 0 | 0 | 0 | 0 | 0 | 0 | 0 | 0 |
| $MgCl_2$*4W | 0 | 0 | 0 | 0 | 0 | 0 | 0 | 0 |
| $MgCl_2$*6W | 0 | 0 | 0 | 0 | 0 | 492736.693 | 492736.693 | 0 |
| $Mg(OH)Cl$ | 0 | 0 | 0 | 0 | 0 | 0 | 0 | 186052.951 |
| $Mg(OH)_2$ | 0 | 0 | 0 | 0 | 0 | 0 | 0 | 0 |
| $MgO$ | 0 | 0 | 0 | 0 | 0 | 0 | 0 | 0 |
| $H_2O$ | 0 | 0 | 0.039 | 1 | 0.712 | 0 | 0 | 0 |
| $H_2$ | 0 | 0 | 0 | 0 | 0 | 0 | 0 | 0 |
| $Cl_2$ | 0 | 0 | 0 | 0 | 0 | 0 | 0 | 0 |
| HCl | 0 | 0 | 0 | 0 | 0.288 | 0 | 0 | 0 |
| $CO_2$ | 0 | 0 | 0.321 | 0 | 0 | 0 | 0 | 0 |
| CO | 0 | 0 | 0 | 0 | 0 | 0 | 0 | 0 |
| $O_2$ | 0 | 0 | 0.11 | 0 | 0 | 0 | 0 | 0 |
| $N_2$ | 0 | 0 | 0.53 | 0 | 0 | 0 | 0 | 0 |
| $CaCl_2$ | 1 | 0.001 | 0 | 0 | 0 | 0 | 0 | 0 |
| $Ca(OH)_2$ | 0 | 0 | 0 | 0 | 0 | 0 | 0 | 0 |
| $CaCO_3$ | 0 | 0.999 | 0 | 0 | 0 | 0 | 0 | 0 |
| $MgCO_3$ | 0 | 0 | 0 | 0 | 0 | 0 | 0 | 0 |
| $Ca(O)Cl_2$ | 0 | 0 | 0 | 0 | 0 | 0 | 0 | 0 |
| $MgCl_2$ | 0 | 0 | 0 | 0 | 0 | 0 | 0 | 0 |
| $MgCl_2$*W | 0 | 0 | 0 | 0 | 0 | 0 | 0 | 0 |
| $MgCl_2$*2W | 0 | 0 | 0 | 0 | 0 | 0 | 0 | 0 |
| $MgCl_2$*4W | 0 | 0 | 0 | 0 | 0 | 0 | 0 | 0 |
| $MgCl_2$*6W | 0 | 0 | 0 | 0 | 0 | 1 | 1 | 0 |
| $Mg(OH)Cl$ | 0 | 0 | 0 | 0 | 0 | 0 | 0 | 1 |
| $Mg(OH)_2$ | 0 | 0 | 0 | 0 | 0 | 0 | 0 | 0 |
| $MgO$ | 0 | 0 | 0 | 0 | 0 | 0 | 0 | 0 |
| $H_2O$ | 0 | 0 | 11.441 | 413.016 | 384.27 | 0 | 0 | 0 |
| $H_2$ | 0 | 0 | 0 | 0 | 0 | 0 | 0 | 0 |
| $Cl_2$ | 0 | 0 | 0 | 0 | 0 | 0 | 0 | 0 |
| HCl | 0 | 0 | 0 | 0 | 76.854 | 0 | 0 | 0 |
| $CO_2$ | 0 | 0 | 38.427 | 0 | 0 | 0 | 0 | 0 |
| CO | 0 | 0 | 0 | 0 | 0 | 0 | 0 | 0 |
| $O_2$ | 0 | 0 | 18.168 | 0 | 0 | 0 | 0 | 0 |
| $N_2$ | 0 | 0 | 99.8 | 0 | 0 | 0 | 0 | 0 |
| $CaCl_2$ | 38.45 | 0.023 | 0 | 0 | 0 | 0 | 0 | 0 |
| $Ca(OH)_2$ | 0 | 0 | 0 | 0 | 0 | 0 | 0 | 0 |
| $CaCO_3$ | 0 | 38.427 | 0 | 0 | 0 | 0 | 0 | 0 |
| $MgCO_3$ | 0 | 0 | 0 | 0 | 0 | 0 | 0 | 0 |
| $Ca(O)Cl_2$ | 0 | 0 | 0 | 0 | 0 | 0 | 0 | 0 |
| $MgCl_2$ | 0 | 0 | 0 | 0 | 0 | 0 | 0 | 0 |
| $MgCl_2$*W | 0 | 0 | 0 | 0 | 0 | 0 | 0 | 0 |
| $MgCl_2$*2W | 0 | 0 | 0 | 0 | 0 | 0 | 0 | 0 |
| $MgCl_2$*4W | 0 | 0 | 0 | 0 | 0 | 0 | 0 | 0 |
| $MgCl_2$*6W | 0 | 0 | 0 | 0 | 0 | 76.854 | 76.854 | 0 |
| $Mg(OH)Cl$ | 0 | 0 | 0 | 0 | 0 | 0 | 0 | 76.854 |
| $Mg(OH)_2$ | 0 | 0 | 0 | 0 | 0 | 0 | 0 | 0 |
| $MgO$ | 0 | 0 | 0 | 0 | 0 | 0 | 0 | 0 |

TABLE 6b

Mass and Energy Accounting for Case 4 Simulation.

Process Stream Names

| | $Mg(OH)Cl_2$ | RECYCLE1 | RECYCLE2 | RECYCLE3 | RX2-VENT | SLURRY | VAPOR | VENT |
|---|---|---|---|---|---|---|---|---|
| Temperature °C. | 100 | 95 | 113.8 | 113.8 | 95 | 95 | 250 | 113.8 |
| Pressure psia | 14.696 | 14.7 | 14.7 | 14.7 | 14.7 | 14.7 | 14.696 | 14.7 |
| Mass VFrac | 0 | 0 | 0.002 | 0 | 1 | 0 | 1 | 1 |
| Mass SFrac | 1 | 0.998 | 0.998 | 1 | 0 | 0.998 | 0 | 0 |
| Mass Flow tonne/year | 186052.95 | 493737.58 | 493737.58 | 492736.69 | 106499.18 | 615107.14 | 306683.74 | 1000.89 |
| Volume Flow gal/min | 32.909 | 126.575 | 982.405 | 96.405 | 56469.408 | 146.834 | 313756.5 | 886 |
| Enthalpy MW | −61.189 | −190.859 | −190.331 | −189.91 | 0.241 | −237.034 | −96.605 | −0.421 |
| Density lb/cuft | 177.393 | 122.394 | 15.769 | 160.371 | 0.059 | 131.442 | 0.031 | 0.035 |
| $H_2O$ | 0 | 1000 | 1000 | 0 | 0 | 1000 | 218315.27 | 1000 |
| $H_2$ | 0 | 0 | 0 | 0 | 0 | 0 | 0 | 0 |
| $Cl_2$ | 0 | 0 | 0 | 0 | 0 | 0 | 0 | 0 |
| HCl | 0 | 0 | 0 | 0 | 0 | 0 | 88368.477 | 0 |
| $CO_2$ | 0 | 0 | 0 | 0 | 0.532 | 0 | 0 | 0 |

TABLE 6b-continued

Mass and Energy Accounting for Case 4 Simulation.

| | Process Stream Names | | | | | | | |
|---|---|---|---|---|---|---|---|---|
| | Mg(OH)Cl$_2$ | RECYCLE1 | RECYCLE2 | RECYCLE3 | RX2-VENT | SLURRY | VAPOR | VENT |
| CO | 0 | 0 | 0 | 0 | 0 | 0 | 0 | 0 |
| O$_2$ | 0 | 0.165 | 0.165 | 0 | 18333.088 | 0.165 | 0 | 0.165 |
| N$_2$ | 0 | 0.72 | 0.72 | 0 | 88165.558 | 0.72 | 0 | 0.72 |
| CaCl$_2$ | 0 | 0 | 0 | 0 | 0 | 80.499 | 0 | 0 |
| Ca(OH)$_2$ | 0 | 0 | 0 | 0 | 0 | 0 | 0 | 0 |
| CaCO$_3$ | 0 | 0 | 0 | 0 | 0 | 121289.06 | 0 | 0 |
| MgCO$_3$ | 0 | 0 | 0 | 0 | 0 | 0 | 0 | 0 |
| Ca(O)Cl$_2$ | 0 | 0 | 0 | 0 | 0 | 0 | 0 | 0 |
| MgCl$_2$ | 0 | 0 | 0 | 0 | 0 | 0 | 0 | 0 |
| MgCl$_2$*W | 0 | 0 | 0 | 0 | 0 | 0 | 0 | 0 |
| MgCl$_2$*2W | 0 | 0 | 0 | 0 | 0 | 0 | 0 | 0 |
| MgCl$_2$*4W | 0 | 0 | 0 | 0 | 0 | 0 | 0 | 0 |
| MgCl$_2$*6W | 0 | 492736.69 | 492736.69 | 492736.69 | 0 | 492736.69 | 0 | 0 |
| Mg(OH)Cl | 186052.95 | 0 | 0 | 0 | 0 | 0 | 0 | 0 |
| Mg(OH)$_2$ | 0 | 0 | 0 | 0 | 0 | 0 | 0 | 0 |
| MgO | 0 | 0 | 0 | 0 | 0 | 0 | 0 | 0 |
| H$_2$O | 0 | 0.002 | 0.002 | 0 | 0 | 0.002 | 0.712 | 0.999 |
| H$_2$ | 0 | 0 | 0 | 0 | 0 | 0 | 0 | 0 |
| Cl$_2$ | 0 | 0 | 0 | 0 | 0 | 0 | 0 | 0 |
| HCl | 0 | 0 | 0 | 0 | 0 | 0 | 0.288 | 0 |
| CO$_2$ | 0 | 0 | 0 | 0 | 0 | 0 | 0 | 0 |
| CO | 0 | 0 | 0 | 0 | 0 | 0 | 0 | 0 |
| O$_2$ | 0 | 0 | 0 | 0 | 0.172 | 0 | 0 | 0 |
| N$_2$ | 0 | 0 | 0 | 0 | 0.828 | 0 | 0 | 0.001 |
| CaCl$_2$ | 0 | 0 | 0 | 0 | 0 | 0 | 0 | 0 |
| Ca(OH)$_2$ | 0 | 0 | 0 | 0 | 0 | 0 | 0 | 0 |
| CaCO$_3$ | 0 | 0 | 0 | 0 | 0 | 0.197 | 0 | 0 |
| MgCO$_3$ | 0 | 0 | 0 | 0 | 0 | 0 | 0 | 0 |
| Ca(O)Cl$_2$ | 0 | 0 | 0 | 0 | 0 | 0 | 0 | 0 |
| MgCl$_2$ | 0 | 0 | 0 | 0 | 0 | 0 | 0 | 0 |
| MgCl$_2$*W | 0 | 0 | 0 | 0 | 0 | 0 | 0 | 0 |
| MgCl$_2$*2W | 0 | 0 | 0 | 0 | 0 | 0 | 0 | 0 |
| MgCl$_2$*4W | 0 | 0 | 0 | 0 | 0 | 0 | 0 | 0 |
| MgCl$_2$*6W | 0 | 0.998 | 0.998 | 1 | 0 | 0.801 | 0 | 0 |
| Mg(OH)Cl | 1 | 0 | 0 | 0 | 0 | 0 | 0 | 0 |
| Mg(OH)$_2$ | 0 | 0 | 0 | 0 | 0 | 0 | 0 | 0 |
| MgO | 0 | 0 | 0 | 0 | 0 | 0 | 0 | 0 |
| H$_2$O | 0 | 1.76 | 1.76 | 0 | 0 | 1.76 | 384.27 | 1.76 |
| H$_2$ | 0 | 0 | 0 | 0 | 0 | 0 | 0 | 0 |
| Cl$_2$ | 0 | 0 | 0 | 0 | 0 | 0 | 0 | 0 |
| HCl | 0 | 0 | 0 | 0 | 0 | 0 | 76.854 | 0 |
| CO$_2$ | 0 | 0 | 0 | 0 | 0 | 0 | 0 | 0 |
| CO | 0 | 0 | 0 | 0 | 0 | 0 | 0 | 0 |
| O$_2$ | 0 | 0 | 0 | 0 | 18.168 | 0 | 0 | 0 |
| N$_2$ | 0 | 0.001 | 0.001 | 0 | 99.799 | 0.001 | 0 | 0.001 |
| CaCl$_2$ | 0 | 0 | 0 | 0 | 0 | 0.023 | 0 | 0 |
| Ca(OH)$_2$ | 0 | 0 | 0 | 0 | 0 | 0 | 0 | 0 |
| CaCO$_3$ | 0 | 0 | 0 | 0 | 0 | 38.427 | 0 | 0 |
| MgCO$_3$ | 0 | 0 | 0 | 0 | 0 | 0 | 0 | 0 |
| Ca(O)Cl$_2$ | 0 | 0 | 0 | 0 | 0 | 0 | 0 | 0 |
| MgCl$_2$ | 0 | 0 | 0 | 0 | 0 | 0 | 0 | 0 |
| MgCl$_2$*W | 0 | 0 | 0 | 0 | 0 | 0 | 0 | 0 |
| MgCl$_2$*2W | 0 | 0 | 0 | 0 | 0 | 0 | 0 | 0 |
| MgCl$_2$*4W | 0 | 0 | 0 | 0 | 0 | 0 | 0 | 0 |
| MgCl$_2$*6W | 0 | 76.854 | 76.854 | 76.854 | 0 | 76.854 | 0 | 0 |
| Mg(OH)Cl | 76.854 | 0 | 0 | 0 | 0 | 0 | 0 | 0 |
| Mg(OH)$_2$ | 0 | 0 | 0 | 0 | 0 | 0 | 0 | 0 |
| MgO | 0 | 0 | 0 | 0 | 0 | 0 | 0 | 0 |

Example 6

Road Salt Boiler: Decomposition of MgCl$_2$.6H$_2$O

FIG. 10 shows a graph of the mass percentage of a heated sample of MgCl$_2$.6H$_2$O. The sample's initial mass was approximately 70 mg and set at 100%. During the experiment, the sample's mass was measured while it was being thermally decomposed. The temperature was quickly ramped up to 150° C., and then slowly increased by 0.5° C. per minute. At approximately 220° C., the weight became constant, consistent with the formation of Mg(OH)Cl. The absence of further weight decrease indicated that almost all the water has been removed. Two different detailed decompositional mass analyses are shown in FIGS. 28 and 29, with the theoretical plateaus of different final materials shown. FIG. 30 confirms that MgO can be made by higher temperatures (here, 500° C.) than those which produce Mg(OH)Cl.

Example 7

Dissolution of Mg(OH)Cl in H$_2$O

A sample of Mg(OH)Cl, produced by the heated decomposition of MgCl$_2$.6H$_2$O, was dissolved in water and stirred for a period of time. Afterwards, the remaining precipitate was dried, collected and analyzed. By the formula of decomposition, the amount of $Mg(OH)_2$ could be compared to the expected amount and analyzed. The chemical reaction can be represented as follows:

$$2Mg(OH)Cl(aq) \rightarrow Mg(OH)_2 + MgCl_2 \qquad (44)$$

The solubility data for $Mg(OH)_2$ and $MgCl_2$ is as follows:
$MgCl_2$ 52.8 gm in 100 gm. $H_2O$ (very soluble)
$Mg(OH)_2$ 0.0009 gm in 100 gm. $H_2O$ (virtually insoluble)
Theoretical weight of recovered $Mg(OH)_2$:
Given weight of sample: 3.0136 gm.
MW Mg(OH)Cl 76.764
MW $Mg(OH)_2$ 58.32
Moles $Mg(OH)_2$ formed per mole Mg(OH)Cl=½
Expected amount of $Mg(OH)_2$
2 Mg(OH)Cl (aq) $Mg(OH)_2$+$MgCl_2$
3.016 gm*(MW $Mg(OH)_2 \div$(MW Mg(OH)Cl*½=1.1447 gm
Precipitate collected=1.1245 gm
% of theoretical collected=(1.1447±1.1245)*100=98.24%
Analytical data:
Next the sample of $Mg(OH)_2$ was sent for analysis, XRD (X-ray-diffraction) and EDS. Results are shown in FIG. 11. The top row of peaks is that of the sample, the spikes in the middle row are the signature of $Mg(OH)_2$ while the spikes at the bottom are those of MgO. Thus verifying that the recovered precipitate from the dissolution of Mg(OH)Cl has a signal resembling that of $Mg(OH)_2$.

| Element (calc.) | k-ratio Wt % | ZAF (1-Sigma) | Atom % | Element | Wt % Err. |
|---|---|---|---|---|---|
| Mg—K | 0.9472 | 1.014 | 96.88 | 96.02 | +/−0.23 |
| Si—K | 0.0073 | 2.737 | 1.74 | 1.99 | +/−0.17 |
| Cl—K | 0.0127 | 1.570 | 1.38 | 2.00 | +/−0.16 |
| Total | 100.00 | 100.00 | | | |

Note:
Results do not include elements with Z < 11 (Na).

The EDS analysis reveals that very little chlorine [Cl] was incorporated into the precipitate. Note, this analysis cannot detect oxygen or hydrogen.

Example 8

Decarbonation Bubbler Experiment: Production of $CaCO_3$ by reacting $CO_2$ with $Mg(OH)_2$ {or Mg(OH)Cl} and $CaCl_2$ Approximately 20 grams of $Mg(OH)_2$ was placed in a bubble column with two liters of water and $CO_2$ was bubbled though it for x minutes period of time. Afterwards some of the liquid was collected to which a solution of $CaCl_2$ was added. A precipitate immediately formed and was sent through the XRD and EDS. The chemical reaction can be represented as follows:

$$Mg(OH)_2 + CO_2 + CaCl_2 \rightarrow CaCO_3 \downarrow + H_2O \qquad (45)$$

The XRD analysis (FIG. 12) coincides with the $CaCO_3$ signature.
EDS

| Element (calc.) | k-ratio Wt % | ZAF (1-Sigma) | Atom % | Element | Wt % Err. |
|---|---|---|---|---|---|
| Mg—K | 0.0070 | 2.211 | 2.52 | 1.55 | +/−0.10 |
| Al—K | 0.0013 | 1.750 | 0.33 | 0.22 | +/−0.04 |
| Si—K | 0.0006 | 1.382 | 0.12 | 0.09 | +/−0.03 |
| Cl—K | 0.0033 | 1.027 | 0.38 | 0.34 | +/−0.03 |
| Ca—K | 0.9731 | 1.005 | 96.64 | 97.80 | +/−0.30 |
| Total | 100.00 | 100.00 | | | |

Note:
Results do not include elements with Z < 11 (Na).

The EDS analysis indicates almost pure $CaCO_3$ with only a 1.55% by weight magnesium impurity and almost no Chlorine from the $CaCl_2$.

The same test was performed, except that Mg(OH)Cl from the decomposition of $MgCl_2.6H_2O$ was used instead of $Mg(OH)_2$. Although Mg(OH)Cl has half the hydroxide [OH⁻], as $Mg(OH)_2$ it is expected to absorb $CO_2$ and form precipitated $CaCO_3$ (PCC).

The XRD analysis (FIG. 13) coincides with the $CaCO_3$ signature.
EDS

| Element (calc.) | k-ratio Wt % | ZAF (1-Sigma) | Atom % | Element | Wt % Err. |
|---|---|---|---|---|---|
| Mg—K | 0.0041 | 2.224 | 1.48 | 0.90 | +/−0.09 |
| S—K | 0.0011 | 1.071 | 0.14 | 0.11 | +/−0.04 |
| Ca—K | 0.9874 | 1.003 | 98.38 | 98.98 | +/−0.34 |
| Total | 100.00 | 100.00 | | | |

Chi-sqd = 5.83 Livetime = 300.0 Sec.
Standardless Analysis
PROZA Correction Acc. Volt. = 20 kV Take-off Angle = 35.00 deg Number of Iterations = 3
Note:
Results do not include elements with Z < 11 (Na).
Again the results indicate almost pure $CaCO_3$, almost no Mg or Cl compounds.

Example 9A

Rock Melter Experiment: Reaction of Olivine and Serpentine with HCl

Samples of olivine $(Mg,Fe)_2SiO_4$ and serpentine $Mg_3Si_2O_5(OH)_4$ were crushed and reacted with 6.1 molar HCl over a period of approximately 72 hours. Two sets of tests were run, the first at room temperature and the second at 70° C. These minerals have variable formulae and often contain iron. After the samples were filtered, the resulting filtrand and filtrate were dried in an oven overnight. The samples then went through XRD and EDS analysis. The filtrates should have $MgCl_2$ present and the filtrand should be primarily $SiO_2$.

Olivine Filtrate Reacted with HCl at Room Temperature

| Element (calc.) | k-ratio Wt % | ZAF (1-Sigma) | Atom % | Element | Wt % Err. |
|---|---|---|---|---|---|
| Mg—K | 0.1960 | 1.451 | 37.06 | 28.45 | +/−0.18 |
| Si—K | 0.0103 | 1.512 | 1.75 | 1.56 | +/−0.11 |
| Cl—K | 0.5643 | 1.169 | 58.89 | 65.94 | +/−0.31 |
| Fe—K | 0.0350 | 1.161 | 2.30 | 4.06 | +/−0.22 |
| Total | 100.00 | 100.00 | | | |

Olivine Filtrate Reacted with HCl at 70° C.

| Element (calc.) | k-ratio Wt % | ZAF (1-Sigma) | Atom % | Element | Wt % Err. |
|---|---|---|---|---|---|
| Mg—K | 0.1172 | 1.684 | 27.39 | 19.74 | +/−0.12 |
| Si—K | 0.0101 | 1.459 | 1.77 | 1.48 | +/−0.07 |
| Cl—K | 0.5864 | 1.142 | 63.70 | 66.94 | +/−0.24 |
| Fe—K | 0.0990 | 1.144 | 6.84 | 11.33 | +/−0.21 |
| Ni—K | 0.0045 | 1.128 | 0.29 | 0.51 | +/−0.09 |
| Total | 100.00 | | 100.00 | | |

Note:
Results do not include elements with Z < 11 (Na).

Serpentine Filtrate Reacted with HCl at Room Temperature

| Element (calc.) | k-ratio Wt % | ZAF (1-Sigma) | Atom % | Element | Wt % Err. |
|---|---|---|---|---|---|
| Mg—K | 0.1674 | 1.466 | 32.47 | 24.53 | +/−0.15 |
| Al—K | 0.0025 | 1.863 | 0.55 | 0.46 | +/−0.06 |
| Si—K | 0.0033 | 1.456 | 0.55 | 0.48 | +/−0.04 |
| Cl—K | 0.6203 | 1.141 | 64.22 | 70.77 | +/−0.27 |
| Ca—K | 0.0016 | 1.334 | 0.17 | 0.21 | +/−0.05 |
| Cr—K | 0.0026 | 1.200 | 0.19 | 0.31 | +/−0.07 |
| Mn—K | 0.0011 | 1.200 | 0.08 | 0.14 | +/−0.08 |
| Fe—K | 0.0226 | 1.160 | 1.51 | 2.62 | +/−0.10 |
| Ni—K | 0.0042 | 1.128 | 0.26 | 0.48 | +/−0.10 |
| Total | 100.00 | | 100.00 | | |

Note:
Results do not include elements with Z < 11 (Na).

Serpentine Filtrate Reacted with HCl at 70° C.

| Element (calc.) | k-ratio Wt % | ZAF (1-Sigma) | Atom % | Element | Wt % Err. |
|---|---|---|---|---|---|
| Mg—K | 0.1759 | 1.455 | 33.67 | 25.59 | +/−0.14 |
| Al—K | 0.0017 | 1.886 | 0.39 | 0.33 | +/−0.06 |
| Si—K | 0.0087 | 1.468 | 1.46 | 1.28 | +/−0.04 |
| Cl—K | 0.6014 | 1.152 | 62.46 | 69.27 | +/−0.25 |
| Cr—K | 0.0016 | 1.199 | 0.12 | 0.19 | +/−0.06 |
| Fe—K | 0.0268 | 1.161 | 1.78 | 3.11 | +/−0.17 |
| Ni—K | 0.0020 | 1.130 | 0.12 | 0.22 | +/−0.08 |
| Total | 100.00 | | 100.00 | | |

Note:
Results do not include elements with Z < 11 (Na).
Note:
Results do not include elements with Z < 11 (Na).

The filtrate clearly for both minerals serpentine and olivine at ambient conditions and 70° C. all illustrate the presence of $MgCl_2$, and a small amount of $FeCl_2$ in the case of olivine.

Olivine Filtrand Reacted with HCl at Room Temperature

| Element (calc.) | k-ratio Wt % | ZAF (1-Sigma) | Atom % | Element | Wt % Err. |
|---|---|---|---|---|---|
| Mg—K | 0.2239 | 1.431 | 37.68 | 32.04 | +/−0.14 |
| Si—K | 0.3269 | 1.622 | 53.96 | 53.02 | +/−0.19 |
| Cl—K | 0.0140 | 1.658 | 1.87 | 2.32 | +/−0.06 |
| Cr—K | 0.0090 | 1.160 | 0.58 | 1.05 | +/−0.08 |
| Mn—K | 0.0013 | 1.195 | 0.08 | 0.16 | +/−0.09 |
| Fe—K | 0.0933 | 1.167 | 5.57 | 10.89 | +/−0.26 |
| Ni—K | 0.0045 | 1.160 | 0.25 | 0.52 | +/−0.11 |
| Total | 100.00 | | 100.00 | | |

Note:
Results do not include elements with Z < 11 (Na).

Olivine Filtrand Reacted with HCl at 70° C.

| Element (calc.) | k-ratio Wt % | ZAF (1-Sigma) | Atom % | Element | Wt % Err. |
|---|---|---|---|---|---|
| Mg—K | 0.2249 | 1.461 | 38.87 | 32.86 | +/−0.16 |
| Si—K | 0.3030 | 1.649 | 51.12 | 49.94 | +/−0.21 |
| Cl—K | 0.0223 | 1.638 | 2.96 | 3.65 | +/−0.14 |
| Ca—K | 0.0033 | 1.220 | 0.29 | 0.41 | +/−0.05 |
| Cr—K | 0.0066 | 1.158 | 0.42 | 0.76 | +/−0.08 |
| Mn—K | 0.0023 | 1.193 | 0.15 | 0.28 | +/−0.10 |
| Fe—K | 0.0937 | 1.163 | 5.61 | 10.89 | +/−0.29 |
| Ni—K | 0.0074 | 1.158 | 0.42 | 0.86 | +/−0.13 |
| Cu—K | 0.0029 | 1.211 | 0.16 | 0.35 | +/−0.16 |
| Total | 100.00 | | 100.00 | | |

Note:
Results do not include elements with Z < 11 (Na).

Given that the formula for olivine is $(Mg,Fe)_2SiO_4$, and this is a magnesium rich olivine. The raw compound has a Mg:Si ratio of 2:1. However the filtrand, that which does not pass through the filter has a (Mg+Fe:Si) ratio of (37+5.5:52) or 0.817:1. (Atom % on the chart), evidently more than 50% of the magnesium passed through the filter.

Serpentine Filtrand Reacted with HCl at Room Temperature

| Element (calc.) | k-ratio Wt % | ZAF (1-Sigma) | Atom % | Element | Wt % Err. |
|---|---|---|---|---|---|
| Mg—K | 0.1930 | 1.595 | 37.32 | 30.78 | +/−0.15 |
| Si—K | 0.2965 | 1.670 | 51.94 | 49.50 | +/−0.20 |
| Cl—K | 0.0065 | 1.633 | 0.88 | 1.06 | +/−0.06 |
| Cr—K | 0.0056 | 1.130 | 0.36 | 0.63 | +/−0.08 |
| Fe—K | 0.1532 | 1.155 | 9.33 | 17.69 | +/−0.31 |
| Ni—K | 0.0029 | 1.159 | 0.17 | 0.34 | +/−0.12 |
| Total | 100.00 | | 100.00 | | |

Note:
Results do not include elements with Z < 11 (Na).

Serpentine Filtrand Reacted with HCl at 70° C.

| Element (calc.) | k-ratio Wt % | ZAF (1-Sigma) | Atom % | Element | Wt % Err. |
|---|---|---|---|---|---|
| Mg—K | 0.1812 | 1.536 | 33.53 | 27.83 | +/−0.13 |
| Si—K | 0.3401 | 1.593 | 56.49 | 54.18 | +/−0.18 |
| Cl—K | 0.0106 | 1.651 | 1.45 | 1.75 | +/−0.11 |
| Cr—K | 0.0037 | 1.142 | 0.24 | 0.43 | +/−0.07 |
| Mn—K | 0.0009 | 1.188 | 0.05 | 0.10 | +/−0.08 |
| Fe—K | 0.1324 | 1.159 | 8.05 | 15.35 | +/−0.26 |
| Ni—K | 0.0032 | 1.160 | 0.18 | 0.37 | +/−0.11 |
| Total | 100.00 | | 100.00 | | |

Note:
Results do not include elements with Z < 11 (Na).

Given that the formula of serpentine is $(Mg,Fe)_3Si_2O_5(OH)_4$ the initial 1.5:1 ratio of (Mg+Fe) to Si has been whittled down to (37+9.3:56.5)=0.898:1.

Example 9B

Temperature/Pressure Simulation for Decomposition of $MgCl_2 \cdot 6(H_2O)$

Pressure and temperature was varied, as shown below (Table 7) and in FIG. 14, to determine the effect this has on the equilibrium of the decomposition of $MgCl_2 \cdot 6(H_2O)$. Inputs are:
1) $MgCl_2 \cdot 6H_2O$
2) $CaCl_2$ 3) The temperature of the hot stream leaving the heat exchanger (HX) labeled Mg(OH)Cl (see FIGS. 7-8).
4) Percentage of Solids separated in decanter.
5) Water needed labeled $H_2O$
6) Flue Gas.

TABLE 7

| VARY 1 REACTOR1 PARAM TEMP ° C. | VARY 2 REACTOR1 PARAM PRES PSIA | INPUT MOL/SEC | Mg(OH)Cl MOL/SEC | MgO MOL/SEC | Q MW | kWh/tonne CO2 |
|---|---|---|---|---|---|---|
| 400 | 5 | 51.08399 | 25.31399 | 25.77001 | 23.63765 | 3883 |
| 410 | 5 | 38.427 | 0 | 38.427 | 19.85614 | 3261 |
| 420 | 5 | 38.427 | 0 | 38.427 | 19.87482 | 3264 |
| 430 | 5 | 38.427 | 0 | 38.427 | 19.89354 | 3268 |
| 440 | 5 | 38.427 | 0 | 38.427 | 19.9123 | 3271 |
| 450 | 5 | 38.427 | 0 | 38.427 | 19.93111 | 3274 |
| 400 | 7 | 76.854 | 76.854 | 0 | 31.37484 | 5153 |
| 410 | 7 | 53.24627 | 29.63854 | 23.60773 | 24.31186 | 3993 |
| 420 | 7 | 38.427 | 0 | 38.427 | 19.87482 | 3264 |
| 430 | 7 | 38.427 | 0 | 38.427 | 19.89354 | 3268 |
| 440 | 7 | 38.427 | 0 | 38.427 | 19.9123 | 3271 |
| 450 | 7 | 38.427 | 0 | 38.427 | 19.93111 | 3274 |
| 400 | 9 | 76.854 | 76.854 | 0 | 31.37484 | 5153 |
| 410 | 9 | 72.85115 | 68.84829 | 4.002853 | 30.20646 | 4961 |
| 420 | 9 | 50.2148 | 23.5756 | 26.6392 | 23.42411 | 3847 |
| 430 | 9 | 38.427 | 0 | 38.427 | 19.89354 | 3268 |
| 440 | 9 | 38.427 | 0 | 38.427 | 19.9123 | 3271 |
| 450 | 9 | 38.427 | 0 | 38.427 | 19.93111 | 3274 |
| 400 | 11 | 76.854 | 76.854 | 0 | 31.37484 | 5153 |
| 410 | 11 | 76.854 | 76.854 | 0 | 31.41 | 5159 |
| 420 | 11 | 64.78938 | 52.72476 | 12.06462 | 27.81251 | 4568 |
| 430 | 11 | 44.67748 | 12.50096 | 32.17652 | 21.77822 | 3577 |
| 440 | 11 | 38.427 | 0 | 38.427 | 19.9123 | 3271 |
| 450 | 11 | 38.427 | 0 | 38.427 | 19.93111 | 3274 |
| 400 | 13 | 76.854 | 76.854 | 0 | 31.37484 | 5153 |
| 410 | 13 | 76.854 | 76.854 | 0 | 31.41 | 5159 |
| 420 | 13 | 76.854 | 76.854 | 0 | 31.44515 | 5165 |
| 430 | 13 | 55.59535 | 34.3367 | 21.25865 | 25.07026 | 4118 |
| 440 | 13 | 38.427 | 0 | 38.427 | 19.9123 | 3271 |
| 450 | 13 | 38.427 | 0 | 38.427 | 19.93111 | 3274 |
| 400 | 15 | 76.854 | 76.854 | 0 | 31.37484 | 5153 |
| 410 | 15 | 76.854 | 76.854 | 0 | 31.41 | 5159 |
| 420 | 15 | 76.854 | 76.854 | 0 | 31.44515 | 5165 |
| 430 | 15 | 66.51322 | 56.17244 | 10.34078 | 28.36229 | 4659 |
| 440 | 15 | 46.41875 | 15.98351 | 30.43525 | 22.32544 | 3667 |
| 450 | 15 | 38.427 | 0 | 38.427 | 19.93111 | 3274 |
| 200 | 5 | 127 | 76.854 | 0 | 47.51946 | 7805 |
| 210 | 5 | 85 | 76.854 | 0 | 33.34109 | 5476 |
| 220 | 5 | 77 | 76.854 | 0 | 30.74184 | 5049 |
| 230 | 5 | 77 | 76.854 | 0 | 30.77702 | 5055 |
| 240 | 5 | 77 | 76.854 | 0 | 30.8122 | 5061 |
| 250 | 5 | 77 | 76.854 | 0 | 30.84739 | 5067 |
| 200 | 7 | 184 | 76.854 | 0 | 66.57309 | 10935 |
| 210 | 7 | 125 | 76.854 | 0 | 46.75184 | 7679 |
| 220 | 7 | 85 | 76.854 | 0 | 33.32609 | 5474 |
| 230 | 7 | 77 | 76.854 | 0 | 30.777 | 5055 |
| 240 | 7 | 77 | 76.854 | 0 | 30.81218 | 5061 |
| 250 | 7 | 77 | 76.854 | 0 | 30.84737 | 5067 |
| 200 | 9 | 297 | 76.854 | 0 | 89.51079 | 14702 |
| 210 | 9 | 165 | 76.854 | 0 | 60.16258 | 9882 |
| 220 | 9 | 113 | 76.854 | 0 | 42.92123 | 7050 |
| 230 | 9 | 78 | 76.854 | 0 | 31.04401 | 5099 |
| 240 | 9 | 77 | 76.854 | 0 | 30.81217 | 5061 |
| 250 | 9 | 77 | 76.854 | 0 | 30.84735 | 5067 |
| 200 | 11 | 473 | 76.854 | 0 | 136.5784 | 22433 |
| 210 | 11 | 205 | 76.854 | 0 | 73.57332 | 12084 |
| 220 | 11 | 142 | 76.854 | 0 | 52.51638 | 8626 |
| 230 | 11 | 98 | 76.854 | 0 | 38.01558 | 6244 |
| 240 | 11 | 77 | 76.854 | 0 | 30.81216 | 5061 |
| 250 | 11 | 77 | 76.854 | 0 | 30.84734 | 5067 |
| 200 | 13 | 684 | 76.854 | 0 | 192.9858 | 31698 |
| 210 | 13 | 303 | 76.854 | 0 | 91.43505 | 15018 |
| 220 | 13 | 170 | 76.854 | 0 | 62.11152 | 10202 |
| 230 | 13 | 119 | 76.854 | 0 | 44.98715 | 7389 |
| 240 | 13 | 83.3323 | 76.854 | 0 | 33.00459 | 5421 |
| 250 | 13 | 76.854 | 76.854 | 0 | 30.84733 | 5067 |
| 200 | 15 | 930.5287 | 76.854 | 0 | 258.7607 | 42502 |
| 210 | 15 | 422.9236 | 76.854 | 0 | 123.7223 | 20322 |
| 220 | 15 | 198.7291 | 76.854 | 0 | 71.70666 | 11778 |

TABLE 7-continued

| VARY 1 REACTOR1 PARAM TEMP °C. | VARY 2 REACTOR1 PARAM PRES PSIA | INPUT MOL/SEC | Mg(OH)Cl MOL/SEC | MgO MOL/SEC | Q MW | kWh/tonne CO2 |
|---|---|---|---|---|---|---|
| 230 | 15 | 139.6567 | 76.854 | 0 | 51.95871 | 8534 |
| 240 | 15 | 98.51739 | 76.854 | 0 | 38.14363 | 6265 |
| 250 | 15 | 76.854 | 76.854 | 0 | 30.84733 | 5067 |

Examples 10-21

The following remaining examples are concerned with obtaining the necessary heat to perform the decomposition reaction using waste heat emissions from either coal or natural gas power plants. In order to obtain the necessary heat from coal flue gas emissions, the heat source may be located prior to the baghouse where the temperature ranges from 320-480° C. in lieu of the air pre-heater. See Reference: pages 11-15 of "The structural design of air and gas ducts for power stations and industrial Boiler Applications," Publisher: American Society of Civil Engineers (August 1995), which is incorporated by reference herein in its entirety. Open cycle natural gas plants have much higher exhaust temperatures of 600° C. See Reference: pages 11-15 of "The structural design of air and gas ducts for power stations and industrial Boiler Applications," Publisher: American Society of Civil Engineers (August 1995), which is incorporated by reference herein in its entirety. Additionally, the decomposition reaction of $MgCl_2 \cdot 6H_2O$ may also run in two different modes, complete decomposition to MgO or a partial decomposition to Mg(OH)Cl. The partial decomposition to Mg(OH)Cl requires in some embodiments a temperature greater than 180° C. whereas the total decomposition to MgO requires in some embodiments a temperature of 440° C. or greater.

Additionally the incoming feed to the process can be represented as a continuum between 100% Calcium Silicate ($CaSiO_3$) and 100% Magnesium Silicate ($MgSiO_3$) with Diopside ($MgCa(SiO_3)_2$) (or a mixture of $CaSiO_3$ and $MgSiO_3$ in a 1:1 molar ratio) representing an intermediate 50% case. For each of these cases the resulting output will range in some embodiments from calcium carbonate ($CaCO_3$) to magnesium carbonate ($MgCO_3$) with Dolomite $CaMg(CO_3)_2$ representing the intermediate case. The process using 100% calcium silicate is the Ca—Mg process used in all of the previously modeled embodiments. It is also important to note that the 100% magnesium silicate process uses no calcium compounds; whereas the 100% calcium silicate incoming feed process does use magnesium compounds, but in a recycle loop, only makeup magnesium compounds are required.

Further details regarding the Ca—Mg, Mg only, Diopside processes, for example, using complete and partial decomposition of hydrated $MgCl_2$ to MgO and Mg(OH)Cl, respectively, are depicted below.

I) Ca—Mg Process
  Overall reaction $CaSiO_3 + CO_2 \rightarrow CaCO_3 + SiO_2$
  a) Full decomposition ("the $CaSiO_3$—MgO process"):
    1) $MgCl_2 \cdot 6H_2O + \Delta \rightarrow MgO + 5H_2O\uparrow + 2HCl\uparrow$
      A thermal decomposition reaction.
    2) $2HCl(aq) + CaSiO_3 \rightarrow CaCl_2(aq) + SiO_2\downarrow + H_2O$
      A rock melting reaction.
      Note 5 $H_2O$ will be present per 2 moles of HCl during the reaction.
    3) $MgO + CaCl_2(aq) + CO_2 \rightarrow CaCO_3\downarrow, + MgCl_2(aq)$
      Some versions of this equation use $Mg(OH)_2$ which is formed from MgO and $H_2O$.
    4) $MgCl_2(aq) + 6H_2O \rightarrow MgCl_2 \cdot 6H_2O$
      Regeneration of $MgCl_2 \cdot 6H_2O$, return to #1.
  b) Partial decomposition ("the $CaSiO_3$—Mg(OH)Cl process"):
    1) $2 \times [MgCl_2 \cdot 6H_2O + \Delta \rightarrow Mg(OH)Cl + 5H_2O\uparrow + HCl\uparrow]$
      Thermal decomposition.
      Twice as much $MgCl_2 \cdot 6H_2O$ is needed to trap the same amount of $CO_2$.
    2) $2HCl(aq) + CaSiO_3 \rightarrow CaCl_2(aq) + SiO_2\downarrow + H_2O$
      Rock melting reaction.
    3) $2Mg(OH)Cl + CaCl_2(aq) + CO_2 \rightarrow CaCO_3\downarrow 2MgCl_2(aq) + H_2O$ $CO_2$ capture reaction
    4) $2\ MgCl_2 + 12H_2O \rightarrow 2MgCl_2 \cdot 6H_2O$
      Regeneration of $MgCl_2 \cdot 6H_2O$, return to #1.
II) Mg Only Process
  Overall reaction $MgSiO_3 + CO_2 \rightarrow MgCO_3 + SiO_2$
  c) Full decomposition ("the $MgSiO_3$—MgO process")
    1) $2HCl(aq) + MgSiO_3 + (x-1)H_2O \rightarrow MgCl_2 + SiO_2\downarrow + x H_2O$
      Rock melting reaction.
    2) $MgCl_2 \cdot xH_2O + \Delta \rightarrow MgO + (x-1)H_2O\uparrow + 2HCl\uparrow$
      Thermal decomposition reaction.
      Note "x−1" moles $H_2O$ will be produced per 2 moles of HCl.
    3) $MgO + CO_2 \rightarrow MgCO_3$
      $CO_2$ capture reaction.
    Note, in this embodiment no recycle of $MgCl_2$ is required. The value of x, the number of waters of hydration is much lower than 6 because the $MgCl_2$ from the rock melting reaction is hot enough to drive much of the water into the vapor phase. Therefore the path from the rock melting runs at steady state with "x" as modeled with a value of approximately 2.
  d) Partial decomposition ("the $MgSiO_3$—Mg(OH)Cl process")
    1) $2HCl(aq) + MgSiO_3 \rightarrow MgCl_2 + SiO_2\downarrow + H_2O$
      Rock melting reaction.
      Note "x−1" $H_2O$ will be present per mole of HCl during the reaction.
    2) $2 \times [MgCl_2 \cdot xH_2O + \Delta \rightarrow Mg(OH)Cl + (x-1)H_2O\uparrow + HCl\uparrow]$
      Decomposition.
      Twice as much $MgCl_2 \cdot (x-1)H_2O$ is needed to trap the same amount of $CO_2$.

3) $2Mg(OH)Cl+CO_2 \rightarrow MgCO_3\downarrow +MgCl_2+H_2O$
   $CO_2$ capture reaction.
4) $MgCl_2(aq)+6H_2O \rightarrow MgCl_2.6H_2O$
   Regenerate $MgCl_2.6H_2O$, Return to #1.

Note, in this embodiment half of the $MgCl_2$ is recycled. The value of x, the number of waters of hydration is somewhat lower than 6 because half of the $MgCl_2$ is from the rock melting reaction which is hot enough to drive much of the water into the vapor phase and the remaining half is recycled from the absorption column. Therefore the number of hydrations for the total amount of $MgCl_2$ at steady state will have a value of approximately 4, being the average between the $MgCl_2.6H_2O$ and $MgCl_2.2H_2O$.

III) Diopside or Mixed Process:

Note diopside is a mixed calcium and magnesium silicate and dolomite is a mixed calcium and magnesium carbonate.

Overall reaction: ½ $CaMg(SiO_3)_2+CO_2 \rightarrow$ ½ $CaMg(CO_3)_2+SiO_2$ e) Full decomposition ("the Diopside-MgO process"):
   1) $MgCl_2.6H_2O+\Delta \rightarrow MgO+5H_2O\uparrow +2HCl\uparrow$
      Thermal decomposition.
   2) $HCl+$ ½ $CaMg(SiO_3)_2$ ½ $CaCl_2+$ ½ $MgSiO_3\downarrow+$ ½ $SiO_2\downarrow+$ ½ $H_2O$
      First rock melting reaction.
   3) $HCl+$ ½ $MgSiO_3 \rightarrow$ ½ $MgCl_2+$ ½ $SiO_2\downarrow+$ ½ $H_2O$
      Second rock melting reaction. The $MgCl_2$ returns to #1.
   4) $MgO+$ ½ $CaCl_2+CO_2 \rightarrow$ ½ $CaMg(CO_3)_2\downarrow +$ ½ $MgCl_2$
   5) ½ $MgCl_2+3H_2O \rightarrow$ ½ $MgCl_2.6H_2O$
      Regenerate $MgCl_2.6H_2O$, return to #1.

f) Partial decomposition ("the Diopside-Mg(OH)Cl process"):
   1) $2\times[MgCl_2.6H_2O+\Delta \rightarrow Mg(OH)Cl+5H_2O\uparrow +HCl\uparrow]$
      Thermal decomposition.
      Twice as much $MgCl_2.6H_2O$ is needed to trap the same amount of $CO_2$.
   2) $HCl+$ ½ $CaMg(SiO_3)_2 \rightarrow$ ½ $CaCl_2+$ ½ $MgSiO_3\downarrow+$ ½ $SiO_2\downarrow+$ ½ $H_2O$
      First rock melting reaction.
   3) $HCl+$ ½ $MgSiO_3 \rightarrow$ ½ $MgCl_2+$ ½ $SiO_2\downarrow+$ ½ $H_2O$
      Second rock melting reaction. Here the $MgCl_2$ returns to #1.
   4) $2Mg(OH)Cl+$ ½ $CaCl_2+CO_2 \rightarrow$ ½ $CaMg(CO_3)_2\downarrow+$ 3/2 $MgCl_2+H_2O$
   5) 3/2 $MgCl_2+9H_2O \rightarrow$ 3/2 $MgCl_2.6H_2O$
      Regenerate $MgCl_2.6H_2O$, return to #1

Calcium Silicate Process:

The $CaSiO_3$—MgO and $CaSiO_3$—Mg(OH)Cl decomposition processes are further divided into two stages, the first step consists of a dehydration reaction where $MgCl_2.6H_2O$ is converted to $MgCl_2.2H_2O+4$ $H_2O$ and the second step in which the $MgCl_2.2H_2O$ is converted to $Mg(OH)Cl+HCl+H_2O$ if partial decomposition is desired or required and $MgO+2HCl+H_2O$ if total decomposition is desired or required. FIG. 15 describes a layout of this process.

Magnesium Silicate Process:

The $MgSiO_3$—MgO and $MgSiO_3$—Mg(OH)Cl processes consists of a one chamber decomposition step in which the HCl from the decomposition chamber reacts with $MgSiO_3$ in the rock-melting reactor and the ensuing heat of reaction leaves the $MgCl_2$ in the dihydrate form $MgCl_2.2H_2O$ as it leaves the rock-melting chamber in approach to the decomposition reactor where it is converted to either MgO or Mg(OH)Cl as described earlier. This process may be preferred if calcium silicates are unavailable. The HCl emitted from the decomposition reacts with $MgSiO_3$ to form more $MgCl_2$. The magnesium silicate process follows a different path from the calcium. The process starts from the "rock melting reaction HCl+silicate", and then moves to the "decomposition reaction ($MgCl_2$+heat)," and lastly the absorption column. In the calcium silicate process, all the magnesium compounds rotate between the decomposition reaction and the absorption reaction. FIG. 16 describes the layout of this process.

Mixed Magnesium and Calcium Silicate "Diopside" Process:

The intermediate process Diopside-MgO and Diopside-Mg(OH)Cl also involve a two stage decomposition consisting of the dehydration reaction $MgCl_2.6H_2O+\Delta \rightarrow MgCl_2.2H_2O+4$ $H_2O$ followed by the decomposition reaction $MgCl_2.2H_2O+\Delta \rightarrow MgO+2HCl+H_2O$ (full decomposition) or $MgCl_2.2H_2O+\Delta \rightarrow Mg(OH)Cl+HCl+H_2O$ partial decomposition. FIG. 17 describes a layout of this process.

The ensuing HCl from the decomposition then reacts with the Diopside $CaMg(SiO_3)_2$ in a two step "rock melting reaction." The first reaction creates $CaCl_2$ through the reaction $2HCl+CaMg(SiO_3)_2 \rightarrow CaCl_2(aq)+MgSiO_3\downarrow+SiO_2\downarrow+H_2O$. The solids from the previous reaction are then reacted with HCl a second time to produce $MgCl_2$ through the reaction $MgSiO_3+2HCl \rightarrow MgCl_2+SiO_2\downarrow+H_2O$. The $CaCl_2$ from the first rock melter is transported to the absorption column and the $MgCl_2$ from the second rock melter is transported to the decomposition reactor to make Mg(OH)Cl or MgO.

TABLE 9

Summary of Processes

| Example | Process | Flue gas source | Temp. °C.[1] | % $CO_2$ of flue gas[2] | Detailed mass and energy balance of each process stream |
|---|---|---|---|---|---|
| 10 | $CaSiO_3$—Mg(OH)Cl | Coal | 320-550 | 7.2%-18% | Table 14 |
| 11 | $CaSiO_3$—Mg(OH)Cl | Nat. gas | 600 | 7.2%-18% | Table 14 |
| 12 | $CaSiO_3$—MgO | Coal | 550 | 7.2%-18% | Table 15 |
| 13 | $CaSiO_3$—MgO | Nat. gas | 600 | 7.2%-18% | Table 15 |
| 14 | $MgSiO_3$—Mg(OH)Cl | Coal | 320-550 | 7.2%-18% | Table 16 |
| 15 | $MgSiO_3$—Mg(OH)Cl | Nat. gas | 600 | 7.2%-18% | Table 16 |
| 16 | $MgSiO_3$—MgO | Coal | 550 | 7.2%-18% | Table 17 |
| 17 | $MgSiO_3$—MgO | Nat. gas | 600 | 7.2%-18% | Table 17 |
| 18 | Diopside-Mg(OH)Cl | Coal | 320-550 | 7.2%-18% | Table 18 |
| 19 | Diopside-Mg(OH)Cl | Nat. gas | 600 | 7.2%-18% | Table 18 |
| 20 | Diopside-MgO | Coal | 550 | 7.2%-18% | Table 19 |
| 21 | Diopside-MgO | Nat. gas | 600 | 7.2%-18% | Table 19 |

[1]The temperature range of 320-550° C. includes models run at 320, 360, 400, 440 and 550° C. respectively.
[2]The $CO_2$ percentage of flue gas 7.2%-18% includes models run at 7.2%, 10%, 14% and 18% respectively.

Basis of the Reaction:

All of these examples assume 50% $CO_2$ absorption of a reference flue gas from a known coal fired plant of interest. This was done to enable a comparison between each example. The emission flow rate of flue gas from this plant is 136,903,680 tons per year and the $CO_2$ content of this gas is 10% by weight. This amount of $CO_2$ is the basis for examples 10 through 21 which is:

Amount of $CO_2$ present in the flue gas per year:
136,903,680 tons per year*10%=13,690,368 tons per year
Amount of $CO_2$ absorbed per year.
13,690,368 tons per year*50%=6,845,184 tons per year of $CO_2$.

Since the amount of $CO_2$ absorbed is a constant, the consumption of reactants and generation of products is also a constant depending on the reaction stoichiometry and molecular weight for each compound.

For all the examples of both the $CaSiO_3$—MgO and the $CaSiO_3$—Mg(OH)Cl process (examples 10-13) the overall reaction is:

$$CaSiO_3 + CO_2 \rightarrow CaCO_3 + SiO_2$$

For all the examples of both the $MgSiO_3$—MgO and the $MgSiO_3$—Mg(OH)Cl process (examples 14-17) the overall reaction is:

$$MgSiO_3 + CO_2 \rightarrow MgCO_3 + SiO_2$$

For all the examples of both the Diopside-MgO and the Diopside-Mg(OH)Cl process (examples 18-21) the overall reaction is:

$$\tfrac{1}{2}CaMg(SiO_3)_2 + CO_2 \rightarrow \tfrac{1}{2}CaMg(CO_3)_2 + SiO_2$$

The Aspen model enters the required inputs for the process and calculates the required flue gas to provide the heat needed for the decomposition reaction to produce the carbon dioxide absorbing compounds MgO, $Mg(OH)_2$ or Mg(OH)Cl. This flue gas may be from a natural gas or a coal plant and in the case of coal was tested at a range of temperatures from 320° C. to 550° C. This flue gas should not be confused with the reference flue gas which was used a standard to provide a specific amount of $CO_2$ removal for each example. A process with a higher temperature flue gas would typically require a lesser amount of flue gas to capture the same amount of carbon dioxide from the basis. Also a flue gas with a greater carbon dioxide concentration would typically result in greater amount of flue gas needed to capture the carbon dioxide because there is a greater amount of carbon dioxide that needs to be captured.

The consumption of reactants and generation of products can be determined from the basis of $CO_2$ captured and the molecular weights of each input and each output for each example.

TABLE 10

Molecular Masses of Inputs and Outputs (all embodiments).

| Compound | Molecular Weight |
|---|---|
| $CaSiO_3$ | 116.16 |
| $MgSiO_3$ | 99.69 |
| Diopside* | 215.85 |
| $CaCO_3$ | 100.09 |
| $MgCO_3$ | 84.31 |
| Dolomite* | 184.40 |
| $SiO_2$ | 60.08 |
| $CO_2$ | 44.01 |

*Number of moles must be divided by 2 to measure comparable $CO_2$ absorption with the other processes, For Examples 10-13:
The $CaSiO_3$ consumption is:
6,845,184 tons per year*(116.16/44.01)=18,066,577 tons per year.
The $CaCO_3$ production is:
6,845,184 tons per year*(100.09/44.01)=15,559,282 tons per year.
The $SiO_2$ production is:
6,845,184 tons per year*(60.08/44.01)=9,344,884 tons per year The same type of calculations may be done for the remaining examples. This following table contains the inputs and outputs for examples 10 through 21. Basis: 6,845,184 tons $CO_2$ absorbed per year.

TABLE 11

Mass Flows of Inputs and Outputs for Examples 10-21.
All measurements are in tons per year (TPY)

| | Examples | | |
|---|---|---|---|
| | 10-13 | 14-17 | 18-21 |
| $CO_2$ absorbed | 6,845,184 | 6,845,184 | 6,845,184 |
| INPUTS | | | |
| Flue Gas for $CO_2$ Capture | 136,903,680 | 136,903,680 | 136,903,680 |
| 10% $CO_2$ | 13,690,368 | 13,690,368 | 13,690,368 |
| $CaSiO_3$ | 18,066,577 | | |
| $MgSiO_3$ | | 15,613,410 | |
| Diopside | | | 16,839,993 |
| OUTPUTS | | | |
| $SiO_2$ | 9,344,884 | 9,344,884 | 9,344,884 |
| $CaCO_3$ | 15,559,282 | | |
| $MgCO_3$ | | 13,111,817 | |
| Dolomite | | | 14,319,845 |

Running the Aspen models generated the following results for the heat duty for each step of the decomposition reaction, dehydration and decomposition. The results for each example are summarized in the table below.

TABLE 12

Power (Rate of Energy for each process at the particular basis of $CO_2$ absorption).
HEAT BALANCE

| | Process | | | | | |
|---|---|---|---|---|---|---|
| | $CaSiO_3$—Mg(OH)Cl | $CaSiO_3$—MgO | $MgSiO_3$—Mg(OH)Cl | $MgSiO_3$—MgO | Diop.-Mg(OH)Cl | Diop.-MgO |
| | Examples | | | | | |
| | 10, 11 | 12, 13 | 14, 15 | 16, 17 | 18, 19 | 20, 21 |
| Dehydration Chamber (MW) HEX TO DI (210° C.) Source | 2670 | 1087 | n/a | n/a | 2614 | 1306 |
| Decomposition Chamber (MW) | 1033 | 1297 | HCl reacting with silicate 1226 | 1264 | 1231 | 1374 |

TABLE 12-continued

Power (Rate of Energy for each process at the particular basis of $CO_2$ absorption).
HEAT BALANCE

| | Process | | | | | |
|---|---|---|---|---|---|---|
| | $CaSiO_3$—$Mg(OH)Cl$ | $CaSiO_3$—MgO | $MgSiO_3$—$Mg(OH)Cl$ | $MgSiO_3$—MgO | Diop.-$Mg(OH)Cl$ | Diop.-MgO |
| | | | Examples | | | |
| | 10, 11 | 12, 13 | 14, 15 | 16, 17 | 18, 19 | 20, 21 |
| Decomposition Temp. °C. | 210 | 450 | 210 | 450 | 210 | 450 |
| Source | | | Flue Gas | | | |
| Total heat used for D&D* (MW) | 3703 | 2384 | 1226 | 1264 | 3854 | 2680 |

*D&D equals dehydration and decomposition

TABLE 13

Percentage $CO_2$ captured as a function of flue gas temperature and $CO_2$ concentration. Examples 10 through 13.

| | | | | | Process | | | |
|---|---|---|---|---|---|---|---|---|
| | | $CaSiO_3$—$Mg(OH)Cl$ | | | | $CaSiO_3$—MgO | $CaSiO_3$—$Mg(OH)Cl$ | $CaSiO_3$—MgO |
| | | | | | Flue Gas Source/Temp. | | | |
| | Coal 320° C. | Coal 360° C. | Coal 400° C. | Coal 440° C. | Coal 550° C. | Coal 550° C. | Nat. gas 600° C. | Nat. gas 600° C. |
| | | | | | Example # | | | |
| % $CO_2$ | 10 | 10 | 10 | 10 | 10 | 12 | 11 | 13 |
| 7% | 33% | 45% | 57% | 70% | 105% | 83% | 121% | 96% |
| 10% | 24% | 32% | 41% | 50% | 75% | 60% | 87% | 69% |
| 14% | 17% | 23% | 29% | 36% | 54% | 43% | 62% | 50% |
| 18% | 13% | 18% | 23% | 28% | 42% | 33% | 48% | 39% |

A value of over 100% means that excess heat is available to produce more $Mg(OH)Cl$ or MgO. FIG. 24 illustrates the percent $CO_2$ captured for varying $CO_2$ flue gas concentrations, varying temperatures, whether the flue gas was originated from coal or natural gas, and also whether the process relied on full or partial decomposition for examples 10 through 13 of the $CaSiO_3$—$Mg(OH)Cl$ and $CaSiO_3$—MgO processes.

TABLE 14

Percentage $CO_2$ captured as a function of flue gas temperature and $CO_2$ concentration. Examples 14 through 17.

| | | | | | Process | | | |
|---|---|---|---|---|---|---|---|---|
| | | $MgSiO_3$—$Mg(OH)Cl$ | | | | $MgSiO_3$—MgO | $MgSiO_3$—$Mg(OH)Cl$ | $MgSiO_3$—MgO |
| | | | | | Flue Gas Source/Temp. | | | |
| | Coal 320° C. | Coal 360° C. | Coal 400° C. | Coal 440° C. | Coal 550° C. | Coal 550° C. | Ngas 600° C. | Ngas 600° C. |
| | | | | | Example # | | | |
| % $CO_2$ | 14 | 14 | 14 | 14 | 14 | 16 | 15 | 17 |
| 7% | 24% | 34% | 45% | 55% | 84% | 86% | 93% | 96% |
| 10% | 17% | 25% | 32% | 40% | 61% | 62% | 67% | 69% |
| 14% | 12% | 18% | 23% | 28% | 43% | 44% | 48% | 49% |
| 18% | 10% | 14% | 18% | 22% | 34% | 34% | 37% | 38% |

FIG. 25 illustrates the percent $CO_2$ captured for varying $CO_2$ flue gas concentrations, varying temperatures, whether the flue gas was originated from coal or natural gas, and also whether the process relied on full or partial decomposition for examples 14 through 17 of the $MgSiO_3$—$Mg(OH)Cl$ and $MgSiO_3$—$MgO$ processes.

TABLE 15

Percentage $CO_2$ captured as a function of flue gas temperature and $CO_2$ concentration. Examples 18 through 21.

| | | Process | | | | | | |
|---|---|---|---|---|---|---|---|---|
| | | Diopside-Mg(OH)Cl | | | | Diop - MgO | Diop - Mg(OH)Cl | Diop-MgO |
| | | Flue Gas Source/Temp. | | | | | | |
| | | Coal 320° C. | Coal 360° C. | Coal 400° C. | Coal 440° C. | Coal 550° C. | Coal 550° C. | Ngas 600° C. | Ngas 600° C. |
| | | | | | Example # | | | | |
| % $CO_2$ | | 18 | 18 | 18 | 18 | 18 | 20 | 19 | 21 |
| 7% | | 28% | 38% | 48% | 59% | 88% | 79% | 101% | 91% |
| 10% | | 20% | 27% | 35% | 42% | 63% | 57% | 73% | 65% |
| 14% | | 14% | 19% | 25% | 30% | 45% | 40% | 52% | 47% |
| 18% | | 11% | 15% | 19% | 23% | 35% | 31% | 41% | 36% |

* Note Diop equals Diopside

FIG. 26 illustrates the percent $CO_2$ captured for varying $CO_2$ flue gas concentrations, varying temperatures, whether the flue gas was originated from coal or natural gas, and also whether the process relied on full or partial decomposition for examples 18 through 21 of the Diopside—$Mg(OH)Cl$ and Diopside—$MgO$ processes.

TABLE 16a

Mass and Energy Accounting for Examples 10 and 11 Simulation.

| | 1 | 2 | $CaCl_2$ | $CaCl_2$—Si | $CaCO_3$ | $CaSiO_3$ | FLUEGAS | $H_2O$ | HCl | HCl Vapor |
|---|---|---|---|---|---|---|---|---|---|---|
| PH | | | | | | | | | | |
| Temperature ° C. | 112.6 | 95 | 149.9 | 150 | 95 | 25 | 100 | 25 | 200 | 250 |
| Pressure psia | 14.696 | 15 | 100 | 14.696 | 14.7 | 14.696 | 15.78 | 14.7 | 14.696 | 14.696 |
| Mass VFrac | 0 | 0.793 | 0 | 0 | 0 | 0 | 1 | 0 | 1 | 1 |
| Mass SFrac | 1 | 0.207 | 0 | 0.163 | 1 | 1 | 0 | 0 | 0 | 0 |
| Mass Flow tonne/year | 5.73E+07 | 3.96E+07 | 4.36E+07 | 5.21E+07 | 1.41E+07 | 164E+07 | 6.21E+07 | 1.80E+07 | 3.57E+07 | 3.57E+07 |
| Volume Flow gal/min | 11216.8 | 2.2E+07 | 17031.4 | 18643.542 | 2616.633 | 2126.004 | 3.11E+07 | 502184.16 | 3.30E+07 | 3.65E+07 |
| Enthalpy MW | −22099.5 | −3288.21 | −17541.7 | −21585.353 | −5368.73 | −7309.817 | −2926.806 | −9056.765 | −11331.898 | −11240.08 |
| Density lb/cuft | 160.371 | 0.059 | 80.305 | 87.619 | 169.173 | 241.725 | 0.063 | 1.125 | 0.034 | 0.031 |
| $H_2O$ | 0 | 1.80E+07 | 2.79E+07 | 2.79E+07 | 0 | 0 | 3.10E+06 | 1.80E+07 | 2.54E+07 | 2.54E+07 |
| HCl | 0 | 0 | 0.004 | 0.004 | 0 | 0 | 0 | 0 | 1.03E+07 | 1.03E+07 |
| $CO_2$ | 0 | 0 | 0 | 0 | 0 | 0 | 6.21E+06 | 0 | 0 | 0 |
| $O_2$ | 0 | 0 | 0 | 0 | 0 | 0 | 6.21E+06 | 0 | 0 | 0 |
| $N_2$ | 0 | 0 | 0 | 0 | 0 | 0 | 4.65E+07 | 0 | 0 | 0 |
| $CaCO_3$ | 0 | 0 | 0 | 0 | 1.41E+07 | 0 | 0 | 0 | 0 | 0 |
| $MgCl_2$ | 0 | 0 | 0 | 0 | 0 | 0 | 0 | 0 | 0 | 0 |
| $MgCl_2$*W | 0 | 0 | 0 | 0 | 0 | 0 | 0 | 0 | 0 | 0 |
| $MgCl_2$*2W | 0 | 0 | 0 | 0 | 0 | 0 | 0 | 0 | 0 | 0 |
| $MgCl_2$*4W | 0 | 0 | 0 | 0 | 0 | 0 | 0 | 0 | 0 | 0 |
| $MgCl_2$*6W | 5.73E+07 | 0 | 0 | 0 | 0 | 0 | 0 | 0 | 0 | 0 |
| Mg(OH)Cl | 0 | 0 | 0 | 0 | 0 | 0 | 0 | 0 | 0 | 0 |
| $Mg(OH)_2$ | 0 | 8.22E+06 | 0 | 0 | 0 | 0 | 0 | 0 | 0 | 0 |
| MgO | 0 | 0 | 0 | 0 | 0 | 0 | 0 | 0 | 0 | 0 |
| $MgHCO_3^+$ | 0 | 0 | 0 | 0 | 0 | 0 | 0 | 0 | 0 | 0 |
| $SO_2$ | 0 | 0 | 0 | 0 | 0 | 0 | 0 | 0 | 0 | 0 |
| $NO_2$ | 0 | 0 | 0 | 0 | 0 | 0 | 0 | 0 | 0 | 0 |
| NO | 0 | 0 | 0 | 0 | 0 | 0 | 0 | 0 | 0 | 0 |
| $Mg^{2+}$ | 0 | 3.43E+06 | 0 | 0 | 0 | 0 | 0 | 0 | 0 | 0 |
| $Ca^{2+}$ | 0 | 0 | 5.65E+06 | 5.65E+06 | 0 | 0 | 0 | 0 | 0 | 0 |
| $Cl^-$ | 0 | 1.00E+07 | 1.00E+07 | 1.00E+07 | 0 | 0 | 0 | 0 | 0 | 0 |

TABLE 16a-continued

Mass and Energy Accounting for Examples 10 and 11 Simulation.

| | Process Stream Names | | | | | | | | |
|---|---|---|---|---|---|---|---|---|---|
| | 1 | 2 | CaCl$_2$ | CaCl$_2$—Si | CaCO$_3$ | CaSiO$_3$ | FLUEGAS | H$_2$O | HCl | HCl Vapor |
| CO$_3^{2-}$ | 0 | 0 | 0 | 0 | 0 | 0 | 0 | 0 | 0 | 0 |
| HCO$_3^-$ | 0 | 0 | 0 | 0 | 0 | 0 | 0 | 0 | 0 | 0 |
| OH$^-$ | 0 | 0 | 0 | 0 | 0 | 0 | 0 | 0 | 0 | 0 |
| CaSiO$_3$ | 0 | 0 | 0 | .007 | 0 | 1.64E+07 | 0 | 0 | 0 | 0 |
| SiO$_2$ | 0 | 0 | 0 | 8.47E+06 | 0 | 0 | 0 | 0 | 0 | 0 |

TABLE 16b

Mass and Energy Accounting for Examples 10 and 11 Simulation.

| | Process Stream Names | | | | | | | |
|---|---|---|---|---|---|---|---|---|
| | MgCl$_2$—2W | MgCl$_2$—6W | RECYCLE1 | RX2-VENT | SiO$_2$ | SLURRY | SOLIDS-1 | SOLIDS-2 |
| PH | | | 9.453 | | | 9.453 | | |
| Temperature C. | 215 | 80 | 95 | 95 | 149.9 | 95 | 250 | 115 |
| Pressure psia | 14.696 | 14.696 | 14.7 | 14.7 | 100 | 14.7 | 14.696 | 14.696 |
| Mass VFrac | .502 | 0 | 0 | 1 | 0 | 0 | 0 | .165 |
| Mass SFrac | .498 | 1 | 0 | 0 | 1 | .152 | 1 | .207 |
| Mass Flow tonne/year | 5.73E+07 | 5.73E+07 | 7.84E+07 | 5.27E+07 | 8.47E+06 | 9.26E+07 | 2.16E+07 | 3.96E+07 |
| Volume Flow gal/min | 3.03E+07 | 11216.796 | 33789.492 | 282E+07 | 1607.826 | 32401.78 | 3828.933 | 6.33E+06 |
| Enthalpy MW | −1877.989 | −22191.287 | −32705.27 | 120.09 | 0 | −38074.2 | −7057.97 | −4070.06 |
| Density lb/cuft | .059 | 160.371 | 72.846 | 0.059 | 165.327 | 89.628 | 177.393 | 0.197 |
| H$_2$O | 2.54E+07 | 0 | 5.16E+07 | 0 | 0 | 5.16E+07 | 0 | 1.80E+07 |
| HCl | 3.40E+06 | 0 | 0 | 0 | 0 | 0 | 0 | 0 |
| CO$_2$ | 0 | 0 | 0.074 | 25.781 | 0 | 0.074 | 0 | 0 |
| O$_2$ | 0 | 0 | 2510.379 | 6.20E+06 | 0 | 2510.379 | 0 | 0 |
| N$_2$ | 0 | 0 | 8109.244 | 4.65E+07 | 0 | 8109.245 | 0 | 0 |
| CaCO$_3$ | 0 | 0 | 0 | 0 | 0 | 1.41E+07 | 0 | 0 |
| MgCl$_2$ | 0 | 0 | 0 | 0 | 0 | 0 | 0 | 0 |
| MgCl$_2$*W | 2.14E+07 | 0 | 0 | 0 | 0 | 0 | 0 | 0 |
| MgCl$_2$*2W | 0 | 0 | 0 | 0 | 0 | 0 | 0 | 0 |
| MgCl$_2$*4W | 0 | 0 | 0 | 0 | 0 | 0 | 0 | 0 |
| MgCl$_2$*6W | 0 | 5.73E+07 | 0 | 0 | 0 | 0 | 0 | 0 |
| Mg(OH)Cl | 7.15E+06 | 0 | 0 | 0 | 0 | 0 | 2.16E+07 | 0 |
| Mg(OH)$_2$ | 0 | 0 | 0 | 0 | 0 | 0 | 0 | 8.22E+06 |
| MgO | 0 | 0 | 0 | 0 | 0 | 0 | 0 | 0 |
| MgHCO$_3^+$ | 0 | 0 | 3324.433 | 0 | 0 | 3324.433 | 0 | 0 |
| SO$_2$ | 0 | 0 | 0 | 0 | 0 | 0 | 0 | 0 |
| NO$_2$ | 0 | 0 | 0 | 0 | 0 | 0 | 0 | 0 |
| NO | 0 | 0 | 0 | 0 | 0 | 0 | 0 | 0 |
| Mg$^{2+}$ | 0 | 0 | 6.85E+06 | 0 | 0 | 6.85E+06 | 0 | 3.43E+06 |
| Ca$^{2+}$ | 0 | 0 | 1644.031 | 0 | 0 | 1644.031 | 0 | 0 |
| Cl$^-$ | 0 | 0 | 2.00E+07 | 0 | 0 | 2.00E+07 | 0 | 1.00E+07 |
| CO$_3$ | 0 | 0 | 61.424 | 0 | 0 | 61.424 | 0 | 0 |
| HCO$_3$ | 0 | 0 | 27.297 | 0 | 0 | 27.297 | 0 | 0 |
| OH$^-$ | 0 | 0 | 690.278 | 0 | 0 | 690.278 | 0 | 0 |
| CaSiO$_3$ | 0 | 0 | 0 | 0 | 0.007 | 0 | 0 | 0 |
| SiO$_2$ | 0 | 0 | 0 | 0 | 8.47E+06 | 0 | 0 | 0 |

TABLE 17a

Mass and Energy Accounting for Examples 12 and 13 Simulation.

| | Process Stream Names | | | | | | | | |
|---|---|---|---|---|---|---|---|---|---|
| | 1 | 2 | CaCl$_2$ | CaCl$_2$—Si | CaCO$_3$ | CaSiO$_3$ | FLUEGAS | H$_2$O | HCl | HCl Vapor |
| PH | | | | | | | | | | |
| Temperature °C. | 271 | 255.5 | 149.8 | 150 | 95 | 25 | 100 | 25 | 200 | 450 |

TABLE 17a-continued

Mass and Energy Accounting for Examples 12 and 13 Simulation.

| | Process Stream Names | | | | | | | | | |
|---|---|---|---|---|---|---|---|---|---|---|
| | 1 | 2 | $CaCl_2$ | $CaCl_2$—Si | $CaCO_3$ | $CaSiO_3$ | FLUEGAS | $H_2O$ | HCl | HCl Vapor |
| Pressure psia | 14.696 | 15 | 100 | 14.696 | 14.7 | 14.696 | 15.78 | 14.7 | 14.696 | 14.696 |
| Mass VFrac | 0 | 0 | 0 | 0 | 0 | 0 | 1 | 0 | 1 | 1 |
| Mass SFrac | 1 | 1 | 0 | 0.215 | 1 | 1 | 0 | 0 | 0 | 0 |
| Mass Flow tonne/year | 2.87E+07 | 2.37E+07 | 3.09E+07 | 3.94E+07 | 1.41E+07 | 1.64E+07 | 6.21E+07 | 1.80E+07 | 2.30E+07 | 2.30E+07 |
| Volume Flow gal/min | 5608.398 | 10220.835 | 10147.12 | 11758.176 | 2616.827 | 2126.004 | 3.11E+07 | 502184.16 | 1.93E+07 | 2.94E+07 |
| Enthalpy MW | −10826.6 | −11660.74 | −11347.9 | −15391.633 | −5369.12 | −7309.817 | −2926.806 | −9056.765 | −6056.076 | −5786.994 |
| Density lb/cuft | 160.371 | 72.704 | 95.515 | 105.035 | 169.173 | 241.725 | 0.063 | 1.125 | 0.037 | 0.024 |
| $H_2O$ | 0 | 1.55E+07 | 1.52E+07 | 1.52E+07 | 0 | 0 | 3.10E+06 | 1.80E+07 | 1.27E+07 | 1.27E+07 |
| HCl | 0 | 0 | 0.015 | 0.015 | 0 | 0 | 0 | 0 | 1.03E+07 | 1.03e+07 |
| $CO_2$ | 0 | 0 | 0 | 0 | 0 | 0 | 6.21E+06 | 0 | 0 | 0 |
| $O_2$ | 0 | 0 | 0 | 0 | 0 | 0 | 6.21E+06 | 0 | 0 | 0 |
| $N_2$ | 0 | 0 | 0 | 0 | 0 | 0 | 4.65E+07 | 0 | 0 | 0 |
| $CaCO_3$ | 0 | 0 | 0 | 0 | 1.41E+07 | 0 | 0 | 0 | 0 | 0 |
| $MgCl_2$ | 0 | 0 | 0 | 0 | 0 | 0 | 0 | 0 | 0 | 0 |
| $MgCl_2$*W | 0 | 0 | 0 | 0 | 0 | 0 | 0 | 0 | 0 | 0 |
| $MgCl_2$*2W | 0 | 0 | 0 | 0 | 0 | 0 | 0 | 0 | 0 | 0 |
| $MgCl_2$*4W | 0 | 0 | 0 | 0 | 0 | 0 | 0 | 0 | 0 | 0 |
| $MgCl_2$*6W | 2.87E+07 | 0 | 0 | 0 | 0 | 0 | 0 | 0 | 0 | 0 |
| Mg(OH)Cl | 0 | 0 | 0 | 0 | 0 | 0 | 0 | 0 | 0 | 0 |
| $Mg(OH)_2$ | 0 | 8.22E+06 | 0 | 0 | 0 | 0 | 0 | 0 | 0 | 0 |
| MgO | 0 | 0 | 0 | 0 | 0 | 0 | 0 | 0 | 0 | 0 |
| $MgHCO_3^+$ | 0 | 0 | 0 | 0 | 0 | 0 | 0 | 0 | 0 | 0 |
| $SO_2$ | 0 | 0 | 0 | 0 | 0 | 0 | 0 | 0 | 0 | 0 |
| $NO_2$ | 0 | 0 | 0 | 0 | 0 | 0 | 0 | 0 | 0 | 0 |
| NO | 0 | 0 | 0 | 0 | 0 | 0 | 0 | 0 | 0 | 0 |
| $Mg^{2+}$ | 0 | 0 | 0 | 0 | 0 | 0 | 0 | 0 | 0 | 0 |
| $Ca^{2+}$ | 0 | 0 | 5.65E+06 | 5.65E+06 | 0 | 0 | 0 | 0 | 0 | 0 |
| $Cl^-$ | 0 | 0 | 1.00E+07 | 1.00E+07 | 0 | 0 | 0 | 0 | 0 | 0 |
| $CO_3^{2-}$ | 0 | 0 | 0 | 0 | 0 | 0 | 0 | 0 | 0 | 0 |
| $HCO_3^-$ | 0 | 0 | 0 | 0 | 0 | 0 | 0 | 0 | 0 | 0 |
| $OH^-$ | 0 | 0 | 0 | 0 | 0 | 0 | 0 | 0 | 0 | 0 |
| $CaSiO_3$ | 0 | 0 | 0 | 0.023 | 1.64E+07 | 0 | 0 | 0 | 0 | 0 |
| $SiO_2$ | 0 | 0 | 0 | 8.47E+06 | 0 | 0 | 0 | 0 | 0 | 0 |

TABLE 17b

Mass and Energy Accounting for Examples 12 and 13 Simulation.

| | Process Stream Names | | | | |
|---|---|---|---|---|---|
| | $MgCl_2$—2W | $MgCl_2$—6W | RECYCLE1 | RX2-VENT | $SiO_2$ |
| PH | | | 9.304 | | |
| Temperature ° C. | 215 | 80 | 95 | 95 | 149.8 |
| Pressure psia | 14.696 | 14.696 | 14.7 | 14.7 | 100 |
| Mass VFrac | 0.502 | 0 | 0 | 1 | 0 |
| Mass SFrac | 0.498 | 1 | 0 | 0 | 1 |
| Mass Flow tonne/year | 2.87E+07 | 2.87E+07 | 4.98E+07 | 5.27E+07 | 8.47E+06 |
| Volume Flow gal/min | 1.51E+07 | 5608.398 | 25330.305 | 2.82E+07 | 1607.826 |
| Enthalpy MW | −9388.949 | −11095.644 | −21589.89 | 120.08 | 0 |
| Density lb/cuft | 0.059 | 160.371 | 61.662 | 0.059 | 165.327 |
| $H_2O$ | 127E+07 | 0 | 3.63E+07 | 0 | 0 |
| HCl | 1.70E+07 | 0 | 0 | 0 | 0 |
| $CO_2$ | 0 | 0 | 0.145 | 79.255 | 0 |
| $O_2$ | 0 | 0 | 1919.222 | 6.20E+06 | 0 |
| $N_2$ | 0 | 0 | 6199.3 | 4.65E+07 | 0 |
| $CaCO_3$ | 0 | 0 | 0 | 0 | 0 |
| $MgCl_2$ | 0 | 0 | 0 | 0 | 0 |
| $MgCl_2$*W | 1.07E+07 | 0 | 0 | 0 | 0 |
| $MgCl_2$*2W | 0 | 0 | 0 | 0 | 0 |
| $MgCl_2$*4W | 0 | 0 | 0 | 0 | 0 |
| $MgCl_2$*6W | 0 | 2.87E+07 | 0 | 0 | 0 |
| Mg(OH)Cl | 3.58E+06 | 0 | 0 | 0 | 0 |
| $Mg(OH)_2$ | 0 | 0 | 0 | 0 | 0 |
| MgO | 0 | 0 | 0 | 0 | 0 |
| $MgHCO_3^+$ | 0 | 0 | 2208.676 | 0 | 0 |
| $SO_2$ | 0 | 0 | 0 | 0 | 0 |
| $NO_2$ | 0 | 0 | 0 | 0 | 0 |
| NO | 0 | 0 | 0 | 0 | 0 |

TABLE 17b-continued

Mass and Energy Accounting for Examples 12 and 13 Simulation.

| | | | | | |
|---|---|---|---|---|---|
| $Mg^{2+}$ | 0 | 0 | 3.43E+06 | 0 | 0 |
| $Ca^{2+}$ | 0 | 0 | 1225.309 | 0 | 0 |
| $Cl^-$ | 0 | 0 | 1.00E+07 | 0 | 0 |
| $CO_3^{2-}$ | 0 | 0 | 110.963 | 0 | 0 |
| $HCO_3^-$ | 0 | 0 | 63.12 | 0 | 0 |
| $OH^-$ | 0 | 0 | 519.231 | 0 | 0 |
| $CaSiO_3$ | 0 | 0 | 0 | 0 | 0.023 |
| $SiO_2$ | 0 | 0 | 0 | 0 | 8.47E+06 |

| | Process Stream Names | | |
|---|---|---|---|
| | SLURRY | SOLIDS-1 | SOLIDS-2 |
| PH | 9.304 | | |
| Temperature ° C. | 95 | 450 | 115 |
| Pressure psia | 14.7 | 14.696 | 14.696 |
| Mass VFrac | 0 | 0 | 0 |
| Mass SFrac | 0.221 | 1 | 1 |
| Mass Flow tonne/year | 6.39E+07 | 5.68E+06 | 2.37E+07 |
| Volume Flow gal/min | 22988.79 | 797.11 | 10220.84 |
| Enthalpy MW | −26959.3 | −2603.98 | −11955.9 |
| Density lb/cuft | 87.199 | 223.695 | 72.704 |
| $H_2O$ | 3.63E+07 | 0 | 1.55E+07 |
| HCl | 0 | 0 | 0 |
| $CO_2$ | 0.145 | 0 | 0 |
| $O_2$ | 1919.222 | 0 | 0 |
| $N_2$ | 6199.301 | 0 | 0 |
| $CaCO_3$ | 1.41E+07 | 0 | 0 |
| $MgCl_2$ | 0 | 0 | 0 |
| $MgCl_2{*}W$ | 0 | 0 | 0 |
| $MgCl_2{*}2W$ | 0 | 0 | 0 |
| $MgCl_2{*}4W$ | 0 | 0 | 0 |
| $MgCl_2{*}6W$ | 0 | 0 | 0 |
| Mg(OH)Cl | 0 | 0 | 0 |
| $Mg(OH)_2$ | 0 | 0 | 8.22E+06 |
| MgO | 0 | 5.68E+06 | 0 |
| $MgHCO_3^+$ | 2208.676 | 0 | 0 |
| $SO_2$ | 0 | 0 | 0 |
| $NO_2$ | 0 | 0 | 0 |
| NO | 0 | 0 | 0 |
| $Mg^{2+}$ | 3.43E+06 | 0 | 0 |
| $Ca^{2+}$ | 1225.309 | 0 | 0 |
| $Cl^-$ | 1.00E+07 | 0 | 0 |
| $CO_3^{2-}$ | 110.963 | 0 | 0 |
| $HCO_3^-$ | 63.12 | 0 | 0 |
| $OH^-$ | 519.231 | 0 | 0 |
| $CaSiO_3$ | 0 | 0 | 0 |
| $SiO_2$ | 0 | 0 | 0 |

TABLE 18a

Mass and Energy Accounting for Examples 14 and 15 Simulation.

| | Process Stream Names | | | | | | |
|---|---|---|---|---|---|---|---|
| | FLUEGAS | $H_2O$ | $H_2O$ | HCl Vapor | $MgCl_2$--2 | $MgCl_2$—2w | $MgCl_2$—Si |
| PH | | | | | | | |
| Temperature ° C. | 100 | 25 | 26 | 250 | 200.7 | 200 | 200 |
| Pressure psia | 15.78 | 1 | 14.696 | 14.696 | 15 | 14.696 | 14.696 |
| Mass VFrac | 1 | 0 | 0.798 | 1 | 0.238 | 0 | 0.169 |
| Mass SFrac | 0 | 0 | 0.186 | 0 | 0 | 1 | 0.289 |
| Mass Flow tons/year | 1.37E+08 | 1.00E+07 | 1.58E+08 | 1.69E+07 | 2.31E+07 | 4.08E+07 | 3.26E+07 |
| Volume Flow gal/min | 62.21E+07 | 4569.619 | 4.91E+07 | 1.22E+07 | 5.22E+06 | 3828.933 | 5.33E+06 |
| Enthalpy MW | −5853.92 | −4563.814 | −13984.7 | −2861.732 | 0 | −11194.13 | −10932.15 |
| Density lb/cuft | 0.063 | 62.249 | 0.091 | 0.04 | 0.126 | 303.28 | 0.174 |
| $H_2O$ | 6.85E+06 | 1.00e+07 | 5.19E+06 | 5.60E+06 | 8.37E+06 | 0 | 8.37E+06 |
| HCl | 0 | 0 | 0 | 1.13E+07 | 126399.9 | 0 | 126399.87 |
| $CO_2$ | 1.37E+07 | 0 | 6.85E+06 | 0 | 0 | 0 | 0 |
| $O_2$ | 1.37E+07 | 0 | 1.37E+07 | 0 | 0 | 0 | 0 |
| $N_2$ | 1.03E+08 | 0 | 1.03E+08 | 0 | 0 | 0 | 0 |
| $MgCO_3$ | 0 | 0 | 0 | 0 | 0 | 0 | 0 |
| $MgCl_2$ | 0 | 0 | 0 | 0 | 0 | 0 | 0 |
| $MgCl_2{*}W$ | 0 | 0 | 0 | 0 | 0 | 0 | 0 |
| $MgCl_2{*}2W$ | 0 | 0 | 0 | 0 | 0 | 4.08E+07 | 0 |

TABLE 18a-continued

Mass and Energy Accounting for Examples 14 and 15 Simulation.

| | Process Stream Names | | | | | | |
|---|---|---|---|---|---|---|---|
| | FLUEGAS | $H_2O$ | $H_2O$ | HCl Vapor | $MgCl_2$--2 | $MgCl_2$—2w | $MgCl_2$—Si |
| $MgCl_2*4W$ | 0 | 0 | 1.09E+07 | 0 | 0 | 0 | 0 |
| $MgCl_2*6W$ | 0 | 0 | 1.83E+07 | 0 | 0 | 0 | 0 |
| Mg(OH)Cl | 0 | 0 | 0 | 0 | 0 | 0 | 0 |
| $Mg(OH)_2$ | 0 | 0 | 0 | 0 | 0 | 0 | 0 |
| MgO | 0 | 0 | 0 | 0 | 0 | 0 | 0 |
| $MgHCO_3^+$ | 0 | 0 | 0.001 | 0 | 0 | 0 | 0 |
| $SO_2$ | 0 | 0 | 0 | 0 | 0 | 0 | 0 |
| $NO_2$ | 0 | 0 | 0 | 0 | 0 | 0 | 0 |
| NO | 0 | 0 | 0 | 0 | 0 | 0 | 0 |
| $Mg^{2+}$ | 0 | 0 | 0 | 0 | 3.74E+06 | 0 | 3.74E+06 |
| $Cl^-$ | 0 | 0 | 0 | 0 | 1.09E+07 | 0 | 1.09E+07 |
| $CO_3^{2-}$ | 0 | 0 | 0 | 0 | 0 | 0 | 0 |
| $HCO_3^-$ | 0 | 0 | 0 | 0 | 0 | 0 | 0 |
| $OH^-$ | 0 | 0 | 0 | 0 | 0 | 0 | 0 |
| $SiO_2$ | 0 | 0 | 0 | 0 | 0 | 0 | 9.24E+06 |
| $MgSiO_3$ | 0 | 0 | 0 | 0 | 0 | 0 | 174011.19 |

TABLE 18b

Mass and Energy Accounting for Examples 14 and 15 Simulation.

| | Process Stream Names | | | | | | |
|---|---|---|---|---|---|---|---|
| | $MgCO_3$ | $MgSiO_3$ | RX2-VENT | $SiO_2$ | SLURRY | SOLIDS-1 | SOLIDS-2 |
| PH | | | | | .0864 | | 6.24 |
| Temperature ° C. | 26 | 25 | | 200.7 | 60 | 250 | 95 |
| Pressure psia | 14.696 | 14.696 | | 15 | 44.088 | 14.696 | 44.088 |
| Mass VFrac | 0 | 0 | | 0 | 0 | 0 | 0 |
| Mass SFrac | 1 | 1 | | 1 | 0.248 | 1 | 0.268 |
| Mass Flow tons/year | 1.31E+07 | 1.56E+07 | 0 | 9.41E+06 | 1.71E+08 | 2.39E+07 | 3.39E+07 |
| Volume Flow gal/min | 1985.546 | 2126.004 | | 1613.601 | 178707.499 | 3828.933 | 8016.874 |
| Enthalpy MW | 0 | −6925.208 | 0 | 0 | −18961.843 | −7057.974 | −12123.17 |
| Density lb/cuft | 187.864 | 208.902 | | 165.967 | 27.184 | 177.393 | 120.206 |
| $H_2O$ | 0 | 0 | | 0 | 5.19E+06 | 0 | 1.00E+07 |
| HCl | 0 | 0 | | 0 | 0 | 0 | 0 |
| $CO_2$ | 0 | 0 | | 0 | 6.85E+06 | 0 | 0 |
| $O_2$ | 0 | 0 | | 0 | 1.37E+07 | 0 | 0 |
| $N_2$ | 0 | 0 | | 0 | 1.03E+08 | 0 | 0 |
| $MgCO_3$ | 1.31E+07 | 0 | | 0 | 1.31E+07 | 0 | 0 |
| $MgCl_2$ | 0 | 0 | | 0 | 0 | 0 | 0 |
| $MgCl_2*W$ | 0 | 0 | | 0 | 0 | 0 | 0 |
| $MgCl_2*2W$ | 0 | 0 | | 0 | 0 | 0 | 0 |
| $MgCl_2*4W$ | 0 | 0 | | 0 | 1.09E+07 | 0 | 0 |
| $MgCl_2*6W$ | 0 | 0 | | 0 | 1.83E+07 | 0 | 0 |
| Mg(OH)Cl | 0 | 0 | | 0 | 0 | 2.39E+07 | 0 |
| $Mg(OH)_2$ | 0 | 0 | | 0 | 0 | 0 | 9.07E+06 |
| MgO | 0 | 0 | | 0 | 0 | 0 | 0 |
| $MgHCO_3^+$ | 0 | 0 | | 0 | 0.001 | 0 | 0 |
| $SO_2$ | 0 | 0 | | 0 | 0 | 0 | 0 |
| $NO_2$ | 0 | 0 | | 0 | 0 | 0 | 0 |
| NO | 0 | 0 | | 0 | 0 | 0 | 0 |
| $Mg^{2+}$ | 0 | 0 | | 0 | 0 | 0 | 3.78E+06 |
| $Cl^-$ | 0 | 0 | | 0 | 0 | 0 | 1.10E+07 |
| $CO3^{2-}$ | 0 | 0 | | 0 | 0 | 0 | 0 |
| $HCO_3^-$ | 0 | 0 | | 0 | 0 | 0 | 0 |
| $OH^-$ | 0 | 0 | | 0 | 0 | 0 | 0.029 |
| $SiO_2$ | 0 | 0 | | 9.24E+06 | 0 | 0 | 0 |
| $MgSiO_3$ | 0 | 1.56E+07 | | 174011.19 | 0 | 0 | 0 |

TABLE 19a

Mass and Energy Accounting for Examples 16 and 17 Simulation.

Process Stream Names

| | FLUEGAS | $H_2O$ | $H_2O$ | HCl Vapor | $MgCl_2$--2 | $MgCl_2$—2w | $MgCl_2$—Si |
|---|---|---|---|---|---|---|---|
| PH | | | 6.583 | | | | |
| Temperature ° C. | 100 | 25 | 59.6 | 450 | 200 | 200 | 200 |
| Pressure psia | 15.78 | 1 | 14.696 | 14.696 | 15 | 14.696 | 14.696 |
| Mass VFrac | 1 | 0 | 0.004 | 1 | 0 | 0 | 0 |
| Mass SFrac | 0 | 0 | 0 | 0 | 1 | 1 | 1 |
| Mass Flow tons/year | 1.37E+08 | 1.00E+07 | 1.70E+07 | 1.41E+07 | 2.04E+07 | 2.04E+07 | 2.98e+07 |
| Volume Flow gal/min | 6.21E+07 | 4569.619 | 40446.86 | 1.26E+07 | 1914.466 | 1914.466 | 3522.292 |
| Enthalpy MW | −5853.92 | −4563.814 | −7633.28 | −1728.6 | 0 | −5597.066 | −9628.072 |
| Density lb/cuft | 0.063 | 62.249 | 11.94 | 0.032 | 303.28 | 303.28 | 240.308 |
| $H_2O$ | 685.E+06 | 1.00E+07 | 1.68E+07 | 2.80E+06 | 0 | 0 | 0 |
| HCl | 0 | 0 | 0 | 1.13E+07 | 0 | 0 | 0 |
| $CO_2$ | 1.37E+07 | 0 | 56280.04 | 0 | 0 | 0 | 0 |
| $O_2$ | 1.37E+07 | 0 | 18848.97 | 0 | 0 | 0 | 0 |
| $N_2$ | 1.03E+08 | 0 | 56346.51 | 0 | 0 | 0 | 0 |
| $MgCO_3$ | 0 | 0 | 0 | 0 | 0 | 0 | 0 |
| $MgCl_2$ | 0 | 0 | 0 | 0 | 0 | 0 | 0 |
| $MgCl_2*W$ | 0 | 0 | 0 | 0 | 0 | 0 | 0 |
| $MgCl_2*2W$ | 0 | 0 | 0 | 0 | 2.04E+07 | 2.04E+07 | 2.04E+07 |
| $MgCl_2*4W$ | 0 | 0 | 0 | 0 | 0 | 0 | 0 |
| $MgCl_2*6W$ | 0 | 0 | 0 | 0 | 0 | 0 | 0 |
| $Mg(OH)Cl$ | 0 | 0 | 0 | 0 | 0 | 0 | 0 |
| $Mg(OH)_2$ | 0 | 0 | 0 | 0 | 0 | 0 | 0 |
| MgO | 0 | 0 | 0 | 0 | 0 | 0 | 0 |
| $MgHCO_3^+$ | 0 | 0 | 77.467 | 0 | 0 | 0 | 0 |
| $SO_2$ | 0 | 0 | 0 | 0 | 0 | 0 | 0 |
| $NO_2$ | 0 | 0 | 0 | 0 | 0 | 0 | 0 |
| NO | 0 | 0 | 0 | 0 | 0 | 0 | 0 |
| $Mg^{2+}$ | 0 | 0 | 744.857 | 0 | 0 | 0 | 0 |
| $Cl^-$ | 0 | 0 | 0 | 0 | 0 | 0 | 0 |
| $CO_3^{2-}$ | 0 | 0 | 1.19 | 0 | 0 | 0 | 0 |
| $HCO_3^-$ | 0 | 0 | 3259.779 | 0 | 0 | 0 | 0 |
| $OH^-$ | 0 | 0 | 0.109 | 0 | 0 | 0 | 0 |
| $SiO_2$ | 0 | 0 | 0 | 0 | 0 | 0 | 9.34E+06 |
| $MgSiO_3$ | 0 | 0 | 0 | 0 | 0 | 0 | 0 |

TABLE 19b

Mass and Energy Accounting for Examples 16 and 17 Simulation.

Process Stream Names

| | $MgCO_3$ | $MgSiO_3$ | RX2-VENT | $SiO_2$ | SLURRY | SOLIDS-1 | SOLIDS-2 |
|---|---|---|---|---|---|---|---|
| PH | | | | | 6.583 | | 8.537 |
| Temperature ° C. | 59.6 | 25 | 60 | 200 | 60 | 450 | 95 |
| Pressure psia | 14.696 | 14.696 | 44.088 | 15 | 44.088 | 14.696 | 44.088 |
| Mass VFrac | 0 | 0 | 1 | 0 | 0 | 0 | 0 |
| Mass SFrac | 1 | 1 | 0 | 1 | 0.436 | 1 | 0.558 |
| Mass Flow tons/year | 1.31E+07 | 1.56E+07 | 1.23E+08 | 9.34E+06 | 3.01E+07 | 6.27E+06 | 1.63E+07 |
| Volume Flow gal/min | 1983.661 | 2126.004 | 1.76E+07 | 1607.826 | 9945.342 | 797.11 | 5155.55 |
| Enthalpy MW | 0 | −6925.208 | −1613.054 | 0 | −12593.788 | −2603.979 | −7331.893 |
| Density lb/cuft | 187.864 | 208.902 | 0.199 | 165.327 | 86.031 | 223.695 | 89.76 |
| $H_2O$ | 0 | 0 | 0 | 0 | 1.68E+07 | 0 | 7.20E+06 |
| HCl | 0 | 0 | 0 | 0 | 0 | 0 | 0 |
| $CO_2$ | 0 | 0 | 6.78E+06 | 0 | 56280.036 | 0 | 0 |
| $O_2$ | 0 | 0 | 1.37E+07 | 0 | 18848.966 | 0 | 0 |
| $N_2$ | 0 | 0 | 1.03E+08 | 0 | 56346.51 | 0 | 0 |
| $MgCO_3$ | 1.31E+07 | 0 | 0 | 0 | 1.31E+07 | 0 | 0 |
| $MgCl_2$ | 0 | 0 | 0 | 0 | 0 | 0 | 0 |
| $MgCl_2*W$ | 0 | 0 | 0 | 0 | 0 | 0 | 0 |
| $MgCl_2*2W$ | 0 | 0 | 0 | 0 | 0 | 0 | 0 |
| $MgCl_2*4W$ | 0 | 0 | 0 | 0 | 0 | 0 | 0 |
| $MgCl_2*6W$ | 0 | 0 | 0 | 0 | 0 | 0 | 0 |
| $Mg(OH)Cl$ | 0 | 0 | 0 | 0 | 0 | 0 | 0 |
| $Mg(OH)_2$ | 0 | 0 | 0 | 0 | 0 | 0 | 9.07E+06 |
| MgO | 0 | 0 | 0 | 0 | 0 | 6.27E+06 | 0 |
| $MgHCO_3^+$ | 0 | 0 | 343.415 | 0 | 77.467 | 0 | 0 |
| $SO_2$ | 0 | 0 | 0 | 0 | 0 | 0 | 0 |
| $NO_2$ | 0 | 0 | 0 | 0 | 0 | 0 | 0 |
| NO | 0 | 0 | 0 | 0 | 0 | 0 | 0 |
| $Mg^{2+}$ | 0 | 0 | 2722.849 | 0 | 744.857 | 0 | 14.282 |

TABLE 19b-continued

Mass and Energy Accounting for Examples 16 and 17 Simulation.

| | \multicolumn{7}{c}{Process Stream Names} | | | | | | |
|---|---|---|---|---|---|---|---|
| | MgCO$_3$ | MgSiO$_3$ | RX2-VENT | SiO$_2$ | SLURRY | SOLIDS-1 | SOLIDS-2 |
| Cl$^-$ | 0 | 0 | 0 | 0 | 0 | 0 | 0 |
| CO$_3^{2-}$ | 0 | 0 | 4.344 | 0 | 1.19 | 0 | 0 |
| HCO$_3^-$ | 0 | 0 | 14439.982 | 0 | 3259.779 | 0 | 0 |
| OH$^-$ | 0 | 0 | 0.481 | 0 | 0.109 | 0 | 19.989 |
| SiO$_2$ | 0 | 0 | 0 | 9.34E+06 | 0 | 0 | 0 |
| MgSiO$_3$ | 0 | 1.56E+07 | 0 | 0 | 0 | 0 | 0 |

TABLE 20a

Mass and Energy Accounting for Examples 18 and 19 Simulation.

| | \multicolumn{7}{c}{Process Stream Names} | | | | | | |
|---|---|---|---|---|---|---|---|
| | 5 | CaCl$_2$—2W | FLUEGAS | H$_2$O | HCl | HCl-VENT | HClVAP2 |
| PH | | | | | | | |
| Temperature ° C. | 200 | 160 | 100 | 25 | 250 | 100 | 349.1 |
| Pressure psia | 14.696 | 14.696 | 15.78 | 1 | 14.696 | 14.696 | 14.696 |
| Mass VFrac | 0.378 | 0.473 | 1 | 0 | 1 | 1 | 1 |
| Mass SFrac | 0.622 | 0 | 0 | 0 | 0 | 0 | 0 |
| Mass Flow tons/year | 6.32E+07 | 2.40E+07 | 1.37E+08 | 1.00E+07 | 3.94E+07 | 0.001 | 197E+07 |
| Volume Flow gal/min | 2.29E+07 | 1.02E+07 | 6.21E+07 | 4569.619 | 3.64E+07 | 0.001 | 1.82E+07 |
| Enthalpy MW | −19530.7 | −8042.026 | −5853.92 | −4563.814 | −11241.7 | 0 | −5620.856 |
| Density lb/cuft | 0.079 | 0.067 | 0.063 | 62.249 | 0.031 | 0.075 | 0.031 |
| H$_2$O | 2.29E+07 | 1.54E+07 | 6.85E+06 | 1.00E+07 | 2.08E+07 | 0 | 1.40E+07 |
| HCl | 983310.7 | 0 | 0 | 0 | 1.13E+07 | 0.001 | 5.67E+06 |
| CO$_2$ | 0 | 0 | 1.37E+07 | 0 | 0 | 0 | 0 |
| O$_2$ | 0 | 0 | 1.37E+07 | 0 | 0 | 0 | 0 |
| N$_2$ | 0 | 0 | 1.03E+08 | 0 | 0 | 0 | 0 |
| MgCl$_2$ | 0 | 0 | 0 | 0 | 0 | 0 | 0 |
| MgCl$_2$*W | 0 | 0 | 0 | 0 | 0 | 0 | 0 |
| MgCl$_2$*2W | 3.73E+07 | 0 | 0 | 0 | 0 | 0 | 0 |
| MgCl$_2$*4W | 0 | 0 | 0 | 0 | 0 | 0 | 0 |
| MgCl$_2$*6W | 0 | 0 | 0 | 0 | 0 | 0 | 0 |
| Mg(OH)Cl | 2.07E+06 | 0 | 0 | 0 | 0 | 0 | 0 |
| Mg(OH)$_2$ | 0 | 0 | 0 | 0 | 0 | 0 | 0 |
| MgO | 0 | 0 | 0 | 0 | 0 | 0 | 0 |
| MgHCO$_3^+$ | 0 | 0 | 0 | 0 | 0 | 0 | 0 |
| SO$_2$ | 0 | 0 | 0 | 0 | 0 | 0 | 0 |
| NO$_2$ | 0 | 0 | 0 | 0 | 0 | 0 | 0 |
| NO | 0 | 0 | 0 | 0 | 0 | 0 | 0 |
| Mg$^{2+}$ | 0 | 2494.617 | 0 | 0 | 0 | 0 | 0 |
| Ca$^{2+}$ | 0 | 3.11E+06 | 0 | 0 | 0 | 0 | 0 |
| Cl$^-$ | 0 | 5.51E+06 | 0 | 0 | 0 | 0 | 0 |
| CO$_3^{2-}$ | 0 | 0 | 0 | 0 | 0 | 0 | 0 |
| HCO$_3^-$ | 0 | 0 | 0 | 0 | 0 | 0 | 0 |
| OH$^-$ | 0 | 0 | 0 | 0 | 0 | 0 | 0 |
| CaSiO$_3$ | 0 | 0 | 0 | 0 | 0 | 0 | 0 |
| SiO$_2$ | 0 | 0 | 0 | 0 | 0 | 0 | 0 |
| MgSiO$_3$ | 0 | 0 | 0 | 0 | 0 | 0 | 0 |
| DIOPSIDE | 0 | 0 | 0 | 0 | 0 | 0 | 0 |
| DOLOMITE | 0 | 0 | 0 | 0 | 0 | 0 | 0 |

| | \multicolumn{5}{c}{Process Stream Names} | | | | |
|---|---|---|---|---|---|
| | HCl Vapor | HClVENT2 | MELT1 | MELT2 | MELT3 |
| PH | | | | | |
| Temperature ° C. | 349.1 | 160 | 160 | 160 | 100 |
| Pressure psia | 14.696 | 14.696 | 14.696 | 14.696 | 14.696 |
| Mass VFrac | 1 | 1 | 0.311 | 0 | 0 |
| Mass SFrac | 0 | 0 | 0.342 | 1 | 0.291 |
| Mass Flow tons/year | 1.97E+07 | 26.688 | 3.65E+07 | 1.25E+07 | 3.22E+07 |
| Volume Flow gal/min | 1.82E+07 | 11.834 | 1.02E+07 | 1866.916 | 9636.543 |
| Enthalpy MW | −5620.856 | −0.002 | −13498.19 | −5456.154 | −12759.563 |
| Density lb/cuft | 0.031 | 0.064 | 0.102 | 190.163 | 94.933 |
| H$_2$O | 1.40E+07 | 0 | 1.54E+07 | 0 | 1.54E+07 |
| HCl | 5.67E+06 | 26.688 | 26.688 | 0 | 0.001 |
| CO$_2$ | 0 | 0 | 0 | 0 | 0 |

TABLE 20a-continued

Mass and Energy Accounting for Examples 18 and 19 Simulation.

| | | | | | |
|---|---|---|---|---|---|
| $O_2$ | 0 | 0 | 0 | 0 | 0 |
| $N_2$ | 0 | 0 | 0 | 0 | 0 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 0 | 0 | 0 | 0 |
| $MgCl_2*6W$ | 0 | 0 | 0 | 0 | 0 |
| $Mg(OH)Cl$ | 0 | 0 | 0 | 0 | 0 |
| $Mg(OH)_2$ | 0 | 0 | 0 | 0 | 0 |
| $MgO$ | 0 | 0 | 0 | 0 | 0 |
| $MgHCO_3^+$ | 0 | 0 | 0 | 0 | 0 |
| $SO_2$ | 0 | 0 | 0 | 0 | 0 |
| $NO_2$ | 0 | 0 | 0 | 0 | 0 |
| $NO$ | 0 | 0 | 0 | 0 | 0 |
| $Mg^{2+}$ | 0 | 0 | 2494.617 | 0 | 1.89E+06 |
| $Ca^{2+}$ | 0 | 0 | 3.11E+06 | 0 | 4128.267 |
| $Cl^-$ | 0 | 0 | 5.51E+06 | 0 | 5.51E+06 |
| $CO_3^{2-}$ | 0 | 0 | 0 | 0 | 0 |
| $HCO_3^-$ | 0 | 0 | 0 | 0 | 0 |
| $OH^-$ | 0 | 0 | 0 | 0 | 0 |
| $CaSiO_3$ | 0 | 0 | 11965.659 | 11965.659 | 0 |
| $SiO_2$ | 0 | 0 | 4.67E+06 | 4.67E+06 | 9.34E+06 |
| $MgSiO_3$ | 0 | 0 | 7.80E+06 | 7.80E+06 | 36.743 |
| DIOPSIDE | 0 | 0 | 0 | 0 | 0 |
| DOLOMITE | 0 | 0 | 0 | 0 | 0 |

TABLE 20b

Mass and Energy Accounting for Examples 18 and 19 Simulation.

| | Process Stream Names | | | | | |
|---|---|---|---|---|---|---|
| | $MgCaSiO_3$ | $MgCl_2$—H | $MgCl_2$—H | RECYCLE | RECYCLE- | $SiO_2$ |
| PH | | | | | | |
| Temperature ° C. | 25 | 100 | 100 | 95 | 95 | 100 |
| Pressure psia | 14.696 | 14.696 | 14.696 | 14.696 | 14.696 | 14.696 |
| Mass VFrac | 0 | 0 | 0 | 0 | 0 | 0 |
| Mass SFrac | 1 | 0 | 1 | 0.828 | 1 | 1 |
| Mass Flow tons/year | 168E+07 | 2.28E+07 | 4.74E+07 | 5.73E+07 | 1.58E+07 | 9.34E+06 |
| Volume Flow gal/min | 1063.002 | 8028.716 | 8412.597 | 13075.55 | 2804.199 | 1607.827 |
| Enthalpy MW | −7167.458 | 0 | −16601.2 | −21023.6 | −5537.26 | 0 |
| Density lb/cuft | 450.627 | 80.836 | 160.371 | 124.605 | 160.371 | 165.327 |
| $H_2O$ | 0 | 1.54E+07 | 0 | 9.84E+07 | 0 | 0 |
| HCl | 0 | 0 | 0 | 0 | 0 | 0 |
| $CO_2$ | 0 | 0 | 0 | 0 | 0 | 0 |
| $O_2$ | 0 | 0 | 0 | 0 | 0 | 0 |
| $N_2$ | 0 | 0 | 0 | 0 | 0 | 0 |
| $MgCl_2$ | 0 | 0 | 0 | 0 | 0 | 0 |
| $MgCl_2*W$ | 0 | 0 | 0 | 0 | 0 | 0 |
| $MgCl_2*2W$ | 0 | 0 | 0 | 0 | 0 | 0 |
| $MgCl_2*4W$ | 0 | 0 | 0 | 0 | 0 | 0 |
| $MgCl_2*6W$ | 0 | 0 | 4.74E+07 | 4.74E+07 | 1.58E+07 | 0 |
| $Mg(OH)Cl$ | 0 | 0 | 0 | 0 | 0 | 0 |
| $Mg(OH)_2$ | 0 | 0 | 0 | 12011.06 | 0 | 0 |
| $MgO$ | 0 | 0 | 0 | 0 | 0 | 0 |
| $MgHCO_3^+$ | 0 | 0 | 0 | 11.135 | 0 | 0 |
| $SO_2$ | 0 | 0 | 0 | 0 | 0 | 0 |
| $NO_2$ | 0 | 0 | 0 | 0 | 0 | 0 |
| $NO$ | 0 | 0 | 0 | 0 | 0 | 0 |
| $Mg^{2+}$ | 0 | 1.89E+06 | 0 | 0 | 0 | 0 |
| $Ca^{2+}$ | 0 | 4128.267 | 0 | 0 | 0 | 0 |
| $Cl^-$ | 0 | 5.51E+06 | 0 | 4.627 | 0 | 0 |
| $CO_3^{2-}$ | 0 | 0 | 0 | 0 | 0 | 0 |
| $HCO_3^-$ | 0 | 0 | 0 | 0 | 0 | 0 |
| $OH^-$ | 0 | 0 | 0 | 0 | 0 | 0 |
| $CaSiO_3$ | 0 | 0 | 0 | 0 | 0 | 0 |
| $SiO_2$ | 0 | 0 | 0 | 0 | 0 | 9.34E+06 |

TABLE 20b-continued

Mass and Energy Accounting for Examples 18 and 19 Simulation.

| | | | | | | |
|---|---|---|---|---|---|---|
| $MgSiO_3$ | 0 | 0 | 0 | 0 | 0 | 36.743 |
| DIOPSIDE | 1.68E+07 | 0 | 0 | 0 | 0 | 0 |
| DOLOMITE | 0 | 0 | 0 | 0 | 0 | 0 |

| | Process Stream Names | | | | |
|---|---|---|---|---|---|
| | SLURRY | SOLIDS | SOLIDS-1 | SOLIDS-2 | VENT |
| PH | 5.163 | | | 6.252 | |
| Temperature ° C. | 95 | 95 | 250 | 95 | 95 |
| Pressure psia | 14.696 | 14.696 | 14.696 | 14.696 | 14.696 |
| Mass VFrac | 0 | 0 | 0 | 0 | 1 |
| Mass SFrac | 0.317 | 1 | 1 | 0.268 | 0 |
| Mass Flow tons/year | 1.95E+08 | 1.43E+07 | 2.39E+07 | 3.39E+07 | 1.23E+08 |
| Volume Flow gal/min | 185622 | 2276.765 | 3828.933 | 8017.333 | 5.85E+07 |
| Enthalpy MW | −27714.4 | 0 | −7057.97 | −12113.4 | −1510.76 |
| Density lb/cuft | 29.855 | 178.921 | 177.393 | 120.2 | 0.06 |
| $H_2O$ | 9.84E+06 | 0 | 0 | 1.00E+07 | 0 |
| HCl | 0 | 0 | 0 | 0 | 0 |
| $CO_2$ | 6.85E+06 | 0 | 0 | 0 | 6.85E+06 |
| $O_2$ | 1.37E+07 | 0 | 0 | 0 | 1.37E+07 |
| $N_2$ | 1.03E+08 | 0 | 0 | 0 | 1.03E+08 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 0 | 0 | 0 | 0 |
| $MgCl_2*6W$ | 4.74E+07 | 0 | 0 | 0 | 0 |
| $Mg(OH)Cl$ | 0 | 0 | 2.39E+07 | 0 | 0 |
| $Mg(OH)_2$ | 12011.06 | 0 | 0 | 9.07E+06 | 0 |
| MgO | 0 | 0 | 0 | 0 | 0 |
| $MgHCO_3^+$ | 11.135 | 0 | 0 | 0 | 0 |
| $SO_2$ | 0 | 0 | 0 | 0 | 0 |
| $NO_2$ | 0 | 0 | 0 | 0 | 0 |
| NO | 0 | 0 | 0 | 0 | 0 |
| $Mg^{2+}$ | 0 | 0 | 0 | 3.78E+06 | 0 |
| $Ca^{2+}$ | 0 | 0 | 0 | 0 | 0 |
| $Cl^-$ | 4.627 | 0 | 0 | 1.10E+07 | 0 |
| $CO_3^{2-}$ | 0 | 0 | 0 | 0 | 0 |
| $HCO_3^-$ | 0 | 0 | 0 | 0 | 0 |
| $OH^-$ | 0 | 0 | 0 | 0.03 | 0 |
| $CaSiO_3$ | 0 | 0 | 0 | 0 | 0 |
| $SiO_2$ | 0 | 0 | 0 | 0 | 0 |
| $MgSiO_3$ | 0 | 0 | 0 | 0 | 0 |
| DIOPSIDE | 0 | 0 | 0 | 0 | 0 |
| DOLOMITE | 1.43E+07 | 1.43E+07 | 0 | 0 | 0 |

TABLE 21a

Mass and Energy Accounting for Examples 20 and 21 Simulation.

| | Process Stream Names | | | | | | |
|---|---|---|---|---|---|---|---|
| | 5 | $CaCl_2$—2W | FLUEGAS | $H_2O$ | HCl | HCl-VENT | HClVAP2 |
| PH | | | | | | | |
| Temperature ° C. | 200 | 160 | 100 | 25 | 450 | 100 | 449.5 |
| Pressure psia | 14.696 | 14.696 | 15.78 | 1 | 14.696 | 14.696 | 14.696 |
| Mass VFrac | 0.378 | 0.256 | 1 | 0 | 1 | 1 | 1 |
| Mass SFrac | 0.622 | 0 | 0 | 0 | 0 | 0 | 0 |
| Mass Flow tons/year | 3.16E+07 | 1.70E+07 | 1.37E+08 | 1.00E+07 | 2.54E+07 | 0.006 | 1.27E+07 |
| Volume Flow gal/min | 1.14E+07 | 3.91E+06 | 6.21E+07 | 4569.619 | 2.94E+07 | 0.002 | 1.47E+07 |
| Enthalpy MW | −9765.36 | −5388.055 | −5853.92 | −4563.814 | −5787.5 | 0 | −2893.751 |
| Density lb/cuft | 0.079 | 0.124 | 0.063 | 62.249 | 0.025 | 0.075 | 0.025 |
| $H_2O$ | 1.15E+07 | 8.41E+06 | 6.85E+06 | 1.00E+07 | 1.40e+07 | 0 | 7.00E+06 |
| HCl | 491655.4 | 0 | 0 | 0 | 1.13E+07 | 0.006 | 5.67E+06 |
| $CO_2$ | 0 | 0 | 1.37E+07 | 0 | 0 | 0 | 0 |
| $O_2$ | 0 | 0 | 1.37E+07 | 0 | 0 | 0 | 0 |
| $N_2$ | 0 | 0 | 1.03E+08 | 0 | 0 | 0 | 0 |
| $MgCl_2$ | 0 | 0 | 0 | 0 | 0 | 0 | 0 |
| $MgCl_2*W$ | 0 | 0 | 0 | 0 | 0 | 0 | 0 |
| $MgCl_2*2W$ | 1.86E+07 | 0 | 0 | 0 | 0 | 0 | 0 |
| $MgCl_2*4W$ | 0 | 0 | 0 | 0 | 0 | 0 | 0 |
| $MgCl_2*6W$ | 0 | 0 | 0 | 0 | 0 | 0 | 0 |
| $Mg(OH)Cl$ | 1.04E+06 | 0 | 0 | 0 | 0 | 0 | 0 |
| $Mg(OH)_2$ | 0 | 0 | 0 | 0 | 0 | 0 | 0 |

TABLE 21a-continued

Mass and Energy Accounting for Examples 20 and 21 Simulation.

| | | | | | | | |
|---|---|---|---|---|---|---|---|
| MgO | 0 | 0 | 0 | 0 | 0 | 0 | 0 |
| $MgHCO_3^+$ | 0 | 0 | 0 | 0 | 0 | 0 | 0 |
| $SO_2$ | 0 | 0 | 0 | 0 | 0 | 0 | 0 |
| $NO_2$ | 0 | 0 | 0 | 0 | 0 | 0 | 0 |
| NO | 0 | 0 | 0 | 0 | 0 | 0 | 0 |
| $Mg^{2+}$ | 0 | 2494.624 | 0 | 0 | 0 | 0 | 0 |
| $Ca^{2+}$ | 0 | 3.11E+06 | 0 | 0 | 0 | 0 | 0 |
| $Cl^-$ | 0 | 5.51E+06 | 0 | 0 | 0 | 0 | 0 |
| $CO_3^{2-}$ | 0 | 0 | 0 | 0 | 0 | 0 | 0 |
| $HCO_3^-$ | 0 | 0 | 0 | 0 | 0 | 0 | 0 |
| $OH^-$ | 0 | 0 | 0 | 0 | 0 | 0 | 0 |
| $CaSiO_3$ | 0 | 0 | 0 | 0 | 0 | 0 | 0 |
| $SiO_2$ | 0 | 0 | 0 | 0 | 0 | 0 | 0 |
| $MgSiO_3$ | 0 | 0 | 0 | 0 | 0 | 0 | 0 |
| DIOPSIDE | 0 | 0 | 0 | 0 | 0 | 0 | 0 |
| DOLOMITE | 0 | 0 | 0 | 0 | 0 | 0 | 0 |

| | Process Stream Names | | | | |
|---|---|---|---|---|---|
| | HCl Vapor | HClVENT2 | MELT1 | MELT2 | MELT3 |
| PH | | | | | |
| Temperature ° C. | 449.5 | 160 | 160 | 160 | 100 |
| Pressure psia | 14.696 | 14.696 | 14.696 | 14.696 | 14.696 |
| Mass VFrac | 1 | 1 | 0.148 | 0 | 0 |
| Mass SFrac | 0 | 0 | 0.423 | 1 | 0.371 |
| Mass Flow tons/year | 1.27E+07 | 10.275 | 2.95E+07 | 1.25E+07 | 2.52E+07 |
| Volume Flow gal/min | 1.47E+07 | 4.556 | 3.91E+06 | 1866.915 | 6342.437 |
| Enthalpy MW | −2893.751 | −.0001 | −10844.21 | −5456.149 | −9602.42 |
| Density lb/cuft | 0.025 | 0.064 | 0.215 | 190.163 | 112.823 |
| $H_2O$ | 7.00E+06 | 0 | 8.41E+06 | 0 | 8.41.E+06 |
| HCl | 5.67E+06 | 10.275 | 10.275 | 0 | 0.006 |
| $CO_2$ | 0 | 0 | 0 | 0 | 0 |
| $O_2$ | 0 | 0 | 0 | 0 | 0 |
| $N_2$ | 0 | 0 | 0 | 0 | 0 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 0 | 0 | 0 | 0 |
| $MgCl_2*6W$ | 0 | 0 | 0 | 0 | 0 |
| Mg(OH)Cl | 0 | 0 | 0 | 0 | 0 |
| $Mg(OH)_2$ | 0 | 0 | 0 | 0 | 0 |
| MgO | 0 | 0 | 0 | 0 | 0 |
| $MgHCO_3^+$ | 0 | 0 | 0 | 0 | 0 |
| $SO_2$ | 0 | 0 | 0 | 0 | 0 |
| $NO_2$ | 0 | 0 | 0 | 0 | 0 |
| NO | 0 | 0 | 0 | 0 | 0 |
| $Mg^{2+}$ | 0 | 0 | 2494.624 | 0 | 1.89E+06 |
| $Ca^{2+}$ | 0 | 0 | 3.11E+06 | 0 | 4119.258 |
| $Cl^-$ | 0 | 0 | 5.51E+06 | 0 | 5.51E+06 |
| $CO_3^{2-}$ | 0 | 0 | 0 | 0 | 0 |
| $HCO_3^-$ | 0 | 0 | 0 | 0 | 0 |
| $OH^-$ | 0 | 0 | 0 | 0 | 0 |
| $CaSiO_3$ | 0 | 0 | 11939.547 | 11939.547 | 0 |
| $SiO_2$ | 0 | 0 | 4.67E+06 | 4.67E+06 | 9.34E+06 |
| $MgSiO_3$ | 0 | 0 | 7.80E+06 | 7.80E+06 | 14.153 |
| DIOPSIDE | 0 | 0 | 0 | 0 | 0 |
| DOLOMITE | 0 | 0 | 0 | 0 | 0 |

TABLE 21b

Mass and Energy Accounting for Examples 20 and 21 Simulation.

| | Process Stream Names | | | | | |
|---|---|---|---|---|---|---|
| | $MgCaSiO3$ | $MgCl_2$—H | $MgCl_2$—H | RECYCLE | RECYCLE- | $SiO_2$ |
| PH | | | | −0.879 | | |
| Temperature ° C. | 25 | 100 | 100 | 95 | 95 | 100 |
| Pressure psia | 14.696 | 14.696 | 14.696 | 14.696 | 14.696 | 14.696 |
| Mass VFrac | 0 | 0 | 0 | 0 | 0 | 0 |
| Mass SFrac | 1 | 0 | 1 | 0 | 0.484 | 1 |
| Mass Flow tons/year | 1.68E+07 | 1.58E+07 | 1.58E+07 | 3.27E+07 | 1.58E+07 | 9.34E+06 |
| Volume Flow gal/min | 1063.002 | 4734.61 | 2804.199 | 10786.59 | 2804.199 | 1607.826 |
| Enthalpy MW | −7167.458 | 0 | −5533.74 | −13087 | −5537.26 | 0 |

TABLE 21b-continued

Mass and Energy Accounting for Examples 20 and 21 Simulation.

| | | | | | | |
|---|---|---|---|---|---|---|
| Density lb/cuft | 450.627 | 94.994 | 160.371 | 86.167 | 160.371 | 165.327 |
| $H_2O$ | 0 | 8.41E+06 | 0 | 1.68E+07 | 0 | 0 |
| HCl | 0 | 0 | 0 | 0 | 0 | 0 |
| $CO_2$ | 0 | 0 | 0 | 0 | 0 | 0 |
| $O_2$ | 0 | 0 | 0 | 0 | 0 | 0 |
| $N_2$ | 0 | 0 | 0 | 0 | 0 | 0 |
| $MgCl_2$ | 0 | 0 | 0 | 0 | 0 | 0 |
| $MgCl_2*W$ | 0 | 0 | 0 | 0 | 0 | 0 |
| $MgCl_2*2W$ | 0 | 0 | 0 | 0 | 0 | 0 |
| $MgCl_2*4W$ | 0 | 0 | 0 | 0 | 0 | 0 |
| $MgCl_2*6W$ | 0 | 0 | 1.58E+07 | 1.58E+07 | 1.58E+07 | 0 |
| Mg(OH)Cl | 0 | 0 | 0 | 0 | 0 | 0 |
| $Mg(OH)_2$ | 0 | 0 | 0 | 11678.01 | 0 | 0 |
| MgO | 0 | 0 | 0 | 0 | 0 | 0 |
| $MgHCO_3^+$ | 0 | 0 | 0 | 908.901 | 0 | 0 |
| $SO_2$ | 0 | 0 | 0 | 0 | 0 | 0 |
| $NO_2$ | 0 | 0 | 0 | 0 | 0 | 0 |
| NO | 0 | 0 | 0 | 0 | 0 | 0 |
| $Mg^{2+}$ | 0 | 1.89E+06 | 0 | 0 | 0 | 0 |
| $Ca^{2+}$ | 0 | 4119.258 | 0 | 0 | 0 | 0 |
| $Cl^-$ | 0 | 5.51E+06 | 0 | 377.667 | 0 | 0 |
| $CO_3^{2-}$ | 0 | 0 | 0 | 0 | 0 | 0 |
| $HCO_3^-$ | 0 | 0 | 0 | 0.006 | 0 | 0 |
| $OH^-$ | 0 | 0 | 0 | 0 | 0 | 0 |
| $CaSiO_3$ | 0 | 0 | 0 | 0 | 0 | 0 |
| $SiO_2$ | 0 | 0 | 0 | 0 | 0 | 9.34E+06 |
| $MgSiO_3$ | 0 | 0 | 0 | 0 | 0 | 14.153 |
| DIOPSIDE | 1.68E+07 | 0 | 0 | 0 | 0 | 0 |
| DOLOMITE | 0 | 0 | 0 | 0 | 0 | 0 |

| | Process Stream Names | | | | |
|---|---|---|---|---|---|
| | SLURRY | SOLIDS | SOLIDS-1 | SOLIDS-2 | VENT |
| PH | 5.271 | | | 8.545 | |
| Temperature ° C. | 95 | 95 | 450 | 95 | 95 |
| Pressure psia | 14.696 | 14.696 | 14.696 | 14.696 | 14.696 |
| Mass VFrac | 0 | 0 | 0 | 0 | 1 |
| Mass SFrac | 1 | 0.177 | 1 | 1 | 0.558 |
| Mass Flow tons/year | 1.70E+08 | 1.43E+07 | 6.27E+06 | 1.63E+07 | 1.23E+08 |
| Volume Flow gal/min | 183332.5 | 2276.772 | 797.11 | 5155.892 | 5.85E+07 |
| Enthalpy MW | −19788.2 | 0 | −2603.98 | −7331.92 | −1510.64 |
| Density lb/cuft | 26.409 | 178.921 | 223.695 | 89.754 | 0.06 |
| $H_2O$ | 1.68E+07 | 0 | 0 | 7.20E+06 | 0 |
| HCl | 0 | 0 | 0 | 0 | 0 |
| $CO_2$ | 6.85E+06 | 0 | 0 | 0 | 6.85E+06 |
| $O_2$ | 1.37E+07 | 0 | 0 | 0 | 1.37E+07 |
| $N_2$ | 1.03E+08 | 0 | 0 | 0 | 1.03E+08 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 0 | 0 | 0 | 0 |
| $MgCl_2*6W$ | 1.58E+07 | 0 | 0 | 0 | 0 |
| Mg(OH)Cl | 0 | 0 | 0 | 0 | 0 |
| $Mg(OH)_2$ | 11678.01 | 0 | 0 | 9.07E+06 | 0 |
| MgO | 0 | 0 | 6.27E+06 | 0 | 0 |
| $MgHCO_3^+$ | 908.901 | 0 | 0 | 0 | 0 |
| $SO_2$ | 0 | 0 | 0 | 0 | 0 |
| $NO_2$ | 0 | 0 | 0 | 0 | 0 |
| NO | 0 | 0 | 0 | 0 | 0 |
| $Mg^{2+}$ | 0 | 0 | 0 | 14.555 | 0 |
| $Ca^{2+}$ | 0 | 0 | 0 | 0 | 0 |
| $Cl^-$ | 377.667 | 0 | 0 | 0 | 0 |
| $CO_3^{2-}$ | 0 | 0 | 0 | 0 | 0 |
| $HCO_3^-$ | 0.006 | 0 | 0 | 0 | 0 |
| $OH^-$ | 0 | 0 | 0 | 0 | 0 |
| $CaSiO_3$ | 0 | 0 | 0 | 0 | 0 |
| $SiO_2$ | 0 | 0 | 0 | 0 | 0 |
| $MgSiO_3$ | 0 | 0 | 0 | 0 | 0 |
| DIOPSIDE | 0 | 0 | 0 | 0 | 0 |
| DOLOMITE | 1.43E+07 | 1.43E+07 | | | |

Example 22

Decomposition of Other Salts

The thermal decomposition of other salts has been measured in lab. A summary of some test results are shown in the table below.

TABLE 22

Decomposition of other salts.

| Salt | Temp. °C. | Time (min.) | Results |
|---|---|---|---|
| $Mg(NO_3)_2$ | 400 | 30 | 63% decomposition. Reaction is $Mg(NO_3)_2 \rightarrow MgO + 2NO_2 + \frac{1}{2}O_2$ |
| $Mg(NO_3)_2$ | 400 | 45 | 64% decomposition. |
| $Mg(NO_3)_2$ | 400 | 90 | 100% decomposition |
| $Mg(NO_3)_2$ | 400 | 135 | 100% decomposition |
| $Ca(NO_3)_2$ | 400 | 30 | <25% decomposition Reaction is $Ca(NO_3)_2 \rightarrow CaO + 2NO_2 + \frac{1}{2}O_2$ |
| $Ca(NO_3)_2$ | 600 | 50 | 61% decomposition |
| $Ca(NO_3)_2$ | 600 | Overnight | 100% decomposition |
| LiCl | 450 | 120 | ~0% decomposition |

Example 22

Two, Three and Four-Chamber Decomposition Models

Table 23 (see below) is a comparison of the four configurations corresponding to FIGS. 31-34. Depicted are the number and description of the chambers, the heat consumed in MW (Megawatts), the percentage of heat from that particular source and the reduction of required external heat in kW-H/tonne of $CO_2$ because of available heat from other reactions in the process, namely the hydrochloric acid reaction with mineral silicates and the condensation of hydrochloric acid. In the FIG. 34 example, the hot flue gas from the open-cycle natural gas plant also qualifies.

Example 23

Output Mineral Compared with Input Minerals—Coal

In this case study involving flue gas from a coal-based power plant, Table 24 illustrates that the volume of mineral outputs (limestone and sand) are 83% of the volume of input minerals (coal and inosilicate). The results summarized in Table 24 are based on a 600 MWe coal plant; total 4.66 E6 tonne $CO_2$, includes $CO_2$ for process-required heat.

Example 24

Output Mineral Compared with Input Minerals—Natural Gas

In this case study summarized in Table 25 (below) involving flue gas from a natural gas-based power plant, the "rail-back volume" of minerals is 92% of the "rail-in volume" of minerals. The results summarized in Table 25 are (based on a 600 MWe CC natural gas plant; total 2.41 E6 tonne $CO_2$, which includes $CO_2$ for process-required heat.

TABLE 23

Two, Three and Four-Chamber Decomposition Results

| | | Chamber Description | | | | |
|---|---|---|---|---|---|---|
| | | Pre-heat | Pre Heat | Pre-Heat Mineral Dissolution Reactor | | |
| Example | No. of Chambers | Cold Flue Gas | from Steam | Silicate Reaction | HCl Heat Recovery | Decomposition |
| FIG. 31 Cold Flue Gas Pre Heat | 3 | | | | | |
| MW of Heat | | 83.9 | Not used | 286 | 563 | 86.8 |
| Percentage of Total Heat | | 8.2% | Not used | 28.0% | 55.2% | 8.5% |
| Reduction kW-Hr/tonne | | −506.7 | Not used | −1727.4 | −3400.5 | Not a reduction |
| FIG. 32 Cold Flue Gas and Steam Pre -Heat | 4 | | | | | |
| MW of Heat | | 83.9 | 8.7 | 286 | 563 | 82.2 |
| Percentage of Total Heat | | 8.2% | 0.8% | 27.9% | 55.0% | 8.0% |
| Reduction kW-Hr/tonne | | −506.7 | −52.5 | −1727.4 | −3400.5 | Not a reduction |
| FIG. 33 Nat Gas Only | 2 | | | | | |
| MW of Heat | | Not used | Not used | 279 | 586 | 129.3 |
| Percentage of Total Heat | | Not used | Not used | 28% | 59% | 13% |
| Reduction kW-Hr/tonne | | Not used | Not used | −1685.1 | −3539.4 | Not a reduction |
| FIG. 34 Hot Flue Gas Only | 2 | | | | | |
| MW of Heat | | Not used | Not used | 243 | 512 | 112.9 |
| Percentage of Total Heat | | Not used | Not used | 28% | 59% | 13% |
| Reduction kW-Hr/tonne | | Not used | Not used | −1467.7 | −3092.4 | −681.9 |

TABLE 24

Coal Scenario - Volume of Mineral Outputs Compared with Volume of Mineral Inputs

| | | Metric Units | | English Units | |
|---|---|---|---|---|---|
| Parameter | Bulk Density (Tonne/m$^3$) | Mass (10$^6$ Tonne/yr) | Volume (10$^6$ m$^3$/yr) | Mass (10$^6$ Ton/yr) | Volume (10$^6$ ft$^3$/yr) |
| Coal | 0.8 | 1.57 | 1.97 | 1.73 | 69.5 |
| CaSiO$_3$ | 0.71 | 12.30 | 17.32 | 13.56 | 611.8 |
| Coal + CaSiO$_3$ | | | | | 681.25 |
| CaCO$_3$ | 0.9 | 10.60 | 11.78 | 11.68 | 415.9 |
| SiO$_2$ | 1.5 | 6.35 | 4.23 | 7.00 | 149.5 |
| CaCO$_3$ + SiO$_2$ | n/a | 16.95 | 16.01 | 18.68 | 565.4 |
| RATIO OF MINERAL VOLUME OUT/MINERAL VOLUME IN = | | | | | 83.00% |

TABLE 25

Natural Gas Scenario - Volume of Mineral Outputs Compared with Volume of Mineral Inputs

| | | Metric Units | | English Units | |
|---|---|---|---|---|---|
| Parameter | Bulk Density (Tonne/m$^3$) | Mass (10$^6$ Tonne/yr) | Volume (10$^6$ m$^3$/yr) | Mass (10$^6$ Ton/yr) | Volume (10$^6$ ft$^3$/yr) |
| Coal | 0.8 | 1.57 | 1.97 | 1.73 | 69.5 |
| CaSiO$_3$ | 0.71 | 12.30 | 17.32 | 13.56 | 611.8 |
| Coal + CaSiO$_3$ | | | | | 681.25 |
| CaCO$_3$ | 0.9 | 10.60 | 11.78 | 11.68 | 415.9 |
| SiO$_2$ | 1.5 | 6.35 | 4.23 | 7.00 | 149.5 |
| CaCO$_3$ + SiO$_2$ | n/a | 16.95 | 16.01 | 18.68 | 565.4 |
| RATIO OF MINERAL VOLUME OUT/MINERAL VOLUME IN = | | | | | 83.00% |

All of the methods disclosed and claimed herein can be made and executed without undue experimentation in light of the present disclosure. While the compositions and methods of this invention have been described in terms of particular embodiments, it will be apparent to those of skill in the art that variations may be applied to the methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

U.S. Prov. Appln. 60/612,355
U.S. Prov. Appln. 60/642,698
U.S. Prov. Appln. 60/718,906
U.S. Prov. Appln. 60/973,948
U.S. Prov. Appln. 61/032,802
U.S. Prov. Appln. 61/033,298
U.S. Prov. Appln. 61/288,242
U.S. Prov. Appln. 61/362,607
U.S. patent application Ser. No. 11/233,509
U.S. patent application Ser. No. 12/235,482
U.S. Patent Pubn. 2006/0185985
U.S. Patent Pubn. 2009/0127127
U.S. Pat. No. 7,727,374
PCT Appln. PCT/US08/77122
Goldberg et al., *Proceedings of First National Conference on Carbon Sequestration*, 14-17 May 2001, Washington, D.C., section 6c, United States Department of Energy, National Energy Technology Laboratory. available at: http://www.netl.doe.gov/publications/proceedings/01/carbon_seq/6cl.pdf.
*Proceedings of First National Conference on Carbon Sequestration*, 14-17 May 2001, Washington, D.C. United States Department of Energy, National Energy Technology Laboratory. CD-ROM USDOE/NETL-2001/1144; also available at http://www.netl.doe.gov/publications/proceedings/01/carbon_seq/carbon_seq01.html.

What is claimed is:

1. A method of sequestering carbon dioxide produced by a source, comprising:
   (a) heating a first halide or hydrate thereof with water to form a first hydroxide, oxide and/or hydroxychloride and HCl, and removing the HCl;
   (b) admixing some or all of the first hydroxide, oxide, and/or hydroxychloride with a second halide or hydrate thereof and carbon dioxide to form a first halide or hydrate thereof, a carbonate salt, and water; and
   (c) separating some or all of the carbonate salt from step b, whereby the carbon dioxide is sequestered into a mineral product form.

2. The method of claim 1, wherein the first halide, or hydrate thereof of step (a) is a first chloride.

3. The method according to claim 1, wherein the first halide or hydrate thereof of step (b) is a first chloride or hydrate thereof.

4. The method of claim 2, wherein the first chloride or hydrate thereof of step (a) is MgCl$_2$.

5. The method of claim 4, wherein the first chloride or hydrate thereof of step (a) is a hydrated form of MgCl$_2$.

6. The method of claim 5, wherein the first chloride or hydrate thereof of step (a) is MgCl$_2$.6H$_2$O.

7. The method according to claim 1, wherein the first hydroxide of step (a) is Mg(OH)$_2$.

8. The method according to claim 2, wherein the first hydroxychloride of step (a) is Mg(OH)Cl.

9. The method of claim 8, wherein the first step (a) product comprises predominantly Mg(OH)Cl.

10. The method of claim 8, wherein the first step (a) product comprises greater than 90% by weight Mg(OH)Cl.

11. The method of claim 8, wherein the first step (a) product is Mg(OH)Cl.

12. The method according to claim 1, wherein the first oxide of step (a) is MgO.

13. The method according to claim 1, wherein the second halide or hydrate thereof of step (b) is a second chloride or hydrate thereof.

14. The method of claim 13, wherein the second chloride or hydrate thereof is CaCl$_2$.

15. The method according to claim 3, wherein the first chloride of step (b) is MgCl$_2$.

16. The method of claim 15, wherein the first chloride of step (b) is a hydrated form of MgCl$_2$.

17. The method of claim 15, wherein the first chloride of step (b) is MgCl$_2$.6H$_2$O.

18. The method according to claim 1, where some or all of the water in step (a) is present in the form of steam or super-critical water.

19. The method according to claim 1, where some or all of the water of step (a) is obtained from the water of step (b).

20. The method according to claim 1, wherein step (b) further comprises admixing sodium hydroxide.

21. A method of claim 1, further comprising:
(d) admixing a Group 2 silicate mineral with HCl to form a Group 2 chloride, water, and silicon dioxide.

22. The method of claim 21, where some or all of the HCl in step (d) is obtained from step (a).

23. The method of claim 21, wherein the HCl of step (d) further comprises agitating the Group 2 silicate mineral with HCl.

24. The method according to claim 21, wherein some or all of the heat generated in step (d) is recovered.

25. The method according to claim 21, where some or all of the second chloride of step (b) is the Group 2 chloride of step (d).

26. The method according to claim 21, further comprising a separation step, wherein the silicon dioxide is removed from the Group 2 chloride formed in step (d).

27. The method according to claim 21, where some or all of the water of step (a) is obtained from the water of step (d).

28. The method according to claim 21, wherein the Group 2 silicate mineral of step (d) comprises a Group 2 inosilicate.

29. The method according to claim 21, wherein the Group 2 silicate mineral of step (d) comprises $CaSiO_3$.

30. The method according to claim 21, wherein the Group 2 silicate mineral of step (d) comprises $MgSiO_3$.

31. The method according to claim 21, wherein the Group 2 silicate mineral of step (d) comprises olivine ($Mg_2[SiO_4]$).

32. The method according to claim 21, wherein the Group 2 silicate mineral of step (d) comprises serpentine ($Mg_6[OH]_8[Si_4O_{10}]$).

33. The method according to claim 21, wherein the Group 2 silicate mineral of step (d) comprises sepiolite ($Mg_4[(OH)_2Si_6O_{15}] \cdot 6H_2O$), enstatite ($Mg_2[Si_2O_6]$), diopside (CaMg $[Si_2O_6]$), and/or tremolite $Ca_2Mg_5\{[OH]Si_4O_{11}\}_2$.

34. The method according to claim 21, wherein the Group 2 silicate further comprises iron and or manganese silicates.

35. The method of claim 34, wherein the iron silicate is fayalite ($Fe_2[SiO_4]$).

36. The method according to claim 3, wherein some or all of the first chloride formed in step (b) is the first chloride used in step (a).

37. The method according to claim 1, wherein the carbon dioxide is in the form of flue gas, wherein the flue gas further comprises $N_2$ and $H_2O$.

38. The method according to claim 1, wherein suitable reacting conditions of step (a) comprise a temperature from about 200° C. to about 500° C.

39. The method of claim 38, wherein the temperature is from about 230° C. to about 260° C.

40. The method of claim 38, wherein the temperature is about 250° C.

41. The method of claim 38, wherein the temperature is from about 200° C. to about 250° C.

42. The method of claim 38, wherein the temperature is about 240° C.

43. The method according to claim 1, wherein suitable reacting conditions of step (a) comprise a temperature from about 50° C. to about 200° C.

44. The method of claim 43, wherein the temperature is from about 90° C. to about 260° C.

45. The method of claim 44, wherein the temperature is from about 90° C. to about 230° C.

46. The method of claim 45, wherein the temperature is about 130° C.

47. The method according to claim 1, wherein suitable reacting conditions of step (a) comprise a temperature from about 400° C. to about 550° C.

48. The method of claim 47, wherein the temperature is from about 450° C. to about 500° C.

49. The method according to claim 1, wherein suitable reacting conditions of step (b) comprise a temperature from about 20° C. to about 100° C.

50. The method of claim 49, wherein the temperature is from about 25° C. to about 95° C.

51. The method according to claim 21, wherein suitable reacting conditions of step (d) comprise a temperature from about 50° C. to about 200° C.

52. The method of claim 51, wherein the temperature is from about 90° C. to about 150° C.

* * * * *

UNITED STATES PATENT AND TRADEMARK OFFICE
CERTIFICATE OF CORRECTION

PATENT NO. : 9,359,221 B2
APPLICATION NO. : 13/179305
DATED : June 7, 2016
INVENTOR(S) : Joe David Jones et al.

Page 1 of 1

It is certified that error appears in the above-identified patent and that said Letters Patent is hereby corrected as shown below:

In the Claims

In Claim 1, Column 108, Line 24, please replace "a first halide" with "the first halide"

Signed and Sealed this
Third Day of December, 2019

Andrei Iancu
*Director of the United States Patent and Trademark Office*